(12) United States Patent
Spoor et al.

(10) Patent No.: US 9,822,673 B2
(45) Date of Patent: Nov. 21, 2017

(54) LATCH INTERFACE FOR A VALVE ACTUATING DEVICE

(71) Applicant: Eaton Corporation, Cleveland, OH (US)

(72) Inventors: Anthony L. Spoor, Union City, MI (US); James R. Sheren, Grand Ledge, MI (US)

(73) Assignee: EATON CORPORATION, Cleveland, OH (US)

( * ) Notice: Subject to any disclaimer, the term of this patent is extended or adjusted under 35 U.S.C. 154(b) by 0 days.

(21) Appl. No.: 14/981,092

(22) Filed: Dec. 28, 2015

(65) Prior Publication Data

US 2016/0146064 A1     May 26, 2016

Related U.S. Application Data

(63) Continuation of application No. 14/840,243, filed on Aug. 31, 2015, which is a continuation of application
(Continued)

(51) Int. Cl.
    *F01L 1/18*           (2006.01)
    *F01L 1/22*           (2006.01)
(Continued)

(52) U.S. Cl.
    CPC ................ *F01L 1/22* (2013.01); *B21D 39/00* (2013.01); *B21D 53/84* (2013.01); *B23P 19/02* (2013.01);
(Continued)

(58) Field of Classification Search
    CPC ..... F01L 1/22; F01L 1/18; F01L 1/185; F01L 1/2405; F01L 13/0005; F01L 13/0021;
(Continued)

(56) References Cited

U.S. PATENT DOCUMENTS 2,385,309 A     9/1945   Spencer et al.
2,573,522 A     10/1951   Watt
(Continued)

FOREIGN PATENT DOCUMENTS

CN     104047655 A     9/2014
CN     104153906 A     11/2014
(Continued)

OTHER PUBLICATIONS

U.S. Appl. No. 61/315,464, "U.S. Appl. No. 61/315,464, filed Mar. 19, 2010", 9 pages.
(Continued)

*Primary Examiner* — Jason Shanske
*Assistant Examiner* — Kelsey Stanek
(74) *Attorney, Agent, or Firm* — GTC Law Group PC & Affiliates

(57) ABSTRACT

A novel latch seat for a switching rocker arm assembly used in variable valve actuation (VVA) systems for internal combustion engines. The seat is formed interactively in the assembled switching rocker arm using a novel fixture and press. The press interactively creates a curved dimple of the correct curvature, position and depth while measuring several lash dimensions. Since the latch seat is formed on the assembled rocker arm assembly, the latch seat depth is designed to account for the inaccuracies in the rocker arm assembly parts which create lash. Therefore all of the parts may be made with less precision since the latch seat is sized to compensate for the inaccuracies of all of the parts. The rocker arm assembly parts now may be manufactured to less stringent standards, but result in a rocker arm assembly with same accuracy of rocker arm assemblies manufactured to previous standards.

12 Claims, 99 Drawing Sheets

Related U.S. Application Data

No. PCT/US2014/019870, filed on Mar. 3, 2014, and a continuation-in-part of application No. 14/188,339, filed on Feb. 24, 2014, now Pat. No. 9,194,261, which is a continuation-in-part of application No. 13/868,068, filed on Apr. 22, 2013, now Pat. No. 9,284,859, which is a continuation-in-part of application No. 13/868,067, filed on Apr. 22, 2013, now Pat. No. 9,228,454, and a continuation-in-part of application No. 13/873,797, filed on Apr. 30, 2013, now Pat. No. 9,016,252, and a continuation-in-part of application No. 13/873,774, filed on Apr. 30, 2013, now Pat. No. 9,291,075, and a continuation-in-part of application No. 13/868,061, filed on Apr. 22, 2013, now Pat. No. 9,038,586, and a continuation-in-part of application No. 13/868,054, filed on Apr. 22, 2013, now Pat. No. 9,708,942, and a continuation-in-part of application No. 13/868,045, filed on Apr. 22, 2013, now Pat. No. 9,267,396, and a continuation-in-part of application No. 13/868,035, filed on Apr. 22, 2013, now Pat. No. 8,915,225, and a continuation-in-part of application No. 13/868,025, filed on Apr. 22, 2013, now Pat. No. 8,985,074, said application No. PCT/US2014/019870 is a continuation-in-part of application No. PCT/US2013/068503, filed on Nov. 5, 2013, and a continuation-in-part of application No. PCT/US2013/038896, filed on Apr. 30, 2013, and a continuation-in-part of application No. PCT/US2013/037665, filed on Apr. 22, 2013, and a continuation-in-part of application No. PCT/US2013/037667, filed on Apr. 22, 2013, said application No. 14/188,339 is a continuation-in-part of application No. PCT/US2013/068503, filed on Nov. 5, 2013, said application No. 14/188,339 is a continuation-in-part of application No. 13/868,068, filed on Apr. 22, 2013, now Pat. No. 9,284,859, and a continuation-in-part of application No. 13/868,067, filed on Apr. 22, 2013, now Pat. No. 9,228,454, and a continuation-in-part of application No. 13/873,797, filed on Apr. 30, 2013, now Pat. No. 9,016,252, and a continuation-in-part of application No. 13/873,774, filed on Apr. 30, 2013, now Pat. No. 9,291,075, and a continuation-in-part of application No. 13/868,061, filed on Apr. 22, 2013, now Pat. No. 9,038,586, and a continuation-in-part of application No. 13/868,054, filed on Apr. 22, 2013, now Pat. No. 9,708,942, which is a continuation-in-part of application No. 13/868,045, filed on Apr. 22, 2013, now Pat. No. 9,267,396, said application No. 14/188,339 is a continuation-in-part of application No. 13/868,035, filed on Apr. 22, 2013, now Pat. No. 8,915,225, and a continuation-in-part of application No. 13/868,025, filed on Apr. 22, 2013, now Pat. No. 8,985,074, and a continuation-in-part of application No. PCT/US2013/038896, filed on Apr. 30, 2013, and a continuation-in-part of application No. PCT/US2013/037665, filed on Apr. 22, 2013, and a continuation-in-part of application No. PCT/US2013/037667, filed on Apr. 22, 2013, said application No. 13/868,068 is a continuation-in-part of application No. 13/051,839, filed on Mar. 18, 2011, now Pat. No. 8,726,862, and a continuation-in-part of application No. 13/051,848, filed on Mar. 18, 2011, now Pat. No. 8,752,513, said application No. 13/868,067 is a continuation-in-part of application No. 13/051,839, filed on Mar. 8, 2011, now Pat. No. 9,726,862, and a continuation-in-part of application No. 13/051,848, filed on Mar. 18, 2011, now Pat. No. 8,752,513, said application No. 13/873,797 is a continuation-in-part of application No. 13/051,839, filed on Mar. 18, 2011, now Pat. No. 8,726,862, and a continuation-in-part of application No. 13/051,848, filed on Mar. 18, 2011, now Pat. No. 8,752,513, said application No. 13/873,774 is a continuation-in-part of application No. 13/051,839, filed on Mar. 18, 2011, now Pat. No. 8,726,862, and a continuation-in-part of application No. 13/051,848, filed on Mar. 18, 2011, now Pat. No. 8,752,513, said application No. 13/868,061 is a continuation-in-part of application No. 13/051,839, filed on Mar. 18, 2011, now Pat. No. 8,726,862, and a continuation-in-part of application No. 13/051,848, filed on Mar. 18, 2011, now Pat. No. 8,752,513, said application No. 13/868,054 is a continuation-in-part of application No. 13/051,839, filed on Mar. 18, 2011, now Pat. No. 8,726,862, and a continuation-in-part of application No. 13/051,848, filed on Mar. 18, 2011, now Pat. No. 8,752,513, said application No. 13/868,045 is a continuation-in-part of application No. 13/051,839, filed on Mar. 18, 2011, now Pat. No. 8,726,862, and a continuation-in-part of application No. 13/051,848, filed on Mar. 18, 2011, now Pat. No. 8,752,513, said application No. 13/868,035 is a continuation-in-part of application No. 13/051,839, filed on Mar. 18, 2011, now Pat. No. 8,726,862, and a continuation-in-part of application No. 13/051,848, filed on Mar. 18, 2011, now Pat. No. 8,752,513, said application No. 13/868,025 is a continuation-in-part of application No. 13/051,839, filed on Mar. 18, 2011, now Pat. No. 8,726,862, and a continuation-in-part of application No. 13/051,848, filed on Mar. 18, 2011, now Pat. No. 8,752,513, said application No. PCT/US2013/038896 is a continuation-in-part of application No. 13/051,839, filed on Mar. 18, 2011, now Pat. No. 8,726,862, and a continuation-in-part of application No. 13/051,848, filed on Mar. 18, 2011, now Pat. No. 8,752,513, said application No. PCT/US2013/037665 is a continuation-in-part of application No. 13/051,839, filed on Mar. 18, 2011, now Pat. No. 8,726,862, and a continuation-in-part of application No. 13/051,848, filed on Mar. 18, 2011, now Pat. No. 8,752,513, said application No. PCT/US2013/037667 is a continuation-in-part of application No. 13/051,839, filed on Mar. 18, 2011, now Pat. No. 8,726,862, and a continuation-in-part of application No. 13/051,848, filed on Mar. 18, 2011, now Pat. No. 8,752,513.

(60) Provisional application No. 61/771,716, filed on Mar. 1, 2013, provisional application No. 61/771,769, filed on Mar. 1, 2013, provisional application No. 61/768,214, filed on Feb. 22, 2013, provisional application No. 61/722,765, filed on Nov. 5, 2012, provisional application No. 61/640,713, filed on Apr. 30, 2012, provisional application No. 61/640,709, filed on Apr. 30, 2012, provisional application No. 61/637,786, filed on Apr. 24, 2012, provisional application No. 61/636,277, filed on Apr. 20, 2012, provisional application No. 61/771,769, filed on Mar. 1, 2013, provisional application No. 61/315,646, filed on Mar. 19, 2010, provisional application No. 61/315,464, filed on Mar. 19, 2010, provisional application No. 61/640,705, filed on Apr. 30, 2012, provisional application No. 61/640,707, filed on Apr.

30, 2012, provisional application No. 61/640,705, filed on Apr. 30, 2012, provisional application No. 61/640,707, filed on Apr. 30, 2012, provisional application No. 61/771,721, filed on Mar. 1, 2013.

(51) Int. Cl.
*F01L 13/00* (2006.01)
*B23P 19/02* (2006.01)
*F01L 1/24* (2006.01)
*B21D 39/00* (2006.01)
*B21D 53/84* (2006.01)
*F01L 1/053* (2006.01)

(52) U.S. Cl.
CPC ............... *F01L 1/18* (2013.01); *F01L 1/185* (2013.01); *F01L 1/2405* (2013.01); *F01L 13/0005* (2013.01); *F01L 13/0021* (2013.01); *F01L 13/0036* (2013.01); *F01L 13/0042* (2013.01); *F01L 2001/0537* (2013.01); *F01L 2001/186* (2013.01); *F01L 2013/001* (2013.01); *F01L 2101/00* (2013.01); *F01L 2103/01* (2013.01); *F01L 2800/11* (2013.01); *F01L 2820/01* (2013.01); *F01L 2820/043* (2013.01); *Y10T 29/49297* (2015.01); *Y10T 29/53* (2015.01); *Y10T 29/53796* (2015.01)

(58) Field of Classification Search
CPC ............... F01L 13/0042; F01L 13/0036; F01L 2001/186; F01L 2001/00; F01L 2800/11; F01L 2800/043; B21D 39/00; B21D 53/84; B23P 19/02; Y10T 29/49297; Y10T 29/53; Y10T 29/53796
USPC .................................................. 123/90.1–90.6
See application file for complete search history.

(56) References Cited

U.S. PATENT DOCUMENTS

| | | |
|---|---|---|
| 2,694,389 A | 11/1954 | Turkish |
| 3,332,405 A | 7/1967 | Haviland, et al. |
| 4,376,447 A | 3/1983 | Chumley |
| 4,491,010 A | 1/1985 | Brandt et al. |
| 4,762,096 A | 8/1988 | Kamm et al. |
| 4,788,947 A | 12/1988 | Edelmayer |
| 4,858,886 A | 8/1989 | Tatara |
| 4,873,949 A | 10/1989 | Fujiyoshi et al. |
| 4,942,853 A | 7/1990 | Konno |
| 4,969,352 A | 11/1990 | Sellnau |
| 4,995,281 A | 2/1991 | Allor et al. |
| 5,018,313 A | 5/1991 | Yamane et al. |
| 5,103,779 A | 4/1992 | Hare |
| 5,109,675 A | 5/1992 | Hwang |
| 5,320,795 A | 6/1994 | Mitchell et al. |
| 5,367,904 A | 11/1994 | Sellnau |
| 5,619,958 A | 4/1997 | Hampton et al. |
| 5,623,897 A | 4/1997 | Hampton et al. |
| 5,660,153 A | 8/1997 | Hampton et al. |
| 5,769,043 A | 6/1998 | Nitkiewicz |
| 6,057,692 A | 5/2000 | Allmendinger et al. |
| 6,178,997 B1 | 1/2001 | Adams et al. |
| 6,186,100 B1 | 2/2001 | Sawada et al. |
| 6,318,342 B1 | 11/2001 | Simon et al. |
| 6,469,500 B1 | 10/2002 | Schmitz et al. |
| 6,474,276 B1 | 11/2002 | Schmitz et al. |
| 6,476,599 B1 | 11/2002 | Czimmek et al. |
| 6,532,920 B1 | 3/2003 | Sweetnam et al. |
| 6,550,494 B2 | 4/2003 | Yoneda et al. |
| 6,557,518 B1 | 5/2003 | Albertson et al. |
| 6,561,036 B1 | 5/2003 | Gustafsson et al. |
| 6,575,128 B2 | 6/2003 | Nakamura et al. |
| 6,598,569 B2 | 7/2003 | Takemura et al. |
| 6,615,782 B1 | 9/2003 | Hendriksma et al. |
| 6,633,157 B1 | 10/2003 | Yamaki et al. |
| 6,668,775 B2 | 12/2003 | Harris |
| 6,691,657 B2 | 2/2004 | Hendriksma et al. |
| 6,769,387 B2 | 8/2004 | Hayman et al. |
| 6,895,351 B2 | 5/2005 | Grumstrup et al. |
| 6,923,151 B2 | 8/2005 | Kreuter |
| 6,932,041 B1 | 8/2005 | Riley |
| 6,973,820 B2 | 12/2005 | Watarai et al. |
| 6,989,669 B2 | 1/2006 | Low et al. |
| 6,994,061 B2 | 2/2006 | Magner et al. |
| 7,034,527 B2 | 4/2006 | Low et al. |
| 7,047,925 B2 | 5/2006 | Hendriksma et al. |
| 7,051,639 B2 | 5/2006 | Krone et al. |
| 7,107,950 B2 | 9/2006 | Arinaga et al. |
| 7,116,097 B2 | 10/2006 | Revankar et al. |
| 7,117,726 B1 | 10/2006 | Krieger |
| 7,207,301 B2 | 4/2007 | Hathaway et al. |
| 7,240,652 B2 | 7/2007 | Roerig et al. |
| 7,259,553 B2 | 8/2007 | Arns et al. |
| 7,305,951 B2 | 12/2007 | Kunz et al. |
| 7,307,418 B2 | 12/2007 | Low et al. |
| 7,318,402 B2 | 1/2008 | Harman et al. |
| RE40,439 E | 7/2008 | Brehob et al. |
| 7,439,733 B2 | 10/2008 | Arns et al. |
| 7,458,158 B2 | 12/2008 | Luo et al. |
| 7,484,487 B2 | 2/2009 | Zurface et al. |
| 7,546,822 B2 | 6/2009 | Murphy et al. |
| 7,546,827 B1 | 6/2009 | Wade et al. |
| 7,562,643 B2 | 7/2009 | Akasaka |
| 7,677,213 B2 | 3/2010 | Deierlein |
| 7,730,771 B2 | 6/2010 | Ludwig et al. |
| 7,737,685 B2 | 6/2010 | Low et al. |
| 7,755,350 B2 | 7/2010 | Arns et al. |
| 7,761,988 B2 | 7/2010 | Rorig et al. |
| 7,854,215 B2 | 12/2010 | Rozario et al. |
| 7,882,814 B2 | 2/2011 | Spath et al. |
| 7,926,455 B2 | 4/2011 | Manther et al. |
| 7,975,662 B2 | 7/2011 | Nakashima et al. |
| 7,987,826 B2 | 8/2011 | Kwak et al. |
| 8,082,092 B2 | 12/2011 | Frank et al. |
| 8,096,170 B2 | 1/2012 | Mayrhofer |
| 8,151,636 B2 | 4/2012 | Siraky |
| 8,162,002 B2 | 4/2012 | Pavin et al. |
| 8,215,275 B2 | 7/2012 | Church |
| 8,240,278 B2 | 8/2012 | Jeon et al. |
| 8,327,750 B2 | 12/2012 | Keller et al. |
| 8,375,909 B2 | 2/2013 | Radulescu et al. |
| 8,448,618 B2 | 5/2013 | Lee et al. |
| 8,464,677 B2 | 6/2013 | Choi et al. |
| 8,474,425 B2 | 7/2013 | Kirbach |
| 8,505,365 B2 | 8/2013 | Stretch et al. |
| 8,534,182 B2 | 9/2013 | Keller et al. |
| 8,555,835 B2 | 10/2013 | Pätzold et al. |
| 8,635,980 B2 | 1/2014 | Church |
| 8,656,878 B2 | 2/2014 | Moeck |
| 8,677,958 B2 | 3/2014 | Becker et al. |
| 8,726,862 B2 | 5/2014 | Zurface et al. |
| 8,752,513 B2 | 6/2014 | Zurface et al. |
| 8,820,279 B2 | 9/2014 | Roussey et al. |
| 8,915,225 B2 | 12/2014 | Zurface et al. |
| 8,985,074 B2 | 3/2015 | Zurface |
| 9,016,252 B2 | 4/2015 | Zurface et al. |
| 9,038,586 B2 | 5/2015 | Schultheis et al. |
| 9,194,261 B2 | 11/2015 | McCarthy |
| 9,228,454 B2 | 1/2016 | Vandeusen |
| 9,267,396 B2 | 2/2016 | Zurface et al. |
| 9,284,859 B2 | 3/2016 | Nielsen et al. |
| 9,291,075 B2 | 3/2016 | Zurface et al. |
| 9,581,058 B2 | 2/2017 | Radulescu et al. |
| 2001/0052254 A1 | 12/2001 | Easterbrook et al. |
| 2003/0140876 A1 | 7/2003 | Yang et al. |
| 2003/0192497 A1 | 10/2003 | Hendriksma et al. |
| 2003/0200947 A1 | 10/2003 | Harris et al. |
| 2003/0209217 A1 | 11/2003 | Hendriksma et al. |
| 2003/0217715 A1 | 11/2003 | Pierik |
| 2004/0003789 A1 | 1/2004 | Kreuter |
| 2004/0074459 A1 | 4/2004 | Hayman et al. |
| 2004/0103869 A1 | 6/2004 | Harris |
| 2004/0188212 A1 | 9/2004 | Weilant |
| 2005/0016480 A1 | 1/2005 | Ferracin et al. |

(56) References Cited

U.S. PATENT DOCUMENTS

| | | |
|---|---|---|
| 2005/0051119 A1 | 3/2005 | Bloms et al. |
| 2005/0188930 A1 | 9/2005 | Best |
| 2005/0193973 A1 | 9/2005 | Hendriksma et al. |
| 2005/0247279 A1 | 11/2005 | Rorig et al. |
| 2006/0037578 A1 | 2/2006 | Nakamura et al. |
| 2006/0081202 A1 | 4/2006 | Verner et al. |
| 2007/0039573 A1 | 2/2007 | Deierlein |
| 2007/0101958 A1 | 5/2007 | Seitz |
| 2007/0113809 A1 | 5/2007 | Harman et al. |
| 2007/0125329 A1 | 6/2007 | Rohe et al. |
| 2007/0155580 A1 | 7/2007 | Nichols et al. |
| 2007/0186890 A1 | 8/2007 | Zurface et al. |
| 2007/0283914 A1 | 12/2007 | Zurface et al. |
| 2008/0044646 A1 | 2/2008 | Rorig et al. |
| 2008/0072854 A1 | 3/2008 | Tochiki et al. |
| 2008/0127917 A1 | 6/2008 | Riley et al. |
| 2008/0149059 A1 | 6/2008 | Murphy et al. |
| 2008/0268388 A1 | 10/2008 | Zanella et al. |
| 2009/0000882 A1 | 1/2009 | Siebke |
| 2009/0064954 A1 | 3/2009 | Manther et al. |
| 2009/0082944 A1 | 3/2009 | Frank et al. |
| 2009/0084340 A1 | 4/2009 | Komura et al. |
| 2009/0090189 A1 | 4/2009 | Villaire |
| 2009/0143963 A1 | 6/2009 | Hendriksma |
| 2009/0217895 A1 | 9/2009 | Spath et al. |
| 2009/0228167 A1 | 9/2009 | Waters et al. |
| 2009/0293597 A1 | 12/2009 | Andrie |
| 2010/0018482 A1 | 1/2010 | Keller et al. |
| 2010/0095918 A1 | 4/2010 | Cecur |
| 2010/0223787 A1 | 9/2010 | Lopez-Crevillen et al. |
| 2010/0246061 A1 | 9/2010 | Sechi |
| 2010/0300390 A1 | 12/2010 | Manther |
| 2011/0226047 A1 | 9/2011 | Stretch et al. |
| 2011/0226208 A1 | 9/2011 | Zurface et al. |
| 2011/0226209 A1 | 9/2011 | Zurface et al. |
| 2012/0037107 A1 | 2/2012 | Church |
| 2012/0163412 A1 | 6/2012 | Stretch |
| 2013/0000582 A1 | 1/2013 | Church et al. |
| 2013/0068182 A1 | 3/2013 | Keller et al. |
| 2013/0233265 A1 | 9/2013 | Zurface et al. |
| 2013/0255612 A1 | 10/2013 | Zurface et al. |
| 2013/0306013 A1 | 11/2013 | Zurface et al. |
| 2013/0312506 A1 | 11/2013 | Nielsen et al. |
| 2013/0312681 A1 | 11/2013 | Schultheis et al. |
| 2013/0312686 A1 | 11/2013 | Zurface et al. |
| 2013/0312687 A1 | 11/2013 | Zurface et al. |
| 2013/0312688 A1 | 11/2013 | Vandeusen |
| 2013/0312689 A1 | 11/2013 | Zurface et al. |
| 2014/0190431 A1 | 7/2014 | McCarthy, Jr. |
| 2014/0283768 A1 | 9/2014 | Keller et al. |
| 2015/0211394 A1 | 7/2015 | Zurface et al. |
| 2015/0267574 A1 | 9/2015 | Radulescu et al. |
| 2015/0369095 A1 | 12/2015 | Spoor et al. |
| 2015/0371793 A1 | 12/2015 | Sheren et al. |
| 2016/0061067 A1 | 3/2016 | Schultheis et al. |
| 2016/0084117 A1 | 3/2016 | Zurface et al. |
| 2016/0108766 A1 | 4/2016 | Zurface et al. |
| 2016/0115831 A1 | 4/2016 | Spoor |
| 2016/0130991 A1 | 5/2016 | Zurface et al. |
| 2016/0138435 A1 | 5/2016 | Zurface et al. |
| 2016/0138438 A1 | 5/2016 | Genise et al. |
| 2016/0138484 A1 | 5/2016 | Nielsen et al. |
| 2016/0169065 A1 | 6/2016 | Vandeusen |
| 2016/0230619 A1 | 8/2016 | McCarthy, Jr. |
| 2016/0273413 A1 | 9/2016 | Sheren et al. |

FOREIGN PATENT DOCUMENTS

| | | |
|---|---|---|
| CN | 204152661 U | 2/2015 |
| CN | 204082242 | 7/2015 |
| DE | 102008062187 A1 | 6/2010 |
| EP | 2770174 A1 | 8/2014 |
| GB | 171409 A | 8/1922 |
| JP | 2010059821 A | 3/2010 |
| JP | 2012184463 A | 9/2012 |
| JP | 2013522542 A | 6/2013 |
| WO | 2014071373 A1 | 5/2014 |
| WO | 2014134601 A1 | 9/2014 |
| WO | 2014168988 A1 | 10/2014 |
| WO | 2014168988 A9 | 10/2014 |
| WO | 2014134601 A9 | 2/2015 |
| WO | 2015134466 A1 | 9/2015 |

OTHER PUBLICATIONS

U.S. Appl. No. 61/636,277, "U.S. Appl. No. 61/636,277, filed Apr. 20, 2012", 27 pages.

U.S. Appl. No. 61/637,786, "U.S. Appl. No. 61/637,786, filed Apr. 24, 2012", 15 pages.

U.S. Appl. No. 61/640,705, "U.S. Appl. No. 61/640,705, filed Apr. 30, 2012", 6 pages.

U.S. Appl. No. 61/640,707, "U.S. Appl. No. 61/640,707, filed Apr. 30, 2012", 4 pages.

U.S. Appl. No. 61/640,709, "U.S. Appl. No. 61/640,709, filed Apr. 30, 2012", 2 pages.

U.S. Appl. No. 61/640,713, "U.S. Appl. No. 61/640,713, filed Apr. 30, 2012", 2 pages.

U.S. Appl. No. 61/722,765, "61/722,765, filed Nov. 5, 2012", 23 pages.

U.S. Appl. No. 61/768,214, "U.S. Appl. No. 61/768,214, filed Feb. 22, 2013", 33 pages.

U.S. Appl. No. 61/771,716, "U.S. Appl. No. 61/771,716, filed Mar. 1, 2013", 10 pages.

U.S. Appl. No. 61/771,721, "U.S. Appl. No. 61/771,721, filed Mar. 1, 2013", 13 pages.

U.S. Appl. No. 61/771,769, "U.S. Appl. No. 61/771,769, filed Mar. 1, 2013", 51 pages.

13851457.5, "European Application Serial No. 13851457.5, Extended European Search Report dated Sep. 2, 2016", Eaton Corporation, 6 Pages.

14756458.7, "European Application Serial No. 14756458.7, Extended European Search Report dated Aug. 29, 2016", Eaton Corporation, 6 Pages.

14782089.8, "European Application Serial No. 14782089.8, Extended European Search Report dated Jan. 2, 2017", Eaton Corporation, 7 Pages.

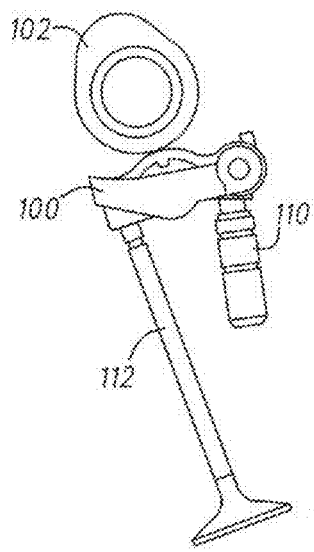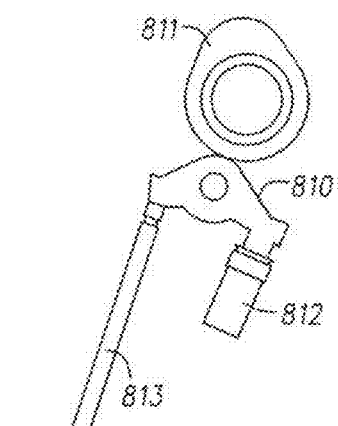
FIG. 2
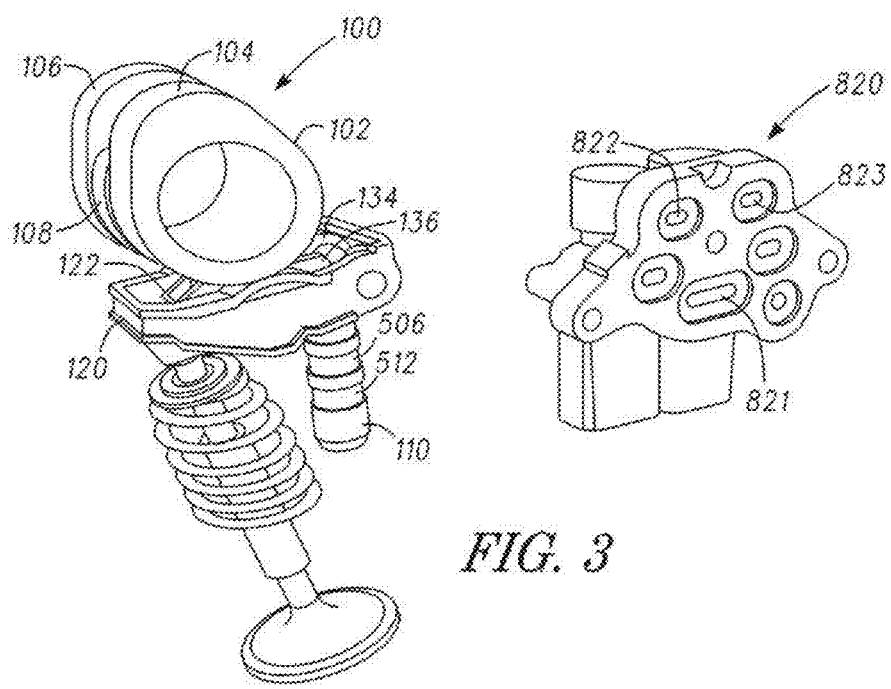
FIG. 3

| MODE | LATCH PIN STATE | OCV ENERGY | HLA UPPER FEED/ CONTROL GALLERY PRESSURE | HLA LOWER FEED PRESSURE |
|---|---|---|---|---|
| HIGH LIFT IDLE-7300 RPM | EXTENDED | OFF | OVC REGULATED 0.2-0.4 BAR | CYLINDER HEAD GALLERY PRESSURE |
| LOW LIFT (FUEL ECONOMY) IDLE-3500 RPM | RETRACTED | ON | OVC UNREGULATED ≥2.0 BAR | CYLINDER HEAD GALLERY PRESSURE |

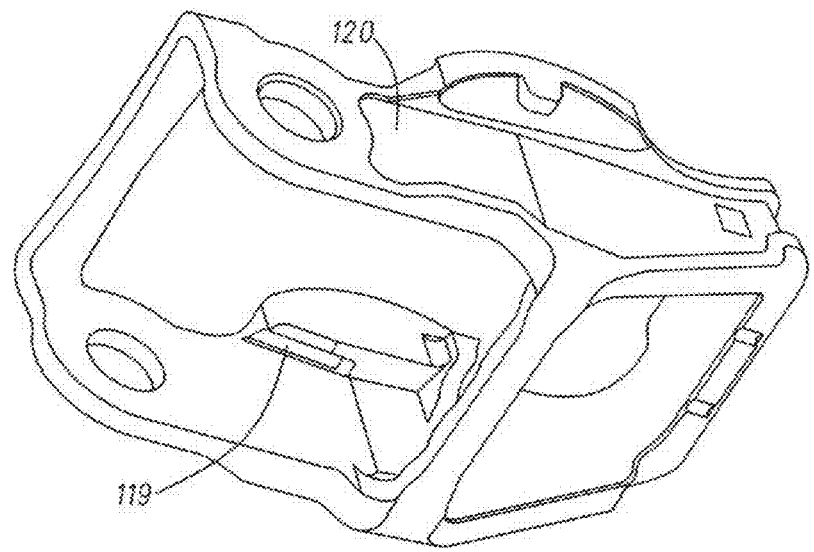

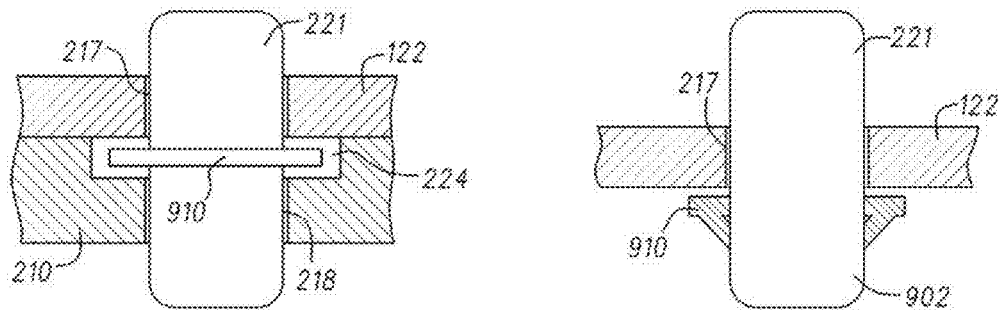
*FIG. 35A*  *FIG. 35B*
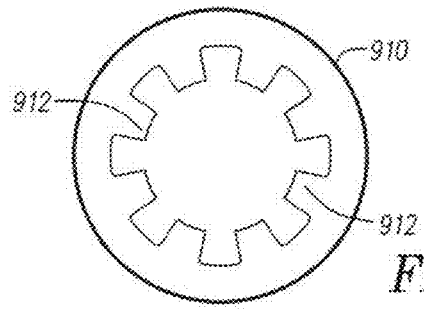
*FIG. 35C*
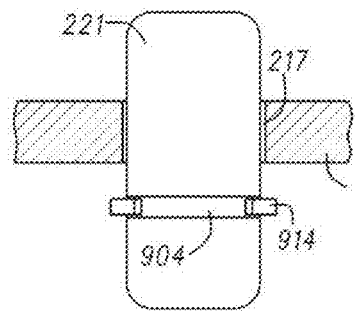
*FIG. 35D*
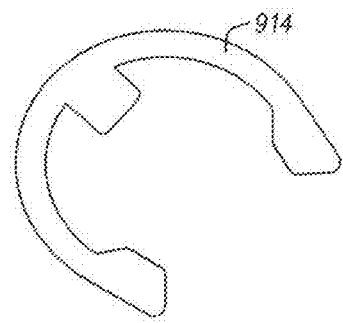
*FIG. 35E*
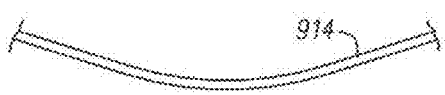
*FIG. 35F*

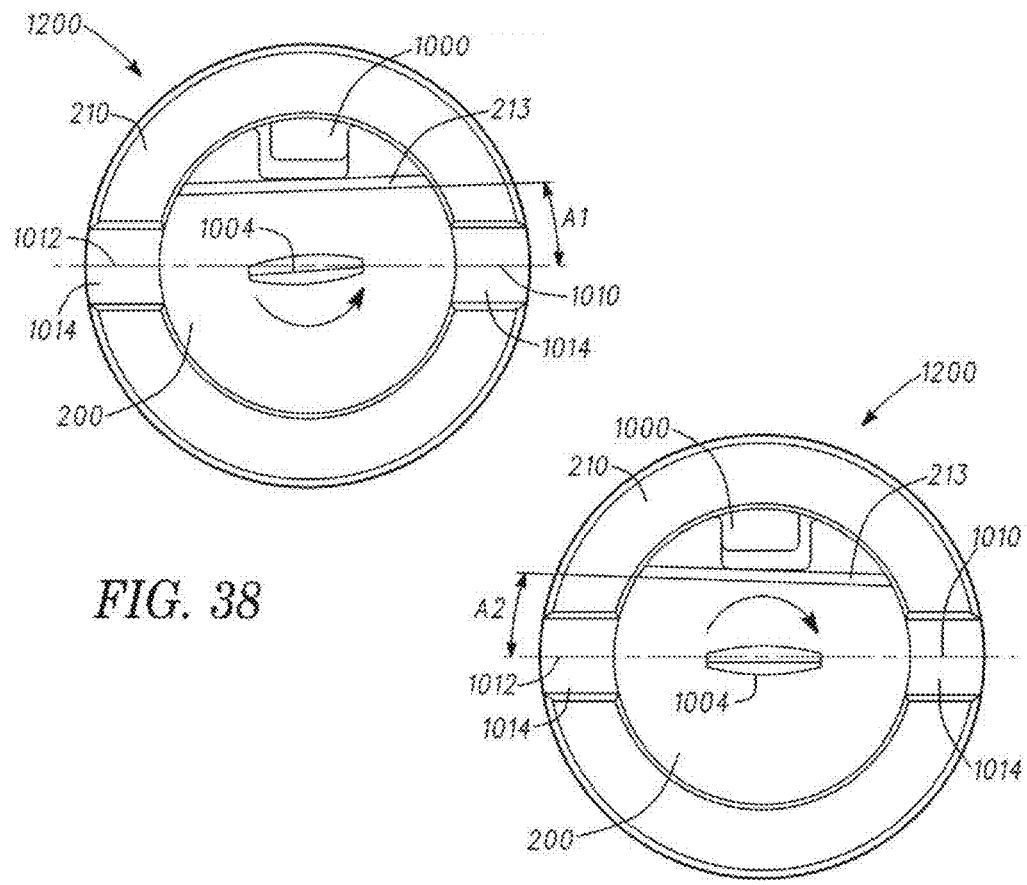
FIG. 38
FIG. 39
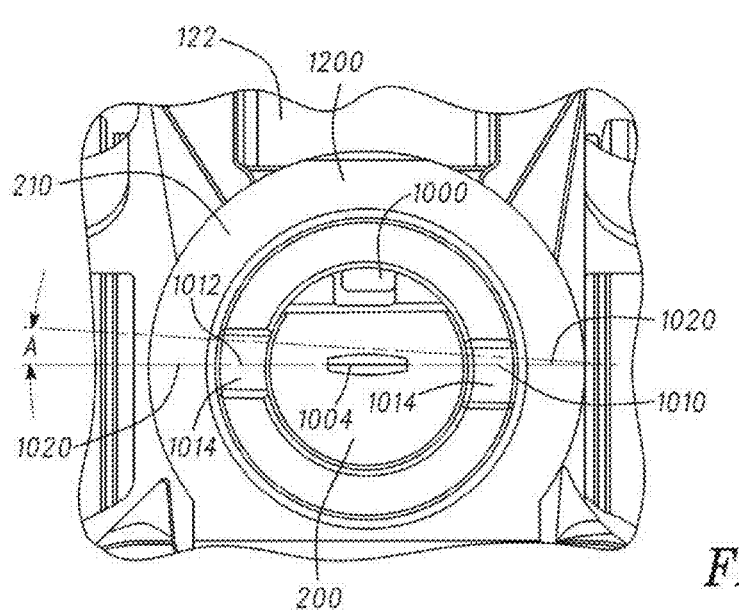
FIG. 40

FIG. 58
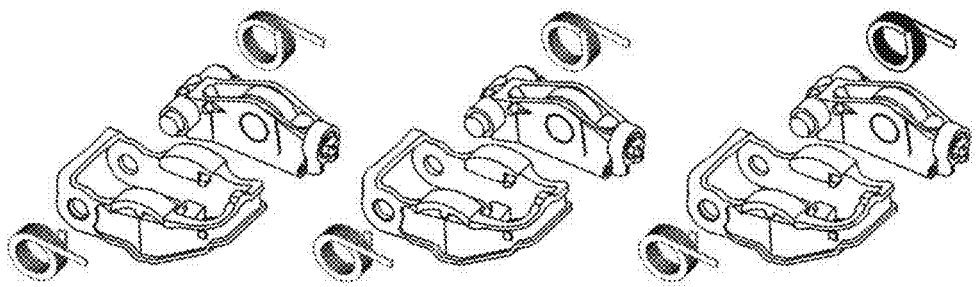
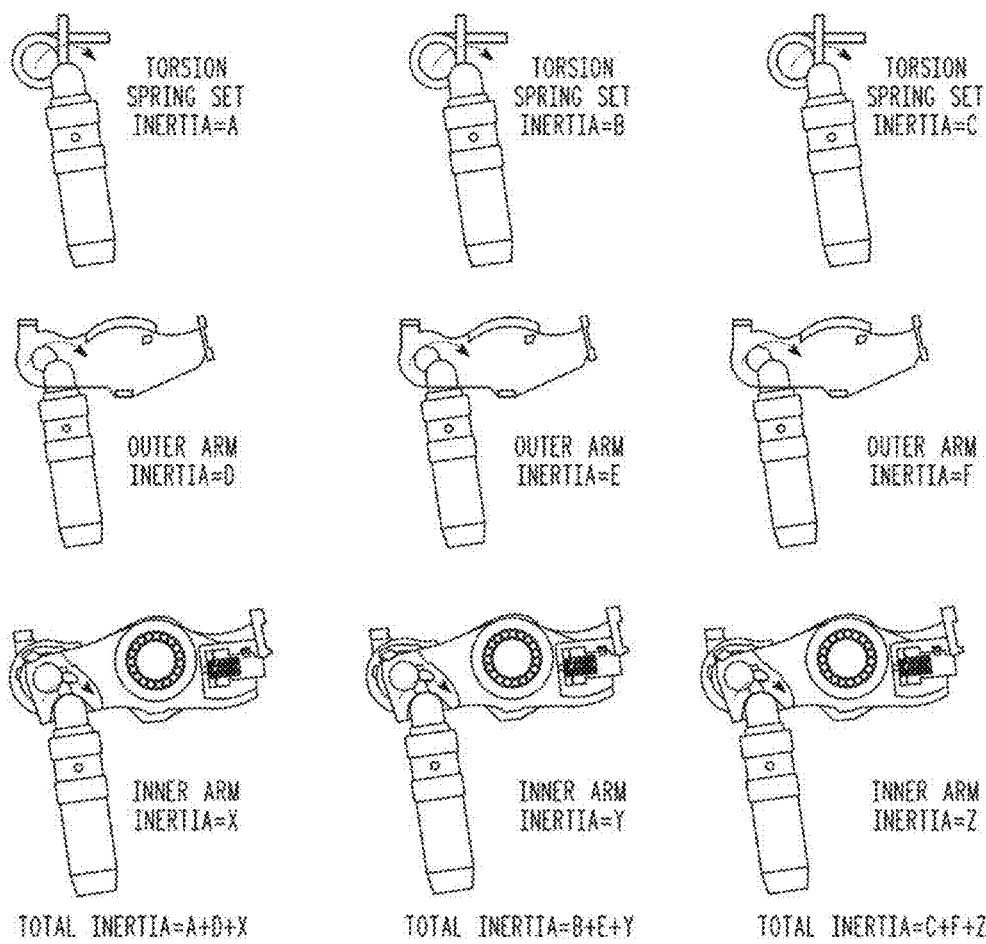

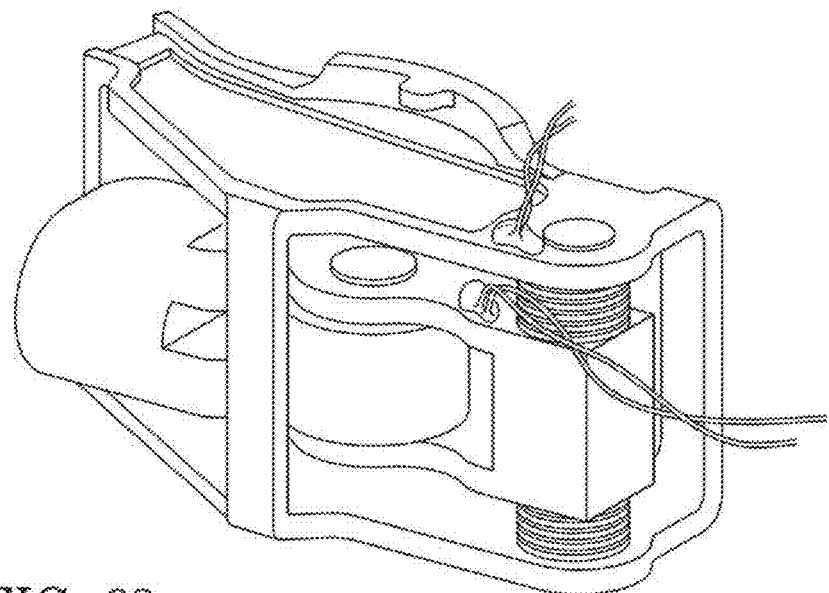
*FIG. 68*
*FIG. 69*
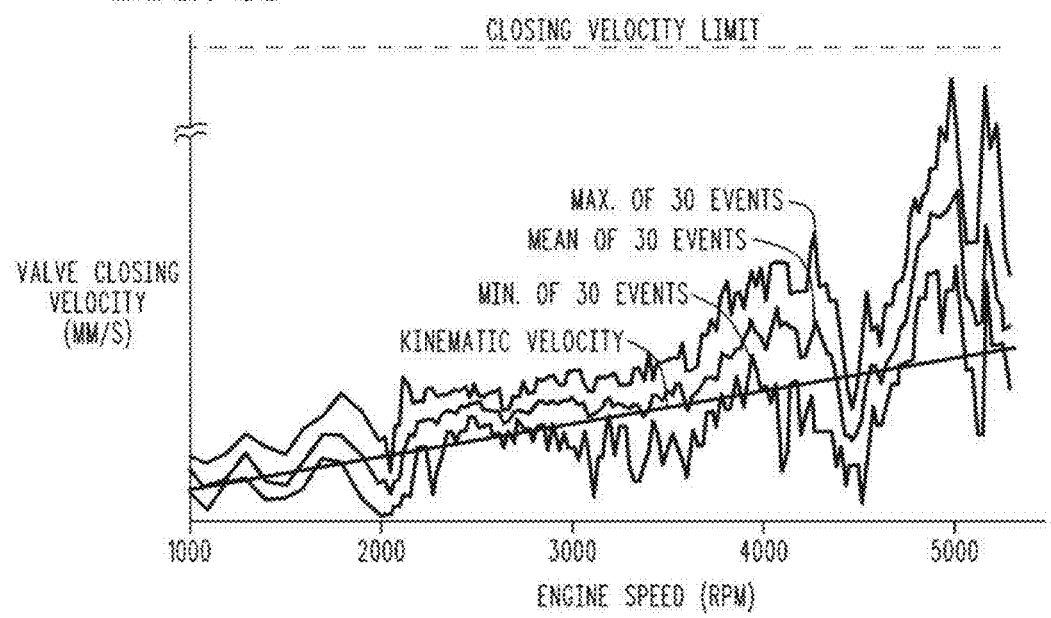

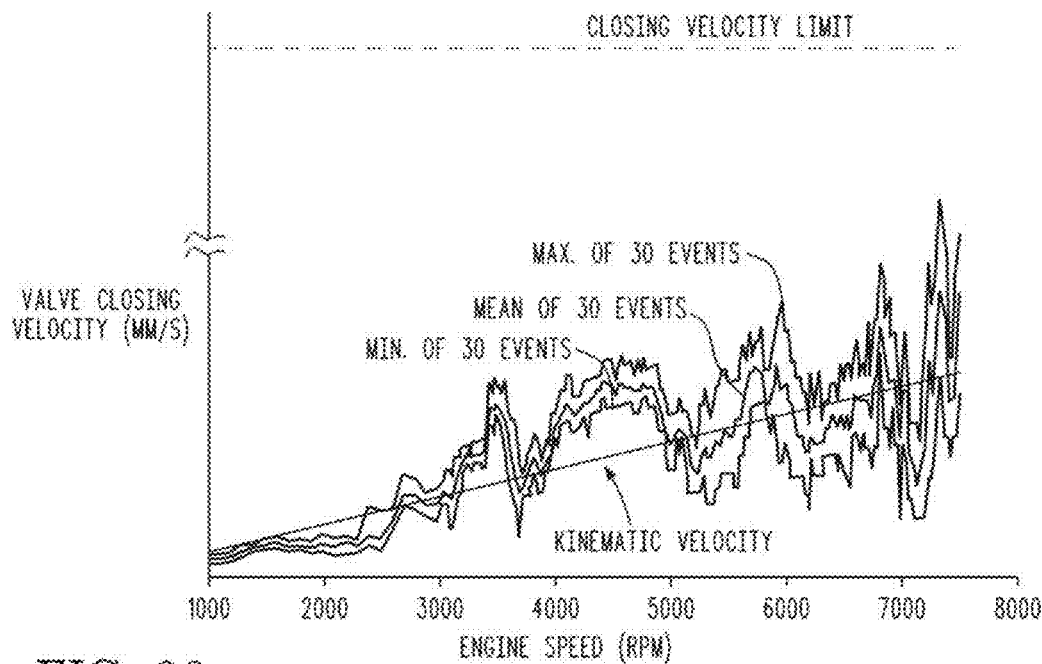

| DURABILITY TEST | DURATION (HOURS) | VALVE EVENTS | | OBJECTIVE |
|---|---|---|---|---|
| | | TOTAL | HIGH LIFT | |
| ACCELERATED SYSTEM AGING | 500 | 72M | 97% | ACCELERATED HIGH SPEED WEAR |
| SWITCHING | 500 | 54M | 50% | LATCH AND TORSION SPRING WEAR |
| CRITICAL SHIFT | 800 | 42M | 50% | LATCH AND BEARING WEAR |
| IDLE 1 | 1000 | 27M | 100% | LOW LUBRICATION |
| IDLE 2 | 1000 | 27M | 0% | LOW LUBRICATION |
| COLD START | 1000 | 27M | 100% | LOW LUBRICATION |
| USED OIL | 400 | 56M | ~99.5% | ACCELERATED HIGH SPEED WEAR |
| BEARING | 140 | N/A | N/A | BEARING WEAR |
| TORSION SPRING | 500 | 25M | 0% | SPRING LOAD LOSS |

| System mode | OCV | Oil pressure in the DFHLA Switching Pressure Port (upper feed) | Oil pressure in the DFHLA Lash Compensator Pressure Port (lower feed) | Latch pin | Engine speed [rpm] |
|---|---|---|---|---|---|
| Lift | De-energized | Oil regulated to 0.2-0.4 bar | Cylinderhead oil pressure | Extended | idle - 7200 |
| Deactivation (no lift) | Energized | Oil unregulated to ≥ 2 bar | Limited oil pressure (< 5 bar) | Retracted | idle - 3500 |

FIG. 107

| Lost Motion Spring Load Loss ||||
|---|---|---|---|
| Test Description | Cycles/Hours | # of Parts on Test | Load loss |
| Cycling | 50M Cycles | 8 | 1-8% |
| Cycling | 25M Cycles | 9 | 1-7% |
| Heat Set | 50 Hours | 12 | 0-5% |

*FIG. 112*

LATCH INTERFACE FOR A VALVE ACTUATING DEVICE

CROSS REFERENCE TO RELATED APPLICATIONS

This application is a continuation of U.S. Nonprovisional application Ser. No. 14/840,243, filed Aug. 31, 2015, entitled "Latch Interface for a Valve Actuating Device. U.S. Non-provisional application Ser. No. 14/840,243 is a continuation of International Application PCT/US2014/019870 (EATN-0213-WO) filed Mar. 3, 2014, entitled "Latch Interface for a Valve Actuating Device."

International Application PCT/US2014/019870 claims the benefit of: U.S. Provisional Applications 61/771,721 (EATN-0106-P01) entitled "Process to Form a Latch Interface for a Valve Actuating Device"; 61/771,716 (EATN-0105-P01) entitled "Latching Mechanism Interface for a Valve Actuating Device" both filed Mar. 1, 2013; 61/771,769 (EATN-0202-P01) filed Mar. 1, 2013, entitled "Discrete Variable Valve Lift Device and Methods." International Application PCT/US2014/019870 is a continuation-in-part of each of the following applications: U.S. application Ser. No. 14/188,339 (EATN-0212-U01) filed Feb. 24, 2014; Ser. No. 13/868,068 (EATN-0210-U01), filed Apr. 22, 2013; Ser. No. 13/868,067 (EATN-0209-U01), filed Apr. 22, 2013; Ser. No. 13/873,797 (EATN-0208-U01) filed Apr. 30, 2013, now U.S. Pat. No. 9,016,252; Ser. No. 13/873,774 (EATN-0207-U01) filed Apr. 30, 2013; Ser. No. 13/868,061 (EATN-0206-U01) filed Apr. 22, 2013, now U.S. Pat. No. 9,038,586; Ser. No. 13/868,054 (EATN-0202-U01-001) filed Apr. 22, 2013; Ser. No. 13/868,045 (EATN-0202-U01) filed Apr. 22, 2013; Ser. No. 13/868,035 (EATN-0201-U01-001) filed Apr. 22, 2013, now U.S. Pat. No. 8,915,225; Ser. No. 13/868,025 (EATN-0201-U01), filed Apr. 22, 2013, now U.S. Pat. No. 8,985,074; and International Application Nos.: PCT/US2013/068503 (EATN-0211-WO) filed Nov. 5, 2013; PCT/US2013/038896 (EATN-0210-WO) filed Apr. 30, 2013; PCT/US2013/037665 (EATN-0206-WO) filed Apr. 22, 2013 and PCT/US2013/037667 (EATN-0204-WO) filed Apr. 22, 2013.

U.S. application Ser. No. 14/188,339 (EATN-0212-U01) claimed the benefit of U.S. Provisional Application 61/768,214 (EATN-0100-P01) filed Feb. 22, 2013; and was a continuation-in-part of International Application PCT/US2013/068503 (EATN-0211-WO) filed Nov. 5, 2013, which claimed the benefit of 61/722,765 (EATN-0211-P01) filed Nov. 5, 2012. U.S. application Ser. No. 14/188,339 was a continuation-in-part of the following U.S. Applications: Ser. No. 13/868,068 (EATN-0210-U01), filed Apr. 22, 2013; Ser. No. 13/868,067 (EATN-0209-U01), filed Apr. 22, 2013; Ser. No. 13/873,797 (EATN-0208-U01) filed Apr. 30, 2013, now U.S. Pat. No. 9,016,252; Ser. No. 13/873,774 (EATN-0207-U01) filed Apr. 30, 2013; Ser. No. 13/868,061 (EATN-0206-U01) filed Apr. 22, 2013, now U.S. Pat. No. 9,038,586; Ser. No. 13/868,054 (EATN-0202-U01-C01) filed Apr. 22, 2013; Ser. No. 13/868,045 (EATN-0202-U01) filed Apr. 22, 2013; Ser. No. 13/868,035 (EATN-0201-U01-C01) filed Apr. 22, 2013, now U.S. Pat. No. 8,915,225; Ser. No. 13/868,025 (EATN-0201-U01), filed Apr. 22, 2013, now U.S. Pat. No. 8,985,074. U.S. application Ser. No. 14/188,339 (EATN-0212-U01) is also a continuation-in-part of International Application Nos.: PCT/US2013/038896 (EATN-0210-WO) filed Apr. 30, 2013, PCT/US2013/037665 (EATN-0206-WO) filed Apr. 22, 2013, and PCT/US2013/037667 (EATN-0204-WO) filed Apr. 22, 2013.

The following U.S. Applications: Ser. No. 13/868,068 (EATN-0210-U01), filed Apr. 22, 2013; Ser. No. 13/868,067 (EATN-0209-U01), filed Apr. 22, 2013; Ser. No. 13/873,797 (EATN-0208-U01) filed Apr. 30, 2013, now U.S. Pat. No. 9,016,252; Ser. No. 13/873,774 (EATN-0207-U01) filed Apr. 30, 2013; Ser. No. 13/868,061 (EATN-0206-U01) filed Apr. 22, 2013, now U.S. Pat. No. 9,038,586; Ser. No. 13/868,054 (EATN-0202-U01-C01) filed Apr. 22, 2013; Ser. No. 13/868,045 (EATN-0202-U01) filed Apr. 22, 2013; Ser. No. 13/868,035 (EATN-0201-U01-C01) filed Apr. 22, 2013, now U.S. Pat. No. 8,915,225; Ser. No. 13/868,025 (EATN-0201-U01), now U.S. Pat. No. 8,985,074, filed Apr. 22, 2013, and the following International Applications: PCT/US2013/038896 (EATN-0210-WO) filed Apr. 30, 2013; PCT/US2013/037665 (EATN-0206-WO) filed Apr. 22, 2013, and PCT/US2013/037667 (EATN-0204-WO) filed Apr. 22, 2013, claimed the benefit of U.S. Provisional Applications: 61/640,713 (EATN-0210-P01) filed Apr. 30, 2012; 61/640,709 (EATN-0209-P01) filed Apr. 30, 2012; 61/637,786 (EATN-0206-P01) filed Apr. 24, 2012; 61/636,277 (EATN-0205-P01) filed Apr. 20, 2012; and 61/771,769 (EATN-0202-P01) filed Mar. 1, 2013. The above U.S. applications and International Applications are continuations-in-part of U.S. Non-provisional application Ser. Nos. 13/051,839 and 13/051,848 both filed Mar. 18, 2011. Application Ser. No. 13/051,839, now U.S. Pat. No. 8,726,862, and Ser. No. 13/051,848, now U.S. Pat. No. 8,752,513, both claimed the benefit of U.S. Provisional Application 61/315,464, filed Mar. 19, 2010.

Application Ser. No. 13/873,774 (EATN-0207-U01) and Ser. No. 13/873,797 (EATN-0208-U01) claimed the benefit of 61/640,705 (EATN-0207-P01) and 61/640,707 (EATN-0208-P01) both filed Apr. 30, 2012. All of the above patent documents are hereby incorporated by reference in their entirety.

FIELD

This application is related to rocker arm designs for internal combustion engines, and more specifically for more efficient novel variable valve actuation switching rocker arm systems.

BACKGROUND

Global environmental and economic concerns regarding increasing fuel consumption and greenhouse gas emission, the rising cost of energy worldwide, and demands for lower operating cost, are driving changes to legislative regulations and consumer demand. As these regulations and requirements become more stringent, advanced engine technologies must be developed and implemented to realize desired benefits.

FIG. 1B illustrates several valve train arrangements in use today. In both Type I (21) and Type II (22), arrangements, a cam shaft with one or more valve actuating lobes 30 is located above an engine valve 29 (overhead cam). In a Type I (21) valvetrain, the overhead cam lobe 30 directly drives the valve through a hydraulic lash adjuster (HLA) 812. In a Type II (22) valve train, an overhead cam lobe 30 drives a rocker arm 25, and the first end of the rocker arm pivots over an HLA 812, while the second end actuates the valve 29.

In Type III (23), the first end of the rocker arm 28 rides on and is positioned above a cam lobe 30 while the second end of the rocker arm 28 actuates the valve 29. As the cam lobe 30 rotates, the rocker arm pivots about a fixed shaft 31. An HLA 812 can be implemented between the valve 29 tip and the rocker arm 28.

In Type V (24), the cam lobe 30 indirectly drives the first end of the rocker arm 26 with a push rod 27. An HLA 812 is shown implemented between the cam lobe 30 and the push rod 27. The second end of the rocker arm 26 actuates the valve 29. As the cam lobe 30 rotates, the rocker arm pivots about a fixed shaft 31.

As FIG. 1A also illustrates, industry projections for Type II (22) valve trains in automotive engines, shown as a percentage of the overall market, are predicted to be the most common configuration produced by 2019.

Technologies focused on Type II (22) valve trains, that improve the overall efficiency of the gasoline engine by reducing friction, pumping, and thermal losses are being introduced to make the best use of the fuel within the engine. Some of these variable valve actuation (VVA) technologies have been introduced and documented.

A VVA device may be a variable valve lift (VVL) system, a cylinder deactivation (CDA) system such as that described U.S. patent application Ser. No. 13/532,777, filed Jun. 25, 2012 "Single Lobe Deactivating Rocker Arm" hereby incorporated by reference in its entirety, or other valve actuation system. As noted, these mechanisms are developed to improve performance, fuel economy, and/or reduce emissions of the engine. Several types of the VVA rocker arm assemblies include an inner rocker arm within an outer rocker arm that are biased together with torsion springs. A latch, when in the latched position causes both the inner and outer rocker arms to move as a single unit. When unlatched, the rocker arms are allowed to move independent of each other.

Switching rocker arms allow for control of valve actuation by alternating between latched and unlatched states, usually involving the inner arm and outer arm, as described above. In some circumstances, these arms engage different cam lobes, such as low-lift lobes, high-lift lobes, and no-lift lobes. Mechanisms are required for switching rocker arm modes in a manner suited for operation of internal combustion engines.

Rocker arms that are driven by a camshaft to actuate the cylinder intake and exhaust valves are typically mounted on the cylinder head.

There are structures extending from the cylinder head such as cam towers to secure the camshafts in an overhead cam design. There are also spark plug tubes that extend upward from the top of each cylinder through the head to receive spark plugs.

As described above, some embodiments of VVA switching rocker arm assemblies include a rocker arm within a rocker arm that are biased together with a spring on either side. Since the inner/outer arm design often employs a roller in the center to engage a cam lobe, it is advantageous to keep the roller the same width of the cam lobe. Therefore, the structures on either side of the roller add width to the rocker assembly causing it to be wider than original non-VVA rocker arms and too wide to fit certain cylinder head designs.

For example, some Type II engine heads employ cam towers that have a hydraulic lifter adjuster (HLA) near the centerline of the head and spark plug tubes that obstruct one side of a wide VVA switching rocker arm assembly.

Many engine parts are designed by manufacturers to work with a specific cylinder head, making the cylinder head very difficult to modify because changes may impact many interrelated components, possibly increasing cost and causing assembly clearance issues.

One example of VVA technology used to alter operation and improve fuel economy in Type II gasoline engines is discrete variable valve lift (DVVL), also sometimes referred to as a DVVL switching rocker arm. DVVL works by limiting engine cylinder intake air flow with an engine valve that uses discrete valve lift states versus standard "part throttling". A second example is cylinder deactivation (CDA). Fuel economy can be improved by using CDA at partial load conditions in order to operate select combustion cylinders at higher loads while turning off other cylinders.

The United States Environmental Protection Agency (EPA) showed a 4% improvement in fuel economy when using DVVL applied to various passenger car engines. An earlier report, sponsored by the United States Department of Energy lists the benefit of DVVL at 4.5% fuel economy improvement. Since automobiles spend most of their life at "part throttle" during normal cruising operation, a substantial fuel economy improvement can be realized when these throttling losses are minimized. For CDA, studies show a fuel economy gain, after considering the minor loss due to the deactivated cylinders, ranging between 2 and 14%. Currently, there is a need for VVA rocker arms for increased performance, economy and/or reduced emissions that fit specific engine head designs.

Switching rocker arms have been used to alter the operation and performance of the engines. For example, specialized rocker arms may be used that provide variable valve actuation (VVA), such as variable valve lift (VVL), and cylinder deactivation (CDA). U.S. Provisional Patent Application 61/636,277 (EATN-0205-P01, pending) describes in detail the structure and function of a VVL switching rocker arm, and the reader is referred to this document for a full description. These have been developed that improve performance, fuel economy, and/or reduce emissions of the engine. Several types of the VVA rocker arm assemblies include an inner rocker arm within an outer rocker arm that are biased together with torsion springs. A latch, when in the latched position causes both the inner and outer rocker arms to move as a single unit. When unlatched, the rocker arms are allowed to move independent of each other. The latch of the inner arm rests on a latch seat of the outer arm. (Alternatively, the latch may be on the outer arm.)

In the past, it was thought that in order to utilize a round rocker arm latch you would need the mating surface of the other rocker arm in the assembly to have a ground in curved mating surface. This mating surface can be referred to as a latch seat.

This latch seat would need to have a radius that very closely matches the latch radius. A seat that is slightly too small causes sticking, and a delayed release. It also causes the latch to impact the corners of the latch seat during engagement of the latch. A larger seat or smaller seat could cause undesirable wear.

Due to the tolerances, it would need to be processed by way of grinding. This would require more exact and expensive manufacturing processes. Also, the latch should not be restricting from properly extending and retracting.

Another latch design included creating a number of latches, measuring each and sorting them by latch width. The proper latch was selected having a specific shelf height from an assortment of latches with varying shelf heights to result in a proper lash. This was time-consuming and required an array of parts.

Currently, there is a need for a switching rocker arm latch that has the proper lash, aligns well with the latch seat and operates efficiently, and a process for making the switching rocker arm latch seat.

SUMMARY

Advanced VVA systems for piston-type internal combustion engines combine valve lift control devices, such as CDA or DVVL switching rocker arms, valve lift actuation methods, such as hydraulic actuation using pressurized engine oil, software and hardware control systems, and enabling technologies. Enabling technologies may include sensing and instrumentation, OCV design, DFHLA design, torsion springs, specialized coatings, algorithms, physical arrangements, etc.

In an embodiment, a switching rocker arm assembly is disclosed having a plurality of rocker arms and additional structures connected together having manufacturing tolerances that introduce mechanical lash, a latch with a latch pin and a latch seat, the latch seat adapted to receive and secure the latch pin. The latch seat comprises an indentation having a shape that is complementary to that of the latch pin; the indentation has a depth chosen to compensate for at least a portion of the mechanical lash to result in a predefined lash.

In embodiments, an economical switching rocker arm assembly is disclosed that exhibits a predetermined lash even though this is constructed with parts having tolerances greater than prior art designs. The rocker arm assembly a first rocker arm manufactured with greater tolerances than prior art designs having with a first end and second end. It also has a second rocker arm manufactured with greater tolerances that prior art designs having a first end pivotally connected to the first end of the first rocker arm, and a roller bearing on the first rocker arm adapted to ride upon a cam and actuate the first rocker arm. The rocker arm assembly has a latch having a latch pin on the second end of one of the first and second arms and a latch seat on the second end of the other rocker arm, the latch operating to cause the arms to be fixed relative to each other when latched and allowed to pivot independently of each other when not latched. The latch seat has an indentation shaped to receive the latch pin and sized to compensate for at least a portion of the increase lash caused by increased manufacturing tolerances, and result in a predefined lash.

In an embodiment, a modified rocker assembly is disclosed having an obstructed side and a non-obstructed side, having an outer structure having a first end, an inner rocker structure fitting within the outer structure, the inner structure also having a first end. The modified rocker assembly has an axle pivotally connecting the first ends of inner structure to the outer structure, such that the inner structure may rotate within the outer structure around the axle. At least one torsion spring on one side of axle, rotationally biases the inner structure relative to the outer structure. The outer structure, on the obstructed side as it extends from the second end toward the first end is offset toward the non-obstructed side creating a first offset portion to provide additional clearance on the obstructed side. This design allows the modified rocker arm to fit into an engine head having an obstruction on its obstruction side.

In an embodiment, a modified rocker assembly is disclosed having an obstructed side and a non-obstructed side, with an outer structure having a first end, an inner rocker structure fitting within the outer structure, the inner structure also having a first end. An axle pivotally connects the first ends of inner structure to the outer structure, such that the inner structure may rotate within the outer structure around the axle. At least one torsion spring is mounted on the non-obstructed side of the axle that rotationally biases the inner structure relative to the outer structure. As the outer structure on the obstructed side extends from the second end toward the first end, the outer structure is offset toward the non-obstructed side creating a first offset portion. The first offset portion provides additional clearance on the obstructed side.

In an embodiment, a modified rocker assembly is disclosed having an obstructed side and a non-obstructed side. The modified rocker assembly has an outer structure having a first end with an offset portion, an inner rocker structure fitting within the outer structure. The inner structure also has a first end. An axle pivotally connects the first ends of inner structure to the outer structure, such that the inner structure may rotate within the outer structure around the axle. The modified rocker assembly has at least one torsion spring on one side of the axle, rotationally biasing the inner structure relative to the outer structure. As the outer structure on the obstructed side extends from the second end toward the first end, the outer structure smoothly curves toward the non-obstructed side. This creates a first offset portion that provides additional clearance on the obstructed side. This allows this embodiment to fit in an engine head that has an obstruction on the obstructed side.

In one embodiment, an advanced discrete variable valve lift (DVVL) system is described. The advanced discrete variable valve lift (DVVL) system was designed to provide two discrete valve lift states in a single rocker arm. Embodiments of the approach presented relate to the Type II valve train described above and shown in FIG. 1B. Embodiments of the system presented herein may apply to a passenger car engine (having four cylinders in embodiments) with an electro-hydraulic oil control valve, dual feed hydraulic lash adjuster (DFHLA), and DVVL switching rocker arm. The DVVL switching rocker arm embodiments described herein focus on the design and development of a switching roller finger follower (SRFF) rocker arm system which enables two-mode discrete variable valve lift on end pivot roller finger follower valve trains. This switching rocker arm configuration includes a low friction roller bearing interface for the low lift event, and retains normal hydraulic lash adjustment for maintenance free valve train operation.

Mode switching (i.e., from low to high lift or vice versa) is accomplished within one cam revolution, resulting in transparency to the driver. The SRFF prevents significant changes to the overhead required for installing in existing engine designs. Load carrying surfaces at the cam interface may comprise a roller bearing for low lift operation, and a diamond like carbon coated slider pad for high lift operation. Among other aspects, the teachings of the present application is able to reduce mass and moment of inertia while increasing stiffness to achieve desired dynamic performance in low and high lift modes.

A diamond-like carbon coating (DLC coating) allows higher slider interface stresses in a compact package. Testing results show that this technology is robust and meets all lifetime requirements with some aspects extending to six times the useful life requirements. Alternative materials and surface preparation methods were screened, and results showed DLC coating to be the most viable alternative. This application addresses the technology developed to utilize a Diamond-like carbon (DLC) coating on the slider pads of the DVVL switching rocker arm.

System validation test results reveal that the system meets dynamic and durability requirements. Among other aspects, this patent application also addresses the durability of the SRFF design for meeting passenger car durability requirements. Extensive durability tests were conducted for high speed, low speed, switching, and cold start operation. High engine speed test results show stable valve train dynamics above 7000 engine rpm. System wear requirements met end-of-life criteria for the switching, sliding, rolling and torsion spring interfaces. One important metric for evaluating wear is to monitor the change in valve lash. The lifetime requirements for wear showed that lash changes are within the acceptable window. The mechanical aspects exhibited robust behavior over all tests including the slider interfaces that contain a diamond like carbon (DLC) coating.

With flexible and compact packaging, this DVVL system can be implemented in a multi-cylinder engine. The DVVL arrangement can be applied to any combination of intake or exhaust valves on a piston-driven internal combustion engine. Enabling technologies include OCV, DFHLA, DLC coating.

In a second embodiment, an advanced single-lobe cylinder deactivation (CDA-1L) system is described. The advanced cylinder deactivation (CDA-1L) system was designed to deactivate one or more cylinders. Embodiments of the approach presented relate to the Type II valve train described above and shown in FIG. 22. Embodiments of the system presented herein may apply to a passenger car engine (having a multiple of two cylinders in embodiments, for example 2, 6, 8) with an electro-hydraulic oil control valve, dual feed hydraulic lash adjuster (DFHLA), and CDA-1L switching rocker arm. The CDA-1L switching rocker arm embodiments described herein focus on the design and development of a switching roller finger follower (SRFF) rocker arm system which enables lift/no-lift operation for end pivot roller finger follower valve trains. This switching rocker arm configuration includes a low friction roller bearing interface for the cylinder deactivation event, and retains normal hydraulic lash adjustment for maintenance free valve train operation.

Mode switching for the CDA-1L system is accomplished within one cam revolution, resulting in transparency to the driver. The SRFF prevents significant changes to the overhead required for installing in existing engine designs. Among other aspects, the teachings of the present application is able to reduce mass and moment of inertia while increasing stiffness to achieve desired dynamic performance in either lift or no-lift modes.

CDA-1L system validation test results reveal that the system meets dynamic and durability requirements. Among other aspects, this patent application also addresses the durability of the SRFF design necessary to meet passenger car durability requirements. Extensive durability tests were conducted for high speed, low speed, switching, and cold start operation. High engine speed test results show stable valve train dynamics above 7000 engine rpm. System wear requirements met end-of-life criteria for the switching, rolling and torsion spring interfaces. One important metric for evaluating wear is to monitor the change in valve lash. The lifetime requirements for wear showed that lash changes are within the acceptable window. The mechanical aspects exhibited robust behavior over all tests.

With flexible and compact packaging, the CDA-1L system can be implemented in a multi-cylinder engine. Enabling technologies include OCV, DFHLA, and specialized torsion spring design.

A rocker arm is described for engaging a cam having one lift lobe per valve. The rocker arm includes an outer arm, an inner arm, a pivot axle, a lift lobe contacting bearing, a bearing axle, and at least one bearing axle spring. The outer arm has a first and a second outer side arms and outer pivot axle apertures configured for mounting the pivot axle. The inner arm is disposed between the first and second outer side arms, and has a first inner side arm and a second inner side arm. The first and second inner side arms have an inner pivot axle apertures that receive and hold the pivot axle, and inner bearing axle apertures for mounting the bearing axle.

The pivot axle fits into the inner pivot axle apertures and the outer pivot axle apertures.

The bearing axle is mounted in the bearing axle apertures of the inner arm.

The bearing axle spring is secured to the outer arm and is in biasing contact with the bearing axle. The lift lobe contacting bearing is mounted to the bearing axle between the first and the second inner side arms.

Another embodiment can be described as a rocker arm for engaging a cam having a single lift lobe per engine valve. The rocker arm includes an outer arm, an inner arm, a cam contacting member configured to be capable of transferring motion from the single lift lobe of the cam to the rocker arm, and at least one biasing spring.

The rocker arm also includes a first outer side arm and a second outer side arm.

The inner arm is disposed between the first and the second outer side arms, and has a first inner side arm and a second inner side arm.

The inner arm is secured to the outer arm by a pivot axle configured to permit rotating movement of the inner arm relative to the outer arm about the pivot axle.

The cam contacting member is disposed between the first and second inner side arm.

At least one biasing spring is secured to the outer arm and is in biasing contact with the cam contacting member.

Another embodiment may be described as a deactivating rocker arm for engaging a cam having a single lift lobe having a first end and a second end, an outer arm, an inner arm, a pivot axle, a lift lobe contacting member configured to be capable of transferring motion from the cam lift lobe to the rocker arm, a latch configured to be capable of selectively deactivating the rocker arm, and at least one biasing spring.

The outer arm has a first outer side arm and a second outer side arm, outer pivot axle apertures configured for mounting the pivot axle, and axle slots configured to accept the lift lobe contacting member, permitting lost motion movement of the lift lobe contacting member.

The inner arm is disposed between the first and second outer side arms, and has a first inner side arm and a second inner side arm. The first inner side arm and the second inner side arm have inner pivot axle apertures configured for mounting the pivot axle, and inner lift lobe contacting member apertures configured for mounting the lift lobe contacting member.

The pivot axle is mounted adjacent the first end of the rocker arm and disposed in the inner pivot axle apertures and the outer pivot axle apertures.

The latch is disposed adjacent the second end of the rocker arm.

The lift lobe contacting member mounted in the lift lobe contacting member apertures of the inner arm and the axle slots of the outer arm and between the pivot axle and latch.

The biasing spring is secured to the outer arm and in biasing contact with the lift lobe contacting member.

BRIEF DESCRIPTION OF THE DRAWINGS

It will be appreciated that the illustrated boundaries of elements in the drawings represent only one example of the boundaries. One of ordinary skill in the art will appreciate that a single element may be designed as multiple elements or that multiple elements may be designed as a single element. An element shown as an internal feature may be implemented as an external feature and vice versa.

Further, in the accompanying drawings and description that follow, like parts are indicated throughout the drawings and description with the same reference numerals, respectively. The figures may not be drawn to scale and the proportions of certain parts have been exaggerated for convenience of illustration.

FIG. 2 shows the intake and exhaust valve train arrangement.

FIG. 3 illustrates the major components that comprise the DVVL system, including hydraulic actuation.

FIG. 31 illustrates a bottom perspective view of the outer arm.

FIG. 32 illustrates a cross-sectional view of the latching mechanism in its latched state along the line 32, 33-32, 33 in FIG. 28.

FIGS. 35A-35F illustrate several retention devices for orientation pin.

FIGS. 38-40 illustrate an exemplary method of assembling a switching rocker arm.

FIG. 58 illustrates an acceptable range of discrete values of stiffness and inertia for component parts of multiple DVVL switching rocker arm assemblies.

FIG. 68 shows a strain gage that was attached to and monitored the SRFF during testing.

FIG. 69 is a graph of valve closing velocity for the Low Lift mode.

FIG. 86 is a graph of valve closing velocity for the High Lift mode.

FIG. 87 illustrates durability test periods.

FIG. 107 is a table showing oil pressure requirements for an exemplary SRFF-1 system.

FIG. 112 is a table showing a torsion spring test summary.

FIG. 113 is a graph showing displacements and pressures during a 'pump-up' test.

FIG. 114 shows durability and lash change over a specified testing period for an exemplary STFF-1L system.

FIG. 115 is a perspective view of a prior art cylinder head with parts removed for clarity.

FIG. 116 is an elevational, cross-sectional view of the cylinder head of FIG. 115.

FIG. 117 is a perspective view of a prior art variable valve lift (VVL) rocker arm assembly.

FIG. 118 is a perspective view of a left-handed (modified) rocker assembly that provides variable valve lift according to one aspect of the present teachings.

FIG. 119 is a top plan view of the modified rocker assembly of FIG. 118.

FIG. 120 is a side elevational view of the modified rocker assembly 400 of FIGS. 118-119.

FIG. 121 is an end-on elevational view of the modified rocker assembly of FIGS. 118-120 as viewed from its hinge (first) end.

FIG. 122 is an end-on elevational view of the modified rocker assembly of FIGS. 118-121 as viewed from its latch (second) end.

FIG. 123 is a plan view from above the outer structure showing the first and second offset areas.

Figure 124:
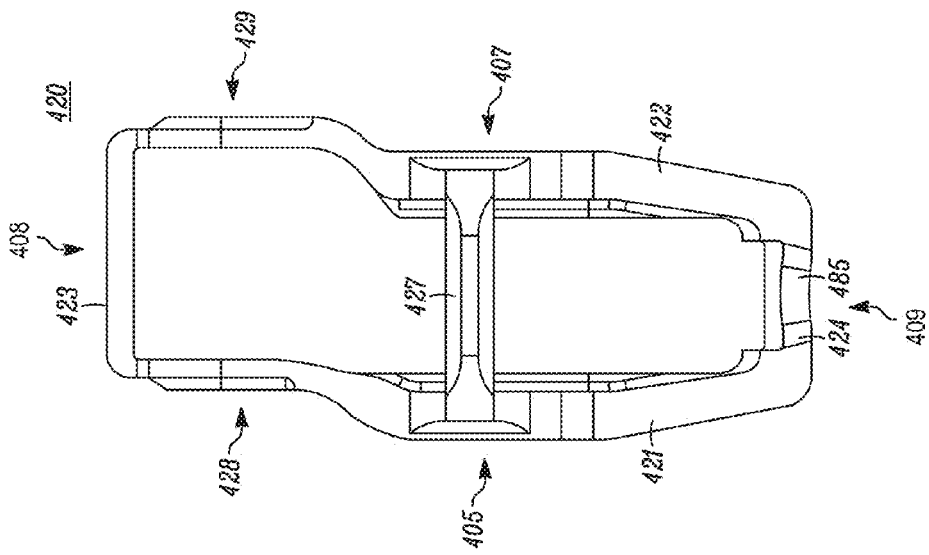

FIG. 124 is a plan view from below the outer structure of FIG. 123.

Figure 125:
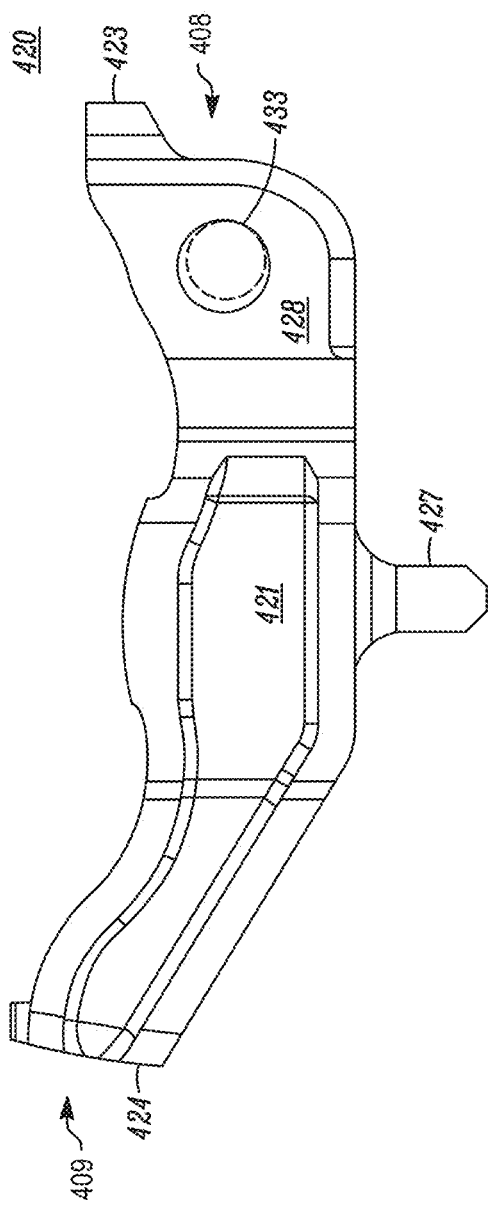

FIG. 125 is a side elevational view of an outer structure according to one aspect of the present teachings.

Figure 126:
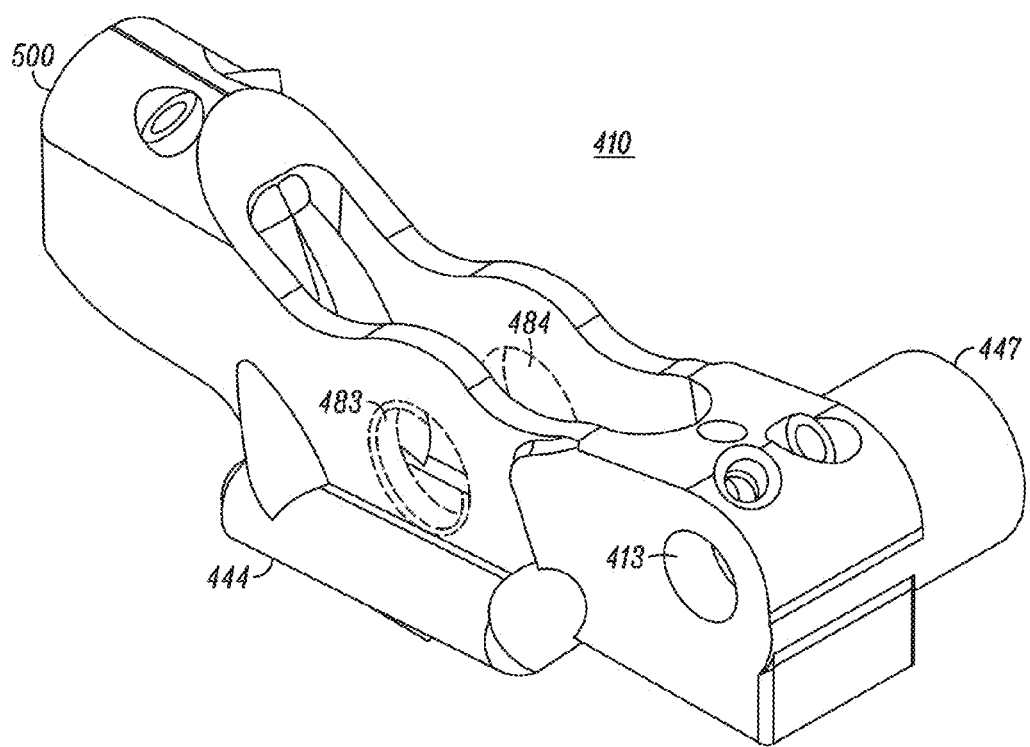

FIG. 126 is a perspective view of top side of an inner structure according to one aspect of the present teachings.

Figure 127:
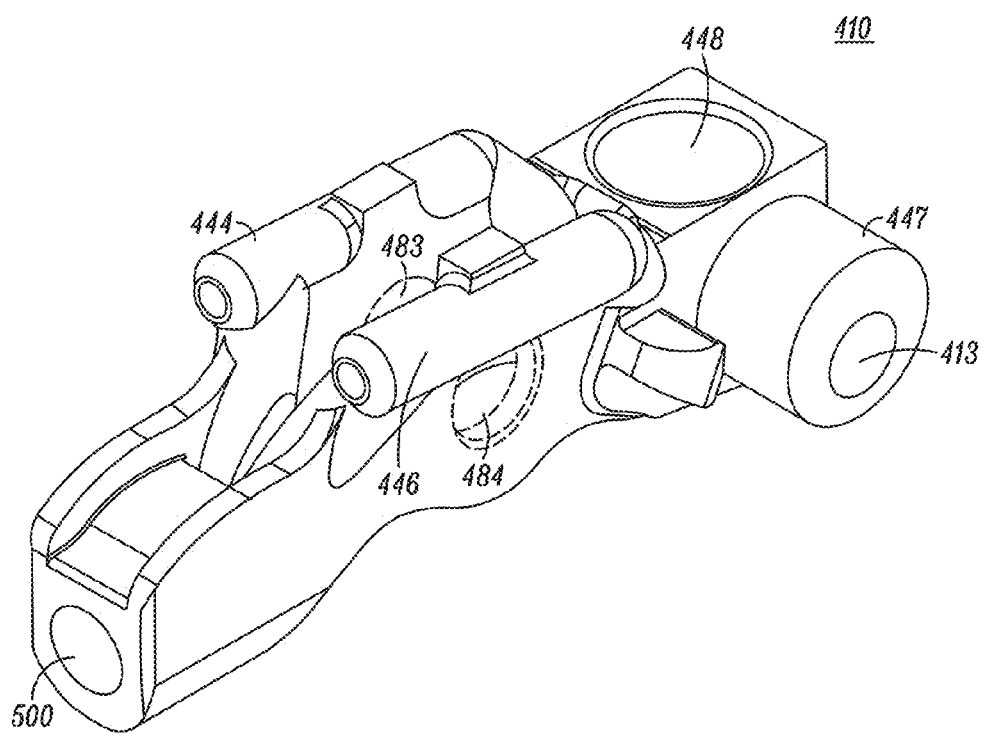

FIG. 127 is a perspective view of bottom side of the inner structure of FIG. 126.

Figure 128:
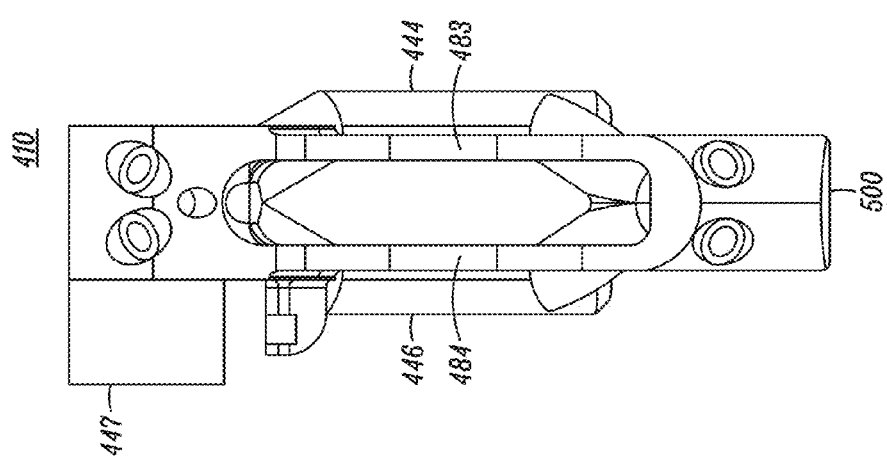

FIG. 128 is a plan view from the top side of the inner structure of FIGS. 126-127.

Figure 129:
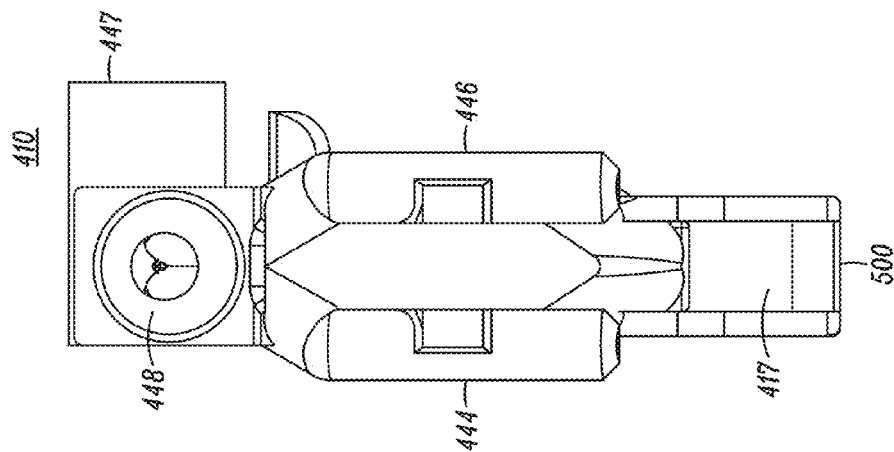

FIG. 129 is a plan view from the bottom side of the inner structure of FIGS. 126-128.

Figure 130:
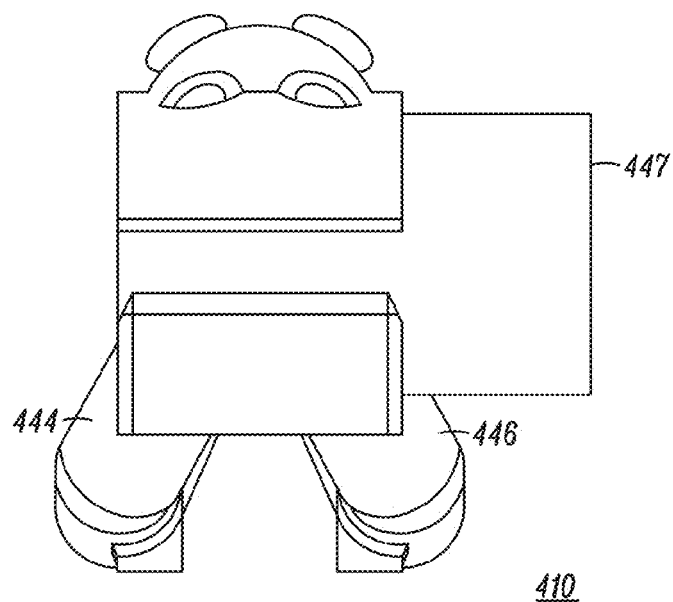

FIG. 130 is an end-on elevational view of the inner structure of FIGS. 126-129 as viewed from its hinge (first) end.

Figure 131:
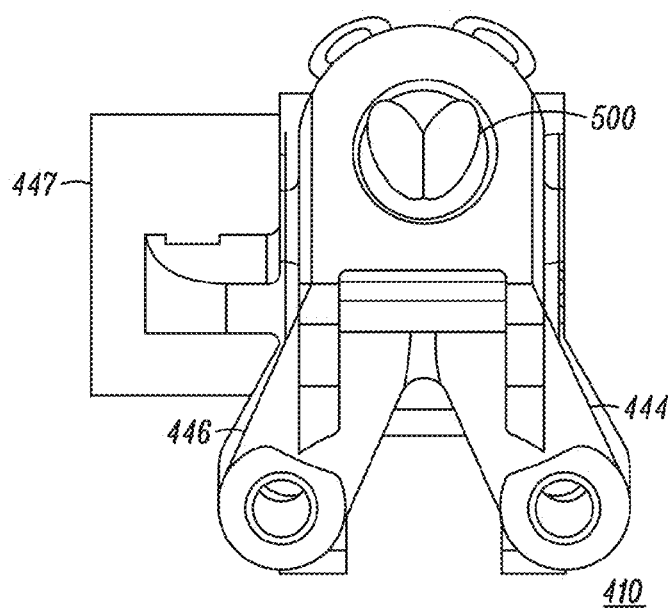

FIG. 131 is an end-on elevational view of the inner structure of FIGS. 126-130 as viewed from its latch (second) end.

Figure 132:
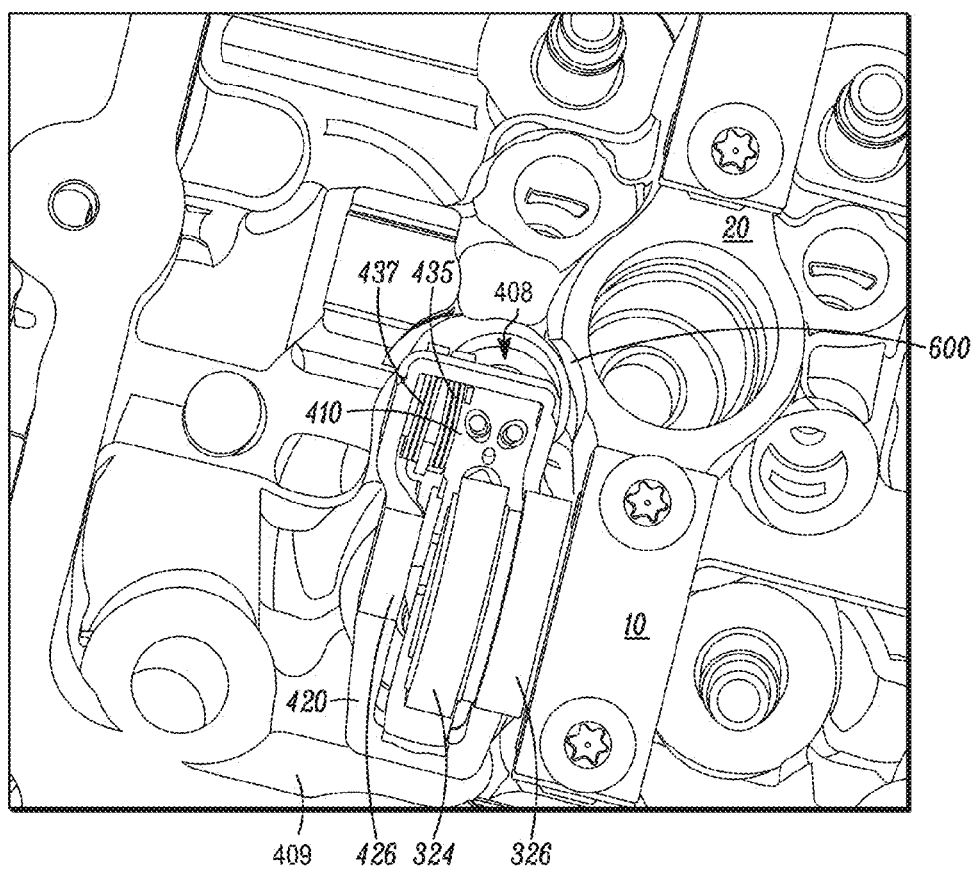

FIG. 132 is a perspective view of the modified rocker assembly of FIGS. 118-122 as it would appear installed in a cylinder head.

Figure 133:
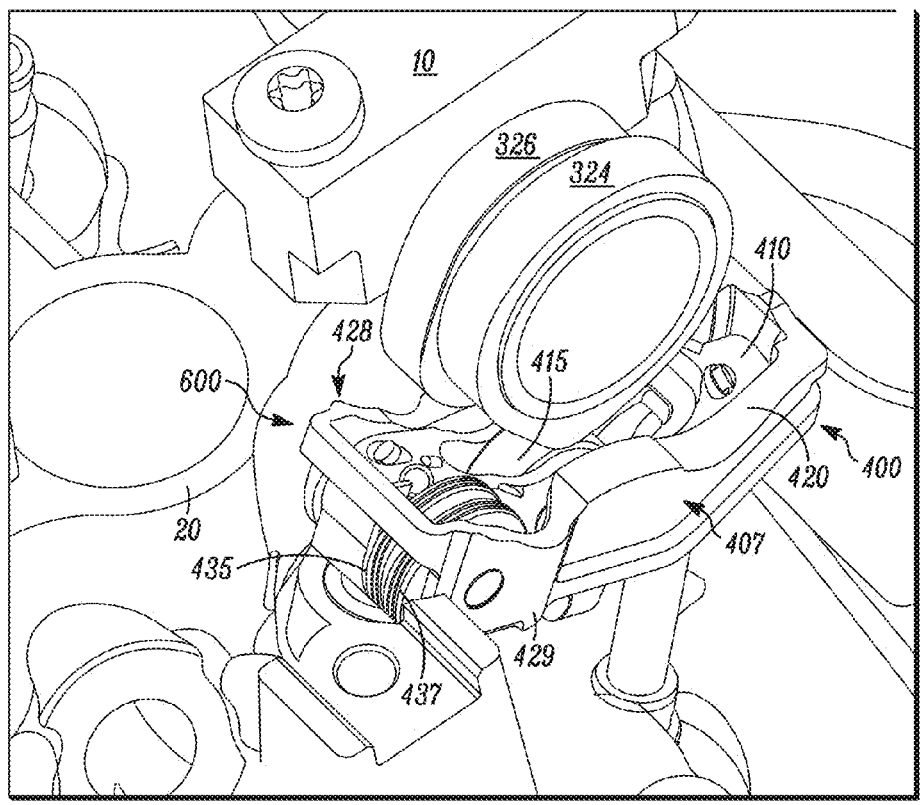

FIG. 133 is a perspective view from another viewpoint of the modified rocker assembly 400 of FIGS. 118-122, as it would appear installed in a cylinder head.

Figure 134:
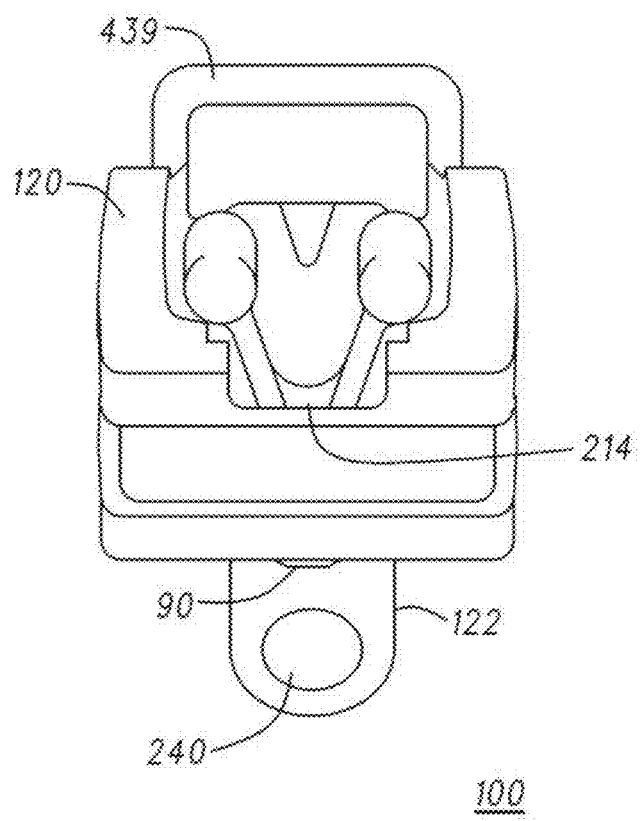

FIG. 134 shows the bottom of a partially assembled switching rocker arm and the outer arm mating surface.

Figure 1A:
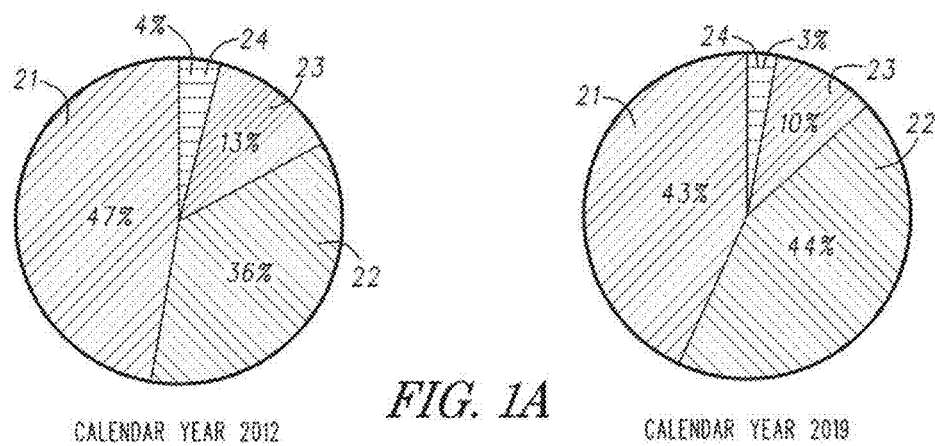
FIG. 1A illustrates the relative percentage of engine types for 2012 and 2019.
Figure 1B:
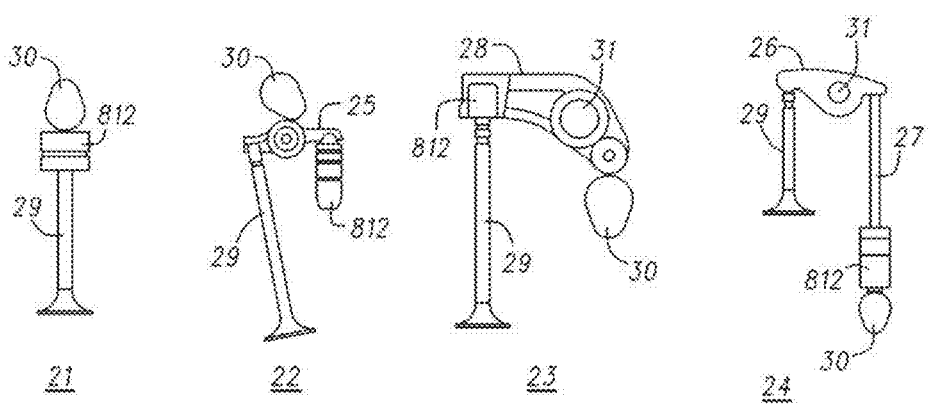
FIG. 1B illustrates the general arrangement and market sizes for Type I, Type II, Type III, and Type V valve trains.
Figure 135:
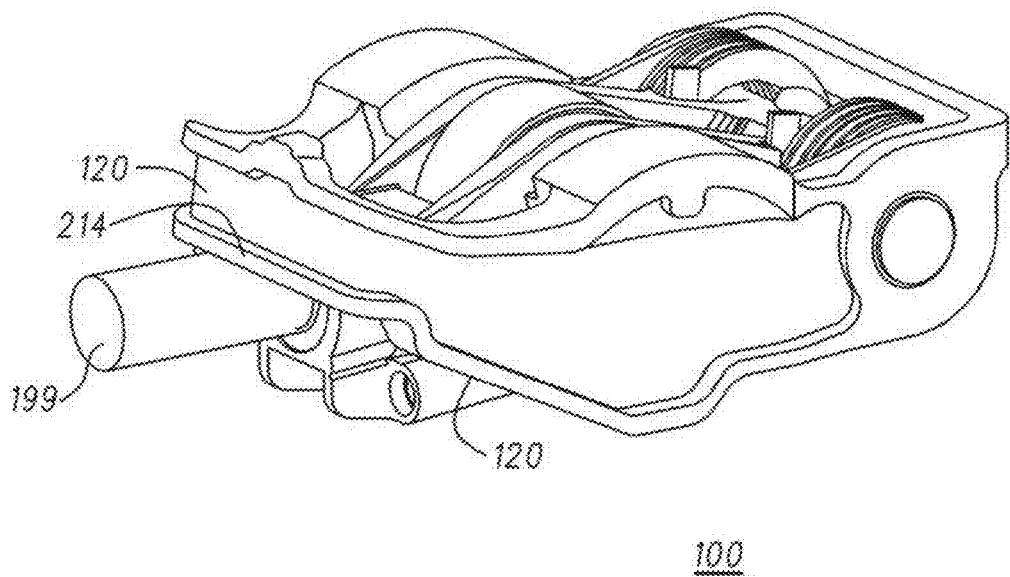

FIG. 135 shows the rocker assembly of FIG. 1 with a carbide pin in the latch recess just before the pin is pressed into the mating surface.

Figure 136:
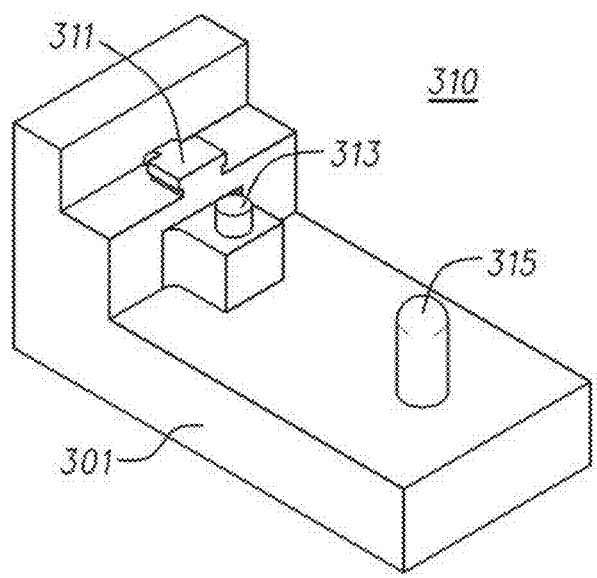

FIG. 136 shows a fixture for forming the indentation in the mating surface.

Figure 137:
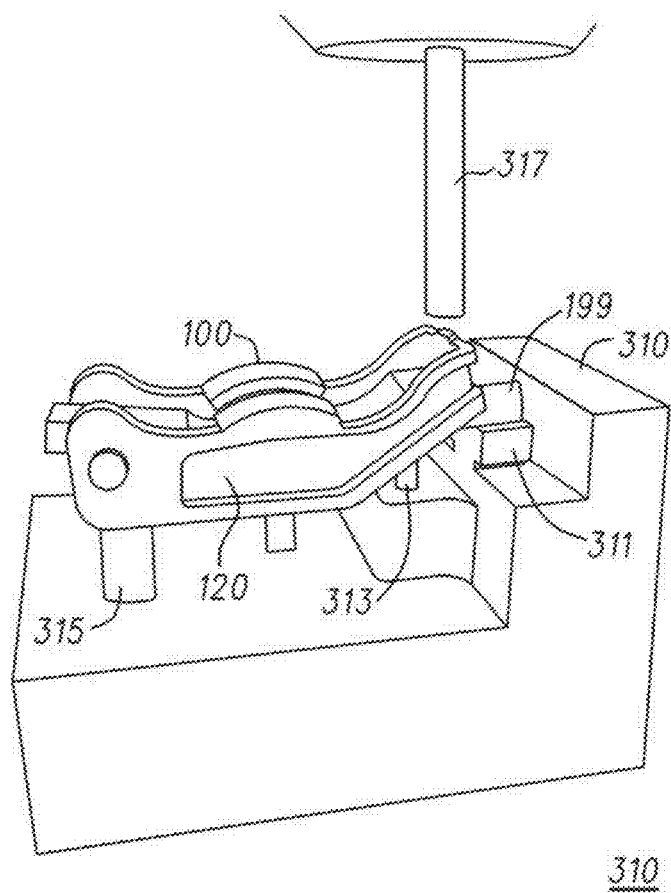

FIG. 137 shows a press setup for pressing a pin into the mating surface.

Figure 138:
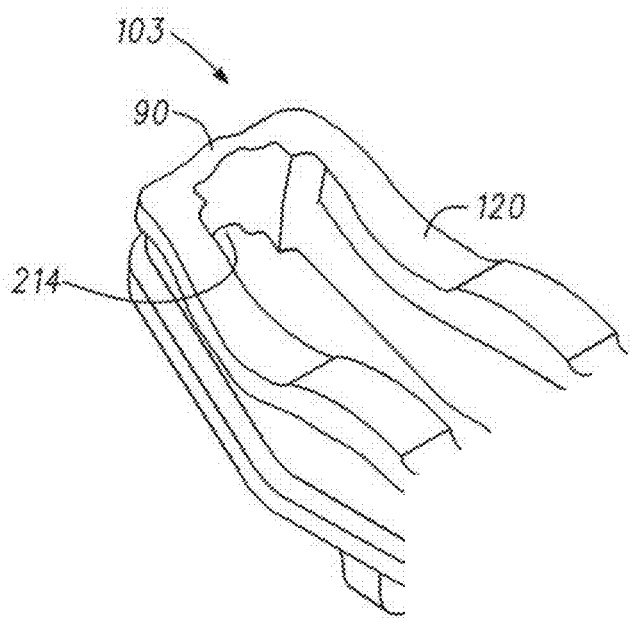

FIG. 138 shows a portion of only the outer arm illustrating the indentation in the latch seat.

DETAILED DESCRIPTION

The terms used herein have their common and ordinary meanings unless redefined in this specification, in which case the new definitions will supersede the common meanings.

It is also to be appreciated that the phraseology and terminology used herein is for the purpose of description and should not be regarded as limiting. References in the singular or plural form are not intended to limit the presently disclosed systems or methods, their components, acts, or elements. The use herein of "including", "comprising", "having", "containing", "involving" and variations thereof are meant to encompass the items listed thereafter and equivalents thereof as well as additional items. References to "or" may be construed as inclusive so that any terms described using "or" may indicate any of a single, more than one, and all of the described terms. Any references to "front and back", "left and right", "top and bottom", and "upper and lower" are intended for convenience of description, not to limit the present systems and methods or their components to any one positional or spatial orientation. Also the terms "coining", "impression", and "indenting" are synonymous. Reference is also made to the "carbide pin" or "carbide rod" which are also synonymous.

As illustrated in the various figures, some sizes of structures or portions are exaggerated relative to other structures or portions for illustrative purposes and, thus, are provided to illustrate the general structures of the present subject matter. Furthermore, various aspects of the present subject matter are described with reference to a structure or a portion being formed on other structures, portions, or both. As will be appreciated by those of skill in the art, references to a structure being formed "on" or "above" another structure or portion contemplates that additional structure, portion, or both may intervene. References to a structure or a portion being formed "on" another structure or portion without an intervening structure or portion are described herein as being formed "directly on" the structure or portion. Similarly, it will be understood that when an element is referred to as being "connected", "attached", or "coupled" to another element, it can be directly connected, attached, or coupled to the other element, or intervening elements may be present. In contrast, when an element is referred to as being "directly connected", "directly attached", or "directly coupled" to another element, no intervening elements are present.

Furthermore, relative terms such as "on", "above", "upper", "top", "lower", or "bottom" are used herein to describe one structure's or portion's relationship to another structure or portion as illustrated in the figures. It will be understood that relative terms such as "on", "above", "upper", "top", "lower" or "bottom" are intended to encompass different orientations of the device in addition to the orientation depicted in the figures. For example, if the device in the figures is turned over, structure or portion described as "above" other structures or portions would now be oriented "below" the other structures or portions. Likewise, if devices in the figures are rotated along an axis, structure or portion described as "above", other structures or portions would now be oriented "next to" or "left of" the other structures or portions. Like numbers refer to like elements throughout.

VVA SYSTEM EMBODIMENTS—VVA system embodiments represent a unique combination of a switching device, actuation method, analysis and control system, and enabling technology that together produce a VVA system. VVA system embodiments may incorporate one or more enabling technologies.

I. Discrete Variable Valve Lift (DVVL) System Embodiment Description

1. DVVL System Overview

A cam-driven, discrete variable valve lift (DVVL), switching rocker arm device that is hydraulically actuated using a combination of dual-feed hydraulic lash adjusters (DFHLA), and oil control valves (OCV) is described in following sections as it would be installed on an intake valve in a Type II valve train. In alternate embodiments, this arrangement can be applied to any combination of intake or exhaust valves on a piston-driven internal combustion engine.

As illustrated in FIG. 2, the exhaust valve train in this embodiment comprises a fixed rocker arm 810, single lobe camshaft 811, a standard hydraulic lash adjuster (HLA) 812, and an exhaust valve 813. As shown in FIGS. 2 and 3, components of the intake valve train include the three-lobe camshaft 102, switching rocker arm assembly 100, a dual feed hydraulic lash adjuster (DFHLA) 110 with an upper fluid port 506 and a lower fluid port 512, and an electro-hydraulic solenoid oil control valve assembly (OCV) 820. The OCV 820 has an inlet port 821, and a first and second control port 822, 823 respectively.

Referring to FIG. 2, the intake and exhaust valve trains share certain common geometries including valve 813 spacing to HLA 812 and valve 112 spacing to DFHLA 110. Maintaining a common geometry allows the DVVL system to package with existing or lightly modified Type II cylinder head space while utilizing the standard chain drive system. Additional components, illustrated in FIG. 4, that are common to both the intake and exhaust valve train include valves 112, valve springs 114, and valve spring retainers 116. Valve keys and valve stem seals (not shown) are also common for both the intake and exhaust. Implementation cost for the DVVL system is minimized by maintaining common geometries, using common components.

Figure 5:
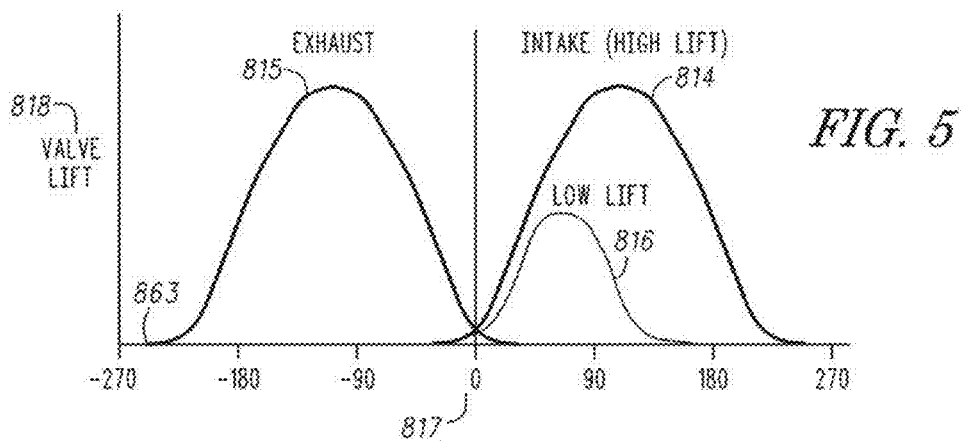
FIG. 5 is a diagram showing valve lift states plotted against cam shaft crank degrees for both the intake and exhaust valves for an exemplary DVVL implementation.

The intake valve train elements illustrated in FIG. 3 work in concert to open the intake valve 112 with either high-lift camshaft lobes 104, 106 or a low-lift camshaft lobe 108. The high-lift camshaft lobes 104, 106 are designed to provide performance comparable to a fixed intake valve train, and are comprised of a generally circular portion where no lift occurs, a lift portion, which may include a linear lift transition portion, and a nose portion that corresponds to maximum lift. The low-lift camshaft lobe 108 allows for lower valve lift and early intake valve closing. The low-lift camshaft lobe 108 also comprises a generally circular portion where no lift occurs, a generally linear portion were lift transitions, and a nose portion that corresponds to maximum lift. The graph in FIG. 5 shows a plot of valve lift 818 versus crank angle 817. The cam shaft high-lift profile 814 and the fixed exhaust valve lift profile 815 are contrasted with low-lift profile 816. The low-lift event illustrated by profile 816 reduces both lift and duration of the intake event during part throttle operation to decrease throttling losses and realize a fuel economy improvement. This is also referred to as early intake valve closing, or EIVC. When full power operation is needed, the DVVL system returns to the high-lift profile 814, which is similar to a standard fixed lift event. Transitioning from low-lift to high-lift and vice versa occurs within one camshaft revolution. The exhaust lift event shown by profile 815 is fixed and operates in the same way with either a low-lift or high-lift intake event.

Figure 6:
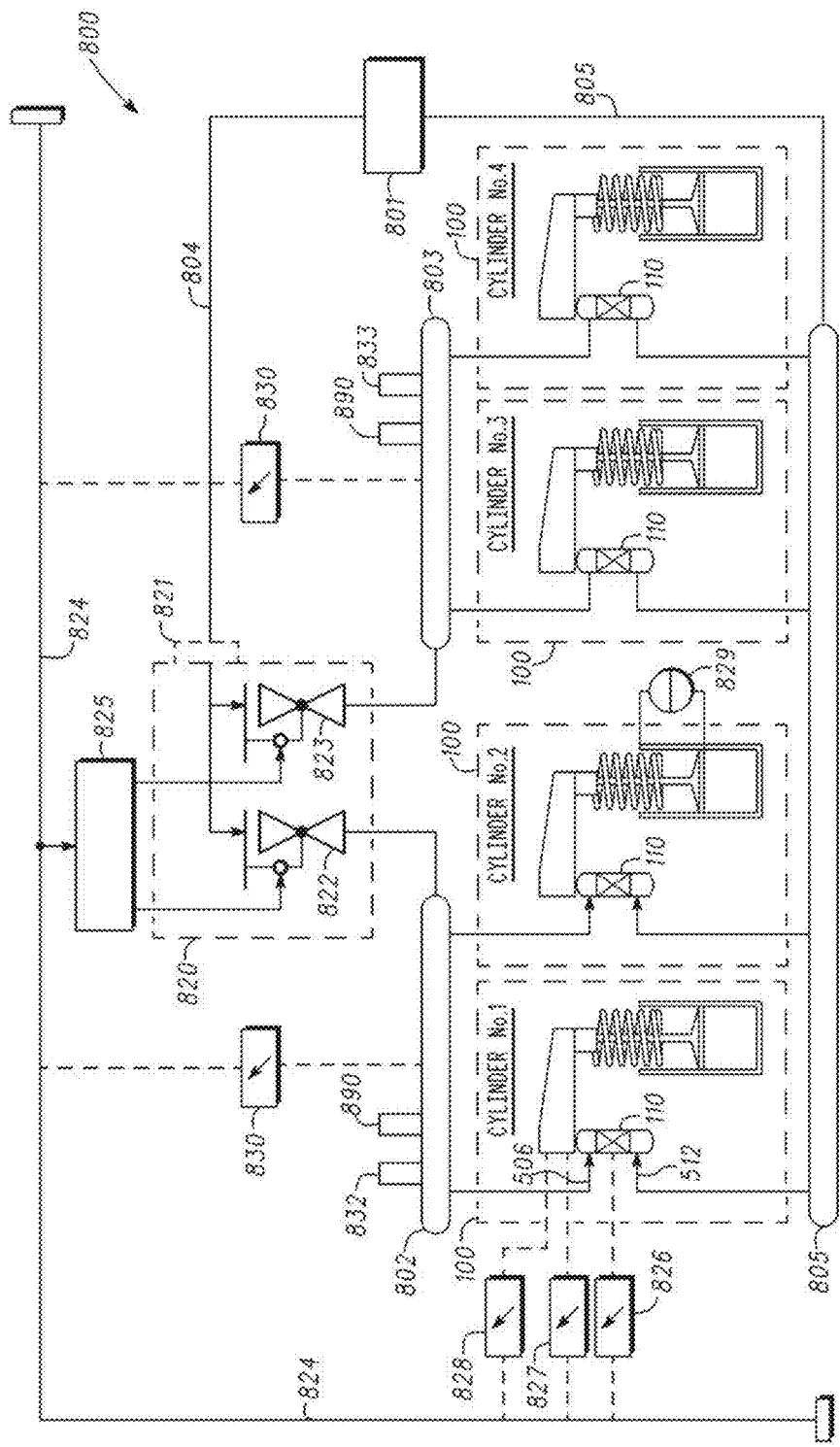
FIG. 6 is a system control diagram for a hydraulically actuated DVVL rocker arm assembly.

The system used to control DVVL switching uses hydraulic actuation. A schematic depiction of a hydraulic control and actuation system 800 that is used with embodiments of the teachings of the present application is shown in FIG. 6.

The hydraulic control and actuation system 800 is designed to deliver hydraulic fluid, as commanded by controlled logic, to mechanical latch assemblies that provide for switching between high-lift and low-lift states. An engine control unit 825 controls when the mechanical switching process is initiated. The hydraulic control and actuation system 800 shown is for use in a four cylinder in-line Type II engine on the intake valve train described previously, though the skilled artisan will appreciate that control and actuation system may apply to engines of other "Types" and different numbers of cylinders.

Several enabling technologies previously mentioned and used in the DVVL system described herein may be used in combination with other DVVL system components described herein thus rending unique combinations, some of which will be described herein:

2. DVVL System Enabling Technologies

Several technologies used in this system have multiple uses in varied applications; they are described herein as components of the DVVL system disclosed herein. These include:

2.1. Oil Control Valve (OCV) and Oil Control Valve Assemblies

Figure 7:
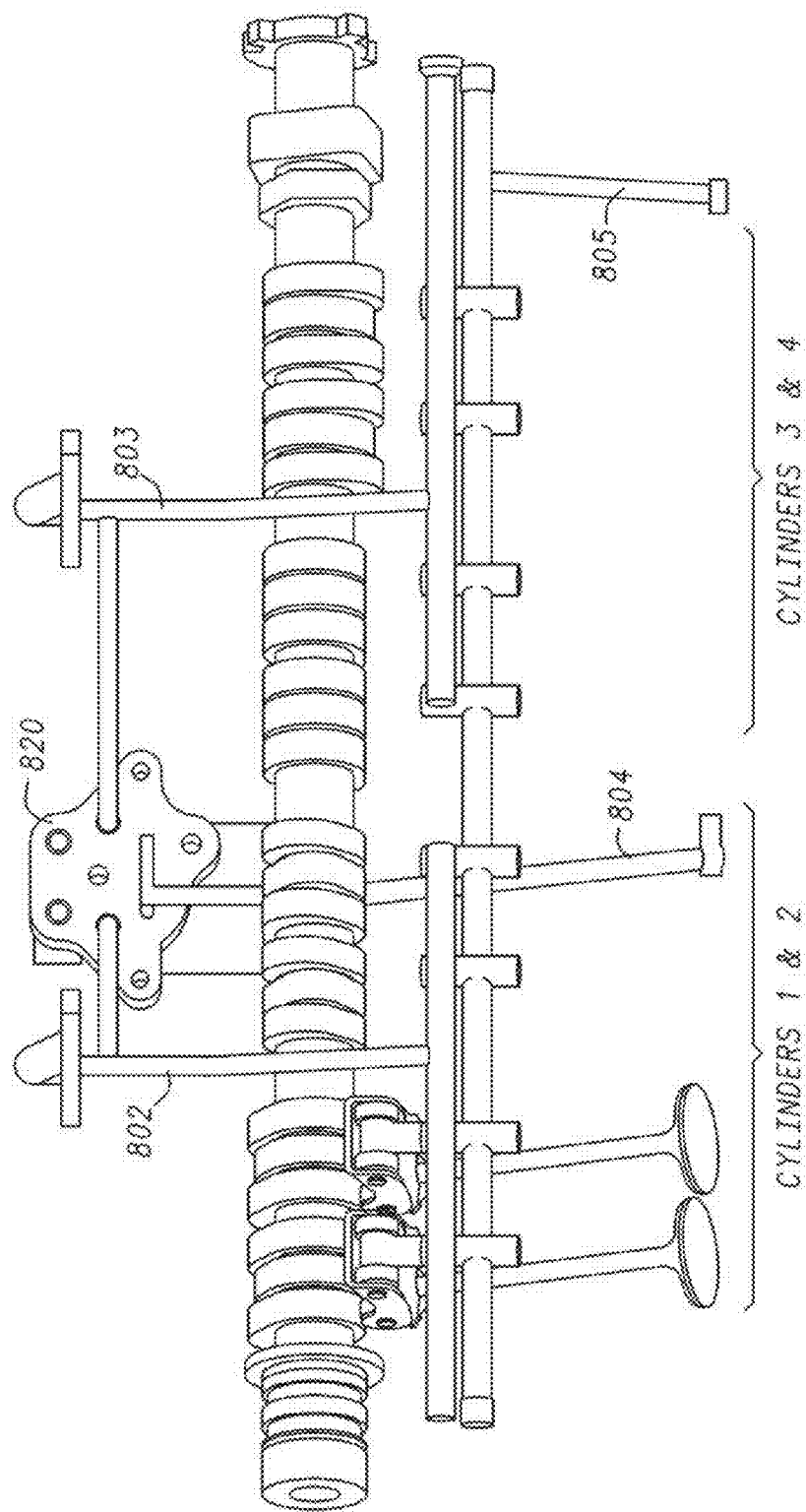
FIG. 7 illustrates the rocker arm oil gallery and control valve arrangement.
Figure 8:
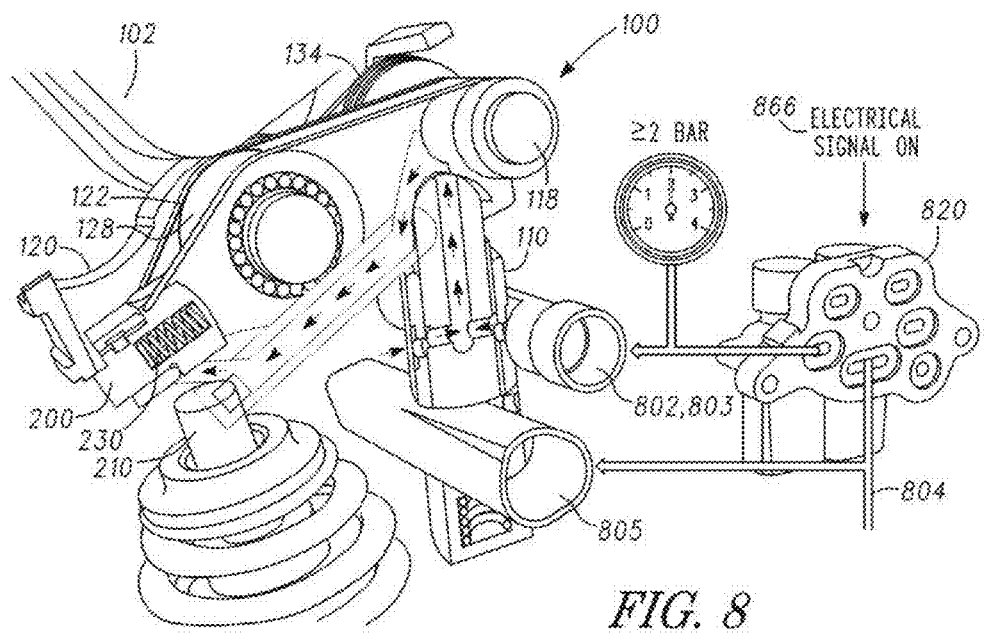
FIG. 8 illustrates the hydraulic actuating system and conditions for an exemplary DVVL switching rocker arm system during low-lift (unlatched) operation.
Figure 9:
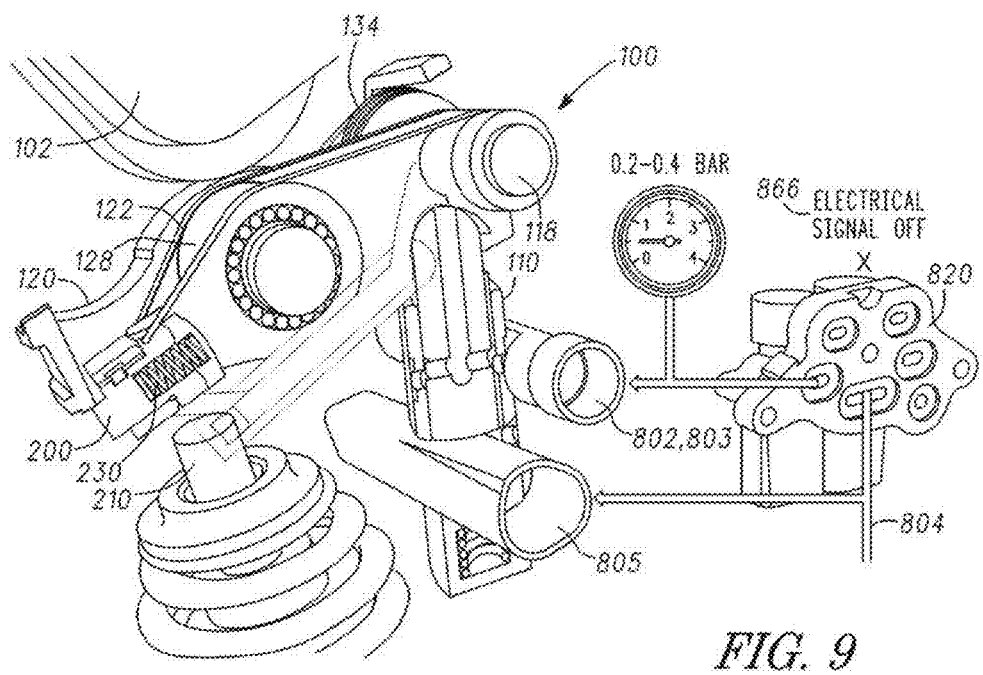
FIG. 9 illustrates the hydraulic actuating system and conditions for an exemplary DVVL switching rocker arm system during high-lift (latched) operation.

Now, referring to FIGS. 7-9, an OCV is a control device that directs or does not direct pressurized hydraulic fluid to cause the rocker arm 100 to switch between high-lift mode and low-lift mode. OCV activation and deactivation is caused by a control device signal 866. One or more OCVs can be packaged in a single module to form an assembly. In one embodiment, OCV assembly 820 is comprised of two solenoid type OCV's packaged together. In this embodiment, a control device provides a signal 866 to the OCV assembly 820, causing it to provide a high pressure (in embodiments, at least 2 Bar of oil pressure) or low pressure (in embodiments, 0.2-0.4 Bar) oil to the oil control galleries 802, 803 causing the switching rocker arm 100 to be in either low-lift or high-lift mode, as illustrated in FIGS. 8 and 9 respectively. Further description of this OCV assembly 820 embodiment is contained in following sections.

2.2. Dual Feed Hydraulic Lash Adjuster (DFHLA):

Many hydraulic lash adjusting devices exist for maintaining lash in engines. For DVVL switching of rocker arm 100 (FIG. 4), traditional lash management is required, but traditional HLA devices are insufficient to provide the necessary oil flow requirements for switching, withstand the associated side-loading applied by the assembly 100 during operation, and fit into restricted package spaces. A compact dual feed hydraulic lash adjuster 110 (DFHLA), used together with a switching rocker arm 100 is described, with a set of parameters and geometry designed to provide optimized oil flow pressure with low consumption, and a set of parameters and geometry designed to manage side loading.

Figure 10:
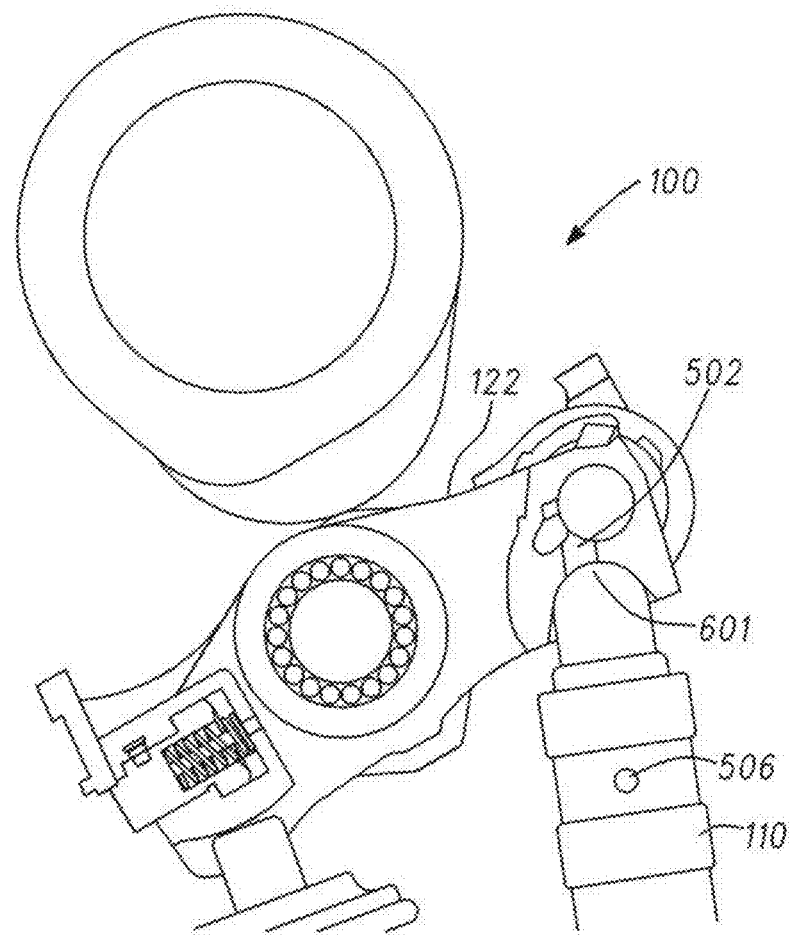
FIG. 10 illustrates a side cut-away view of an exemplary switching rocker arm assembly with dual feed hydraulic lash adjuster (DFHLA).

As illustrated in FIG. 10, the ball plunger end 601 fits into the ball socket 502 that allows rotational freedom of movement in all directions. This permits side and possibly asymmetrical loading of the ball plunger end 601 in certain operating modes, for example when switching from high-lift to low-lift and vice versa. In contrast to typical ball end plungers for HLA devices, the DFHLA 110 ball end plunger 601 is constructed with thicker material to resist side loading, shown in FIG. 11 as plunger thickness 510.

Selected materials for the ball plunger end 601 may also have higher allowable kinetic stress loads, for example, chrome vanadium alloy.

Hydraulic flow pathways in the DFHLA 110 are designed for high flow and low pressure drop to ensure consistent hydraulic switching and reduced pumping losses. The DFHLA is installed in the engine in a cylindrical receiving socket sized to seal against exterior surface 511, illustrated in FIG. 11. The cylindrical receiving socket combines with the first oil flow channel 504 to form a closed fluid pathway with a specified cross-sectional area.

Figure 11:
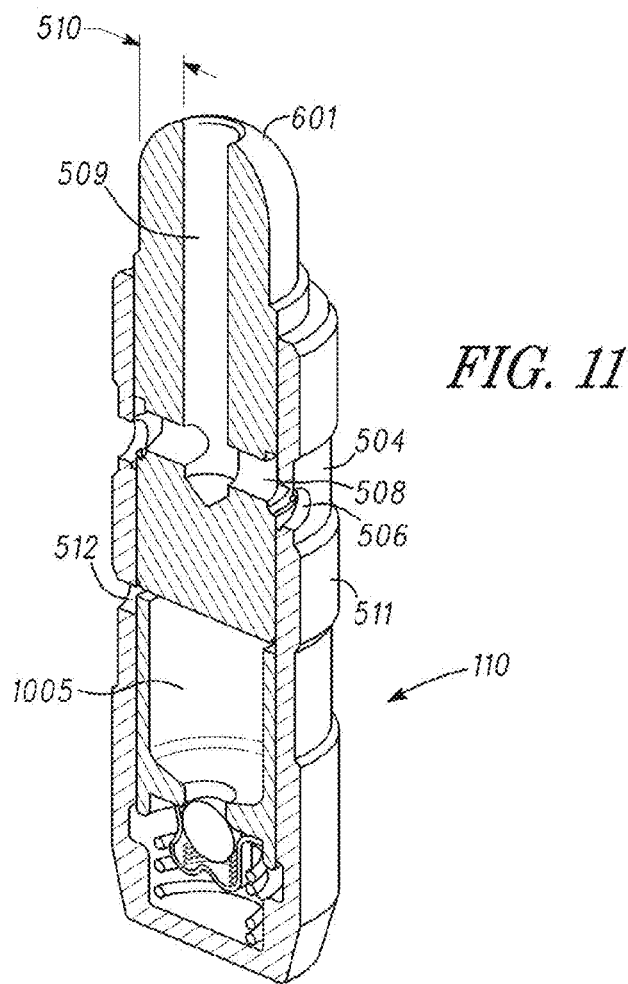
FIG. 11 is a cut-away view of a DFHLA.

As shown in FIG. 11, the preferred embodiment includes four oil flow ports 506 (only two shown) as they are arranged in an equally spaced fashion around the base of the first oil flow channel 504. Additionally, two second oil flow channels 508 are arranged in an equally spaced fashion around ball end plunger 601, and are in fluid communication with the first oil flow channel 504 through oil ports 506. Oil flow ports 506 and the first oil flow channel 504 are sized with a specific area and spaced around the DFHLA 110 body to ensure even flow of oil and minimized pressure drop from the first flow channel 504 to the third oil flow channel 509. The third oil flow channel 509 is sized for the combined oil flow from the multiple second oil flow channels 508.

2.3. Diamond-Like Carbon Coating (DLC)

A diamond-like carbon coating (DLC) coating is described that can reduce friction between treated parts, and at the same provide necessary wear and loading characteristics. Similar coating materials and processes exist, none are sufficient to meet many of the requirements encountered when used with VVA systems. For example, 1) be of sufficient hardness, 2) have suitable loadbearing capacity, 3) be chemically stable in the operating environment, 4) be applied in a process where temperatures do not exceed part annealing temperatures, 5) meet engine lifetime requirements, and 6) offer reduced friction as compared to a steel on steel interface.

A unique DLC coating process is described that meets the requirements set forth above. The DLC coating that was selected is derived from a hydrogenated amorphous carbon or similar material. The DLC coating is comprised of several layers described in FIG. 12.

1. The first layer is a chrome adhesion layer 701 that acts as a bonding agent between the metal receiving surface 700 and the next layer 702.
2. The second layer 702 is chrome nitride that adds ductility to the interface between the base metal receiving surface 700 and the DLC coating.
3. The third layer 703 is a combination of chrome carbide and hydrogenated amorphous carbon which bonds the DLC coating to the chrome nitride layer 702.
4. The fourth layer 704 is comprised of hydrogenated amorphous carbon that provides the hard functional wear interface.

The combined thickness of layers 701-704 is between two and six micrometers. The DLC coating cannot be applied directly to the metal receiving surface 700. To meet durability requirements and for proper adhesion of the first chrome adhesion layer 701 with the base receiving surface 700, a very specific surface finish mechanically applied to the base layer receiving surface 700.

2.4 Sensing and Measurement

Information gathered using sensors may be used to verify switching modes, identify error conditions, or provide information analyzed and used for switching logic and timing. Several sensing devices that may be used are described below.

2.4.1 Dual Feed Hydraulic Lash Adjuster (DFHLA) Movement

Variable valve actuation (VVA) technologies are designed to change valve lift profiles during engine operation using switching devices, for example a DVVL switching rocker arm or cylinder deactivation (CDA) rocker arm. When employing these devices, the status of valve lift is important information that confirms a successful switching operation, or detects an error condition/malfunction.

Figure 13:
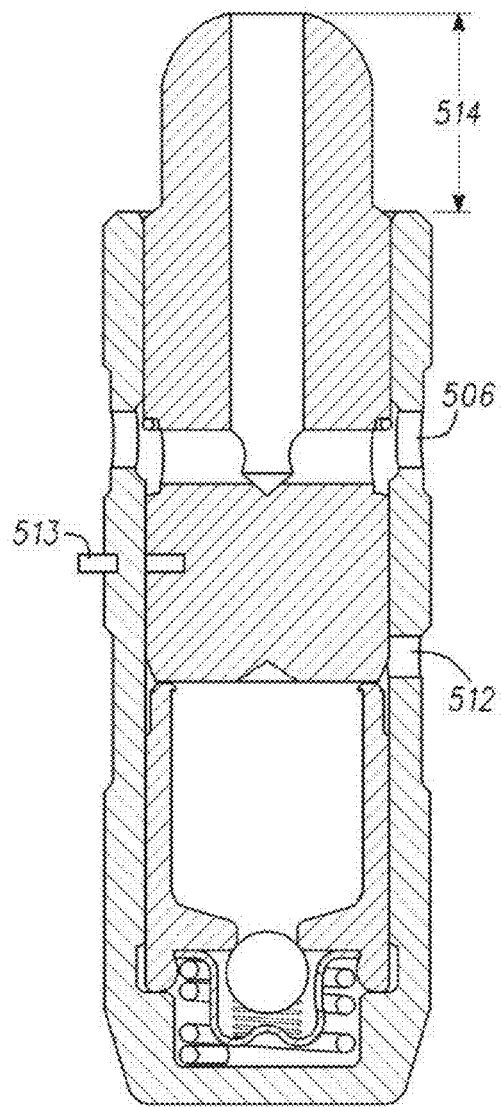
FIG. 13 illustrates an instrument used to sense position or relative movement of a DFHLA ball plunger.

A DFHLA is used to both manage lash and supply hydraulic fluid for switching in VVA systems that employ switching rocker arm assemblies such as CDA or DVVL. As shown in the section view of FIG. 10, normal lash adjustment for the DVVL rocker arm assembly 100, (a detailed description is in following sections) causes the ball plunger 601 to maintain contact with the inner arm 122 receiving socket during both high-lift and low-lift operation. The ball plunger 601 is designed to move as necessary when loads vary from between high-lift and low-lift states. A measurement of the movement 514 of FIG. 13 in comparison with known states of operation can determine the latch location status. In one embodiment, a non-contact switch 513 is located between the HLA outer body and the ball plunger cylindrical body. A second example may incorporate a Hall-effect sensor mounted in a way that allows measurement of the changes in magnetic fields generated by a certain movement 514.

2.4.2 Valve Stem Movement

Variable valve actuation (VVA) technologies are designed to change valve lift profiles during engine operation using switching devices, for example a DVVL switching rocker arm. The status of valve lift is important information that confirms a successful switching operation, or detects an error condition/malfunction. Valve stem position and relative movement sensors can be used to for this function.

Figure 14:
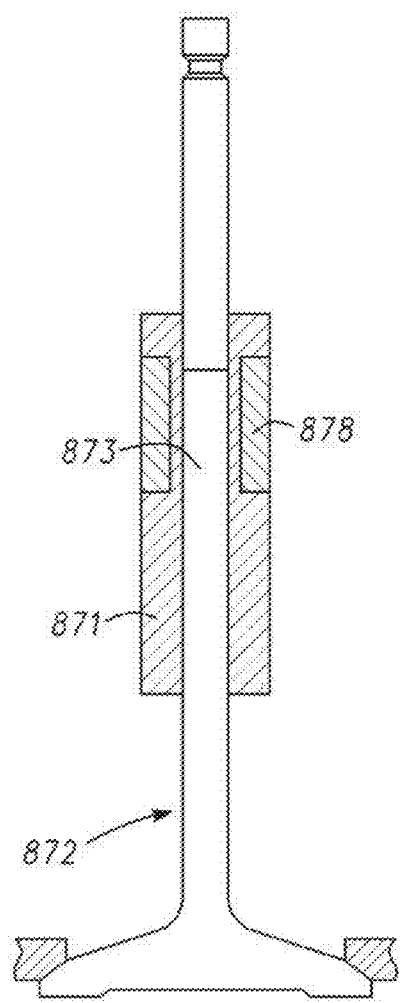
FIG. 14 illustrates an instrument used in conjunction with a valve stem to measure valve movement relative to a known state.
Figures 14A, 14B:
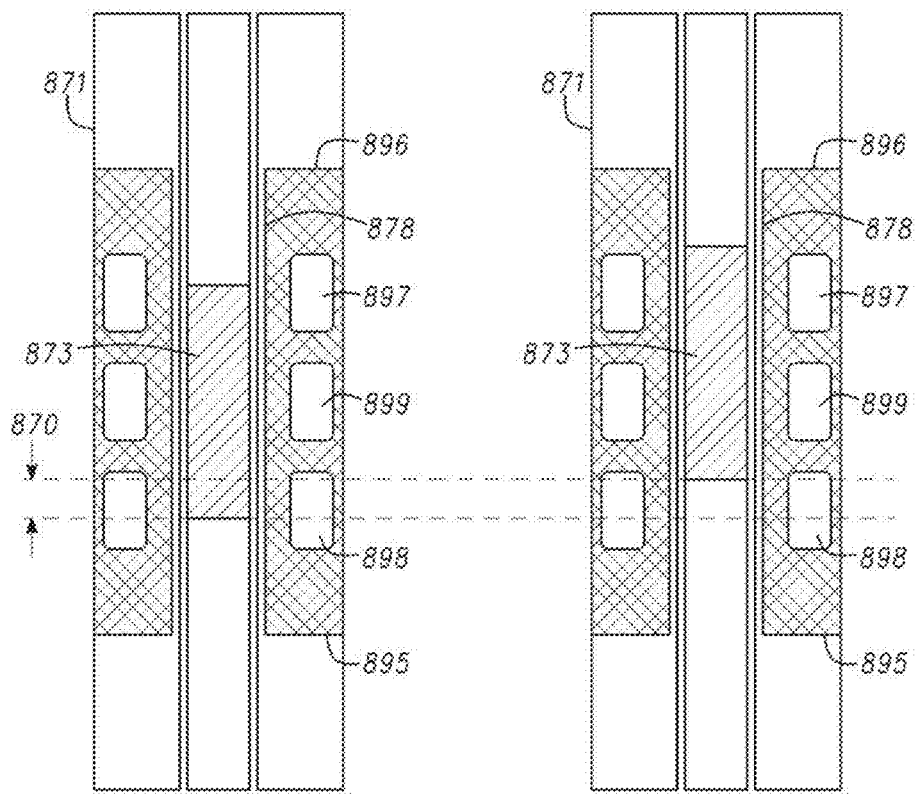
FIGS. 14A and 14B illustrate a section view of a first linear variable differential transformer using three windings to measure valve stem movement.

One embodiment to monitor the state of VVA switching, and to determine if there is a switching malfunction is illustrated in FIGS. 14 and 14A. In accordance with one aspect of the present teachings, a linear variable differential transformer (LVDT) type of transducer can convert the rectilinear motion of valve 872, to which it is coupled mechanically, into a corresponding electrical signal. LVDT linear position sensors are readily available that can measure movements as small as a few millionths of an inch up to several inches.

FIG. 14A shows the components of a typical LVDT installed in a valve stem guide 871. The LVDT internal structure consists of a primary winding 899 centered between a pair of identically wound secondary windings 897, 898. In embodiments, the windings 897, 898, 899 are wound in a recessed hollow formed in the valve guide body 871 that is bounded by a thin-walled section 878, a first end wall 895, and a second end wall 896. In this embodiment, the valve guide body 871 is stationary.

Now, as to FIGS. 14, 14A, and 14B, the moving element of this LVDT arrangement is a separate tubular armature of magnetically permeable material called the core 873. In embodiments, the core 873 is fabricated into the valve 872 stem using any suitable method and manufacturing material, for example iron.

The core 873 is free to move axially inside the primary winding 899, and secondary windings 897, 898, and it is mechanically coupled to the valve 872, whose position is being measured. There is no physical contact between the core 873, and valve guide 871 inside bore.

In operation, the LVDT's primary winding, 899, is energized by applying an alternating current of appropriate amplitude and frequency, known as the primary excitation. The magnetic flux thus developed is coupled by the core 873 to the adjacent secondary windings, 897 and 898.

As shown in 14A, if the core 873 is located midway between the secondary windings 897, 898, an equal magnetic flux is then coupled to each secondary winding, making the respective voltages induced in windings 897 and 898 equal. At this reference midway core 873 position, known as the null point, the differential voltage output is essentially zero.

The core 873 is arranged so that it extends past both ends of winding 899. As shown in FIG. 14B, if the core 873 is moved a distance 870 to make it closer to winding 897 than to winding 898, more magnetic flux is coupled to winding 897 and less to winding 898, resulting in a non-zero differential voltage. Measuring the differential voltages in this manner can indicate both direction of movement and position of the valve 872.

Figures 14C, 14D:
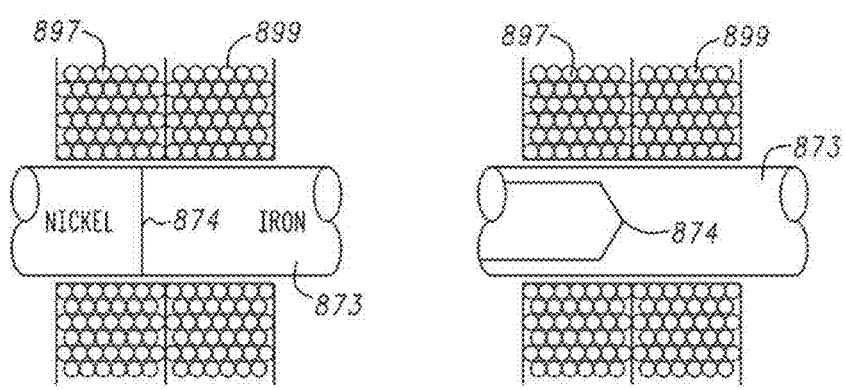
FIGS. 14C and 14D illustrate a section view of a second linear variable differential transformer using two windings to measure valve stem movement.

In a second embodiment, illustrated in FIGS. 14C and 14D, the LVDT arrangement described above is modified by removing the second coil 898 in (FIG. 14A). When coil 898 is removed, the voltage induced in coil 897 will vary relative to the end position 874 of the core 873. In embodiments where the direction and timing of movement of the valve 872 is known, only one secondary coil 897 is necessary to measure magnitude of movement. As noted above, the core 873 portion of the valve can be located and fabricated using several methods. For example, a weld at the end position 874 can join nickel base non-core material and iron base core material, a physical reduction in diameter can be used to locate end position 874 to vary magnetic flux in a specific location, or a slug of iron-based material can be inserted and located at the end position 874.

It will be appreciated in light of the disclosure that the LVDT sensor components in one example can be located near the top of the valve guide 871 to allow for temperature dissipation below that point. While such a location can be above typical weld points used in valve stem fabrication, the weld could be moved or as noted. The location of the core 873 relative to the secondary winding 897 is proportional to how much voltage is induced.

The use of an LVDT sensor as described above in an operating engine has several advantages, including 1) Frictionless operation—in normal use, there is no mechanical contact between the LVDT's core 873 and coil assembly. No friction also results in long mechanical life. 2) Nearly infinite resolution—since an LVDT operates on electromagnetic coupling principles in a friction-free structure, it can measure infinitesimally small changes in core position, limited only by the noise in an LVDT signal conditioner and the output display's resolution. This characteristic also leads to outstanding repeatability, 3) Environmental robustness—materials and construction techniques used in assembling an LVDT result in a rugged, durable sensor that is robust to a variety of environmental conditions. Bonding of the windings 897, 898, 899 may be followed by epoxy encapsulation into the valve guide body 871, resulting in superior moisture and humidity resistance, as well as the capability to take substantial shock loads and high vibration levels. Additionally, the coil assembly can be hermetically sealed to resist oil and corrosive environments. 4) Null point repeatability—the location of an LVDT's null point, described previously, is very stable and repeatable, even over its very wide operating temperature range. 5) Fast dynamic response—the absence of friction during ordinary operation permits an LVDT to respond very quickly to changes in core position. The dynamic response of an LVDT sensor is limited only by small inertial effects due to the core assembly mass. In most cases, the response of an LVDT sensing system is determined by characteristics of the signal conditioner. 6) Absolute output—an LVDT is an absolute output device, as opposed to an incremental output device. This means that in the event of loss of power, the position data being sent from the LVDT will not be lost. When the measuring system is restarted, the LVDT's output value will be the same as it was before the power failure occurred.

The valve stem position sensor described above employs a LVDT type transducer to determine the location of the valve stem during operation of the engine. The sensor may be any known sensor technology including Hall-effect sensor, electronic, optical and mechanical sensors that can track the position of the valve stem and report the monitored position back to the ECU.

2.4.3 Part Position/Movement

Variable valve actuation (VVA) technologies are designed to change valve lift profiles during engine operation using switching devices, for example a DVVL switching rocker arm. Changes in switching state may also change the position of component parts in VVA assemblies, either in absolute terms or relative to one another in the assembly. Position change measurements can be designed and implemented to monitor the state of VVA switching, and possibly determine if there is a switching malfunction.

Figure 15:
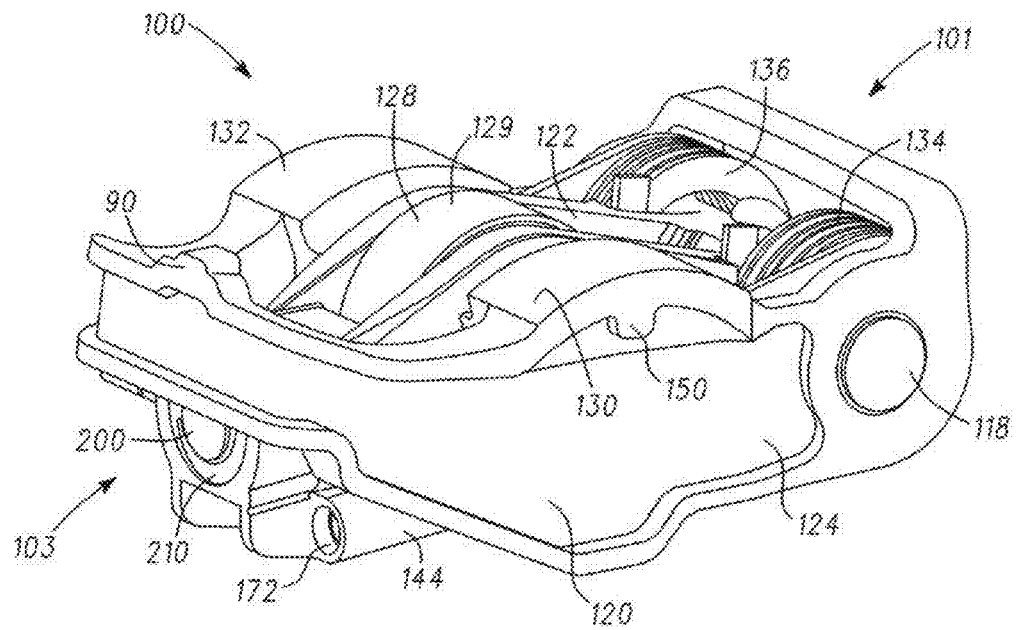
FIG. 15 illustrates another perspective view of an exemplary switching rocker arm and FIG. 15A depicts the exemplary switching rocker arm held in a clamping fixture.
Figure 16:
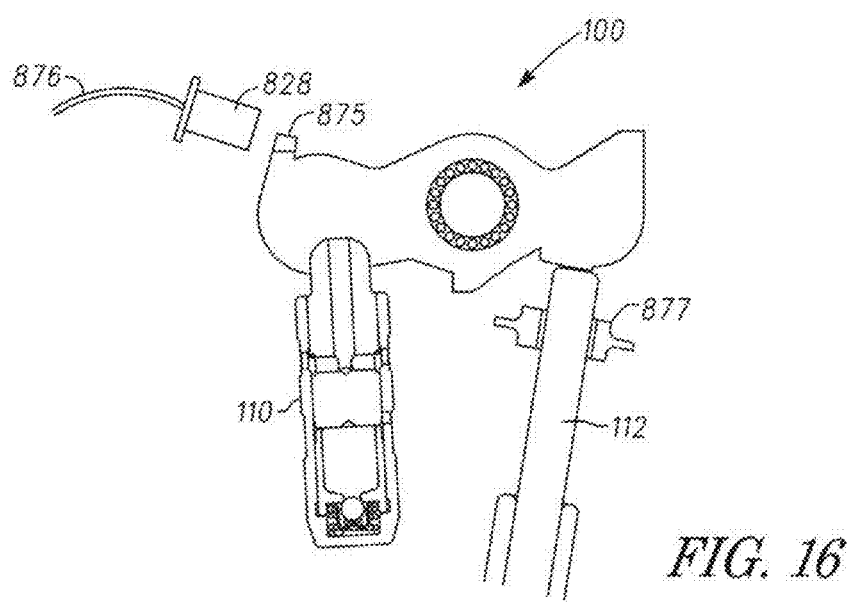
FIG. 16 illustrates an instrument designed to sense position and/or movement.

Now, with reference to FIGS. 15-16, an exemplary DVVL switching rocker arm assembly 100 can be configured with an accurate non-contacting sensor 828 that measures relative movement, motion, or distance.

In one embodiment, movement sensor 828 is located near the first end 101 (FIG. 15), to evaluate the movement of the outer arm 120 relative to known positions for high-lift and low-lift modes. In this example, movement sensor 828 comprises a wire wound around a permanently magnetized core, and is located and oriented to detect movement by measuring changes in magnetic flux produced as a ferrous material passes through its known magnetic field. For example, when the outer arm tie bar 875, which is magnetic (ferrous material), passes through the permanent magnetic field of the position sensor 828, the flux density is modulated, inducing AC voltages in the coil and producing an electrical output that is proportional to the proximity of the tie bar 875. The modulating voltage is input to the engine control unit (ECU) (described in following sections), where a processor employs logic and calculations to initiate rocker arm assembly 100 switching operations. In embodiments, the voltage output may be binary, meaning that the absence or presence of a voltage signal indicates high-lift or low-lift.

It can be seen that position sensor 828 may be positioned to measure movement of other parts in the rocker arm assembly 100. In a second embodiment, sensor 828 may be positioned at second end 103 of the DVVL rocker arm assembly 100 (FIG. 15) to evaluate the location of the inner arm 122 relative to the outer arm 120.

A third embodiment can position sensor 828 to directly evaluate the latch 200 position in the DVVL rocker arm assembly 100. The latch 200 and sensor 828 are engaged and fixed relative to each other when they are in the latched state (high lift mode), and move apart for unlatched (low-lift) operation.

Movement may also be detected using and inductive sensor. Sensor 877 may be a Hall-effect sensor, mounted in a way that allows measurement of the movement or lack of movement, for example the valve stem 112.

2.4.4 Pressure Characterization

Variable valve actuation (VVA) technologies are designed to change valve lift profiles during engine operation using switching devices, for example a DVVL switching rocker arm. Because latch status is an important input to the ECU that may enable it to perform various functions, such as regulating fuel/air mixture to increase gas mileage, reduce pollution, or to regulate idle and knocking, measuring devices or systems that confirm a successful switching operation, or detect an error condition or malfunction are necessary for proper control. In some cases switching status reporting and error notification is necessary for regulatory compliance.

In embodiments comprising a hydraulically actuated DVVL system 800, as illustrated in FIG. 6, changes in switching state provide distinct hydraulic switching fluid pressure signatures. Because fluid pressure is required to produce the necessary hydraulic stiffness that initiates switching, and because hydraulic fluid pathways are geometrically defined with specific channels and chambers, a characteristic pressure signature is produced that can be used to predictably determine latched or unlatched status or a switching malfunction. Several embodiments can be described that measure pressure, and compare measured results with known and acceptable operating parameters. Pressure measurements can be analyzed on a macro level by examining fluid pressure over several switching cycles, or evaluated over a single switching event lasting milliseconds.

Figure 17:
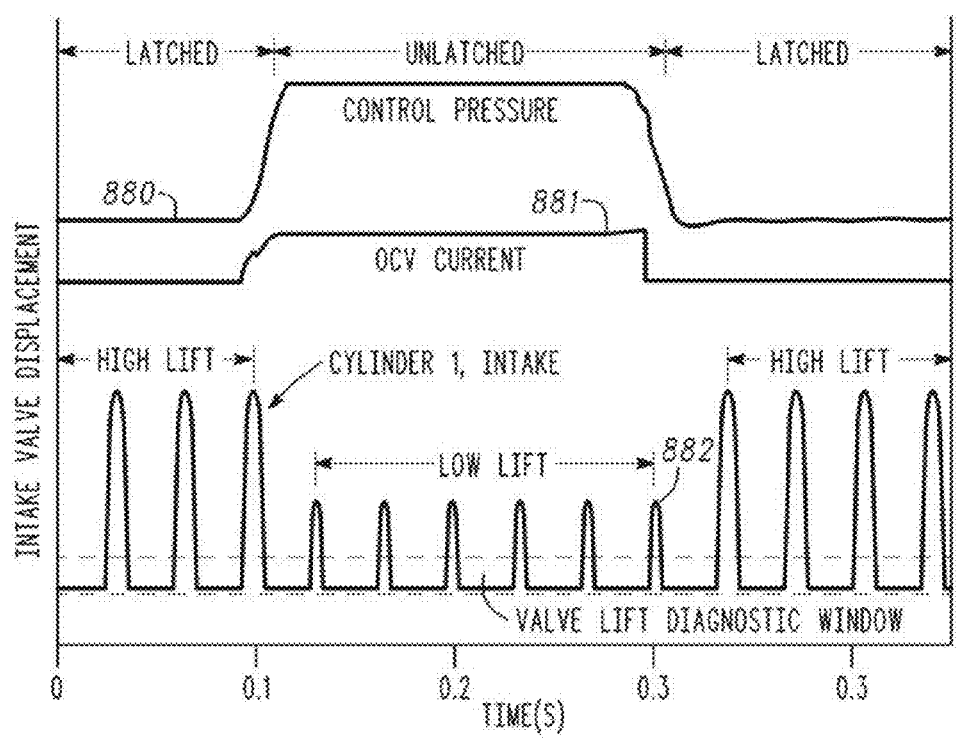
FIG. 17 is a graph that illustrates the relationship between OCV actuating current, actuating oil pressure and valve lift state during a transition between high-lift and low-lift states.

Now, with reference to FIGS. 6, 7, and 17, an example plot (FIG. 17) shows the valve lift height variation 882 over time for cylinder 1 as the switching rocker assembly 100 operates in either high-lift or low-lift, and switches between high-lift and low-lift. Corresponding data for the hydraulic switching system are plotted on the same time scale (FIG. 17), including oil pressure 880 in the upper galleries 802, 803 as measured using pressure transducer 890, and the electrical current 881 used to open and close solenoid valves 822, 823 in the OCV assembly 820. As can be seen, this level of analysis on a macro level clearly shows the correlation between OCV switching current 881, control pressure 880, and lift 882 during all states of operation. For example, at time 0.1, the OCV is commanded to switch, as shown by an increased electrical current 881. When the OCV is switched, increased control pressure 880 results in a high-lift to low-lift switching event. As operation is evaluated over one or more complete switching cycles, proper operation of the sub-system comprising the OCV and the pressurized fluid delivery system to the rocker arm assembly 100 can be evaluated. Switching malfunction determination can be enhanced with other independent measurements, for example valve stem movement as described above. As can be seen, these analyses can be performed for any number of OCV's used to control intake and/or exhaust valves for one or more cylinders.

Figure 17A:
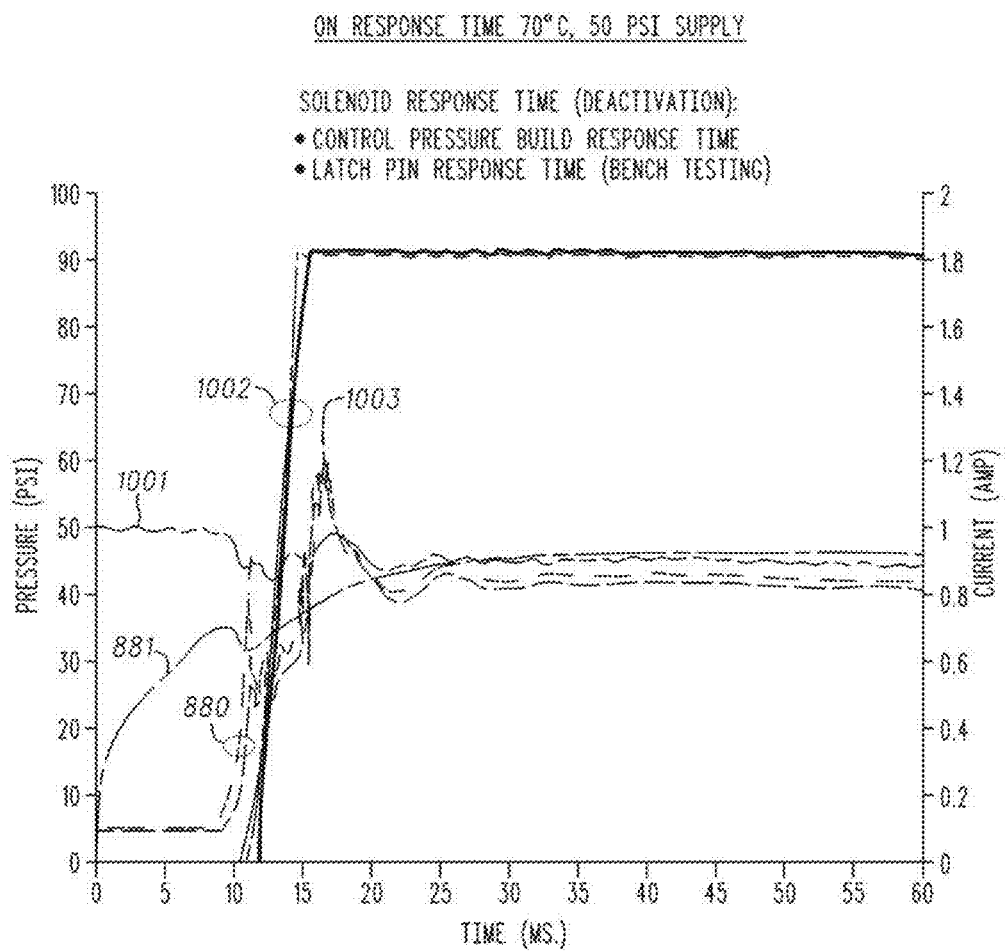
FIG. 17A is a graph that illustrates the relationship between OCV actuating current, actuating oil pressure and latch state during a latch transition.
Figure 17B:
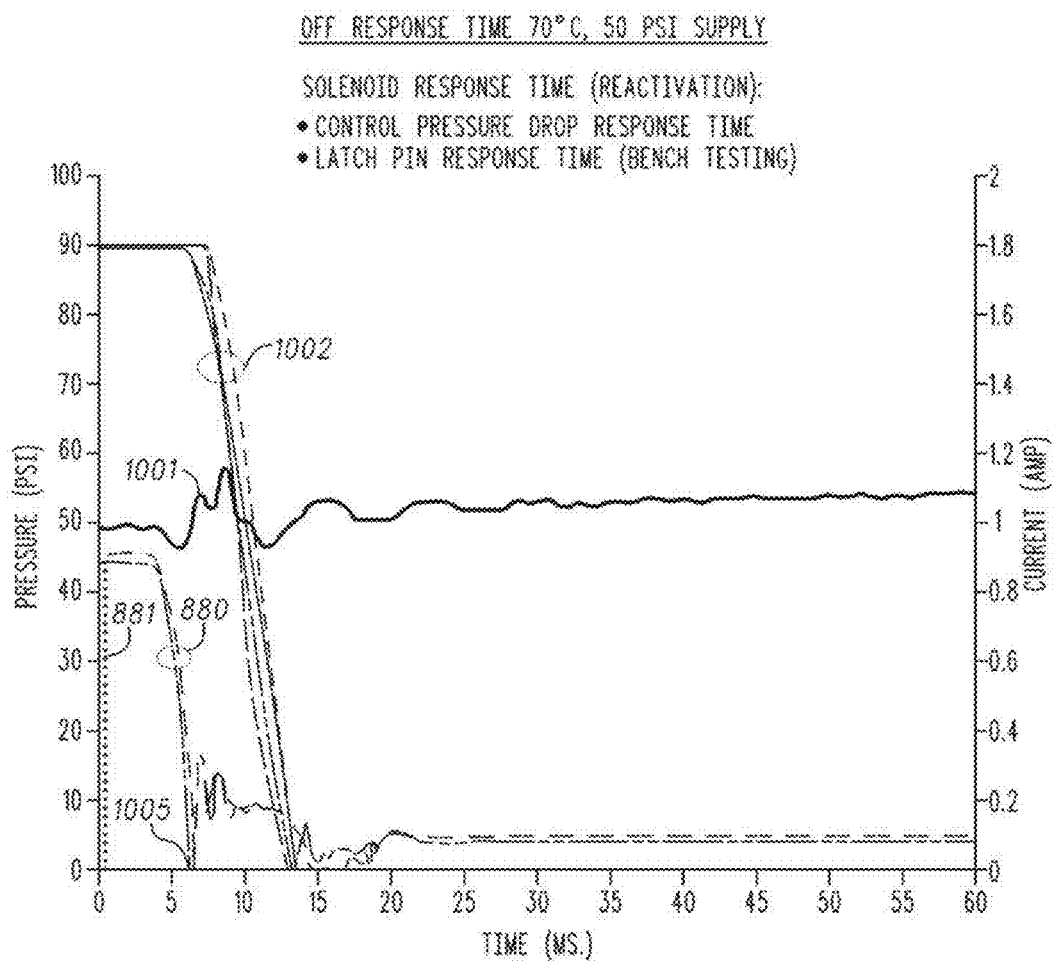
FIG. 17B is a graph that illustrates the relationship between OCV actuating current, actuating oil pressure, and latch state during another latch transition.

Using a similar method, but using data measured and analyzed on the millisecond level during a switching event, provides enough detailed control pressure information (FIGS. 17A, 17B) to independently evaluate a successful switching event or switching malfunction without measuring valve lift or latch pin movement directly. In embodiments using this method, switching state is determined by comparing the measured pressure transient to known operating state pressure transients developed during testing, and stored in the ECU for analysis. FIGS. 17A and 17B illustrate exemplary test data used to produce known operating pressure transients for a switching rocker arm in a DVVL system.

The test system included four switching rocker arm assemblies 100 as shown in (FIG. 3), an OCV assembly 820 (FIG. 3), two upper oil control galleries 802, 803 (FIGS. 6-7), and a closed loop system to control hydraulic actuating fluid temperature and pressure in the control galleries 802, 803. Each control gallery provided hydraulic fluid at regulated pressure to control two rocker arm assemblies 100.

FIG. 17A illustrates a valid single test run showing data when an OCV solenoid valve is energized to initiate switching from high-lift to low-lift state. Instrumentation was installed to measure latch movements 1003, pressure 880 in the control galleries 802, 803, OCV current 881, pressure 1001 in the hydraulic fluid supply 804 (FIG. 6-7), and latch lash and cam lash. The sequence of events can be described as follows:

0 ms—ECU switched on electrical current 881 to energize the OCV solenoid valve.
  10 ms—Switching current 881 to the OCV solenoid is sufficient to regulate pressure higher in the control gallery 802, 803 as shown by pressure curve 880.
  10-13 ms—The supply pressure curve 1001 decreases below the pressure regulated by the OCV as hydraulic fluid flows from the supply 804 (FIGS. 6-7) into the upper control galleries 802, 803. In response, pressure 880 increases rapidly in the control galleries 802, 803. Latch pin movement begins as shown in latch pin movement curve 1003.
  13-15 ms—The supply pressure curve 1001 returns to a steady unregulated state as flow stabilizes. Pressure 880 in the control galleries 802, 803 increases to the higher pressure regulated by the OCV.
  15-20 ms—A pressure 880 increase/decrease transient in the control galleries 802, 803 is produced as pressurized hydraulic fluid pushes the latch fully back into position (latch pin movement curve 1002), and hydraulic flow and pressure stabilizes at the OCV unregulated pressure. Pressure spike 1003 is characteristic of this transient.
  At 12 ms and 17 ms distinctive pressure transients can be seen in pressure curve 880 that coincide with sudden changes in latch position 1002.

FIG. 17B illustrates a valid single test run showing data when an OCV solenoid valve is de-energized to initiate switching from low-lift to high-lift state. The sequence of events can be described as follows:

0 ms—ECU switched off electrical current 881 to de-energize the OCV solenoid valve.
  5 ms—OCV solenoid moves far enough to introduce regulated, lower pressure, hydraulic fluid into enter the control galleries 802 and 803 (pressure curve 880).
  5-7 ms—Pressure in the control galleries 802, 803, decreases rapidly as shown by curve 880, as the OCV regulates pressure lower.
  7-12 ms—Coinciding with the low pressure point 1005, lower pressure in the control galleries 802, 803 initiates latch movement as shown by the latch movement curve 1002. Pressure curve 880 transients are initiated as the latch spring 230 (FIG. 19) compresses and moves hydraulic fluid in the volume engaging the latch.
  12-15 ms—Pressure transients, shown in pressure curve 880, are again introduced as the latch pin movement, shown by latch pin movement curve 1002, completes.
  15-30 ms—Pressure in control galleries 802, 803 stabilize at the OCV regulated pressure as shown by pressure curve 880.
  As noted above, at 7-10 ms and 13-20 ms distinctive pressure transients can be seen in pressure curve 880 that coincide with sudden changes in latch position 1002.

As noted previously, and in following sections, the fixed geometric configuration of the hydraulic channels, holes, clearances, and chambers, and the stiffness of the latch spring, are variables that relate to hydraulic response and mechanical switching speed for changes in regulated hydraulic fluid pressure. The pressure curves 880, in FIGS. 17A and 17B describe a DVVL switching rocker arm system operating in an acceptable range. During operation, specific rates of increase or decrease in pressure (curve slope) are characteristic of proper operation characterized by the timing of events listed above. Examples of error conditions include: time shifting of pressure events that show deterioration of latch response times, changes in rate of the occurrence of events (pressure curve slope changes), or an overall decrease in the amplitude of pressure events. For example, a lower than anticipated pressure increase in the 15-20 ms period indicates that the latch has not retracted completely, potentially resulting in a critical shift.

The test data in these examples were measured with oil pressure of 50 psi and oil temperature of 70 degrees C. A series of tests in different operating conditions can provide a database of characteristic curves to be used by the ECU for switching diagnosis.

An additional embodiment that utilizes pressure measurement to diagnose switching state is described. A DFHLA 110 as shown in FIG. 3 is used to both manage lash, and supply hydraulic fluid for actuating VVA systems that employ switching rocker arm assemblies such as CDA or DVVL. As shown in the section view of FIG. 52, normal lash adjustment for the DVVL rocker arm assembly 100, causes the ball plunger 601 to maintain contact with the receiving socket of the inner arm assembly 622 during both high-lift and low-lift operation. When fully assembled in an engine, the DFHLA 110 is in a fixed position, while the inner rocker arm assembly 622 exhibits rotational movement about the ball tip contact point 611. The rotational movement of the inner arm assembly 622 and the ball plunger load 615 vary in magnitude when switching between high-lift and low-lift states. The ball plunger 601 is designed to move in compensation when loads and movement vary.

Compensating force for the ball plunger load 615 is provided by hydraulic fluid pressure in the lower control gallery 805 as it is communicated from the lower port 512 to chamber 905 (FIG. 11). As shown in FIGS. 6-7, hydraulic fluid at unregulated pressure is communicated from the engine cylinder head, into the lower control gallery 805.

In embodiments, a pressure transducer is placed in the hydraulic gallery 805 that feeds the lash adjuster part of the DFHLA 110. The pressure transducer can be used to monitor the transient pressure change in the hydraulic gallery 805 that feeds the lash adjuster when transitioning from the high-lift state to the low-lift state or from the low-lift state to the high-lift state. By monitoring the pressure signature when switching from one mode to another, the system may be able to detect when the variable valve actuation system is malfunctioning at any one location. A pressure signature curve, in embodiments plotted as pressure versus time in milliseconds, provides a characteristic shape that can include amplitude, slope, and/or other parameters.

Figure 17C:
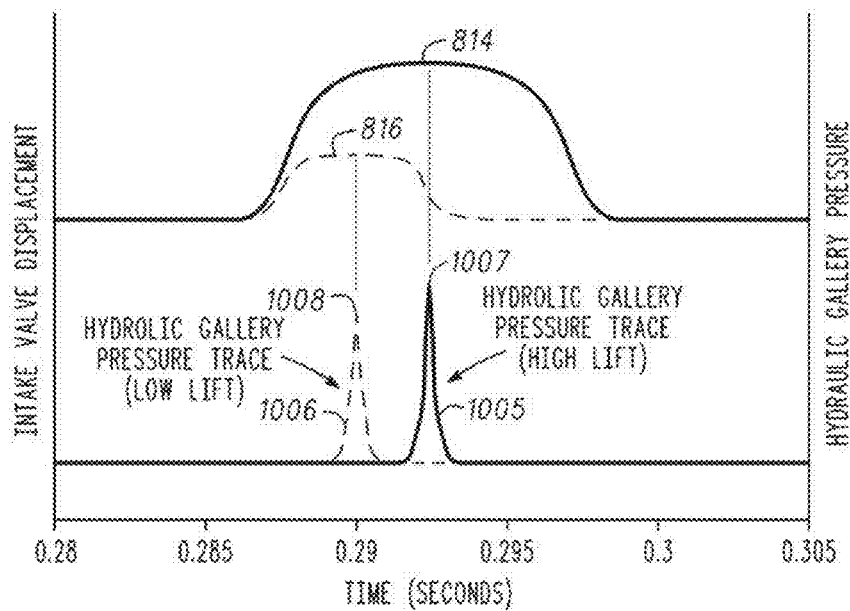
FIG. 17C is a graph that illustrates the relationship between valve lift profiles and actuating oil pressure for high-lift and low-lift states.

For example, FIG. 17C shows a plot of intake valve lift profile curves 814, 816 versus time in milliseconds, superimposed with a plot of hydraulic gallery pressure curves 1005, 1006 versus the same time scale. Pressure curve 1006 and valve lift profile curve 816 correspond to the low-lift state, and pressure curve 1005 and valve lift profile 814 correspond to the high-lift state.

During steady state operation, pressure signature curves 1005, 1006 exhibit cyclical behavior, with distinct spikes 1007, 1008 caused as the DFHLA compensates for alternating ball plunger loads 615 that are imparted as the cam pushes down the rocker arm assembly to compress the valve spring (FIG. 3) and provide valve lift, as the valve spring extends to close the valve, and when the cam is on base circle where no lift occurs. As shown in FIG. 17C, transient pressure spikes 1006, 1007 correspond with the peak of the low-lift and high-lift profiles 816, 814 respectively. As the hydraulic system pressure stabilizes, steady-state pressure signature curves 1005, 1006 resume.

As noted previously, and in following sections, the fixed geometric configuration of DFHLA hydraulic channels, holes, clearances, and chambers, are variables that relate to hydraulic response and pressure transients for a given hydraulic fluid pressure and temperature. The pressure signature curves 1005, 1006, in FIG. 17C describe a DVVL switching rocker arm system operating in an acceptable range. During operation, certain rates of increase or decrease in pressure (curve slopes), peak pressure values, and timing of peak pressures with respect to maximum lift are also be characteristic of proper operation characterized by the timing of switching events. Examples of error conditions may include time shifting of pressure events, changes in rate of the occurrence of events (pressure curve slope changes), sudden unexpected pressure transients, or an overall decrease in the amplitude of pressure events.

A series of tests in different operating conditions can provide a database of characteristic curves to be used by the ECU for switching diagnosis. One or several values of pressure can be used based on the system configuration and vehicle demands. The monitored pressure trace can be compared to a standard trace to determine when the system malfunctions.

3. Switching Control and Logic 3.1. Engine Implementation

Figure 4:
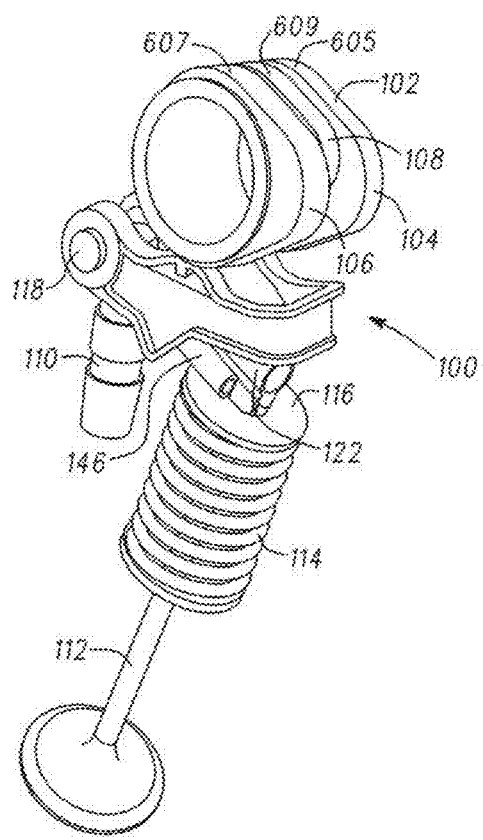
FIG. 4 illustrates a perspective view of an exemplary switching rocker arm as it may be configured during operation with a three lobed cam.

The DVVL hydraulic fluid system that delivers engine oil at a controlled pressure to the DVVL switching rocker arm 100, illustrated in FIG. 4, is described in following sections as it may be installed on an intake valve in a Type II valve train in a four cylinder engine. In alternate embodiments, this hydraulic fluid delivery system can be applied to any combination of intake or exhaust valves on a piston-driven internal combustion engines.

3.2. Hydraulic Fluid Delivery System to the Rocker Arm Assembly

Figure 18:
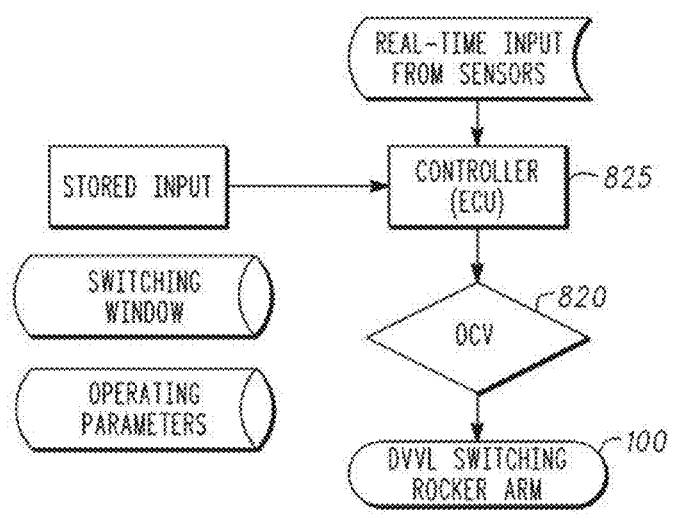
FIG. 18 is a control logic diagram for a DVVL system.

With reference to FIGS. 3, 6 and 7, the hydraulic fluid system delivers engine oil 801 at a controlled pressure to the DVVL switching rocker arm 100 (FIG. 4). In this arrangement, engine oil from the cylinder head 801 that is not pressure regulated feeds into the HLA lower feed gallery 805. As shown in FIG. 3, this oil is always in fluid communication with the lower feed inlet 512 of the DFHLA, where it is used to perform normal hydraulic lash adjustment. Engine oil from the cylinder head 801 that is not pressure regulated is also supplied to the oil control valve assembly inlet 821. As described previously, the OCV assembly 820 for this DVVL embodiment comprises two independently actuated solenoid valves that regulate oil pressure from the common inlet 821. Hydraulic fluid from the OCV assembly 820 first control port outlet 822 is supplied to the first upper gallery 802, and hydraulic fluid from the second control port 823 is supplied to the second upper gallery 803. The first OCV determines the lift mode for cylinders one and two, and the second OCV determines the lift mode for cylinders three and four. As shown in FIG. 18 and described in following sections, actuation of valves in the OCV assembly 820 is directed by the engine control unit 825 using logic based on both sensed and stored information for particular physical configuration, switching window, and set of operating conditions, for example, a certain number of cylinders and a certain oil temperature.

Figures 19, 20:
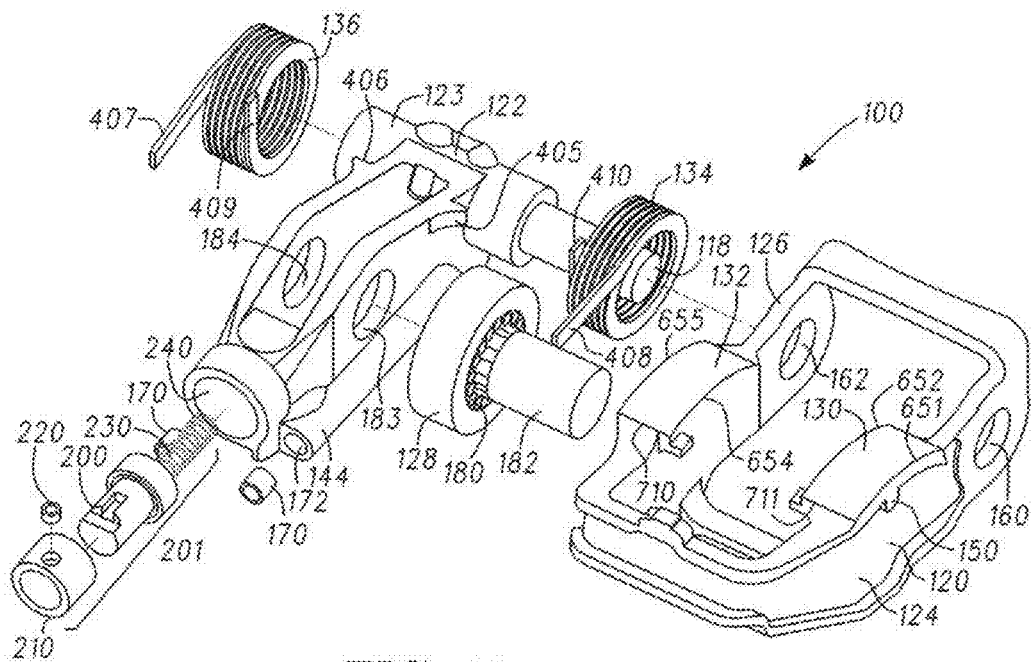
FIG. 19 illustrates an exploded view of an exemplary switching rocker arm.
FIG. 20 is a chart illustrating oil pressure conditions and oil control valve (OCV) states for both low-lift and high-lift operation of a DVVL rocker arm assembly.

Pressure regulated hydraulic fluid from the upper galleries 802, 803 is directed to the DFHLA upper port 506, where it is transmitted through channel 509 to the switching rocker arm assembly 100. As shown in FIG. 19, hydraulic fluid is communicated through the rocker arm assembly 100 via the first oil gallery 144, and the second oil gallery 146 to the latch pin assembly 201, where it is used to initiate switching between high-lift and low-lift states.

Purging accumulated air in the upper galleries 802, 803 is important to maintain hydraulic stiffness and minimize variation in the pressure rise time. Pressure rise time directly affects the latch movement time during switching operations. The passive air bleed ports 832, 833 shown in FIG. 6 were added to the high points in the upper galleries 802, 803 to vent accumulated air into the cylinder head air space under the valve cover.

3.2.1 Hydraulic Fluid Delivery for Low-Lift Mode:

Now, with reference to FIG. 8, the DVVL system is designed to operate from idle to 3500 rpm in low-lift mode. A section view of the rocker arm assembly 100 and the 3-lobed cam 102 shows low-lift operation. Major components of the assembly shown in FIGS. 8 and 19, include the inner arm 122, roller bearing 128, outer arm 120, slider pads 130, 132, latch 200, latch spring 230, pivot axle 118, and lost motion torsion springs 134, 136. For low-lift operation, when a solenoid valve in the OCV assembly 820 is energized, unregulated oil pressure at ≥2.0 Bar is supplied to the switching rocker arm assembly 100 through the control galleries 802, 803 and the DFHLA 110. The pressure causes the latch 200 to retract, unlocking the inner arm 122 and outer arm 120, and allowing them to move independently. The high-lift camshaft lobes 104, 106 (FIG. 3) remain in contact with the sliding interface pads 130, 132 on the outer arm 120. The outer arm 120 rotates about the pivot axle 118 and does not impart any motion to the valve 112. This is commonly referred to as lost motion. Since the low-lift cam profile 816 (FIG. 5) is designed for early valve closing, the switching rocker arm 100 must be designed to absorb all of the motion from the high-lift camshaft lobes 104, 106 (FIG. 3). Force from the lost motion torsion springs 134, 136 (FIG. 15) ensure the outer arm 120 stays in contact with the high-lift lobe 104, 106 (FIG. 3). The low-lift lobe 108 (FIG. 3) contacts the roller bearing 128 on the inner arm 122 and the valve is opened per the low lift early valve closing profile 816 (FIG. 5).

3.2.2 Hydraulic Fluid Delivery for High-Lift Mode

Now, with reference to FIG. 9, the DVVL system is designed to operate from idle to 7300 rpm in high-lift mode. A section view of the switching rocker arm 100 and the 3-lobe cam 102 shows high-lift operation. Major components of the assembly are shown in FIGS. 9 and 19, including the inner arm 122, roller bearing 128, outer arm 120, slider pads 130, 132, latch 200, latch spring 230, pivot axle 118, and lost motion torsion springs 134, 136.

Solenoid valves in the OCV assembly 820 are de-energized to enable high lift operation. The latch spring 230 extends the latch 200, locking the inner arm 122 and outer arm 120. The locked arms function like a fixed rocker arm. The symmetric high lift lobes 104, 106 (FIG. 3) contact the slider pads 130, (132 not shown) on the outer arm 120, rotating the inner arm 122 about the DFHLA 110 ball end 601 and opening the valve 112 (FIG. 4) per the high lift profile 814 (FIG. 5). During this time, regulated oil pressure from 0.2 to 0.4 bar is supplied to the switching rocker arm 100 through the control galleries 802, 803. Oil pressure maintained at 0.2 to 0.4 bar keeps the oil passages full but does not retract the latch 200.

In high-lift mode, the dual feed function of the DFHLA is important to ensure proper lash compensation of the valve train at maximum engine speeds. The lower gallery 805 in FIG. 9 communicates cylinder head oil pressure to the lower DFHLA port 512 (FIG. 11). The lower portion of the DFHLA is designed to perform as a normal hydraulic lash compensation mechanism. The DFHLA 110 mechanism was designed to ensure the hydraulics have sufficient pressure to avoid aeration and to remain full of oil at all engine speeds. Hydraulic stiffness and proper valve train function are maintained with this system.

The table in FIG. 20 summarizes the pressure states in high-lift and low-lift modes. Hydraulic separation of the DFHLA normal lash compensation function from the rocker arm assembly switching function is also shown. The engine starts in high-lift mode (latch extended and engaged), since this is the default mode.

3.3 Operating Parameters

An important factor in operating a DVVL system is the reliable control of switching from high-lift mode to low-lift mode. DVVL valve actuation systems can only be switched between modes during a predetermined window of time. As described above, switching from high lift mode to low lift mode and vice versa is initiated by a signal from the engine control unit (ECU) 825 (FIG. 18) using logic that analyzes stored information, for example a switching window for particular physical configuration, stored operating conditions, and processed data that is gathered by sensors. Switching window durations are determined by the DVVL system physical configuration, including the number of cylinders, the number of cylinders controlled by a single OCV, the valve lift duration, engine speed, and the latch response times inherent in the hydraulic control and mechanical system.

3.3.1 Gathered Data

Real-time sensor information includes input from any number of sensors, as illustrated in the exemplary DVVL system 800 illustrated in FIG. 6. Sensors may include 1) valve stem movement 829, as measured in one embodiment using the linear variable differential transformer (LVDT) described previously, 2) motion/position 828 and latch position 827 using a Hall-effect sensor or motion detector, 3) DFHLA movement 826 using a proximity switch, Hall effect sensor, or other means, 4) oil pressure 830, and 5) oil temperature 890. Cam shaft rotary position and speed may be gathered directly or inferred from the engine speed sensor.

In a hydraulically actuated VVA system, the oil temperature affects the stiffness of the hydraulic system used for switching in systems such as CDA and VVL. If the oil is too cold, its viscosity slows switching time, causing a malfunction. This relationship is illustrated for an exemplary DVVL switching rocker arm system, in FIGS. 21-22. An accurate oil temperature, taken with a sensor 890 shown in FIG. 6, located near the point of use rather than in the engine oil crankcase, provides the most accurate information. In one example, the oil temperature in a VVA system, monitored close to the oil control valves (OCV), must be greater than or equal to 20 degrees C. to initiate low-lift (unlatched) operation with the required hydraulic stiffness. Measurements can be taken with any number of commercially available components, for example a thermocouple. The oil control valves are described further in published US Patent Applications US2010/0089347 published Apr. 15, 2010 and US2010/0018482 published Jan. 28, 2010 both hereby incorporated by reference in their entirety.

Sensor information is sent to the Engine Control Unit (ECU) 825 as a real-time operating parameter (FIG. 18).

3.3.2 Stored Information 3.3.2.1 Switching Window Algorithms

Mechanical Switching Window:

The shape of each lobe of the three-lobed cam illustrated in FIG. 4 comprises a base circle portion 605, 607, 609, where no lift occurs, a transition portion that is used to take up mechanical clearances prior to a lift event, and a lift portion that moves the valve 112. For the exemplary DVVL switching rocker arm 100, installed in system 800 (FIG. 6), switching between high-lift and low-lift modes can only occur during base circle operation when there is no load on the latch that prevents it from moving. Further descriptions of this mechanism are provided in following sections. The no-lift portion 863 of base circle operation is shown graphically in FIG. 5. The DVVL system 800, switches within a single camshaft revolution at speeds up to 3500 engine rpm at oil temperatures of 20° C. and above. Switching outside of the timing window or prescribed oil conditions may result in a critical shift event, which is a shift in engine valve position during a point in the engine cycle when loading on the valve actuator switching component or on the engine valve is higher than the structure is designed to accommodate while switching. A critical shift event may result in damage to the valve train and/or other engine parts. The switching window can be further defined as the duration in cam shaft crank degrees needed to change the pressure in the control gallery and move the latch from the extended to retracted position and vice versa.

Figure 23:
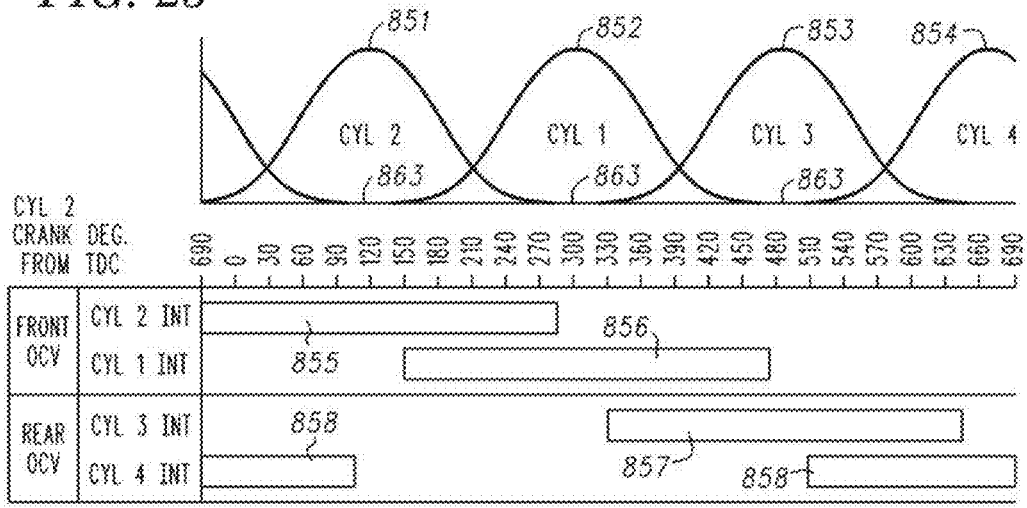
FIG. 23 is a timing diagram showing available switching windows for an exemplary DVVL switching rocker arm, in a 4-cylinder engine, with actuating oil pressure controlled by two OCV's each controlling two cylinders.

As previously described and shown in FIG. 7, the DVVL system has a single OCV assembly 820 that contains two independently controlled solenoid valves. The first valve controls the first upper gallery 802 pressure and determines the lift mode for cylinders one and two. The second valve controls the second upper gallery 803 pressure and determines the lift mode for cylinders three and four. FIG. 23 illustrates the intake valve timing (lift sequence) for this OCV assembly 820 (FIG. 3) configuration relative to crankshaft angle for an in-line four cylinder engine with a cylinder firing order of (2-1-3-4). The high-lift intake valve profiles for cylinder two 851, cylinder one 852, cylinder three 853, and cylinder four 854, are shown at the top of the illustration as lift plotted versus crank angle. Valve lift duration for the corresponding cylinders are plotted in the lower section as lift duration regions 855, 856, 857, and 858 lift versus crank angle. No lift base circle operating regions 863 for individual cylinders are also shown. A prescribed switching window must be determined to move the latch within one camshaft revolution, with the stipulation that each OCV is configured to control two cylinders at once.

Figure 24:
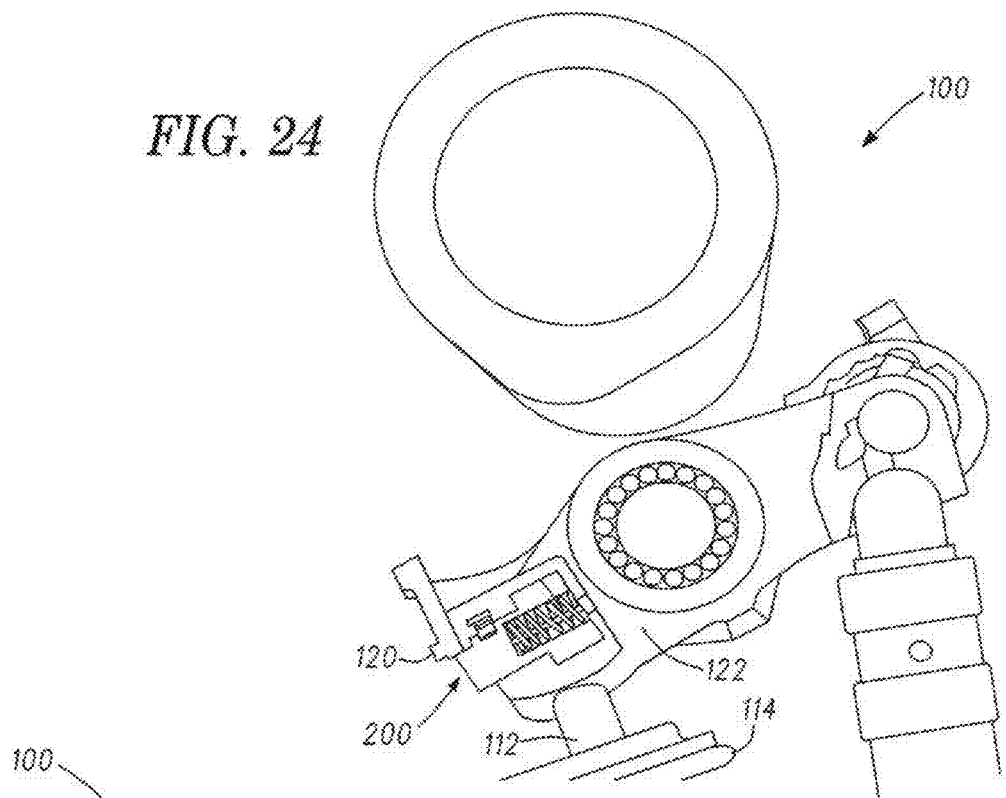
FIG. 24 is a side cutaway view of a DVVL switching rocker arm illustrating latch pre-loading prior to switching from high-lift to low-lift.

The mechanical switching window can be optimized by understanding and improving latch movement. Now, with reference to FIGS. 24-25, the mechanical configuration of the switching rocker arm assembly 100 provides two distinct conditions that allow the effective switching window to be increased. The first, called a high-lift latch restriction, occurs in high-lift mode when the latch 200 is locked in place by the load being applied to open the valve 112. The second, called a low-lift latch restriction, occurs in the unlatched low-lift mode when the outer arm 120 blocks the latch 200 from extending under the outer arm 120. These conditions are described as follows:

High-Lift Latch Restriction:

FIG. 24 shows high-lift event where the latch 200 is engaged with the outer arm 120. As the valve is opened against the force supplied by valve spring 114, the latch 200 transfers the force from the inner arm 122 to the outer arm 120. When the spring 114 force is transferred by the latch 200, the latch 200 becomes locked in its extended position. In this condition, hydraulic pressure applied by switching the OCV while attempting to switch from high-lift to low-lift mode is insufficient to overcome the force locking the latch 200, preventing it from being retracted. This condition extends the total switching window by allowing pressure application prior to the end of the high-lift event and the onset of base circle 863 (FIG. 23) operation that unloads the latch 200. When the force is released on the latch 200, a switching event can commence immediately.

Figure 25:
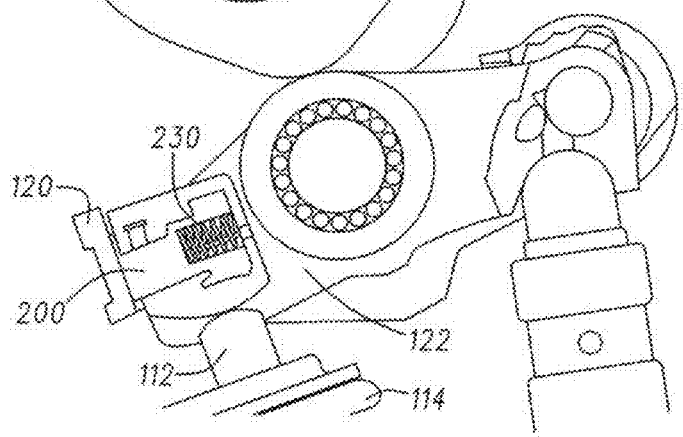
FIG. 25 is a side cutaway view of a DVVL switching rocker arm illustrating latch pre-loading prior to switching from low-lift to high-lift.

Low-Lift Latch Restriction:

FIG. 25 shows low lift operation where the latch 200 is retracted in low-lift mode. During the lift portion of the event, the outer arm 120 blocks the latch 200, preventing its extension, even if the OCV is switched, and hydraulic fluid pressure is lowered to return to the high-lift latched state. This condition extends the total switching window by allowing hydraulic pressure release prior to the end of the high-lift event and the onset of base circle 863 (FIG. 23). Once base circle is reached, the latch spring 230 can extend the latch 200. The total switching window is increased by allowing pressure relief prior to base circle. When the camshaft rotates to base circle, switching can commence immediately.

Figure 26:
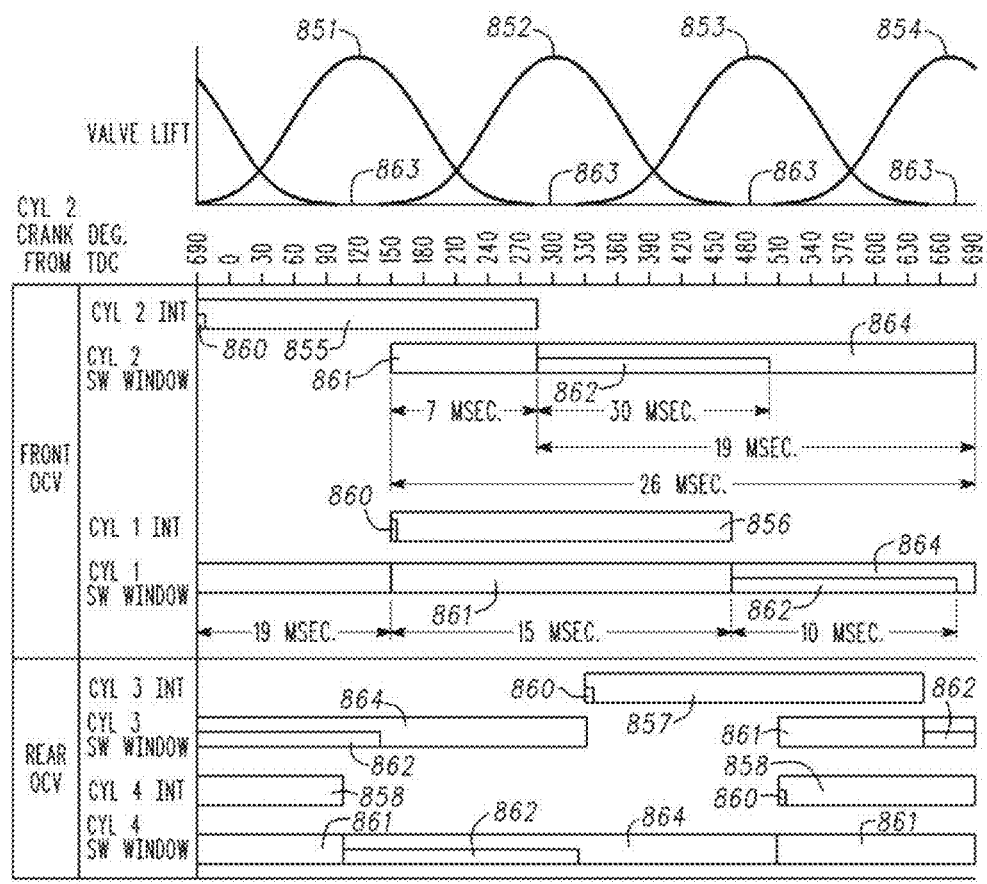
FIG. 26 is an expanded timing diagram showing available switching windows and constituent mechanical switching times for an exemplary DVVL switching rocker arm, in a 4-cylinder engine, with actuating oil pressure controlled by two OCV's each controlling two cylinders.

FIG. 26 illustrates the same information shown in FIG. 23, but is also overlaid with the time required to complete each step of the mechanical switching process during the transition between high-lift and low-lift states. These steps represent elements of mechanical switching that are inherent in the design of the switching rocker arm assembly. As described for FIG. 23, the firing order of the engine is shown at the top corresponding to the crank angle degrees referenced to cylinder two along with the intake valve profiles 851, 852, 853, 854. The latch 200 must be moved while the intake cam lobes are on base circle 863 (referred to as the mechanical switching window). Since each solenoid valve in an OCV assembly 820 controls two cylinders, the switching window must be timed to accommodate both cylinders while on their respective base circles. Cylinder two returns to base circle at 285 degrees crank angle. Latch movement must be complete by 690 crank angle degrees prior to the next lift event for cylinder two. Similarly, cylinder one returns to base circle at 465 degrees and must complete switching by 150 degrees. As can be seen, the switching window for cylinders one and two is slightly different. As can be seen, the first OCV electrical trigger starts switching prior to the cylinder one intake lift event and the second OCV electrical trigger starts prior to the cylinder four intake lift event.

A worst case analysis was performed to define the switching times in FIG. 26 at the maximum switching speed of 3500 rpm. Note that the engine may operate at much higher speeds of 7300 rpm; however, mode switching is not allowed above 3500 rpm. The total switching window for cylinder two is 26 milliseconds, and is broken into two parts: a 7 millisecond high-lift/low-lift latch restriction time 861, and a 19 millisecond mechanical switching time 864. A 10 millisecond mechanical response time 862 is consistent for all cylinders. The 15 millisecond latch restricted time 861 is longer for cylinder one because OCV switching is initiated while cylinder one is on an intake lift event, and the latch is restricted from moving.

Several mechanical and hydraulic constraints that must be accommodated to meet the total switching window. First, a critical shift 860, caused by switching that is not complete prior to the beginning of the next intake lift event must be avoided. Second, experimental data shows that the maximum switching time to move the latch at the lowest allowable engine oil temperature of 20° C. is 10 milliseconds. As noted in FIG. 26, there are 19 milliseconds available for mechanical switching 864 on the base circle. Because all test data shows that the switching mechanical response 862 will occur in the first 10 milliseconds, the full 19 milliseconds of mechanical switching time 864 is not required. The combination of mechanical and hydraulic constraints defines a worst-case switching time of 17 milliseconds that includes latch restricted time 861 plus latch mechanical response time 862.

The DVVL switching rocker arm system was designed with margin to accomplish switching with a 9 millisecond margin. Further, the 9 millisecond margin may allow mode switching at speeds above 3500 rpm. Cylinders three and four correspond to the same switching times as one and two with different phasing as shown in FIG. 26. Electrical switching time required to activate the solenoid valves in the OCV assembly is not accounted for in this analysis, although the ECU can easily be calibrated to consider this variable because the time from energizing the OCV until control gallery oil pressure begins to change remains predictable.

Figure 25A:
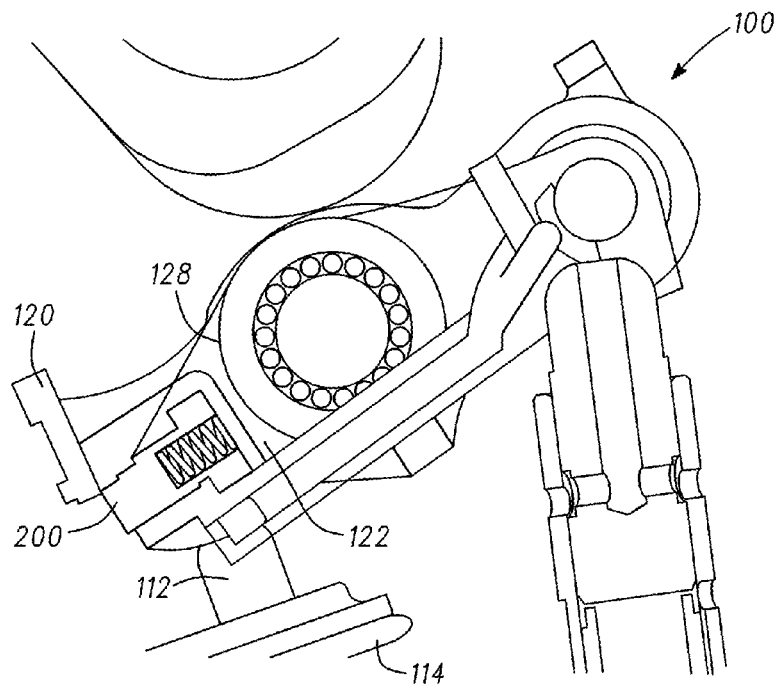
FIG. 25A is a side cutaway view of a DVVL switching rocker arm illustrating a critical shift event when switching between low-lift and high-lift.

Now, as to FIGS. 4 and 25A, a critical shift may occur if the timing of the cam shaft rotation and the latch 200 movement coincide to load the latch 200 on one edge, where it only partially engages on the outer arm 120. Once the high-lift event begins, the latch 200 can slip and disengage from the outer arm 120. When this occurs, the inner arm 122, accelerated by valve spring 114 forces, causes an impact between the roller bearing 128 and the low-lift cam lobe 108. A critical shift is not desired as it creates a momentary loss of control of the rocker arm assembly 100 and valve movement, and an impact to the system. The DVVL switching rocker arm was designed to meet a lifetime worth of critical shift occurrences.

3.3.2.2 Stored Operating Parameters

Operating parameters comprise stored information, used by the ECU 825 (FIG. 18) for switching logic control, based on data collected during extended testing as described in later sections. Several examples of known operating parameters may be described: In embodiments, 1) a minimum oil temperature of 20 degrees C. is required for switching from a high-lift state to a low-lift state, 2) a minimum oil pressure of greater than 2 Bar should be present in the engine sump for switching operations, 3) The latch response switching time varies with oil temperature according to data plotted in FIGS. 21-22, 4) as shown in FIG. 17 and previously described, predictable pressure variations caused by hydraulic switching operations occur in the upper galleries 802, 803 (FIG. 6) as determined by pressure sensors 890, 5) as shown in FIG. 5 and previously described, known valve movement versus crank angle (time), based on lift profiles 814, 816 can be predetermined and stored.

3.3 Control Logic

As noted above, DVVL switching can only occur during a small predetermined window of time under certain operating conditions, and switching the DVVL system outside of the timing window may result in a critical shift event, that could result in damage to the valve train and/or other engine parts. Because engine conditions such as oil pressure, temperature, emissions, and load may vary rapidly, a high-speed processor can be used to analyze real-time conditions, compare them to known operating parameters that characterize a working system, reconcile the results to determine when to switch, and send a switching signal. These operations can be performed hundreds or thousands of times per second. In embodiments, this computing function may be performed by a dedicated processor, or by an existing multi-purpose automotive control system referred to as the engine control unit (ECU). A typical ECU has an input section for analog and digital data, a processing section that includes a microprocessor, programmable memory, and random access memory, and an output section that might include relays, switches, and warning light actuation.

In one embodiment, the engine control unit (ECU) 825 shown in FIGS. 6 and 18 accepts input from multiple sensors such as valve stem movement 829, motion/position 828, latch position 827, DFHLA movement 826, oil pressure 830, and oil temperature 890. Data such as allowable operating temperature and pressure for given engine speeds (FIG. 20), and switching windows (FIG. 26 and described in other sections), is stored in memory. Real-time gathered information is then compared with stored information and analyzed to provide the logic for ECU 825 switching timing and control.

After input is analyzed, a control signal is output by the ECU 825 to the OCV 820 to initiate switching operation, which may be timed to avoid critical shift events while meeting engine performance goals such as improved fuel economy and lowered emissions. If necessary, the ECU 825 may also alert operators to error conditions.

4. DVVL Switching Rocker Arm Assembly 4.1 Assembly Description

A switching rocker arm, hydraulically actuated by pressurized fluid, for engaging a cam is disclosed. An outer arm and inner arm are configured to transfer motion to a valve of an internal combustion engine. A latching mechanism includes a latch, sleeve and orientation member. The sleeve engages the latch and a bore in the inner arm, and also provides an opening for an orientation member used in providing the correct orientation for the latch with respect to the sleeve and the inner arm. The sleeve, latch and inner arm have reference marks used to determine the optimal orientation for the latch.

Figure 27:
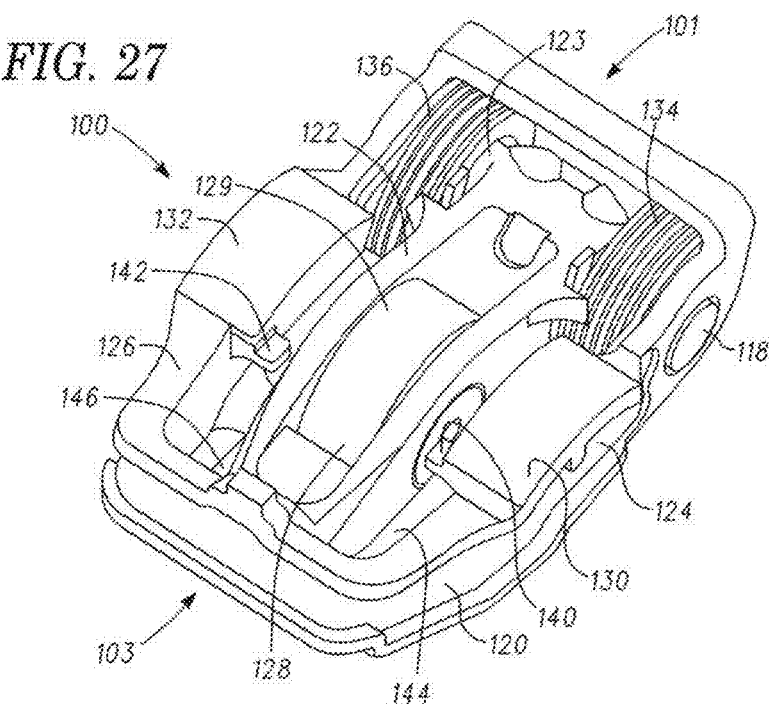
FIG. 27 illustrates a perspective view of an exemplary switching rocker arm.

An exemplary switching rocker arm 100 may be configured during operation with a three lobed cam 102 as illustrated in the perspective view of FIG. 4. Alternatively, a similar rocker arm embodiment could be configured to work with other cam designs such as a two lobed cam. The switching rocker arm 100 is configured with a mechanism to maintain hydraulic lash adjustment and a mechanism to feed hydraulic switching fluid to the inner arm 122. In embodiments, a dual feed hydraulic lash adjuster (DFHLA) 110 performs both functions. A valve 112, spring 114, and spring retainer 116 are also configured with the assembly. The cam 102 has a first and second high-lift lobe 104, 106 and a low lift lobe 108. The switching rocker arm has an outer arm 120 and an inner arm 122, as shown in FIG. 27. During operation, the high-lift lobes 104, 106 contact the outer arm 120 while the low lift-lobe contacts the inner arm 122. The lobes cause periodic downward movement of the outer arm 120 and inner arm 122. The downward motion is transferred to the valve 112 by inner arm 122, thereby opening the valve. Rocker arm 100 is switchable between a high-lift mode and low-lift mode. In the high-lift mode, the outer arm 120 is latched to the inner arm 122. During engine operation, the high-lift lobes periodically push the outer arm 120 downward. Because the outer arm 120 is latched to the inner arm 122, the high-lift motion is transferred from outer arm 120 to inner arm 122 and further to the valve 112. When the rocker arm 100 is in its low-lift mode, the outer arm 120 is not latched to the inner arm 122, and so high-lift movement exhibited by the outer arm 120 is not transferred to the inner arm 122. Instead, the low-lift lobe contacts the inner arm 122 and generates low lift motion that is transferred to the valve 112. When unlatched from inner arm 122, the outer arm 120 pivots about axle 118, but does not transfer motion to valve 112.

FIG. 27 illustrates a perspective view of an exemplary switching rocker arm 100. The switching rocker arm 100 is shown by way of example only and it will be appreciated that the configuration of the switching rocker arm 100 that is the subject of this disclosure is not limited to the configuration of the switching rocker arm 100 illustrated in the figures contained herein.

As shown in FIG. 27, the switching rocker arm 100 includes an outer arm 120 having a first outer side arm 124 and a second outer side arm 126. An inner arm 122 is disposed between the first outer side arm 124 and second outer side arm 126. The inner arm 122 and outer arm 120 are both mounted to a pivot axle 118, located adjacent the first end 101 of the rocker arm 100, which secures the inner arm 122 to the outer arm 120 while also allowing a rotational degree of freedom about the pivot axle 118 of the inner arm 122 with respect to the outer arm 120. In addition to the illustrated embodiment having a separate pivot axle 118 mounted to the outer arm 120 and inner arm 122, the pivot axle 118 may be part of the outer arm 120 or the inner arm 122.

The rocker arm 100 illustrated in FIG. 27 has a roller bearing 128 that is configured to engage a central low-lift lobe of a three-lobed cam. First and second slider pads 130, 132 of outer arm 120 are configured to engage the first and second high-lift lobes 104, 106 shown in FIG. 4. First and second torsion springs 134, 136 function to bias the outer arm 120 upwardly after being displaced by the high-lift lobes 104, 106. The rocker arm design provides spring over-torque features.

Figure 28:
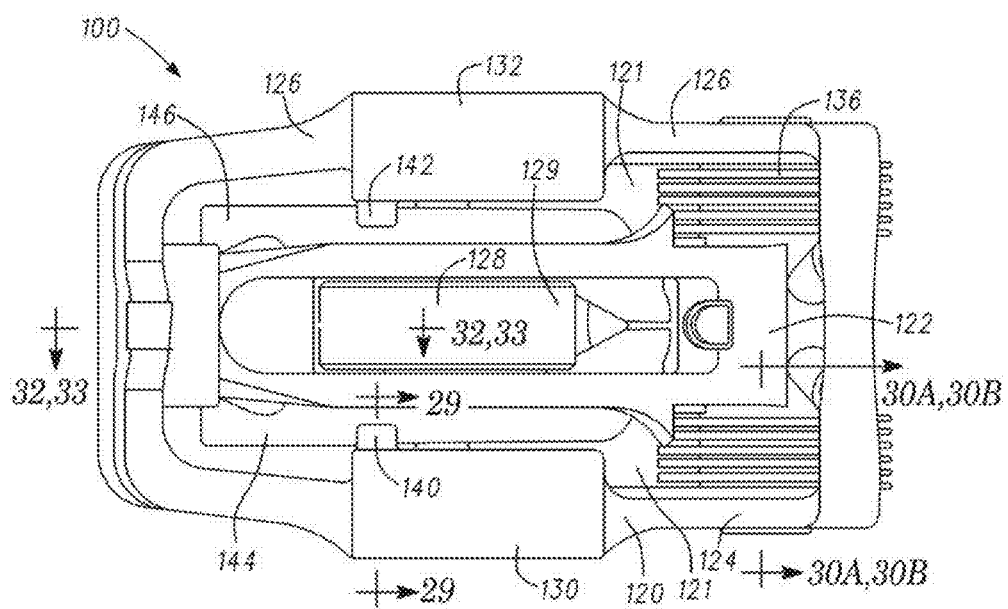
FIG. 28 illustrates a top-down view of exemplary switching rocker arm.
Figure 29:
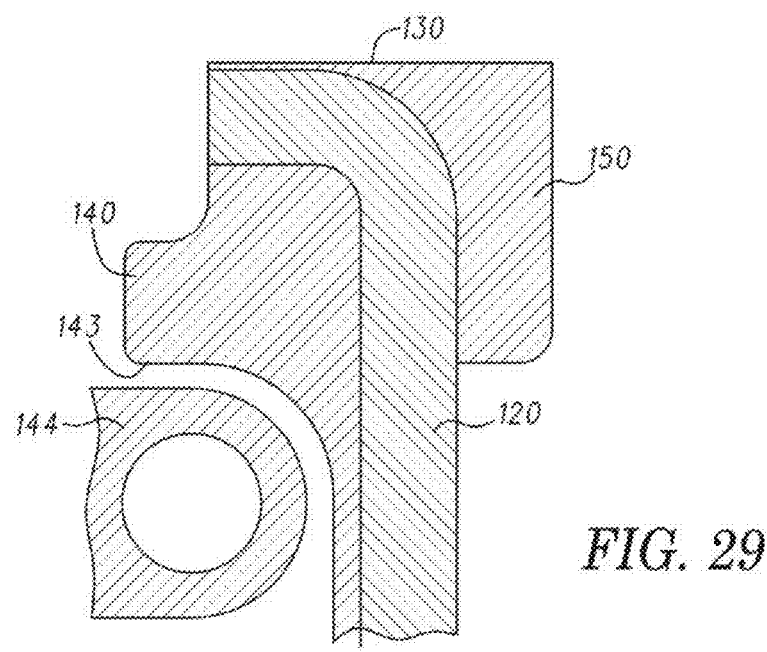
FIG. 29 illustrates a cross-section view taken along line 29-29 in FIG. 28.

First and second over-travel limiters 140, 142 of the outer arm prevent over-coiling of the torsion springs 134, 136 and limit excess stress on the springs 134, 136. The over-travel limiters 140, 142 contact the inner arm 122 on the first and second oil gallery 144, 146 when the outer arm 120 reaches its maximum rotation during low-lift mode. At this point, the interference between the over-travel limiters 140, 142 and the galleries 144, 146 stops any further downward rotation of the outer arm 120. FIG. 28 illustrates a top-down view of rocker arm 100. As shown in FIG. 28, over-travel limiters 140, 142 extend from outer arm 120 toward inner arm 122 to overlap with galleries 144, 146 of the inner arm 122, ensuring interference between limiters 140, 142 and galleries 144, 146. As shown in FIG. 29, representing a cross-section view taken along line 29-29, contacting surface 143 of limiter 140 is contoured to match the cross-sectional shape of gallery 144. This assists in applying even distribution of force when limiters 140, 142 make contact with galleries 144, 146.

When the outer arm 120 reaches its maximum rotation during low-lift mode as described above, a latch stop 90, shown in FIG. 15, prevents the latch from extending, and locking incorrectly. This feature can be configured as necessary, suitable to the shape of the outer arm 120.

FIG. 27 shows a perspective view from above of a rocker assembly 100 showing torsion springs 134, 136 according to one embodiment of the teachings of the present application. FIG. 28 is a plan view of the rocker assembly 100 of FIG. 27. This design shows the rocker arm assembly 100 with torsion springs 134, 136 each coiled around a retaining axle 118.

The switching rocker arm assembly 100 must be compact enough to fit in confined engine spaces without sacrificing performance or durability. Traditional torsion springs coiled from round wire sized to meet the torque requirements of the design, in some embodiments, are too wide to fit in the allowable spring space 121 between the outer arm 120 and the inner arm 122, as illustrated in FIG. 28.

4.2 Torsion Spring

A torsion spring 134, 136 design and manufacturing process is described that results in a compact design with a generally rectangular shaped wire made with selected materials of construction.

Now, with reference to FIGS. 15, 28, 30A, and 30B, the torsion springs 134, 136, are constructed from a wire 397 that is generally trapezoidal in shape. The trapezoidal shape is designed to allow wire 397 to deform into a generally rectangular shape as force is applied during the winding process. After torsion spring 134, 136 is wound, the shape of the resulting wires can be described as similar to a first wire 396 with a generally rectangular shape cross section. A section along line 8 in FIG. 28 shows two torsion spring 134, 136 embodiments, illustrated as multiple coils 398, 399 in cross section. In a preferred embodiment, wire 396 has a rectangular cross sectional shape, with two elongated sides, shown here as the vertical sides 402, 404 and a top 401 and bottom 403. The ratio of the average length of side 402 and side 404 to the average length of top 401 and bottom 403 of the coil can be any value less than 1. This ratio produces more stiffness along the coil axis of bending 400 than a spring coiled with round wire with a diameter equal to the average length of top 401 and bottom 403 of the coil 398. In an alternate embodiment, the cross section wire shape has a generally trapezoidal shape with a larger top 401 and a smaller bottom 403.

In this configuration, as the coils are wound, elongated side 402 of each coil rests against the elongated side 402 of the previous coil, thereby stabilizing the torsion springs 134, 136. The shape and arrangement holds all of the coils in an upright position, preventing them from passing over each other or angling when under pressure.

Figure 30A:
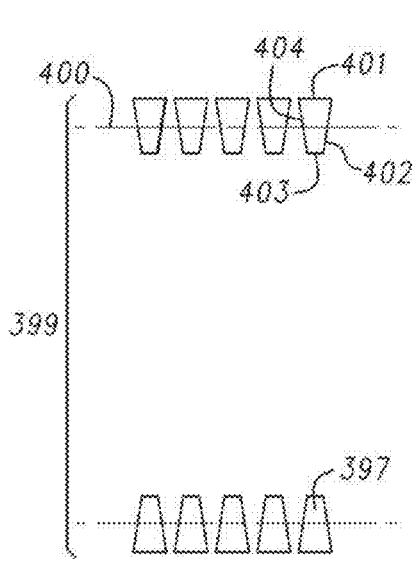
FIGS. 30A-30B illustrate a section view of an exemplary torsion spring.
Figure 30B:
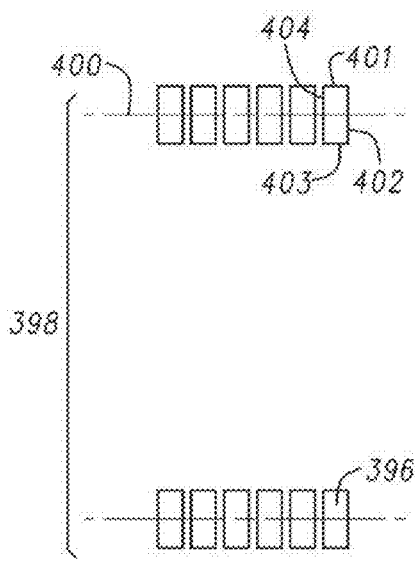

When the rocker arm assembly 100 is operating, the generally rectangular or trapezoidal shape of the torsion springs 134, 136, as they bend about axis 400 shown in FIGS. 30A, 30B, and FIG. 19, produces high part stress, particularly tensile stress on top surface 401.

To meet durability requirements, a combination of techniques and materials are used together. For example, the torsion springs 134, 136 may be made of a material that includes Chrome Vanadium alloy steel along with this design to improve strength and durability.

The torsion spring 134, 136 may be heated and quickly cooled to temper the springs. This reduces residual part stress.

Impacting the surface of the wire 396, 397 used for creating the torsion springs 134, 136 with projectiles, or 'shot peening' is used to put residual compressive stress in the surface of the wire 396, 397. The wire 396, 397 is then wound into the torsion springs 134, 136. Due to their shot peening, the resulting torsion springs 134, 136 can now accept more tensile stress than identical springs made without shot peening.

4.3 Torsion Spring Pocket

The switching rocker arm assembly 100 may be compact enough to fit in confined engine spaces with minimal impact to surrounding structures.

A switching rocker arm 100 provides a torsion spring pocket with retention features formed by adjacent assembly components is described.

Now with reference to FIGS. 27, 19, 28, and 31, the assembly of the outer arm 120 and the inner arm 122 forms the spring pocket 119 as shown in FIG. 31. The pocket includes integral retaining features 119 for the ends of torsion springs 134, 136 of FIG. 19.

Torsion springs 134, 136 can freely move along the axis of pivot axle 118. When fully assembled, the first and second tabs 405, 406 on inner arm 122 retain inner ends 409, 410 of torsion springs 134, 136, respectively. The first and second over-travel limiters 140, 142 on the outer arm 120 assemble to prevent rotation and retain outer ends 407, 408 of the first and second torsion springs 134, 136, respectively, without undue constraints or additional materials and parts.

4.4 Outer Arm

Figure 15A:
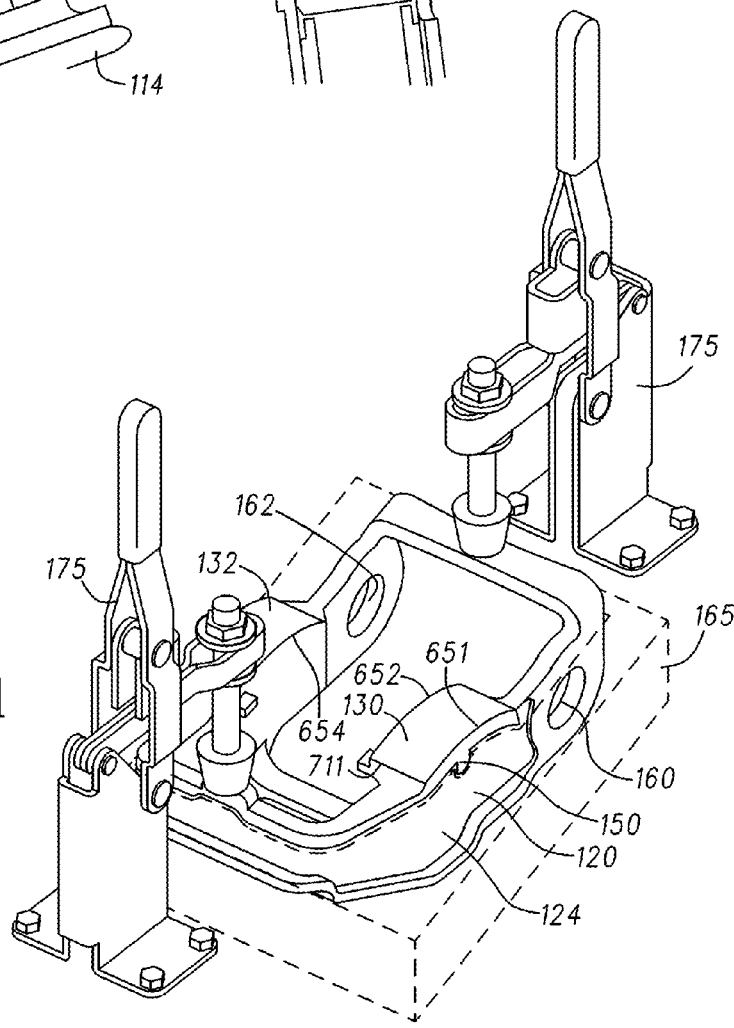

The design of outer arm 120 is optimized for the specific loading expected during operation, and its resistance to bending and torque applied by other means or from other directions may cause it to deflect out of specification. Examples of non-operational loads may be caused by handling or machining. A clamping feature or surface built into the part, designed to assist in the clamping and holding process while grinding the slider pads, a critical step needed to maintain parallelism between the slider pads as it holds the part stationary without distortion. FIGS. 15 and 15A illustrate perspective views of the rocker arm 100. A first clamping lobe 150 protrudes from underneath the first slider pad 130. A second clamping lobe (not shown) is similarly placed underneath the second slider pad 132. During the manufacturing process, clamping lobes 150 of outer arm 120 are engaged by a clamping fixture 165 engaging outer arm 120 with clamps 175 during grinding of the slider pads 130, 132. Forces are applied to the clamping lobes 150 by the clamping fixture that restrain the outer arm 120 in a position that resembles its assembled state as part of rocker arm assembly 100. Grinding of these surfaces requires that the pads 130, 132 remain parallel to one another and that the outer arm 120 not be distorted. Clamping at the clamping lobes 150 prevents distortion that may occur to the outer arm 120 under other clamping arrangements. For example, clamping at the clamping lobes 150, which are preferably integral to the outer arm 120, assists in eliminating any mechanical stress that may occur by clamping that squeezes outer side arms 124, 126 toward one another. In another example, the location of clamping lobe 150 immediately underneath slider pads 130, 132, results in substantially zero to minimal torque on the outer arm 120 caused by contact forces with the grinding machine. In certain applications, it may be necessary to apply pressure to other portions in outer arm 120 in order to minimize distortion.

4.5 DVVL Assembly Operation

FIG. 19 illustrates an exploded view of the switching rocker arm 100 of FIGS. 27 and 15. With reference to FIGS. 19 and 28, when assembled, roller bearing 128 is part of a needle roller-type assembly 129, which may have needles 180 mounted between the roller bearing 128 and roller axle 182. Roller axle 182 is mounted to the inner arm 122 via roller axle apertures 183, 184.

Roller assembly 129 serves to transfer the rotational motion of the low-lift cam 108 to the inner rocker arm 122, and in turn transfer motion to the valve 112 in the unlatched state. Pivot axle 118 is mounted to inner arm 122 through collar 123 and to outer arm 120 through pivot axle apertures 160, 162 at the first end 101 of rocker arm 100. Lost motion rotation of the outer arm 120 relative to the inner arm 122 in the unlatched state occurs about pivot axle 118. Lost motion movement in this context means movement of the outer arm 120 relative to the inner arm 122 in the unlatched state. This motion does not transmit the rotating motion of the first and second high-lift lobe 104, 106 of the cam 102 to the valve 112 in the unlatched state.

Other configurations other than the roller assembly 129 and pads 130, 132 also permit the transfer of motion from cam 102 to rocker arm 100. For example, a smooth non-rotating surface (not shown) such as pads 130, 132 may be placed on inner arm 122 to engage low-lift lobe 108, and roller assemblies may be mounted to rocker arm 100 to transfer motion from high-lift lobes 104, 106 to outer arm 120 of rocker arm 100.

Figure 12:
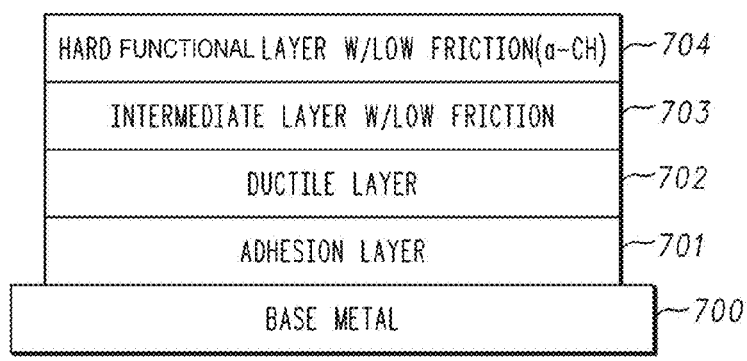
FIG. 12 illustrates diamond like carbon coating layers.

Now, with reference to FIGS. 4, 19, and 12, as noted above, the exemplary switching rocker arm 100 uses a three-lobed cam 102.

To make the design compact, with dynamic loading as close as possible to non-switching rocker arm designs, slider pads 130, 132 are used as the surfaces that contact the cam lobes 104, 106 during operation in high-lift mode. Slider pads produce more friction during operation than other designs such as roller bearings, and the friction between the first slider pad surface 130 and the first high-lift lobe surface 104, plus the friction between the second slider pad 132 and the second high-lift lobe 106, creates engine efficiency losses.

When the rocker arm assembly 100 is in high-lift mode, the full load of the valve opening event is applied slider pads 130, 132. When the rocker arm assembly 100 is in low-lift mode, the load of the valve opening event applied to slider pads 130, 132 is less, but present. Packaging constraints for the exemplary switching rocker arm 100, require that the width of each slider pad 130, 132 as described by slider pad edge length 710, 711 that come in contact with the cam lobes 104, 106 are narrower than most existing slider interface designs. This results in higher part loading and stresses than most existing slider pad interface designs. The friction results in excessive wear to cam lobes 104, 106, and slider pads 130, 132, and when combined with higher loading, may result in premature part failure. In the exemplary switching rocker arm assembly, a coating such as a diamond like carbon coating is used on the slider pads 130, 132 on the outer arm 120.

A diamond-like carbon coating (DLC) coating enables operation of the exemplary switching rocker arm 100 by reducing friction, and at the same providing necessary wear and loading characteristics for the slider pad surfaces 130, 132. As can be easily seen, benefits of DLC coating can be applied to any part surfaces in this assembly or other assemblies, for example the pivot axle surfaces 160, 162, on the outer arm 120 described in FIG. 19.

Although similar coating materials and processes exist, none are sufficient to meet the following DVVL rocker arm assembly requirements: 1) be of sufficient hardness, 2) have suitable loadbearing capacity, 3) be chemically stable in the operating environment, 4) be applied in a process where temperatures do not exceed the annealing temperature for the outer arm 120, 5) meet engine lifetime requirements, and 6) offer reduced friction as compared to a steel on steel interface. The DLC coating process described earlier meets the requirements set forth above, and is applied to slider pad surfaces 130, 132, which are ground to a final finish using a grinding wheel material and speed that is developed for DLC coating applications. The slider pad surfaces 130, 132 are also polished to a specific surface roughness, applied using one of several techniques, for example vapor honing or fine particle sand blasting.

4.5.1 Hydraulic Fluid System

The hydraulic latch for rocker arm assembly 100 must be built to fit into a compact space, meet switching response time requirements, and minimize oil pumping losses. Oil is conducted along fluid pathways at a controlled pressure, and applied to controlled volumes in a way that provides the necessary force and speed to activate latch pin switching. The hydraulic conduits require specific clearances and sizes so that the system has the correct hydraulic stiffness and resulting switching response time. The design of the hydraulic system must be coordinated with other elements that comprise the switching mechanism, for example the biasing spring 230.

In the switching rocker arm 100, oil is transmitted through a series of fluid-connected chambers and passages to the latch pin assembly 201, or any other hydraulically activated latch pin mechanism. As described above, the hydraulic transmission system begins at oil flow port 506 in the DFHLA 110, where oil or another hydraulic fluid at a controlled pressure is introduced. Pressure can be modulated with a switching device, for example, a solenoid valve. After leaving the ball plunger end 601, oil or other pressurized fluid is directed from this single location, through the first oil gallery 144 and the second oil gallery 146 of the inner arm discussed above, which have bores sized to minimize pressure drop as oil flows from the ball socket 502, shown in FIG. 10, to the latch pin assembly 201 in FIG. 19.

The latch pin assembly 201 for latching inner arm 122 to outer arm 120, which in the illustrated embodiment is found near second end 103 of rocker arm 100, is shown in FIG. 19 as including a latch pin 200 that is extended in high-lift mode, securing inner arm 122 to outer arm 120. In low-lift mode, latch 200 is retracted into inner arm 122, allowing lost motion movement of outer arm 120. Oil pressure is used to control latch pin 200 movement.

As illustrated in FIG. 32, one embodiment of a latch pin assembly shows that the oil galleries 144, 146 (shown in FIG. 19) are in fluid communication with the chamber 250 through oil opening 280.

The oil is provided to oil opening 280 and the latch pin assembly 201 at a range of pressures, depending on the required mode of operation.

Figure 33:
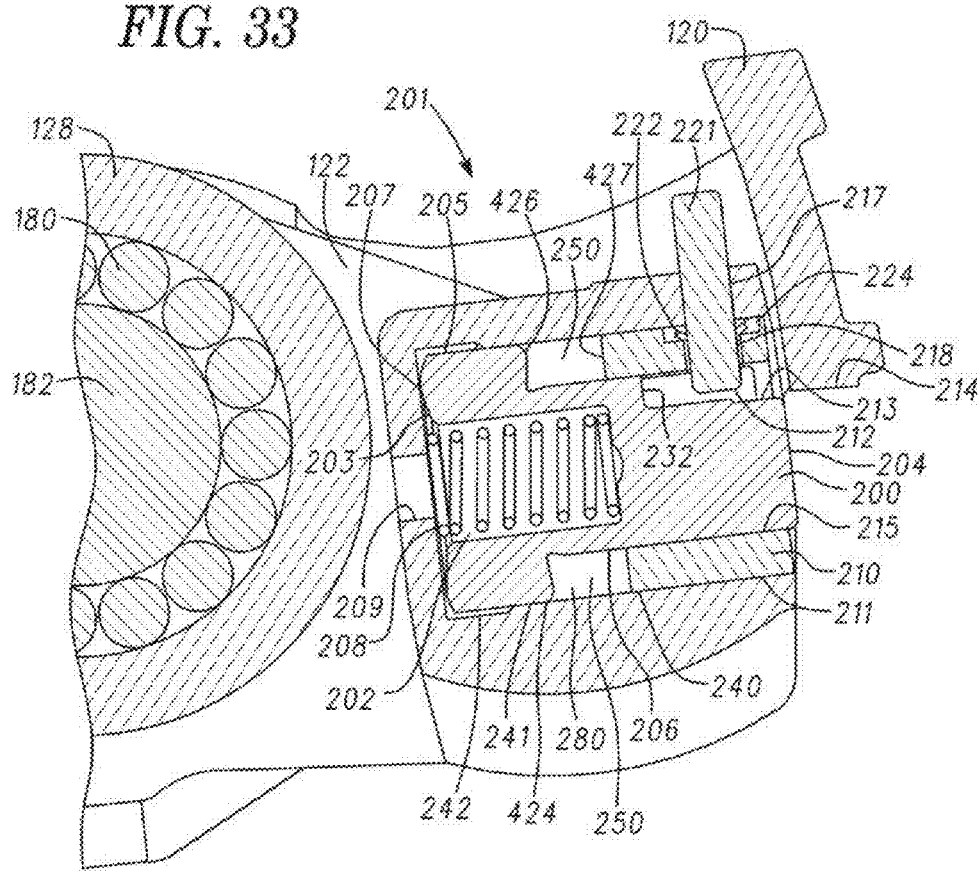
FIG. 33 illustrates a cross-sectional view of the latching mechanism in its unlatched state.

As can be seen in FIG. 33, upon introduction of pressurized oil into chamber 250, latch 200 retracts into bore 240, allowing outer arm 120 to undergo lost motion rotation with respect to inner arm 122. Oil can be transmitted between the first generally cylindrical surface 205 and surface 241, from first chamber 250 to second chamber 420 shown in FIG. 32.

Some of the oil exits back to the engine through hole 209, drilled into the inner arm 122. The remaining oil is pushed back through the hydraulic pathways as the biasing spring 230 expands when it returns to the latched high-lift state. It can be seen that a similar flow path can be employed for latch mechanisms that are biased for normally unlatched operation.

The latch pin assembly design manages latch pin response time through a combination of clearances, tolerances, hole sizes, chamber sizes, spring designs, and similar metrics that control the flow of oil. For example, the latch pin design may include features such as a dual diameter pin designed with an active hydraulic area to operate within tolerance in a given pressure range, an oil sealing land designed to limit oil pumping losses, or a chamfer oil in-feed.

Figure 34:
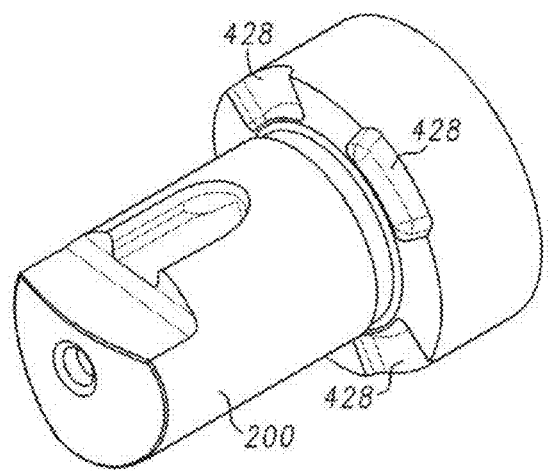
FIG. 34 illustrates an alternate latch pin design.

Now, with reference to FIGS. 32-34, latch 200 contains design features that provide multiple functions in a limited space:

1. Latch 200 employs the first generally cylindrical surface 205 and the second generally cylindrical surface 206. First generally cylindrical surface 205 has a diameter larger than that of the second generally cylindrical surface 206. When pin 200 and sleeve 210 are assembled together in bore 240, a chamber 250 is formed without employing any additional parts. As noted, this volume is in fluid communication with oil opening 280. Additionally, the area of pressurizing surface 422, combined with the transmitted oil pressure, can be controlled to provide the necessary force to move the pin 200, compress the biasing spring 230, and switch to low-lift mode (unlatched).

2. The space between the first generally cylindrical surface 205 and the adjacent bore wall 241 is intended to minimize the amount of oil that flows from chamber 250 into second chamber 420. The clearance between the first generally cylindrical surface 205 and surface 241 must be closely controlled to allow freedom of movement of pin 200 without oil leakage and associated oil pumping losses as oil is transmitted between first generally cylindrical surface 205 and surface 241, from chamber 250 to second chamber 420.

3. Package constraints require that the distance along the axis of movement of the pin 200 be minimized. In some operating conditions, the available oil sealing land 424 may not be sufficient to control the flow of oil that is transmitted between first generally cylindrical surface 205 and surface 241, from chamber 250 to the second chamber 420. An annular sealing surface is described. As latch 200 retracts, it encounters bore wall 208 with its rear surface 203. In one preferred embodiment, rear surface 203 of latch 200 has a flat annular or sealing surface 207 that lies generally perpendicular to first and second generally cylindrical bore wall 241, 242, and parallel to bore wall 208. The flat annular surface 207 forms a seal against bore wall 208, which reduces oil leakage from chamber 250 through the seal formed by first generally cylindrical surface 205 of latch 200 and first generally cylindrical bore wall 241. The area of sealing surface 207 is sized to minimize separation resistance caused by a thin film of oil between the sealing surface 207 and the bore wall 208 shown in FIG. 32, while maintaining a seal that prevents pressurized oil from flowing between the sealing surface 207 and the bore wall 208, and out hole 209.

4. In one latch pin 200 embodiment, an oil in-feed surface 426, for example a chamfer, provides an initial pressurizing surface area to allow faster initiation of switching, and overcome separation resistance caused by a thin film of oil between the pressurization surface 422 and the sleeve end 427. The size and angle of the chamfer allows ease of switching initiation, without unplanned initiation due to oil pressure variations encountered during normal operation. In a second latch pin 200 embodiment, a series of castellations 428, arranged radially as shown in FIG. 34, provide an initial pressurizing surface area, sized to allow faster initiation of switching, and overcome separation resistance caused by a thin film of oil between the pressurization surface 422 and the sleeve end 427.

An oil in-feed surface 426 can also reduce the pressure and oil pumping losses required for switching by lowering the requirement for the breakaway force between pressurization surface 422 and the sleeve end 427. These relationships can be shown as incremental improvements to switching response and pumping losses.

As oil flows throughout the previously-described switching rocker arm assembly 100 hydraulic system, the relationship between oil pressure and oil fluid pathway area and length largely defines the reaction time of the hydraulic system, which also directly affects switching response time. For example, if high pressure oil at high velocity enters a large volume, its velocity will suddenly slow, decreasing its hydraulic reaction time, or stiffness. A range of these relationships that are specific to the operation of switching rocker arm assembly 100 can be calculated. One relationship, for example, can be described as follows: oil at a pressure of 2 bar is supplied to chamber 250, where the oil pressure, divided by the pressurizing surface area, transmits a force that overcomes biasing spring 230 force, and initiates switching within 10 milliseconds from latched to unlatched operation.

A range of characteristic relationships that result in acceptable hydraulic stiffness and response time, with minimized oil pumping losses can be calculated from system design variables that can be defined as follows:

Oil gallery 144, 146 inside diameter and length from the ball socket 502 to hole 280.
Bore hole 280 diameter and length.
Area of pressurizing surface 422.
The volume of chamber 250 in all states of operation.
The volume of second chamber 420 in all states of operation.
Cross-sectional area created by the space between first generally cylindrical surface 205 and surface 241.
The length of oil sealing land 424.
The area of the flat annular surface 207.
The diameter of hole 209.
Oil pressure supplied by the DFHLA 110.
Stiffness of biasing spring 230.
The cross sectional area and length of flow channels 504, 508, 509.
The area and number of oil in-feed surfaces 426.
The number and cross sectional area of castellations 428.

Latch response times for the previously described hydraulic arrangement in switching rocker arm 100 can be described for a range of conditions, for example:

Oil temperatures: 10° C. to 120° C.
Oil type: 5 w-20 weight

This conditions result in a range of oil viscosities that affect the latch response time.

4.5.2 Latch Pin Mechanism

The latch pin mechanism 201 of rocker arm assembly 100 provides a means of mechanically switching from high-lift to low-lift and vice versa. A latch pin mechanism can be configured to be normally in an unlatched or latched state. Several preferred embodiments can be described.

In one embodiment, the latch pin assembly 201 for latching inner arm 122 to outer arm 120, which is found near second end 103 of rocker arm 100, is shown in FIG. 19 as comprising latch pin 200, sleeve 210, orientation pin 220, and latch spring 230. The latch pin assembly 201 is configured to be mounted inside inner arm 122 within bore 240. As explained below, in the assembled rocker arm 100, latch 200 is extended in high-lift mode, securing inner arm 122 to outer arm 120. In low-lift mode, latch 200 is retracted into inner arm 122, allowing lost motion movement of outer arm 120. Switched oil pressure, as described previously, is provided through the first and second oil gallery 144, 146 to control whether latch 200 is latched or unlatched. Plugs 170 are inserted into gallery holes 172 to form a pressure tight seal closing first and second oil gallery 144, 146 and allowing them to pass oil to latching mechanism 201.

FIG. 32 illustrates a cross-sectional view of the latching mechanism 201 in its latched state along the line 32, 33-32, 33 in FIG. 28. A latch 200 is disposed within bore 240. Latch 200 has a spring bore 202 in which biasing spring 230 is inserted. The latch 200 has a rear surface 203 and a front surface 204. Latch 200 also employs the first generally cylindrical surface 205 and a second generally cylindrical surface 206. First generally cylindrical surface 205 has a diameter larger than that of the second generally cylindrical surface 206. Spring bore 202 is generally concentric with surfaces 205, 206.

Sleeve 210 has a generally cylindrical outer surface 211 that interfaces a first generally cylindrical bore wall 241, and a generally cylindrical inner surface 215. Bore 240 has a first generally cylindrical bore wall 241, and a second generally cylindrical bore wall 242 having a larger diameter than first generally cylindrical bore wall 241. The generally cylindrical outer surface 211 of sleeve 210 and first generally cylindrical surface 205 of latch 200 engage first generally cylindrical bore wall 241 to form tight pressure seals. Further, the generally cylindrical inner surface 215 of sleeve 210 also forms a tight pressure seal with second generally cylindrical surface 206 of latch 200. During operation, these seals allow oil pressure to build in chamber 250, which encircles second generally cylindrical surface 206 of latch 200.

The default position of latch 200, shown in FIG. 32, is the latched position. Spring 230 biases latch 200 outwardly from bore 240 into the latched position. Oil pressure applied to chamber 250 retracts latch 200 and moves it into the unlatched position. Other configurations are also possible, such as where spring 230 biases latch 200 in the unlatched position, and application of oil pressure between bore wall 208 and rear surface 203 causes latch 200 to extend outwardly from the bore 240 to latch outer arm 120.

In the latched state, latch 200 engages a latch surface 214 of outer arm 120 with arm engaging surface 213. As shown in FIG. 32, outer arm 120 is impeded from moving downward and will transfer motion to inner arm 122 through latch 200. An orientation feature 212 takes the form of a channel into which orientation pin 221 extends from outside inner arm 122 through first pin opening 217 and then through second pin opening 218 in sleeve 210. The orientation pin 221 is generally solid and smooth. A retainer 222 secures pin 221 in place. The orientation pin 221 prevents excessive rotation of latch 200 within bore 240.

As previously described, and seen in FIG. 33, upon introduction of pressurized oil into chamber 250, latch 200 retracts into bore 240, allowing outer arm 120 to undergo lost motion rotation with respect to inner arm 122. The outer arm 120 is then no longer impeded by latch 200 from moving downward and exhibiting lost motion movement. Pressurized oil is introduced into chamber 250 through oil opening 280, which is in fluid communication with oil galleries 144, 146.

FIGS. 35A-35F illustrate several retention devices for orientation pin 221. In FIG. 35A, pin 221 is cylindrical with a uniform thickness. A push-on ring 910, as shown in FIG. 35C is located in recess 224 located in sleeve 210. Pin 221 is inserted into ring 910, causing teeth 912 to deform and secure pin 221 to ring 910. Pin 221 is then secured in place due to the ring 910 being enclosed within recess 224 by inner arm 122. In another embodiment, shown in FIG. 35B, pin 221 has a slot 902 in which teeth 912 of ring 910 press, securing ring 910 to pin 221. In another embodiment shown in FIG. 35D, pin 221 has a slot 904 in which an E-styled clip 914 of the kind shown in FIG. 35E, or a bowed E-styled clip 914 as shown in FIG. 35F may be inserted to secure pin 221 in place with respect to inner arm 122. In yet other embodiments, wire rings may be used in lieu of stamped rings. During assembly, the E-styled clip 914 is placed in recess 224, at which point the sleeve 210 is inserted into inner arm 122, then, the orientation pin 221 is inserted through the clip 910.

Figure 36:
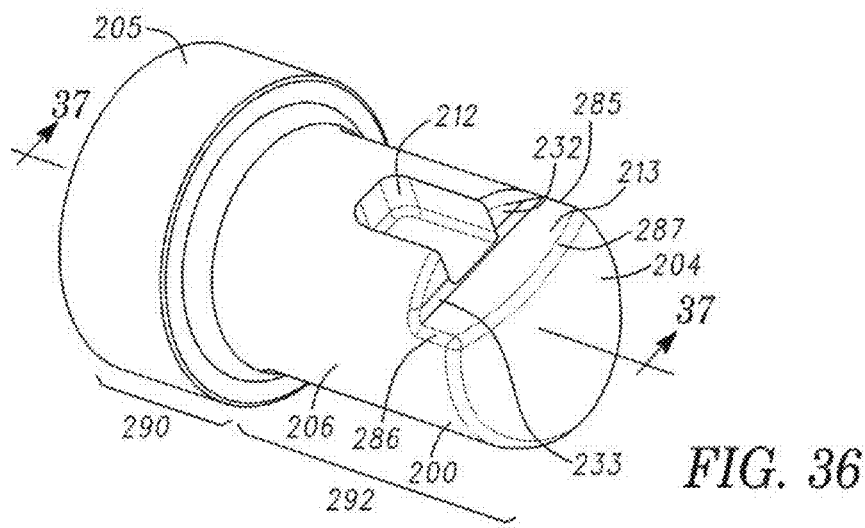
FIG. 36 illustrates an exemplary latch pin design.

An exemplary latch 200 is shown in FIG. 36. The latch 200 is generally divided into a head portion 290 and a body portion 292. The front surface 204 is a protruding convex curved surface. This surface shape extends toward outer arm 120 and results in an increased chance of proper engagement of arm engaging surface 213 of latch 200 with outer arm 120. Arm engaging surface 213 comprises a generally flat surface. Arm engaging surface 213 extends from a first boundary 285 with second generally cylindrical surface 206 to a second boundary 286 and from a boundary 287 with the front surface to a boundary 233 with surface 232. The portion of arm engaging surface 213 that extends furthest from surface 232 in the direction of the longitudinal axis A of latch 200 is located substantially equidistant between first boundary 285 and second boundary 286. Conversely, the portion of arm engaging surface 213 that extends the least from surface 232 in the axial direction A is located substantially at first and second boundaries 285, 286. Front surface 204 need not be a convex curved surface but instead can be a v-shaped surface, or some other shape. The arrangement permits greater rotation of the latch 200 within bore 240 while improving the likelihood of proper engagement of arm engaging surface 213 of latch 200 with outer arm 120.

Figure 37:
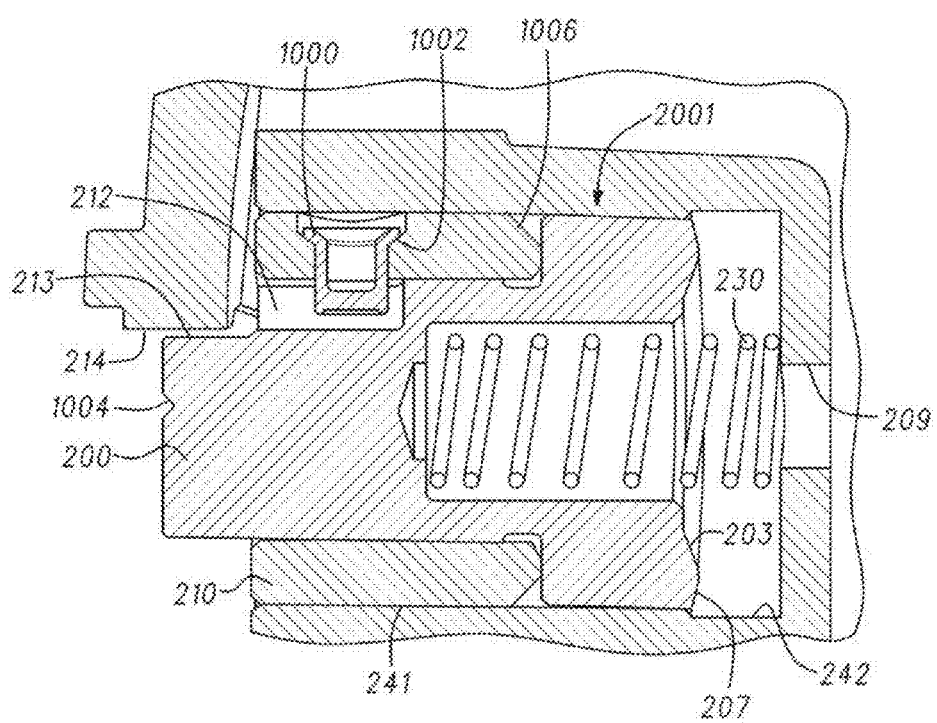
FIG. 37 illustrates an alternative latching mechanism.

An alternative latching mechanism 201 is shown in FIG. 37. An orientation plug 1000, in the form of a hollow cup-shaped plug, is press-fit into sleeve hole 1002 and orients latch 200 by extending into orientation feature 212, preventing latch 200 from rotating excessively with respect to sleeve 210. As discussed further below, an aligning slot 1004 assists in orienting the latch 200 within sleeve 210 and ultimately within inner arm 122 by providing a feature by which latch 200 may be rotated within the sleeve 210. The alignment slot 1004 may serve as a feature with which to rotate the latch 200, and also to measure its relative orientation.

With reference to FIGS. 38-40, an exemplary method of assembling a switching rocker arm 100 is as follows: the orientation plug 1000 is press-fit into sleeve hole 1002 and latch 200 is inserted into generally cylindrical inner surface 215 of sleeve 210.

The latch pin 200 is then rotated clockwise until orientation feature 212 reaches plug 1000, at which point interference between the orientation feature 212 and plug 1000 prevents further rotation. An angle measurement A1, as shown in FIG. 38, is then taken corresponding to the angle between arm engaging surface 213 and sleeve references 1010, 1012, which are aligned to be perpendicular to sleeve hole 1002. Aligning slot 1014 may also serve as a reference line for latch 200, and key slots 1014 may also serve as references located on sleeve 210. The latch pin 200 is then rotated counterclockwise until orientation feature 212 reaches plug 1000, preventing further rotation. As seen in FIG. 39, a second angle measurement A2 is taken corresponding to the angle between arm engaging surface 213 and sleeve references 1010, 1012. Rotating counterclockwise and then clockwise is also permissible in order to obtain A1 and A2. As shown in FIG. 40, upon insertion into the inner arm 122, the sleeve 210 and pin subassembly 1200 is rotated by an angle A as measured between inner arm references 1020 and sleeve references 1010, 1012, resulting in the arm engaging surface 213 being oriented horizontally with respect to inner arm 122, as indicated by inner arm references 1020. The amount of rotation A should be chosen to maximize the likelihood the latch 200 will engage outer arm 120. One such example is to rotate subassembly 1200 an angle half of the difference of A2 and A1 as measured from inner arm references 1020. Other amounts of adjustment A are possible within the scope of the present disclosure.

Figure 41:
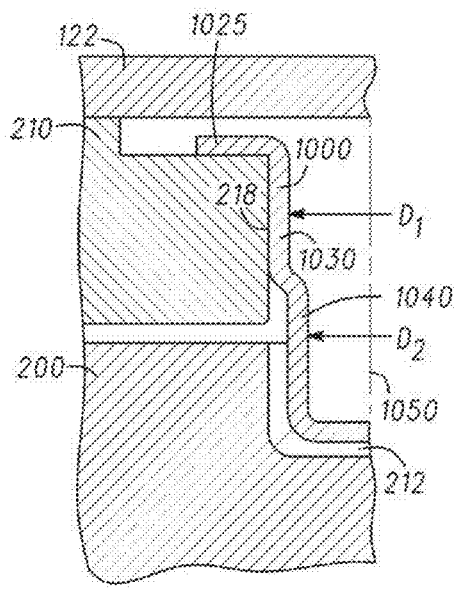
FIG. 41 illustrates an alternative embodiment of pin.
Figure 42:
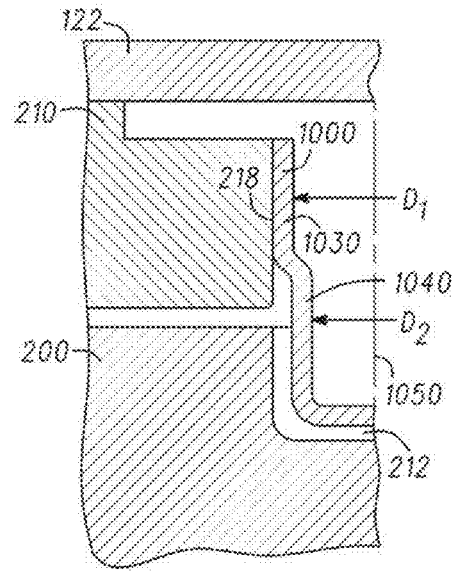
FIG. 42 illustrates an alternative embodiment of a pin.

A profile of an alternative embodiment of pin 1000 is shown in FIG. 41. Here, the pin 1000 is hollow, partially enclosing an inner volume 1050. The pin has a substantially cylindrical first wall 1030 and a substantially cylindrical second wall 1040. The substantially cylindrical first wall 1030 has a diameter D1 larger than diameter D2 of second wall 1040. In one embodiment shown in FIG. 41, a flange 1025 is used to limit movement of pin 1000 downwardly through pin opening 218 in sleeve 210. In a second embodiment shown in FIG. 42, a press-fit limits movement of pin 1000 downwardly through pin opening 218 in sleeve 210.

The latch embodiments described above utilize a flat mating surface to engage or disengage during switching operations, thus providing a predictable contact area with relatively low contact stress for the mating parts. As described above, this pin design requires additional parts and features to ensure proper orientation during operation, adding complexity and cost to the rocker arm manufacturing and assembly process.

Another latch embodiment incorporates a round or other non-flat latch pin that eliminates the need to provide pin orientation. In the past is was thought that in order to utilize a round or other non-flat rocker arm latch, the mating surface would require an expensive high-tolerance 'ground-in' curved mating surface, or latch seat, with a radius very closely matching the latch pin radius. A seat that is slightly too small may cause sticking, a delayed release, and possibly cause impact with the corners of the latch seat. A latch seat that is too large allows too much lateral motion. As described below, a round or other non-flat latch embodiment that does not require grinding can be produced using a coining process.

In the example shown, for a truly round latch with no flat latch shelf, the need to orient the latch in the rocker arm that it resides in is eliminated. By eliminating the need to orient the latch, assembly parts and risk may be eliminated.

This process will also likely reduce or eliminate the need to categorize latch, inner arm, and outer arm dimensions required to meet lash requirements for a given rocker arm assembly. This is accomplished by being able to adjust the latch lash at the end of the assembly processes.

A method for manufacturing a rocker arm assembly that utilizes a round or non-flat latch embodiment is described later. As noted, this process modifies this mating surface by way of a coining process.

The present invention employs a non-flat latch, such as a latch with a round cross section that interfaces with a latch seat that has been modified from a flat section. The present invention includes a design that can achieve a curved mating surface that matches what the latch requirements are, and does not require a grinding process. The process modifies this mating surface by way of a coining process. By using a truly round latch with no flat latch shelf we eliminate the need to orient the latch in the rocker arm that it resides in. By eliminating the need to orient the latch you eliminate parts from the assembly and risk from the assembly.

This process will likely reduce or eliminate categories of latches and the need to categorize the inner and outer arm. This is accomplished by being able to adjust the latch lash at the end of the assembly processes.

The description here explains a VVL rocker arm assembly that has a normally unlatched latch position. This process also can be used for a CDA rocker arm assembly, and other switching rocker arm assemblies. The rocker assembly is partially assembled with a roller bearing installed. The latch hasn't been installed at this point.

The second end 103 of the outer arm 120 has been investment cast and the latch seat 214 has been coined flat as shown in FIGS. 134 and 135.

Next, the outer arm will be 3-point located on a fixture so that it is supported under the arm directly below the pivot holes on both sides of the arm. It will then be located with a swivel locator directly in the middle of the latch mating surface, giving a 3-point location. It will then be clamped directly above these points with swivel foot clamps so as not to distort the part.

Now the pivot hole will be machined. Next this outer arm will be heat treated. Now the pivot hole will be honed.

After that, the pivot holes are honed. The part is mounted on a fixture with a pin passing through the pivot holes of the outer arm 120 and the datum hole on the fixture. The outer arm 120 will also rest on a swivel foot post that is directly below the coined latch pad surface, again giving 3 point location and eliminating part distortion. While on this fixture the stop bar will be machined to the proper height and parallel to the pivot hole axis. Now the outer arm will be located on the pivot holes and the stop bar to do the final grind on the slider pads. Both arms will now be assembled. Springs are installed on the inner arm spring posts then the two arms are assembled and pivot pin is installed.

Figure 44:
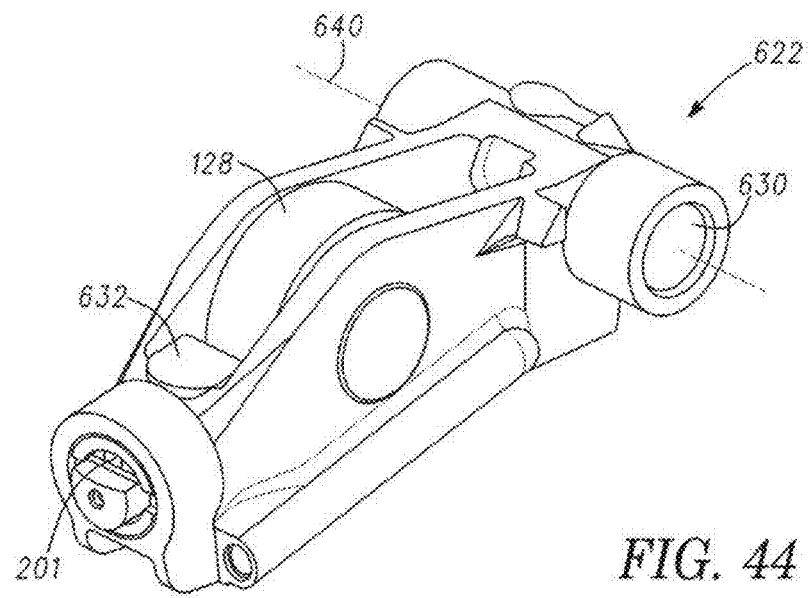
FIG. 44 illustrates a perspective view of an exemplary inner arm of a switching rocker arm.
Figure 45:
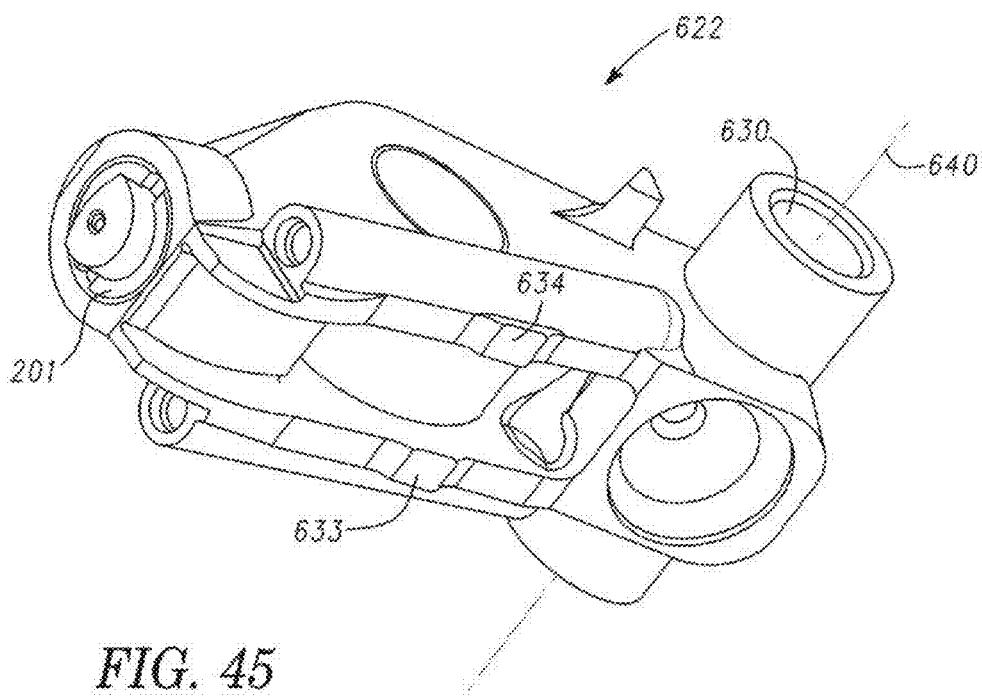
FIG. 45 illustrates a perspective view from below of the inner arm of a switching rocker arm.
Figure 46:
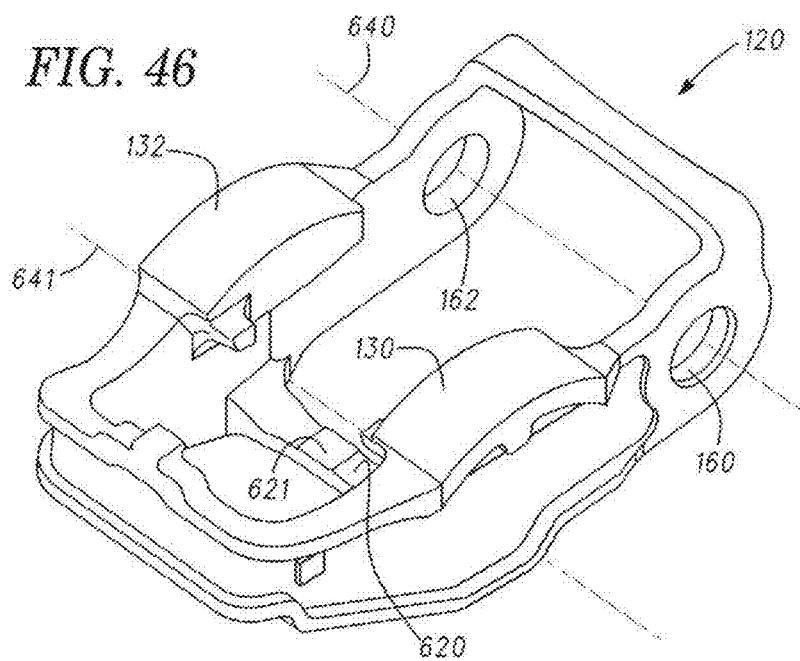
FIG. 46 illustrates a perspective view of an exemplary outer arm of a switching rocker arm.

FIG. 134 shows a partially assembled switching rocker arm assembly 100 as viewed from its second end 103. This view shows the bottom side upward, such that the lower cross arm 439 is visible. The inner arm assembly 622 (also shown in FIGS. 44 and 45) is hanging downward. This shows a latch bore 240 (that is also shown in FIGS. 19, 33).

This end 103 of the outer arm 120 also shows the latch stop 90. (FIG. 15 shows another view of the latch stop 15.) As indicated above, prior art methods of machining the latch seat were done only on the outer arm 120 and were measured independent of the other parts, and not as an assembly. Since the outer arm 120 was machined by itself, the connections to other parts were not taken into account during measurements. In the current method and device, the assembled, or partially assembled switching rocker arm assembly 100 is processed and measured interactively. Therefore, the lash contributed by the assembly is measured instead of the lash originating from a single part. FIG. 135 is a perspective view showing the switching rocker arm assembly with a latch rod 199 inserted into, and extending from latch bore 240. The latch rod 199 is intended to be made of a material that is harder than the material of the latch seat 214. The switching rocker arm assembly 100 is in the latched position in which the latch pin (here, the latch rod 199) is extended and rests upon the latch seat 214.

FIG. 136 shows a manufacturing fixture 310 directed toward completing manufacture of the switching rocker arm assembly 100. Specifically, it will be used in holding the switching rocker arm assembly 100 when creating precise impressions or indentations in the latch seat 214 of FIGS. 134, 135.

The switching rocker arm assembly 100 is now placed on the fixture shown in FIG. 136 that has a post to simulate a ball plunger and a post to simulate a valve tip. The manufacturing fixture 310 as shown in this embodiment is a three-point mount. It has a support shelf 311 sized and shaped to support a latch pin or similarly shaped structure when a switching rocker arm assembly is mounted on the manufacturing fixture 310. There is a valve stem post 315 for supporting a first end (101 of FIG. 15) of the switching rocker arm assembly and a valve stem post 313 for supporting a second end (103 OF FIG. 15) of the switching rocker arm assembly.

The inner arm will rest on the ball plunger post 315 and be guided from side to side by the valve tip post. The latch rod 199, sized to have a tight slip fit into the latch bore 240, is then slid into the latch bore of the inner arm 122. The latch rod 199 will extend out of the inner arm 122 (for example, by approximately 10 mm). The latch rod 199 will then rest on a flat carbide support shelf 311 on the manufacturing fixture 310. At this point the rocker arm assembly 100 is being supported by the ball plunger post 315 and the latch rod 199 sitting on the support shelf 311 as shown in FIG. 137.

The rocker arm assembly 100 is being controlled from side to side by the ball plunger post 315 and the valve tip post 313. Now a load is applied by a press 317 to the outer arm 120 directly above the latch surface and on top of the outer arm 120. (The press may be a hydraulic, screw, or any other form of controlled power press.) This load will be increased until the correct latch lash is achieved. The latch seat 214 of the outer arm 120 now has a perfectly coined indention in the surface that directly matches the latch pin (200 of FIGS. 8, 9).

FIG. 138 is a disassembled view of the outer arm 120 after the process showing the latch seat 214. By creating this indention the latch pin (200 of FIGS. 8, 9) no longer has point contact and the latch seat 214 will have a contact stress level that is low enough to operate without failure. Since the latch seat is formed with the nearly fully assembled switching rocker arm assembly 100, it should be noted that the switching rocker arm assembly 100 only need to have the latch pin inserted to complete the assembly process after the process of forming the impression in the latch seat 214. The disassembled view of the outer arm 120 in FIG. 138 was provided only to show the impression made in the latch seat 214.

Below is an example of steps to implement the process.
1. Mill the mating surface into a flat latch seat 214.
2. Apply loads through the outer arm 120 onto a latch rod 199 (which is preferably a carbide pin) that simulates a latch pin that is located in the latch bore 240 of the inner rocker arm 122 to coin, indent or form an impression in the latch seat 214. (The carbide pin/rod could also be of any material found to suitable for the coining/indenting process.)
3. This will require a manufacturing fixture 310 to hold the assembly in a press.
4. Increase loads until a desired deformation or chord depth is achieved in the latch seat 214 for a desired lash.
5. Measure traces across the outer arm 120 at each incremental load increase and record and place trace data.
6. The traces should be taken at the inner most edge and the mid pad areas for each load.

7. The inner arm 122 is reassembled with a standard round latch assembly 200.
8. The cam lash and total lash are measured to verify that the assembly meets specifications.

4.6 DVVL Assembly Lash Management

A method of managing three or more lash values, or design clearances, in the DVVL switching rocker arm assembly 100 shown in FIG. 4, is described. Methods may include a range of manufacturing tolerances, wear allowances, and design profiles for cam lobe/rocker arm contact surfaces.

DVVL Assembly Lash Description

An exemplary rocker arm assembly 100 shown in FIG. 4, has one or more lash values that must be maintained in one or more locations in the assembly. The three-lobed cam 102, illustrated in FIG. 4, is comprised of three cam lobes, a first high lift lobe 104, a second high lift lobe 106, and a low lift lobe 108. Cam lobes 104, 106, and 108, are comprised of profiles that respectively include a base circle 605, 607, 609, described as generally circular and concentric with the cam shaft.

Figure 43:
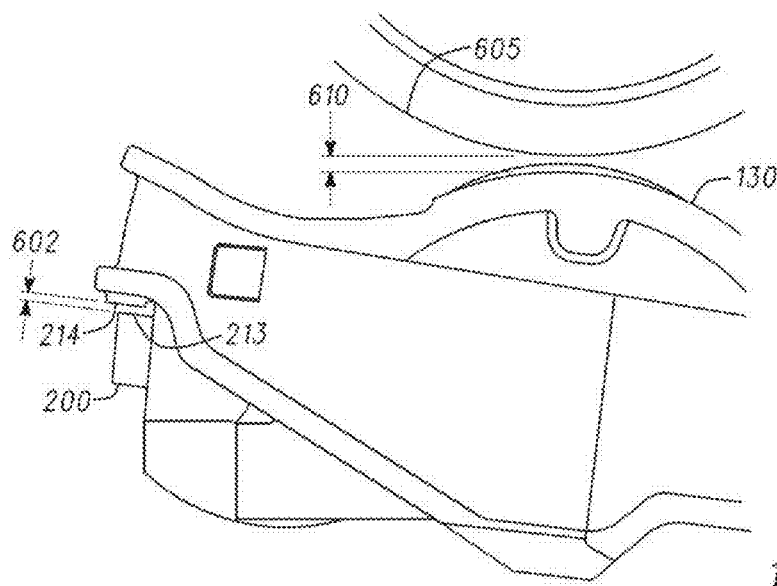
FIG. 43 illustrates the various lash measurements of a switching rocker arm.
Figure 49:
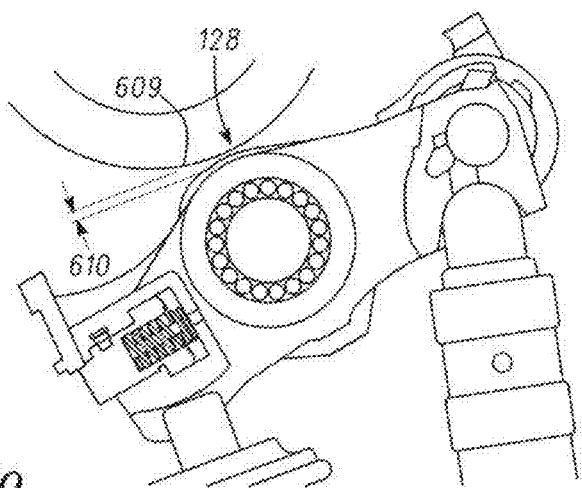
FIG. 49 illustrates a side cut-away view of an exemplary switching rocker arm assembly.

The switching rocker arm assembly 100 shown in FIG. 4 was designed to have small clearances (lash) in two locations. The first location, illustrated in FIG. 43, is latch lash 602, the distance between latch pad surface 214 and the arm engaging surface 213. Latch lash 602 ensures that the latch 200 is not loaded and can move freely when switching between high-lift and low-lift modes. As shown in FIGS. 4, 27, 43, and 49, a second example of lash, the distance between the first slider pad 130 and the first high lift cam lobe base circle 605, is illustrated as camshaft lash 610. Camshaft lash 610 eliminates contact, and by extension, friction losses, between slider pads 130, 132, and their respective high lift cam lobe base circles 605, 607 when the roller bearing 128, shown in FIG. 49, is contacting the low-lift cam base circle 609 during low-lift operation.

Figure 47:
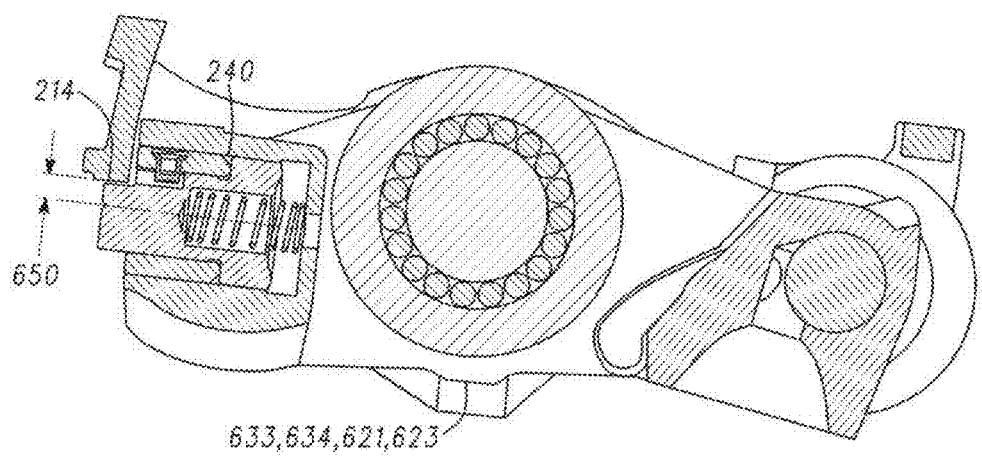
FIG. 47 illustrates a sectional view of a latch assembly of an exemplary switching rocker arm.

During low-lift mode, camshaft lash 610 also prevents the torsion spring 134, 136 force from being transferred to the DFHLA 110 during base circle 609 operation. This allows the DFHLA 110 to operate like a standard rocker arm assembly with normal hydraulic lash compensation where the lash compensation portion of the DFHLA is supplied directly from an engine oil pressure gallery. As shown in FIG. 47, this action is facilitated by the rotational stop 621, 623 within the switching rocker arm assembly 100 that prevents the outer arm 120 from rotating sufficiently far due to the torsion spring 134, 136 force to contact the high lift lobes 104, 106.

Figure 48:
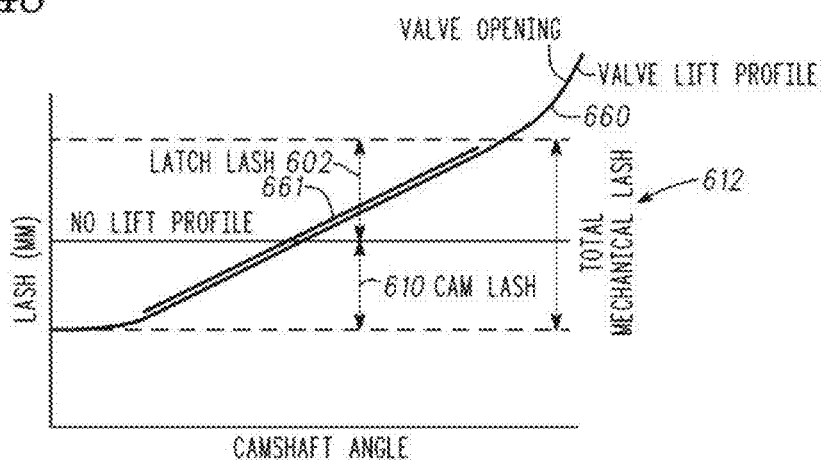
FIG. 48 is a graph of lash vs. camshaft angle for a switching rocker arm.

As illustrated in FIGS. 43 and 48, total mechanical lash is the sum of camshaft lash 610 and latch lash 602. The sum affects valve motion. The high lift camshaft profiles include opening and closing ramps 661 to compensate for total mechanical lash 612. Minimal variation in total mechanical lash 612 is important to maintain performance targets throughout the life of the engine. To keep lash within the specified range, the total mechanical lash 612 tolerance is closely controlled in production. Because component wear correlates to a change in total mechanical lash, low levels of component wear are allowed throughout the life of the mechanism. Extensive durability shows that allocated wear allowance and total mechanical lash remain within the specified limits through end of life testing.

Referring to the graph shown in FIG. 48, lash in millimeters is on the vertical axis, and camshaft angle in degrees is arranged on the horizontal axis. The linear portion 661 of the valve lift profile 660 shows a constant change of distance in millimeters for a given change in camshaft angle, and represents a region where closing velocity between contact surfaces is constant. For example, during the linear portion 661 of the valve lift profile curve 660, when the rocker arm assembly 100 (FIG. 4) switches from low-lift mode to high-lift mode, the closing distance between the first slider pad 130, and the first high-lift lobe 104 (FIG. 43), represents a constant velocity. Utilizing the constant velocity region reduces impact loading due to acceleration.

As noted in FIG. 48, no valve lift occurs during the constant velocity no lift portion 661 of the valve lift profile curve 660. If total lash is reduced or closely controlled through improved system design, manufacturing, or assembly processes, the amount of time required for the linear velocity portion of the valve lift profile is reduced, providing engine management benefits, for example allowing earlier valve lift opening or consistent valve operation engine to engine.

Now, as to FIGS. 43, 47, and 48, design and assembly variations for individual parts and sub-assemblies can produce a matrix of lash values that meet switch timing specifications and reduce the required constant velocity switching region described previously. For example, one latch pin 200 self-aligning embodiment may include a feature that requires a minimum latch lash 602 of 10 microns to function. An improved modified latch 200, configured without a self-aligning feature may be designed that requires a latch lash 602 of 5 microns. This design change decreases the total lash by 5 microns, and decreases the required no lift 661 portion of the valve lift profile 660.

Latch lash 602, and camshaft lash 610 shown in FIG. 43, can be described in a similar manner for any design variation of switching rocker arm assembly 100 of FIG. 4 that uses other methods of contact with the three-lobed cam 102. In one embodiment, a sliding pad similar to 130 is used instead of roller bearing 128 (FIGS. 15 and 27). In a second embodiment, rollers similar to 128 are used in place of slider pad 130 and slider pad 132. There are also other embodiments that have combinations of rollers and sliders.

Lash Management, Testing

As described in following sections, the design and manufacturing methods used to manage lash were tested and verified for a range of expected operating conditions to simulate both normal operation and conditions representing higher stress conditions.

Durability of the DVVL switching rocker arm is assessed by demonstrating continued performance (i.e., valves opening and closing properly) combined with wear measurements. Wear is assessed by quantifying loss of material on the DVVL switching rocker arm, specifically the DLC coating, along with the relative amounts of mechanical lash in the system. As noted above, latch lash 602 (FIG. 43) is necessary to allow movement of the latch pin between the inner and outer arm to enable both high and low lift operation when commanded by the engine electronic control unit (ECU). An increase in lash for any reason on the DVVL switching rocker arm reduces the available no-lift ramp 661 (FIG. 48), resulting in high accelerations of the valve-train. The specification for wear with regards to mechanical lash is set to allow limit build parts to maintain desirable dynamic performance at end of life.

For example, as shown in FIG. 43, wear between contacting surfaces in the rocker arm assembly will change latch lash 602, cam shaft lash 610, and the resulting total lash. Wear that affects these respective values can be described as follows: 1) wear at the interface between the roller bearing 128 (FIG. 15) and the cam lobe 108 (FIG. 4) reduces total lash, 2) wear at the sliding interface between slider pads 130, 132 (FIG. 15) and cam lobes 104, 106 (FIG. 4) increases total lash, and 3) wear between the latch 200 and the latch pad surface 214 increases total lash. Since bearing interface wear decreases total lash and latch and slider interface wear increase total lash, overall wear may result in minimal net total lash change over the life of the rocker arm assembly.

4.7 DVVL Assembly Dynamics

The weight distribution, stiffness, and inertia for traditional rocker arms have been optimized for a specified range of operating speeds and reaction forces that are related to dynamic stability, valve tip loading and valve spring compression during operation. An exemplary switching rocker arm 100, illustrated in FIG. 4 has the same design requirements as the traditional rocker arm, with additional constraints imposed by the added mass and the switching functions of the assembly. Other factors must be considered as well, including shock loading due to mode-switching errors and subassembly functional requirements. Designs that reduce mass and inertia, but do not effectively address the distribution of material needed to maintain structural stiffness and resist stress in key areas can result in parts that deflect out of specification or become overstressed, both of which are conditions that may lead to poor switching performance and premature part failure. The DVVL rocker arm assembly 100, shown in FIG. 4, must be dynamically stable to 3500 rpm in low lift mode and 7300 rpm in high lift mode to meet performance requirements.

Figure 50:
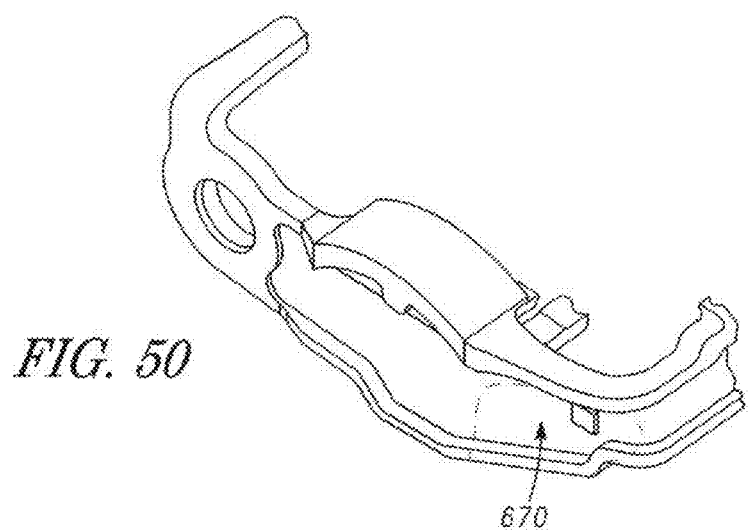
FIG. 50 illustrates a perspective view of the outer arm with an identified region of maximum deflection when under load conditions.

As to FIGS. 4, 15, 19, and 27, DVVL rocker arm assembly 100 stiffness is evaluated in both low lift and high lift modes. In low lift mode, the inner arm 122 transmits force to open the valve 112. The engine packaging volume allowance and the functional parameters of the inner arm 122 do not require a highly optimized structure, as the inner arm stiffness is greater than that of a fixed rocker arm for the same application. In high lift mode, the outer arm 120 works in conjunction with the inner arm 122 to transmit force to open the valve 112. Finite Element Analysis (FEA) techniques show that the outer arm 120 is the most compliant member, as illustrated in FIG. 50 in an exemplary plot showing a maximum area of vertical deflection 670. Mass distribution and stiffness optimization for this part is focused on increasing the vertical section height of the outer arm 120 between the slider pads 130, 132 and the latch 200. Design limits on the upper profile of the outer arm 120 are based on clearance between the outer arm 120 and the swept profile of the high lift lobes 104, 106. Design limits on the lower profile of the outer arm 120 are based on clearance to the valve spring retainer 116 in low lift mode. Optimizing material distribution within the described design constraints decreases the vertical deflection and increased stiffness, in one example, more than 33 percent over initial designs.

Figure 52:
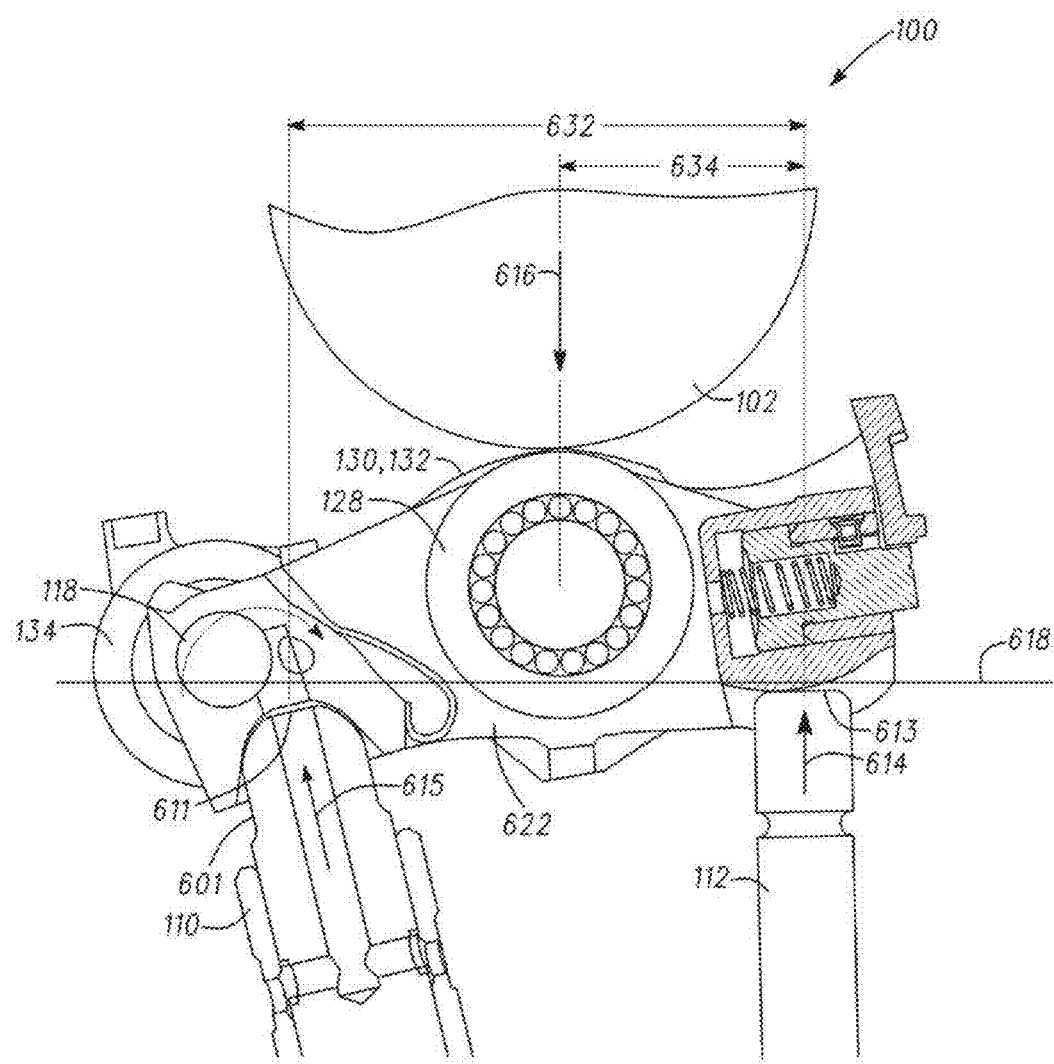
FIG. 52 illustrates a section view along line 52-52 in of FIG. 51 of an exemplary switching rocker arm.

As shown in FIGS. 15 and 52, the DVVL rocker arm assembly 100 is designed to minimize inertia as it pivots about the ball plunger contact point 611 of the DFHLA 110 by biasing mass of the assembly as much as possible towards side 101. This results in a general arrangement with two components of significant mass, the pivot axle 118 and the torsion springs 134 136, located near the DFHLA 110 at side 101. With pivot axle 118 in this location, the latch 200 is located at end 103 of the DVVL rocker arm assembly 100.

Figure 55:
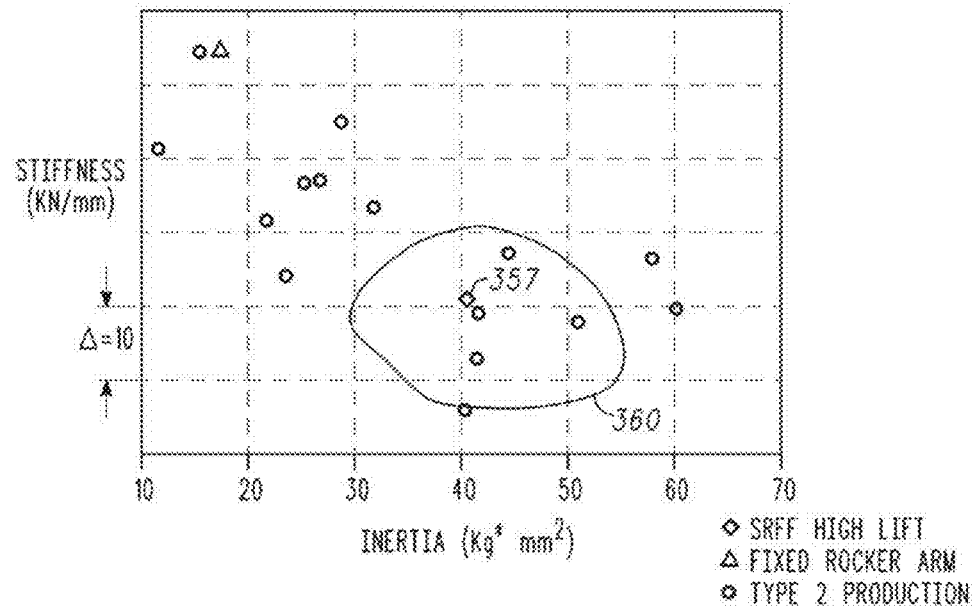
FIG. 55 illustrates a characteristic plot of inertia versus stiffness for design iterations of an exemplary switching rocker arm assembly.

FIG. 55 is a plot that compares the DVVL rocker arm assembly 100 stiffness in high-lift mode with other standard rocker arms. The DVVL rocker arm assembly 100 has lower stiffness than the fixed rocker arm for this application; however, its stiffness is in the existing range rocker arms used in similar valve train configurations now in production. The inertia of the DVVL rocker arm assembly 100 is approximately double the inertia of a fixed rocker arm, however, its inertia is only slightly above the mean for rocker arms used in similar valve train configurations now in production. The overall effective mass of the intake valve train, consisting of multiple DVVL rocker arm assemblies 100 is 28% greater than a fixed intake valve train. These stiffness, mass, and inertia values require optimization of each component and subassembly to ensure minimum inertia and maximum stiffness while meeting operational design criteria.

4.7.1 DVVL Assembly Dynamics Detailed Description

Figure 53:
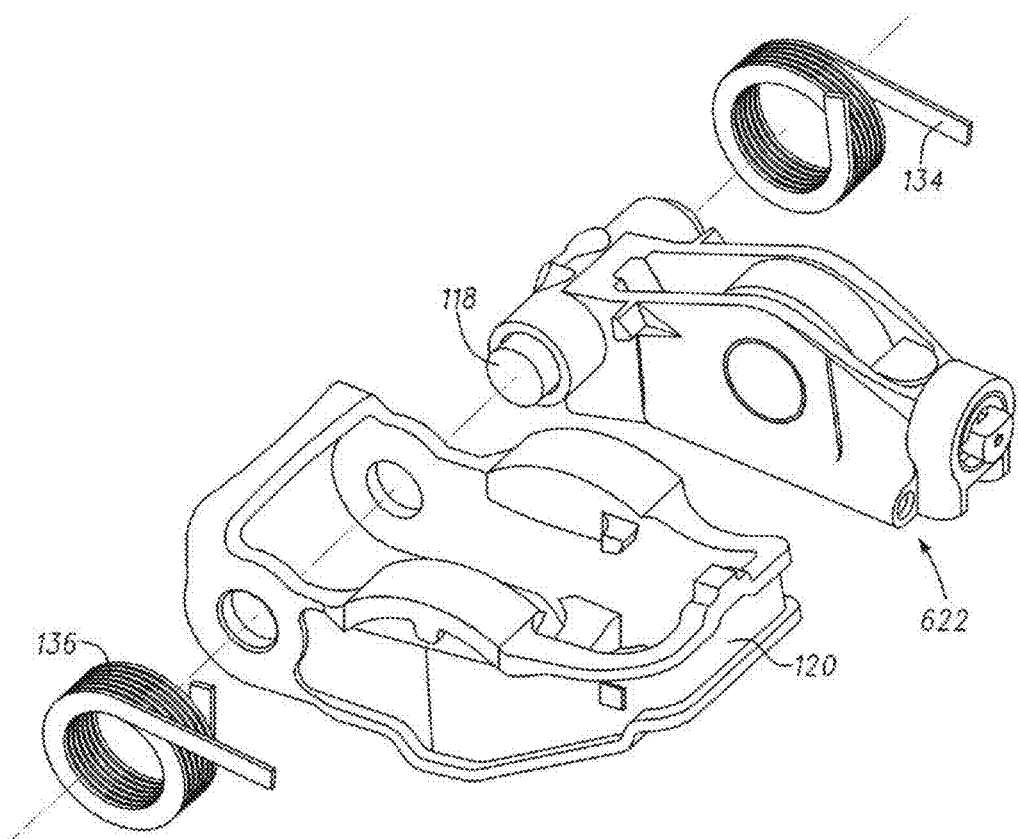
FIG. 53 illustrates an exploded view of an exemplary switching rocker arm, showing the major components that affect inertia for an exemplary switching rocker arm assembly.
Figure 54:
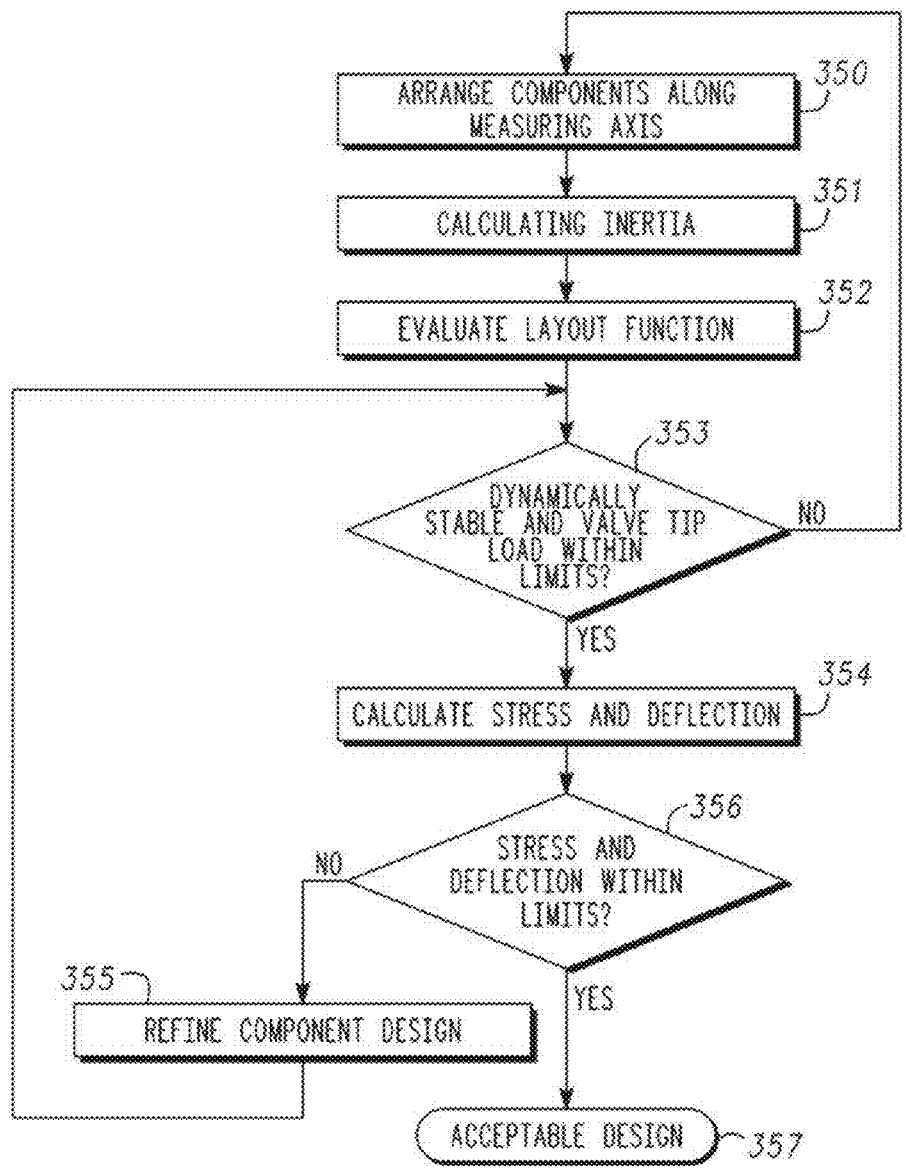
FIG. 54 illustrates a design process to optimize the relationship between inertia and stiffness for an exemplary switching rocker assembly.

The major components that comprise total inertia for the rocker arm assembly 100 are illustrated in FIG. 53. These are the inner arm assembly 622, the outer arm 120, and the torsion springs 134, 136. As noted, functional requirements of the inner arm assembly 622, for example, its hydraulic fluid transfer pathways and its latch pin mechanism housing, require a stiffer structure than a fixed rocker arm for the same application. In the following description, the inner arm assembly 622 is considered a single part.

Figure 51:
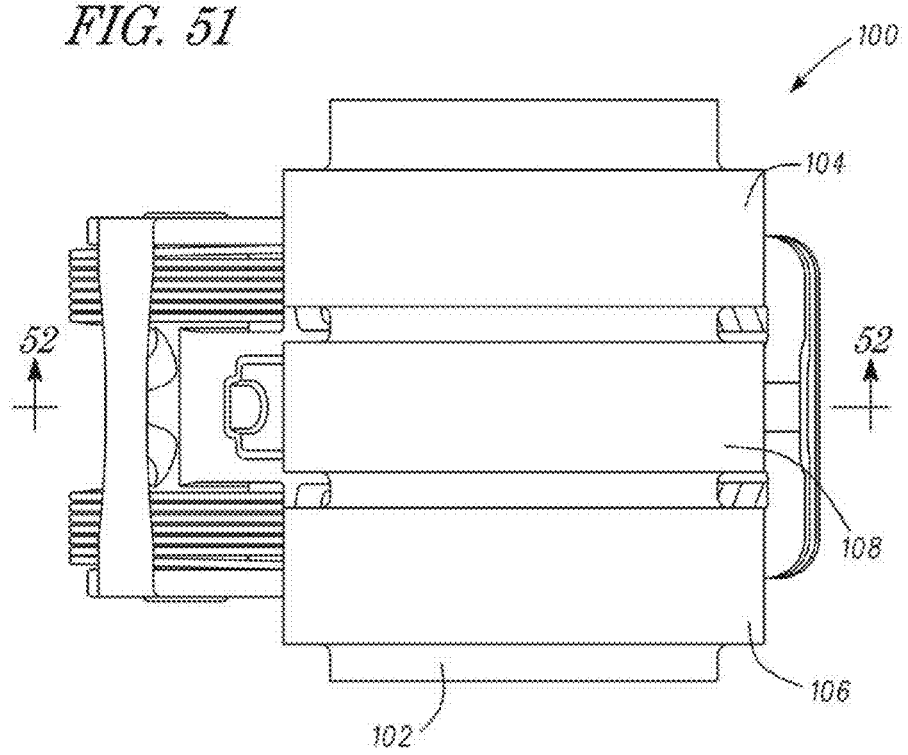
FIG. 51 illustrates a top view of an exemplary switching rocker arm and three-lobed cam.

Referring to FIGS. 51-53, FIG. 51 shows a top view of the rocker arm assembly 100 in FIG. 4. FIG. 52 is a section view along the line 52-52 in FIG. 51 that illustrates loading contact points for the rocker arm assembly 100. The rotating three lobed cam 102 imparts a cam load 616 to the roller bearing 128 or, depending on mode of operation, to the slider pads 130, 132. The ball plunger end 601 and the valve tip 613 provide opposing forces.

In low-lift mode, the inner arm assembly 622 transmits the cam load 616 to the valve tip 613, compresses spring 114 (of FIG. 4), and opens the valve 112. In high-lift mode, the outer arm 120, and the inner arm assembly 622 are latched together. In this case, the outer arm 120 transmits the cam load 616 to the valve tip 613, compresses the spring 114, and opens the valve 112.

Now, as to FIGS. 4 and 52, the total inertia for the rocker arm assembly 100 is determined by the sum of the inertia of its major components, calculated as they rotate about the ball plunger contact point 611. In the exemplary rocker arm assembly 100, the major components may be defined as the torsion springs 134, 136, the inner arm assembly 622, and the outer arm 120. When the total inertia increases, the dynamic loading on the valve tip 613 increases, and system dynamic stability decreases. To minimize valve tip loading and maximize dynamic stability, mass of the overall rocker arm assembly 100 is biased towards the ball plunger contact point 611. The amount of mass that can be biased is limited by the required stiffness of the rocker arm assembly 100 needed for a given cam load 616, valve tip load 614, and ball plunger load 615.

Now, as to FIGS. 4 and 52, the stiffness of the rocker arm assembly 100 is determined by the combined stiffness of the inner arm assembly 622, and the outer arm 120, when they are in a high-lift or low-lift state. Stiffness values for any given location on the rocker arm assembly 100 can be calculated and visualized using Finite Element Analysis (FEA) or other analytical methods, and characterized in a plot of stiffness versus location along the measuring axis 618. In a similar manner, stiffness for the outer arm 120 and inner arm assembly 622 can be individually calculated and visualized using Finite Element Analysis (FEA) or other analytical methods. An exemplary illustration 106 shows the results of these analyses as a series characteristic plots of stiffness versus location along the measuring axis 618. As an additional illustration noted earlier, FIG. 50 illustrates a plot of maximum deflection for the outer arm 120.

Figure 56:
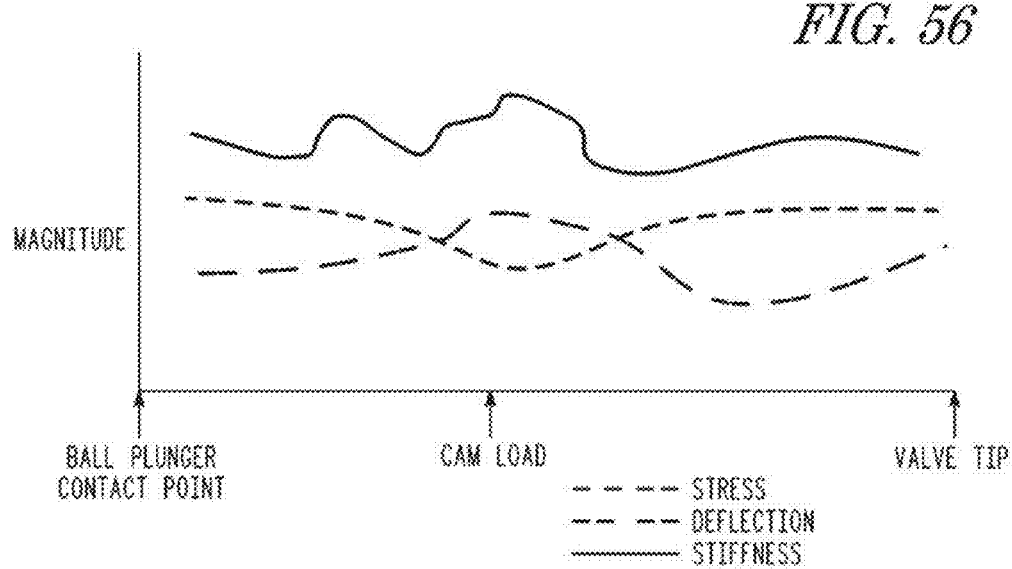
FIG. 56 illustrates a characteristic plot showing stress, deflection, loading, and stiffness versus location for an exemplary switching rocker arm assembly.

Now, referencing FIGS. 52 and 56, stress and deflection for any given location on the rocker arm assembly 100 can be calculated using Finite Element Analysis (FEA) or other analytical methods, and characterized as plots of stress and deflection versus location along the measuring axis 618 for given cam load 616, valve tip load 614, and ball plunger load 615. In a similar manner, stress and deflection for the outer arm 120 and inner arm assembly 622 can be individually calculated and visualized using Finite Element Analysis (FEA) or other analytical methods. An exemplary illustration in FIG. 56 shows the results of these analyses as a series of characteristic plots of stress and deflection versus location along the measuring axis 618 for given cam load 616, valve tip load 614, and ball plunger load 615.

4.7.2 DVVL Assembly Dynamics Analysis

For stress and deflection analysis, a load case is described in terms of load location and magnitude as illustrated in FIG. 52. For example, in a latched rocker arm assembly 100 in high-lift mode, the cam load 616 is applied to slider pads 130, 132. The cam load 616 is opposed by the valve tip load 614 and the ball plunger load 615. The first distance 632 is the distance measured along the measuring axis 618 between the valve tip load 614 and the ball plunger load 615. The second distance 634 is the distance measured along the measuring axis 618 between the valve tip load 614 and the cam load 616. The load ratio is the second distance 634 divided by the first distance 632. For dynamic analysis, multiple values and operating conditions are considered for analysis and possible optimization. These may include the three lobe camshaft interface parameters, torsion spring parameters, total mechanical lash, inertia, valve spring parameters, and DFHLA parameters.

Design parameters for evaluation can be described:

| Variable/Parameter | Description | Value/Range for a Design Iteration |
|---|---|---|
| Engine speed | The maximum rotational speed of the rocker arm assembly 100 about the ball plunger contact point 611 is derived from the engine speed. | 7300 rpm in high-lift mode 3500 rpm in low-lift mode |
| Lash | Lash enables switching from between high-lift and low-lift modes, and varies based on the selected design. In the example configuration shown in FIG. 52, a deflection of the outer arm 120 slider pad results in a decrease of the total lash available for switching. | Cam lash Latch lash Total lash |
| Maximum allowable deflection | This value is based on the selected design configuration. | Total lash +/− tolerance |
| Maximum allowable stress | Establish allowable loading for the specified materials of construction. | Kinematic contact stresses: Valve tip = Ball plunger end = Roller = 1200-1400 MPa Slider pads = 800-1000 MPa |
| Dynamic stability | | Valve closing velocity |
| Cam shape | The cam load 616 in FIG. 52 is established by the rotating cam lobe as it acts to open the valve. The shape of the cam lobe affects dynamic loading. | This variable is considered fixed for iterative design analysis. |
| Valve spring stiffness | The spring 114 compression stiffness is fixed for a given engine design. | |
| Ball plunger to valve tip distance | As described in FIG. 52, the second distance 632 value is set by the engine design. | Range = 20-50 mm |
| Load ratio | The load ratio as shown in FIG. 52 is the second distance 634 divided by the first distance 632. This value is imposed by the design configuration and load case selected. | Range = 0.2-0.8 |
| Inertia | This is a calculated value. | Range = 20-60 Kg * mm2 |

Now, as referenced by FIGS. 4, 51, 52, 53, and 54, based on given set of design parameters, a general design methodology is described.

Figure 57:
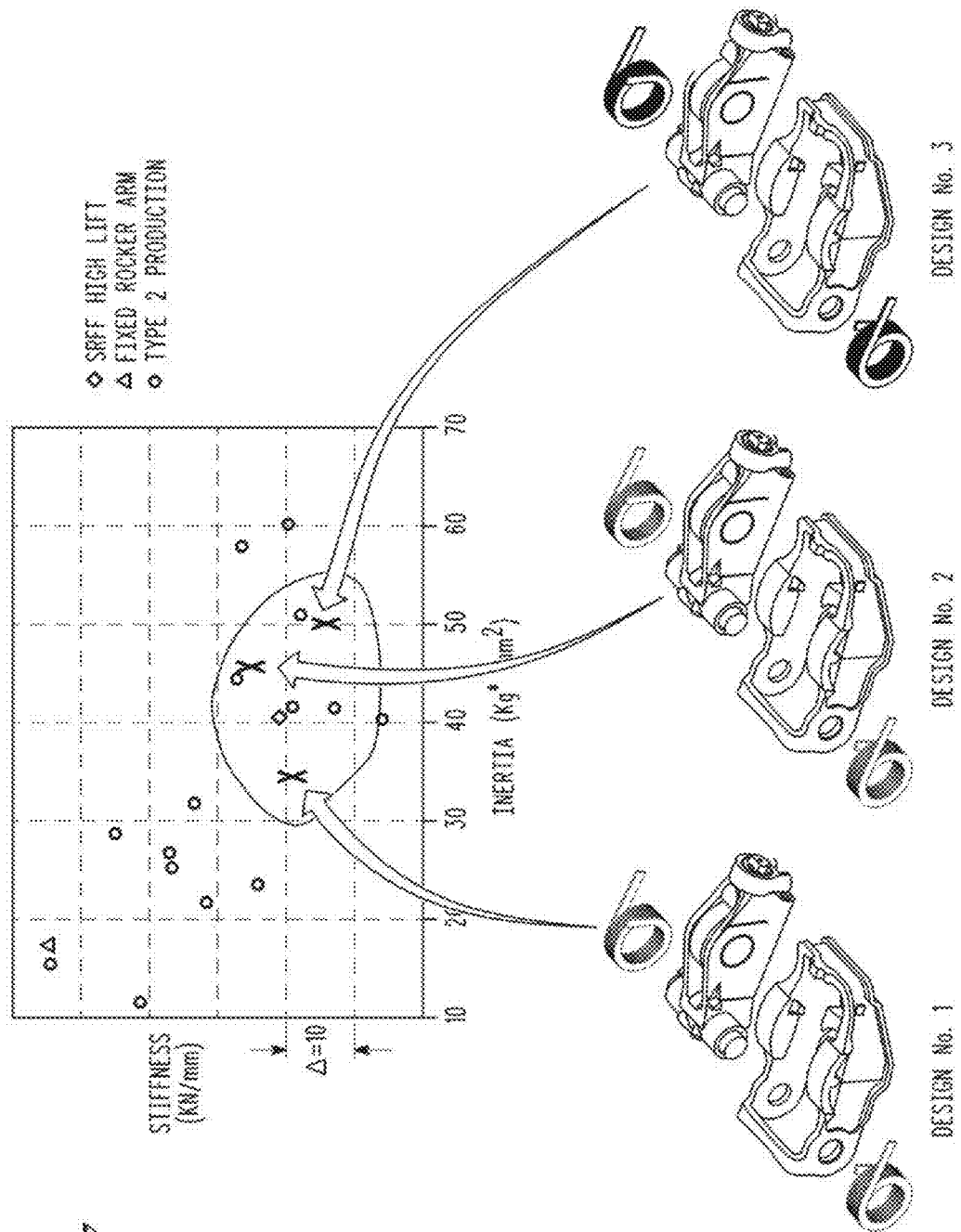
FIG. 57 illustrates a characteristic plot showing stiffness versus inertia for a range of exemplary switching rocker arm assemblies.

1. In step one 350, arrange components 622, 120, 134, and 136 along the measuring axis to bias mass towards the ball plunger contact point 611. For example, the torsion springs 134, 136 may be positioned 2 mm to the left of the ball plunger contact point, and the pivot axle 118 in the inner arm assembly 622 may be positioned 5 mm. to the right. The outer arm 120 is positioned to align with the pivot axle 118 as shown in FIG. 53.
2. In step 351, for a given component arrangement, calculate the total inertia for the rocker arm assembly 100.
3. In step 352, evaluate the functionality of the component arrangement. For example, confirm that the torsion springs 134, 136 can provide the required stiffness in their specified location to keep the slider pads 130, 132 in contact with the cam 102, without adding mass. In another example, the component arrangement must be determined to fit within the package size constraints.
4. In step 353, evaluate the results of step 351 and step 352. If minimum requirements for the valve tip load 614 and dynamic stability at the selected engine speed are not met, iterate on the arrangement of components and perform the analyses in steps 351 and 352 again. When minimum requirements for the valve tip load 614 and dynamic stability at the selected engine speed are met, calculate deflection and stress for the rocker arm assembly 100.
5. In step 354, calculate stress and deflections.
6. In step 356, evaluate deflection and stress. If minimum requirements for deflection and stress are not met, proceed to step 355, and, and refine component design. When the design iteration is complete, return to step 353 and re-evaluate the valve tip load 614 and dynamic stability. When minimum requirements for the valve tip load 614 and dynamic stability at the selected engine speed are met, calculate deflection and stress in step 354.
7. With reference to FIG. 55, when conditions of stress, deflection, and dynamic stability are met, the result is one possible design 357. Analysis results can be plotted for possible design configurations on a graph of stiffness versus inertia. This graph provides a range of acceptable values as indicated by area 360. FIG. 57 shows three discrete acceptable designs. By extension, the acceptable inertia/stiffness area 360 also bounds the characteristics for individual major components 120, 622, and torsion springs 134, 136.

Now, with reference to FIGS. 4, 52, 55, a successful design, as described above, is reached if each of the major rocker arm assembly 100 components, including the outer arm 120, the inner arm assembly 622, and the torsion springs 134, 136, collectively meet specific design criteria for inertia, stress, and deflection. A successful design produces unique characteristic data for each major component.

Figure 59:
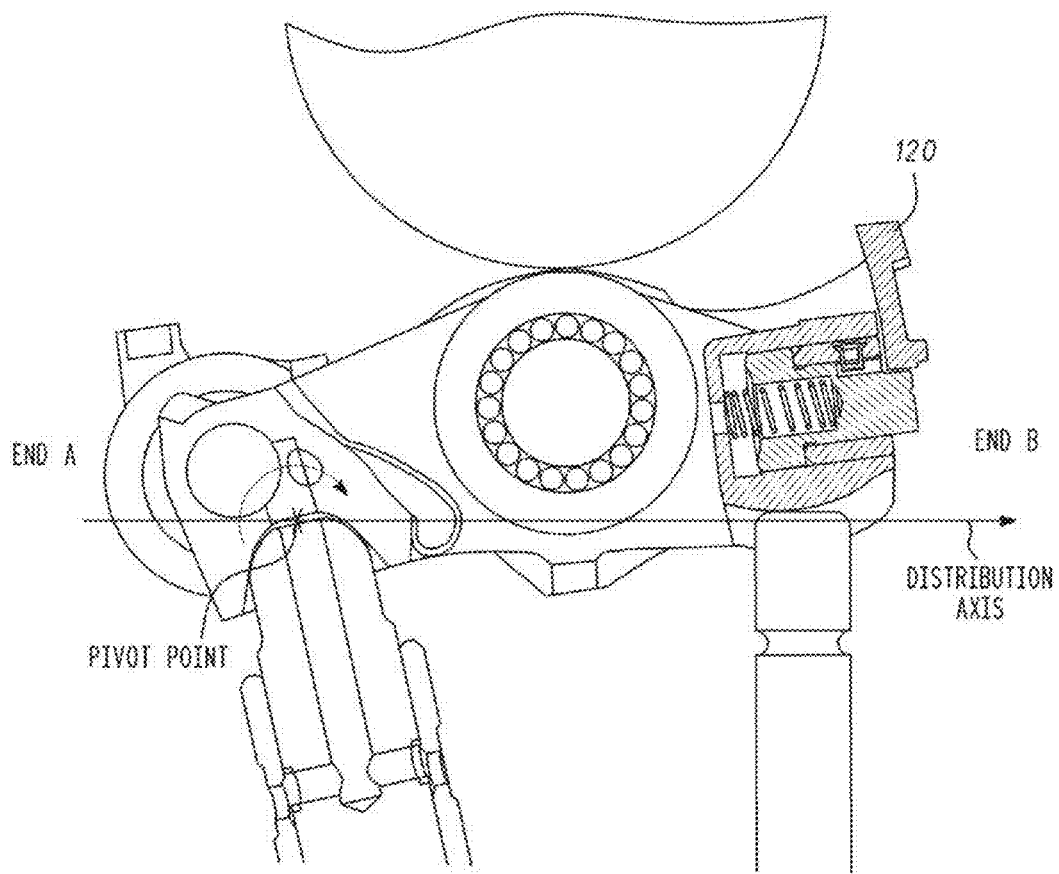
FIG. 59 is a side cut-away view of an exemplary switching rocker arm assembly including a DFHLA and valve.
Figure 60:
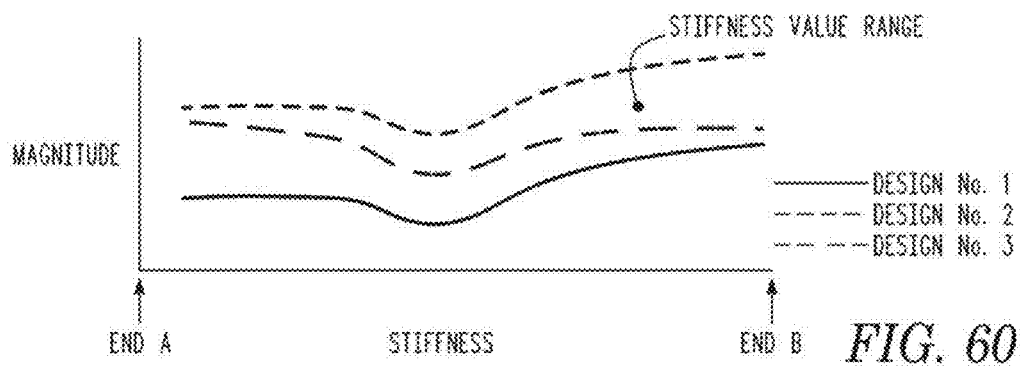
FIG. 60 illustrates a characteristic plot showing a range of stiffness values versus location for component parts of an exemplary switching rocker arm assembly.
Figure 61:
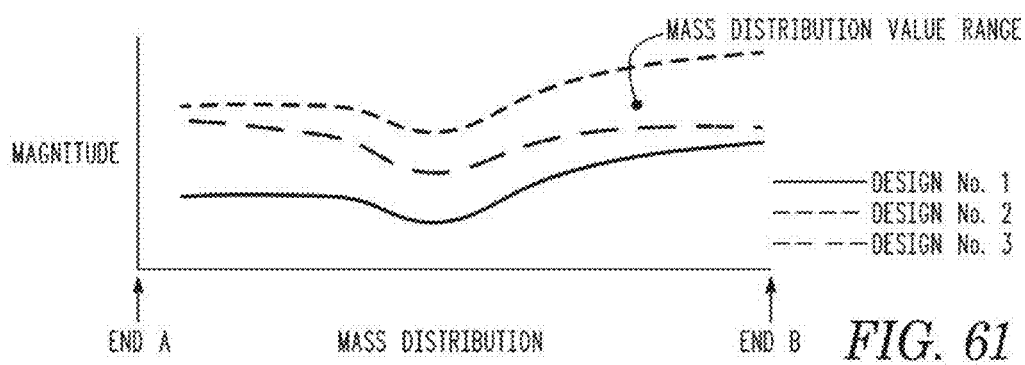
FIG. 61 illustrates a characteristic plot showing a range of mass distribution values versus location for component parts of an exemplary switching rocker arm assembly.

To illustrate, select three functioning DVVL rocker arm assemblies 100, illustrated in FIG. 57, that meet a certain stiffness/inertia criteria. Each of these assemblies is comprised of three major components: the torsion springs 134, 136, outer arm 120, and inner arm assembly 622. For this analysis, as illustrated in an exemplary illustration of FIG. 58, a range of possible inertia values for each major component can be described:

Torsion spring set, design #1, inertia=A; torsion spring set, design #2, inertia=B; torsion spring set, design #3, inertia=C Torsion spring set inertia range, calculated about the ball end plunger tip (also indicated with an X in FIG. 59), is bounded by the extents defined in values A, B, and C.

Outer arm, design #1, inertia=D; outer arm, design #2, inertia=E; outer arm, design #3, inertia=F Outer arm inertia range, calculated about the ball end plunger tip (also indicated with an X in FIG. 59), is bounded by the extents defined in values D, E, and F Inner arm assembly, design #1, inertia=X; inner arm assembly, design #2, inertia=Y; inner arm assembly, design #3, inertia=Z Inner arm assembly inertia range, calculated about the ball end plunger tip (also indicated with an X in FIG. 59), is bounded by the extents defined in values X, Y, and Z.

This range of component inertia values in turn produces a unique arrangement of major components (torsion springs, outer arm, and inner arm assembly). For example, in this design, the torsion springs will tend to be very close to the ball end plunger tip 611.

As to FIGS. 57-61, calculation of inertia for individual components is closely tied to loading requirements in the assembly, because the desire to minimize inertia requires the optimization of mass distribution in the part to manage stress in key areas. For each of the three successful designs described above, a range of values for stiffness and mass distribution can be described.

For outer arm 120 design #1, mass distribution can be plotted versus distance along the part, starting at end A, and proceeding to end B. In the same way, mass distribution values for outer arm 120 design #2 and outer arm 120 design #3 can be plotted.

The area between the two extreme mass distribution curves can be defined as a range of values characteristic to the outer arm 120 in this assembly.

For outer arm 120 design #1, stiffness distribution can be plotted versus distance along the part, starting at end A, and proceeding to end B. In the same way, stiffness values for outer arm 120 design #2 and outer arm 120 design #3 can be plotted.

The area between the two extreme stiffness distribution curves can be defined as a range of values characteristic to the outer arm 120 in this assembly.

Stiffness and mass distribution for the outer arm 120 along an axis related to its motion and orientation during operation, describe characteristic values, and by extension, characteristic shapes.

5 Design Verification 5.1 Latch Response

Figure 62:
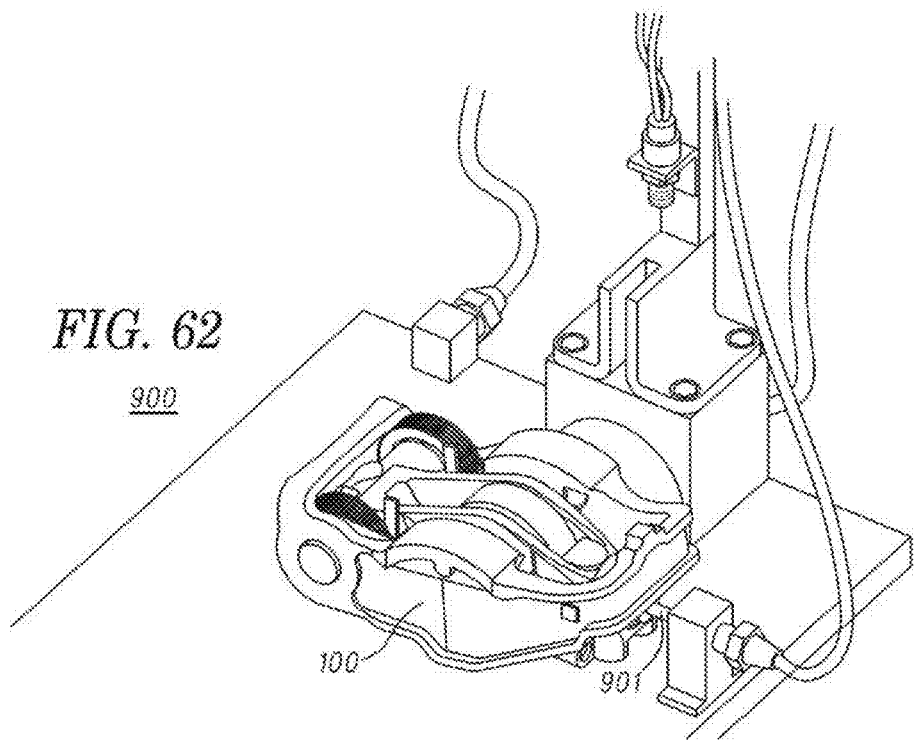
FIG. 62 illustrates a test stand measuring latch displacement.

Latch response times for the exemplary DVVL system were validated with a latch response test stand 900 illustrated in FIG. 62, to ensure that the rocker arm assembly switched within the prescribed mechanical switching window explained previously, and illustrated in FIG. 26. Response times were recorded for oil temperatures ranging from 10° C. to 120° C. to effect a change in oil viscosity with temperature.

The latch response test stand 900 utilized production intent hardware including OCVs, DFHLAs, and DVVL switching rocker arms 100. To simulate engine oil conditions, the oil temperature was controlled by an external heating and cooling system. Oil pressure was supplied by an external pump and controlled with a regulator. Oil temperature was measured in a control gallery between the OCV and DFHLA. The latch movement was measured with a displacement transducer 901.

Latch response times were measured with a variety of production intent SRFFs. Tests were conducted with production intent 5 w-20 motor oil. Response times were recorded when switching from low lift mode to high lift and high lift mode to low lift mode.

Figure 21:
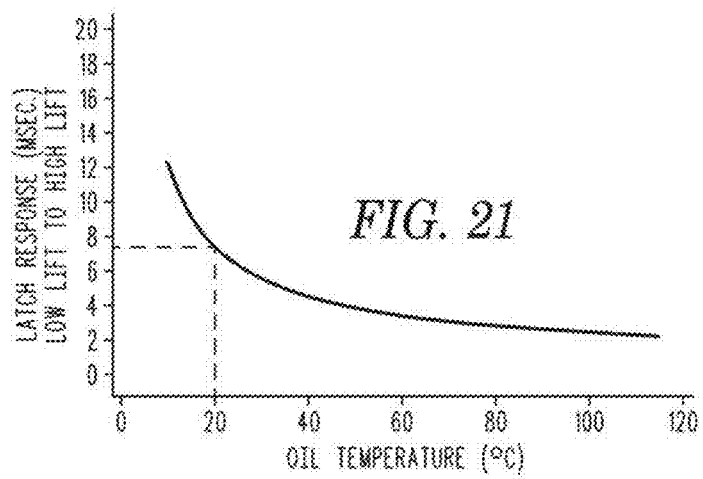
FIGS. 21-22 illustrate graphs showing the relation between oil temperature and latch response time.
Figure 22:
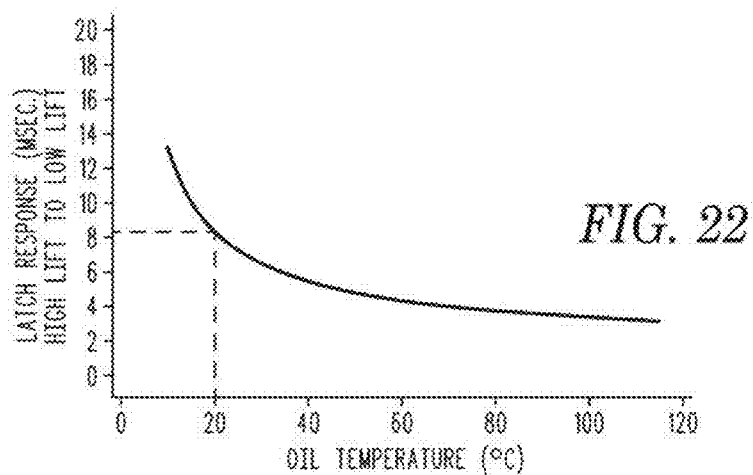

FIG. 21 details the latch response times when switching from low-lift mode to high-lift mode. The maximum response time at 20° C. was measured to be less than 10 milliseconds. FIG. 22 details the mechanical response times when switching from high-lift mode to low lift mode. The maximum response time at 20° C. was measured to be less than 10 milliseconds.

Results from the switching studies show that the switching time for the latch is primarily a function of the oil temperature due to the change in viscosity of the oil. The slope of the latch response curve resembles viscosity to temperature relationships of motor oil.

The switching response results show that the latch movement is fast enough for mode switching in one camshaft revolution up to 3500 engine rpm. The response time begins to increase significantly as the temperature falls below 20° C. At temperatures of 10° C. and below, switching in one camshaft revolution is not possible without lowering the 3500 rpm switching requirement.

The SRFF was designed to be robust at high engine speeds for both high and low lift modes as shown in Table 1. The high lift mode can operate up to 7300 rpm with a "burst" speed requirement of 7500 rpm. A burst is defined as a short excursion to a higher engine speed. The SRFF is normally latched in high lift mode such that high lift mode is not dependent on oil temperature. The low lift operating mode is focused on fuel economy during part load operation up to 3500 rpm with an over speed requirement of 5000 rpm in addition to a burst speed to 7500 rpm. As tested, the system is able to hydraulically unlatch the SRFF for oil temperatures at 200 C or above. Testing was conducted down to 10° C. to ensure operation at 20° C. Durability results show that the design is robust across the entire operating range of engine speeds, lift modes and oil temperatures.

TABLE 1

| Mode | Engine Speed, rpm | Oil Temperature |
| --- | --- | --- |
| High Lift | 7300<br>7500 burst speed | N/A |
| Low Lift<br>(Fuel Economy Mode) | 3500<br>5000 overspeed<br>7500 burst speed | 20° C. and above |

The design, development, and validation of a SRFF based DVVL system to achieve early intake valve closing was completed for a Type II valve train. This DVVL system improves fuel economy without jeopardizing performance by operating in two modes. Pumping loop losses are reduced in low lift mode by closing the intake valve early while performance is maintained in high lift mode by utilizing a standard intake valve profile. The system preserves common Type II intake and exhaust valve train geometries for use in an in-line four cylinder gasoline engine. Implementation cost is minimized by using common components and a standard chain drive system. Utilizing a Type II SRFF based system in this manner allows the application of this hardware to multiple engine families.

This DVVL system, installed on the intake of the valve train, met key performance targets for mode switching and dynamic stability in both high-lift and low-lift modes. Switching response times allowed mode switching within one cam revolution at oil temperatures above 20° C. and engine speeds up to 3500 rpm. Optimization of the SRFF stiffness and inertia, combined with an appropriate valve lift profile design allowed the system to be dynamically stable to 3500 rpm in low lift mode and 7300 rpm in high lift mode. The validation testing completed on production intent hardware shows that the DVVL system exceeds durability targets. Accelerated system aging tests were utilized to demonstrate durability beyond the life targets.

5.2 Durability

Passenger cars are required to meet an emissions useful life requirement of 150,000 miles. This study set a more stringent target of 200,000 miles to ensure that the product is robust well beyond the legislated requirement.

The valve train requirements for end of life testing are translated to the 200,000 mile target. This mileage target must be converted to valve actuation events to define the valve train durability requirements. In order to determine the number of valve events, the average vehicle and engine speeds over the vehicle lifetime must be assumed. For this example, an average vehicle speed of 40 miles per hour combined with an average engine speed of 2200 rpm was chosen for the passenger car application. The camshaft speed operates at half the engine speed and the valves are actuated once per camshaft revolution, resulting in a test requirement of 330 million valve events. Testing was conducted on both firing engines and non-firing fixtures. Rather than running a 5000 hour firing engine test, most testing and reported results focus on the use of the non-firing fixture illustrated in FIG. 63 to conduct testing necessary to meet 330 million valve events. Results from firing and non-firing tests were compared, and the results corresponded well with regarding valve train wear results, providing credibility for non-firing fixture life testing.

5.2.1 Accelerated Aging

There was a need for conducting an accelerated test to show compliance over multiple engine lives prior to running engine tests. Hence, fixture testing was performed prior to firing tests. A higher speed test was designed to accelerate valve train wear such that it could be completed in less time. A test correlation was established such that doubling the average engine speed relative to the in-use speed yielded results in approximately one-quarter of the time and nearly equivalent valve train wear. As a result, valve train wear followed closely to the following equation:

$$VE_{Accel} \sim VE_{in-use}\left(\frac{RPM_{avg-test}}{RPM_{avg-in\ use}}\right)^2$$

Where $VE_{Accel}$ are the valve events required during an accelerated aging test, $VE_{in-use}$ are the valve events required during normal in-use testing, $RPM_{avg-test}$ is the average engine speed for the accelerated test and $RPM_{avg-in\ use}$ is the average engine speed for in-use testing.

A proprietary, high speed, durability test cycle was developed that had an average engine speed of approximately 5000 rpm. Each cycle had high speed durations in high lift mode of approximately 60 minutes followed by lower speed durations in low lift mode for approximately another 10 minutes. This cycle was repeated 430 times to achieve 72 million valve events at an accelerated wear rate that is equivalent to 330 million events at standard load levels. Standard valve train products containing needle and roller bearings have been used successfully in the automotive industry for years. This test cycle focused on the DLC coated slider pads where approximately 97% of the valve lift events were on the slider pads in high lift mode leaving 2 million cycles on the low lift roller bearing as shown in Table 2. These testing conditions consider one valve train life equivalent to 430 accelerated test cycles. Testing showed that the SRFF is durable through six engine useful lives with negligible wear and lash variation.

TABLE 2

Durability Tests, Valve Events and Objectives

| Durability Test | Duration (hours) | Valve Events total | Valve Events high lift | Objective |
|---|---|---|---|---|
| Accelerated System Aging | 500 | 72M | 97% | Accelerated high speed wear |
| Switching | 500 | 54M | 50% | Latch and torsion spring wear |
| Critical Shift | 800 | 42M | 50% | Lathe and bearing wear |
| Idle 1 | 1000 | 27M | 100% | Low lubrication |
| Idle 2 | 1000 | 27M | 0% | Low lubrication |
| Cold Start | 1000 | 27M | 100% | Low lubrication |
| Used Oil | 400 | 56M | ~99.5% | Accelerated high speed wear |
| Bearing | 140 | N/A | N/A | Bearing wear |
| Torsion Spring | 500 | 25M | 0% | Spring load loss |

The accelerated system aging test was key to showing durability while many function-specific tests were also completed to show robustness over various operating states.

Table 2 includes the main durability tests combined with the objective for each test. The accelerated system aging test was described above showing approximately 500 hours or approximately 430 test cycles. A switching test was operated for approximately 500 hours to assess the latch and torsion spring wear. Likewise, a critical shift test was also performed to further age the parts during a harsh and abusive shift from the outer arm being partially latched such that it would slip to the low lift mode during the high lift event. A critical shift test was conducted to show robustness in the case of extreme conditions caused by improper vehicle maintenance. This critical shift testing was difficult to achieve and required precise oil pressure control in the test laboratory to partially latch the outer arm. This operation is not expected in-use as the oil control pressures are controlled outside of that window. Multiple idle tests combined with cold start operation were conducted to accelerate wear due to low oil lubrication. A used oil test was also conducted at high speed. Finally, bearing and torsion spring tests were conducted to ensure component durability. All tests met the engine useful lift requirement of 200,000 miles which is safely above the 150,000 mile passenger car useful life requirement.

All durability tests were conducted having specific levels of oil aeration. Most tests had oil aeration levels ranging between approximately 15% and 20% total gas content (TGC) which is typical for passenger car applications. This content varied with engine speed and the levels were quantified from idle to 7500 rpm engine speed. An excessive oil aeration test was also conducted having aeration levels of 26% TGC. These tests were conducted with SRFF's that met were tested for dynamics and switching performance tests. Details of the dynamics performance test are discussed in the results section. The oil aeration levels and extended levels were conducted to show product robustness.

5.2.2 Durability Test Apparatus

Figure 63:
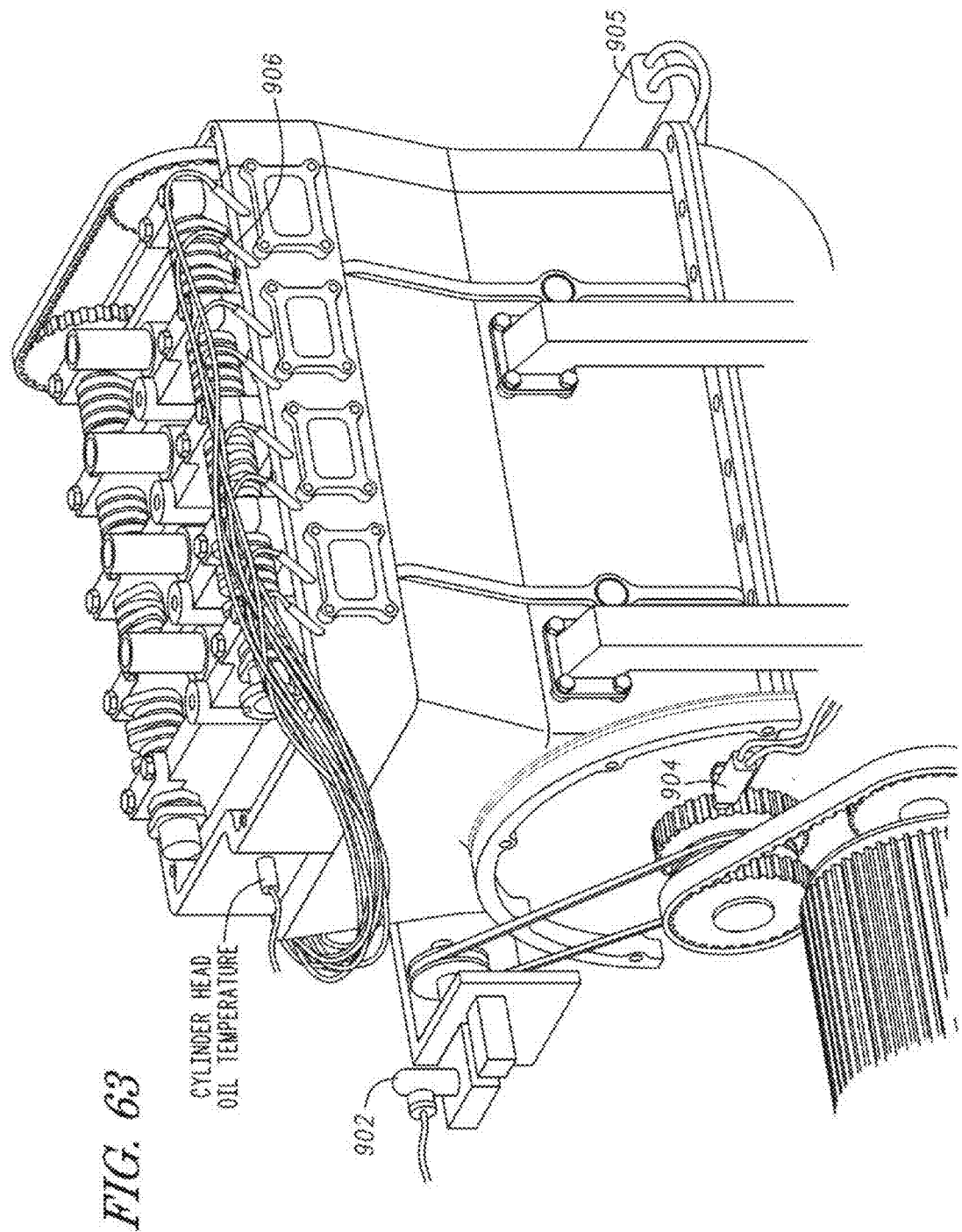
FIG. 63 is an illustration of a non-firing test stand for testing switching rocker arm assembly.

The durability test stand shown in FIG. 63 consists of a prototype 2.5 L four cylinder engine driven by an electric motor with an external engine oil temperature control system 905. Camshaft position is monitored by an Accu-coder 802S external encoder 902 driven by the crankshaft. Angular velocity of the crankshaft is measured with a digital magnetic speed sensor (model Honeywell584) 904. Oil pressure in both the control and hydraulic galleries is monitored using Kulite XTL piezoelectric pressure transducers.

5.2.3 Durability Test Apparatus Control

A control system for the fixture is configured to command engine speed, oil temperature and valve lift state as well as verify that the intended lift function is met. The performance of the valve train is evaluated by measuring valve displacement using non-intrusive Bently Nevada 3300XL proximity probes 906. The proximity probes measure valve lift up to 2 mm at one-half camshaft degree resolution. This provides the information necessary to confirm the valve lift state and post process the data for closing velocity and bounce analysis. The test setup included a valve displacement trace that was recorded at idle speed to represent the baseline conditions of the SRFF and is used to determine the master profile 908 shown in FIG. 64.

FIG. 17 shows the system diagnostic window representing one switching cycle for diagnosing valve closing displacement. The OCV is commanded by the control system resulting in movement of the OCV armature as represented by the OCV current trace 881. The pressure downstream of the OCV in the oil control gallery increases as shown by the pressure curve 880; thus, actuating the latch pin resulting in a change of state from high-lift to low-lift.

Figure 64:
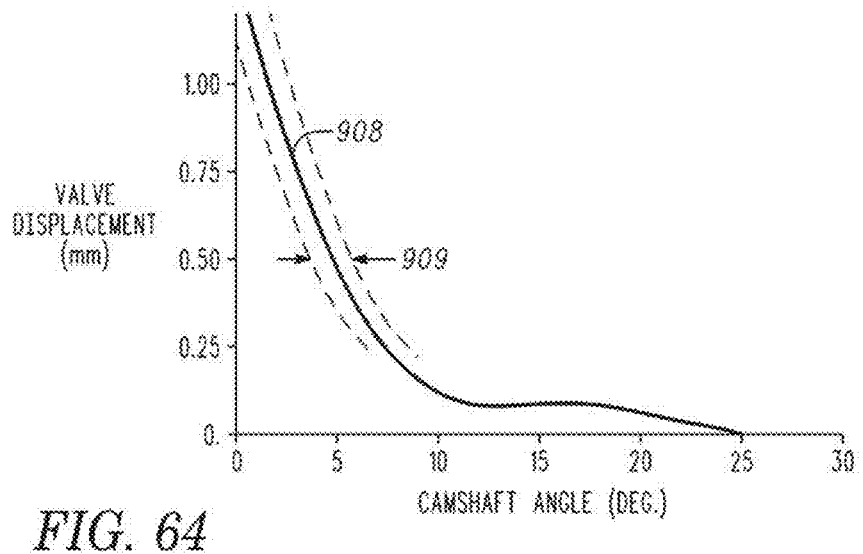
FIG. 64 is a graph of valve displacement vs. camshaft angle.

FIG. 64 shows the valve closing tolerance 909 in relation to the master profile 908 that was experimentally determined. The proximity probes 906 used were calibrated to measure the last 2 mm of lift, with the final 1.2 mm of travel shown on the vertical axis in FIG. 64. A camshaft angle tolerance of 2.5" was established around the master profile 908 to allow for the variation in lift that results from valve train compression at high engine speeds to prevent false fault recording. A detection window was established to resolve whether or not the valve train system had the intended deflection. For example, a sharper than intended valve closing would result in an earlier camshaft angle closing resulting in valve bounce due to excessive velocity which is not desired. The detection window and tolerance around the master profile can detect these anomalies.

5.2.4 Durability Test Plan

Figure 65:
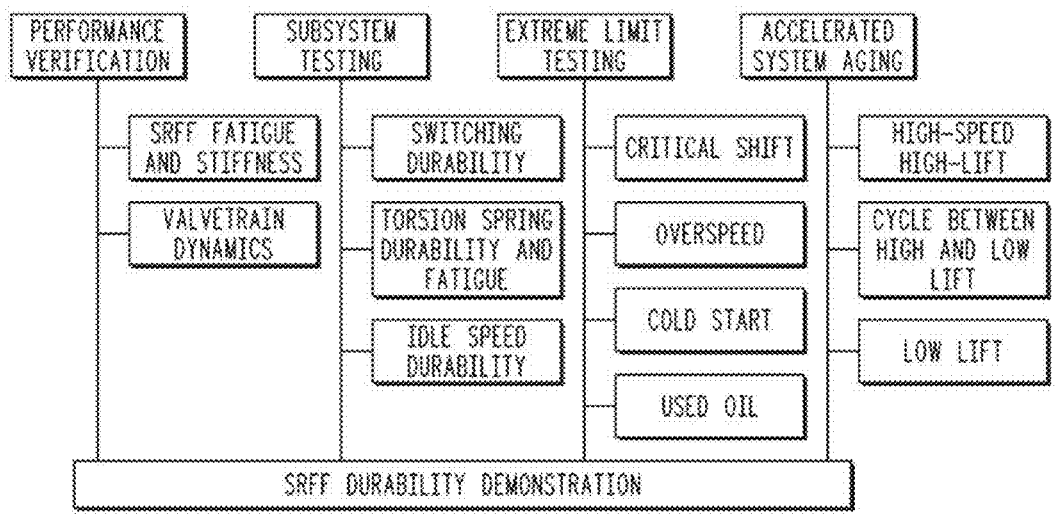
FIG. 65 illustrates a hierarchy of key tests for testing the durability of a switching roller finger follower (SRFF) rocker arm assembly.

A Design Failure Modes and Effects Analysis (DFMEA) was conducted to determine the SRFF failure modes. Likewise, mechanisms were determined at the system and subsystem levels. This information was used to develop and evaluate the durability of the SRFF to different operating conditions. The test types were separated into four categories as shown in FIG. 65 that include: Performance Verification, Subsystem Testing, Extreme Limit Testing and Accelerated System Aging.

The hierarchy of key tests for durability are shown in FIG. 65. Performance Verification Testing benchmarks the performance of the SRFF to application requirements and is the first step in durability verification. Subsystem tests evaluate particular functions and wear interfaces over the product lifecycle. Extreme Limit Testing subjects the SRFF to the severe user in combination with operation limits. Finally, the Accelerated Aging test is a comprehensive test evaluating the SRFF holistically. The success of these tests demonstrates the durability of the SRFF.

Performance Verification

Fatigue & Stiffness

The SRFF is placed under a cyclic load test to ensure fatigue life exceeds application loads by a significant design margin. Valve train performance is largely dependent on the stiffness of the system components. Rocker arm stiffness is measured to validate the design and ensure acceptable dynamic performance.

Valve Train Dynamics

The Valve train Dynamics test description and performance is discussed in the results section. The test involved strain gaging the SRFF combined with measuring valve closing velocities.

Subsystem Testing

Switching Durability

The switching durability test evaluates the switching mechanism by cycling the SRFF between the latched, unlatched and back to the latched state a total of three million times (FIGS. 24 and 25). The primary purpose of the test is the evaluation of the latching mechanism. Additional durability information is gained regarding the torsion springs due to 50% of the test cycle being in low lift.

Torsion Spring Durability and Fatigue

The torsion spring is an integral component of the switching roller finger follower. The torsion spring allows the outer arm to operate in lost motion while maintaining contact with the high lift camshaft lobe. The Torsion Spring Durability test is performed to evaluate the durability of the torsion springs at operational loads. The Torsion Spring Durability test is conducted with the torsion springs installed in the SRFF. The Torsion Spring Fatigue test evaluates the torsion spring fatigue life at elevated stress levels. Success is defined as torsion spring load loss of less than 15% at end-of-life.

Idle Speed Durability

The Idle Speed Durability test simulates a limit lubrication condition caused by low oil pressure and high oil temperature. The test is used to evaluate the slider pad and bearing, valve tip to valve pallet and ball socket to ball plunger wear. The lift-state is held constant throughout the test in either high or low lift. The total mechanical lash is measured at periodic inspection intervals and is the primary measure of wear.

Extreme Limit Testing

Overspeed

Switching rocker arm failure modes include loss of lift-state control. The SRFF is designed to operate at a maximum crankshaft speed of 3500 rpm in low lift mode. The SRFF includes design protection to these higher speeds in the case of unexpected malfunction resulting in low lift mode. Low lift fatigue life tests were performed at 5000 rpm. Engine Burst tests were performed to 7500 rpm for both high and low lift states.

Cold Start Durability

The Cold Start durability test evaluates the ability of the DLC to withstand 300 engine starting cycles from an initial temperature of −30° C. Typically, cold weather engine starting at these temperatures would involve an engine block heater. This extreme test was chosen to show robustness and was repeated 300 times on a motorized engine fixture. This test measures the ability of the DLC coating to withstand reduced lubrication as a result of low temperatures.

Critical Shift Durability

The SRFF is designed to switch on the base circle of the camshaft while the latch pin is not in contact with the outer arm. In the event of improper OCV timing or lower than required minimum control gallery oil pressure for full pin travel, the pin may still be moving at the start of the next lift event. The improper location of the latch pin may lead to a partial engagement between the latch pin and outer arm. In the event of a partial engagement between the outer arm and latch pin, the outer arm may slip off the latch pin resulting in an impact between the roller bearing and low lift camshaft lobe. The Critical Shift Durability is an abuse test that creates conditions to quantify robustness and is not expected in the life of the vehicle. The Critical Shift test subjects the SRFF to 5000 critical shift events.

Accelerated Bearing Endurance

The accelerated bearing endurance is a life test used to evaluate life of bearings that completed the critical shift test. The test is used to determine whether the effects of critical shift testing will shorten the life of the roller bearing. The test is operated at increased radial loads to reduce the time to completion. New bearings were tested simultaneously to benchmark the performance and wear of the bearings subjected to critical shift testing. Vibration measurements were taken throughout the test and were analyzed to detect inception of bearing damage.

Used Oil Testing

The Accelerated System Aging test and Idle Speed Durability test profiles were performed with used oil that had a 20/19/16 ISO rating. This oil was taken from engines at the oil change interval.

Accelerated System Aging

Figure 66:
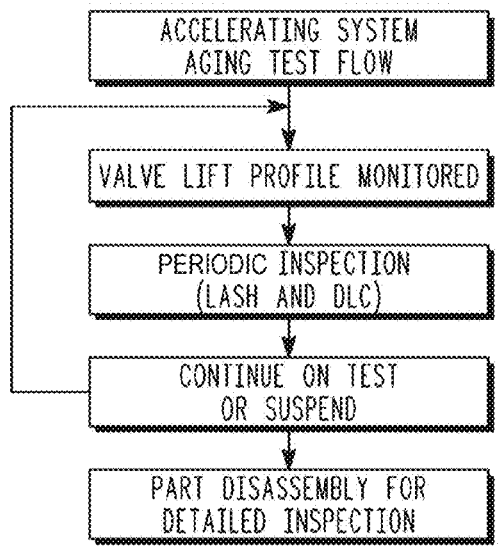
FIG. 66 shows the test protocol in evaluating the SRFF over an Accelerated System Aging test cycle.

The Accelerated System Aging test is intended to evaluate the overall durability of the rocker arm including the sliding interface between the camshaft and SRFF, latching mechanism and the low lift bearing. The mechanical lash was measured at periodic inspection intervals and is the primary measure of wear. FIG. 66 shows the test protocol in evaluating the SRFF over an Accelerated System Aging test cycle. The mechanical lash measurements and FTIR measurements allow investigation of the overall health of the SRFF and the DLC coating respectively. Finally, the part is subjected to a teardown process in an effort to understand the source of any change in mechanical lash from the start of test.

Figure 67:
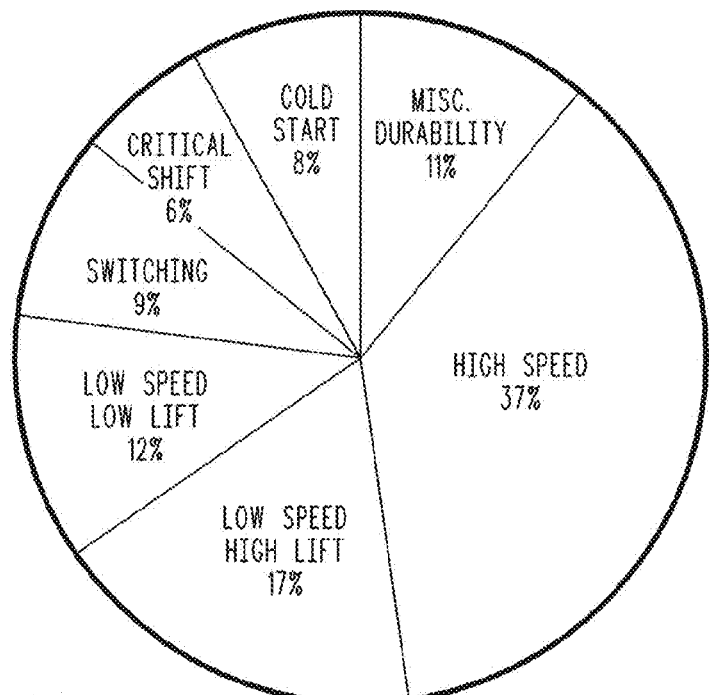
FIG. 67 is a pie chart showing the relative testing time for the SRFF durability testing.

FIG. 67 is a pie chart showing the relative testing time for the SRFF durability testing which included approximately 15,700 total hours. The Accelerated System Aging test offered the most information per test hour due to the acceleration factor and combined load to the SRFF within one test leading to the 37% allotment of total testing time. The Idle Speed Durability (Low Speed, Low Lift and Low Speed, High Lift) tests accounted for 29% of total testing time due to the long duration of each test. Switching Durability was tested to multiple lives and constituted 9% of total test time. Critical Shift Durability and Cold Start Durability testing required significant time due to the difficulty in achieving critical shifts and thermal cycling time required for the Cold Start Durability. The data is quantified in terms of the total time required to conduct these modes as opposed to just the critical shift and cold starting time itself. The remainder of the subsystem and extreme limit tests required 11% of the total test time.

Valvetrain Dynamics

Valve train dynamic behavior determines the performance and durability of an engine. Dynamic performance was determined by evaluating the closing velocity and bounce of the valve as it returns to the valve seat. Strain gaging provides information about the loading of the system over the engine speed envelope with respect to camshaft angle. Strain gages are applied to the inner and outer arms at locations of uniform stress. FIG. 68 shows a strain gage attached to the SRFF. The outer and inner arms were instrumented to measure strain for the purpose of verifying the amount of load on the SRFF.

A Valve train Dynamics test was conducted to evaluate the performance capabilities of the valve train. The test was performed at nominal and limit total mechanical lash values. The nominal case is presented. A speed sweep from 1000 to 7500 rpm was performed, recording 30 valve events per engine speed. Post processing of the dynamics data allows calculation of valve closing velocity and valve bounce. The attached strain gages on the inner and outer arms of the SRFF indicate sufficient loading of the rocker arm at all engine speeds to prevent separation between valve train components or "pump-up" of the HLA. Pump-up occurs when the HLA compensates for valve bounce or valve train deflection causing the valve to remain open on the camshaft base circle. The minimum, maximum and mean closing velocities are shown to understand the distribution over the engine speed range. The high lift closing velocities are presented in FIG. 67. The closing velocities for high lift meet the design targets. The span of values varies by approximately 250 mm/s between the minimum and maximum at 7500 rpm while safely staying within the target.

FIG. 69 shows the closing velocity of the low lift camshaft profile.

Normal operation occurs up to 3500 rpm where the closing velocities remain below 200 mm/s, which is safely within the design margin for low lift. The system was designed to an over-speed condition of 5000 rpm in low lift mode where the maximum closing velocity is below the limit. Valve closing velocity design targets are met for both high and low lift modes.

Critical Shift

The Critical Shift test is performed by holding the latch pin at the critical point of engagement with the outer arm as shown in FIG. 27. The latch is partially engaged on the outer arm which presents the opportunity for the outer arm to disengage from the latch pin resulting in a momentary loss of control of the rocker arm. The bearing of the inner arm is impacted against the low lift camshaft lobe. The SRFF is tested to a quantity that far exceeds the number of critical shifts that are anticipated in a vehicle to show lifetime SRFF robustness. The Critical Shift test evaluates the latching mechanism for wear during latch disengagement as well as the bearing durability from the impact that occurs during a critical shift.

Figure 70:
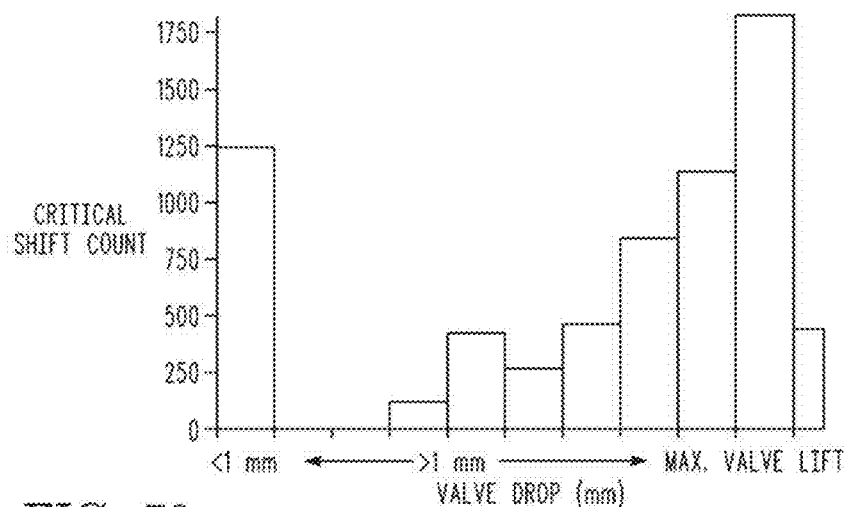
FIG. 70 is a valve drop height distribution.
Figure 71:
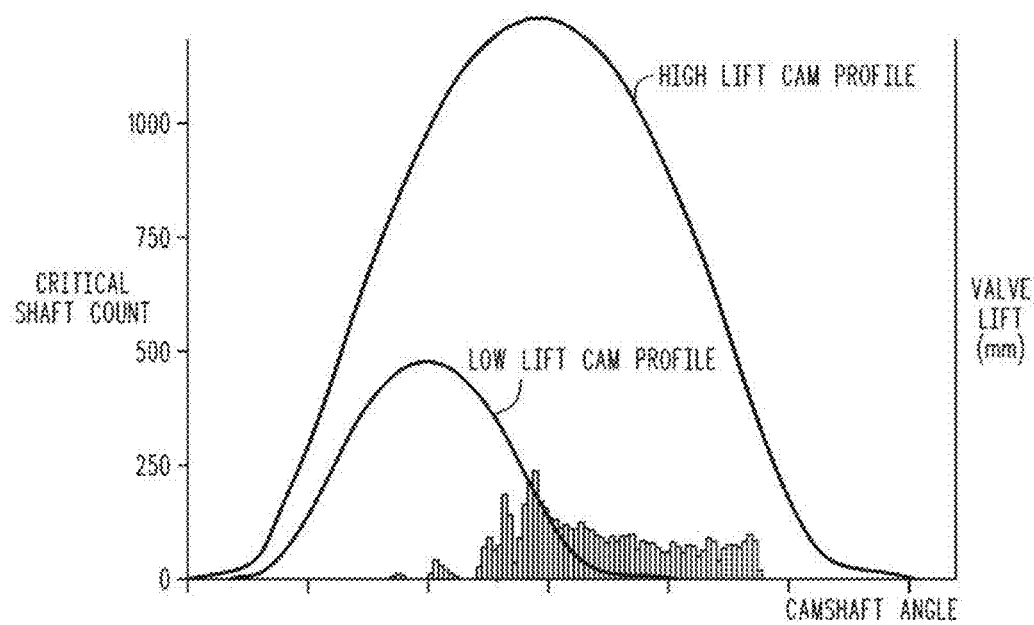
FIG. 71 displays the distribution of critical shifts with respect to camshaft angle.

The Critical Shift test was performed using a motorized engine similar to that shown in FIG. 63. The lash adjuster control gallery was regulated about the critical pressure. The engine is operated at a constant speed and the pressure is varied around the critical pressure to accommodate for system hysteresis. A Critical Shift is defined as a valve drop of greater than 1.0 mm. The valve drop height distribution of a typical SRFF is shown in FIG. 70. It should be noted that over 1000 Critical Shifts occurred at less than 1.0 mm which are tabulated but not counted towards test completion. FIG. 71 displays the distribution of critical shifts with respect to camshaft angle. The largest accumulation occurs immediately beyond peak lift with the remainder approximately evenly distributed.

Figure 72:
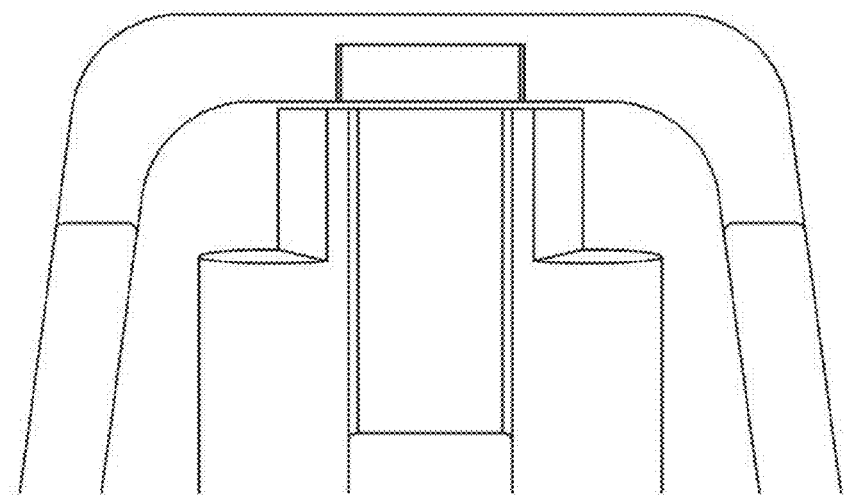
FIG. 72 show an end of a new outer arm before use.
Figure 73:
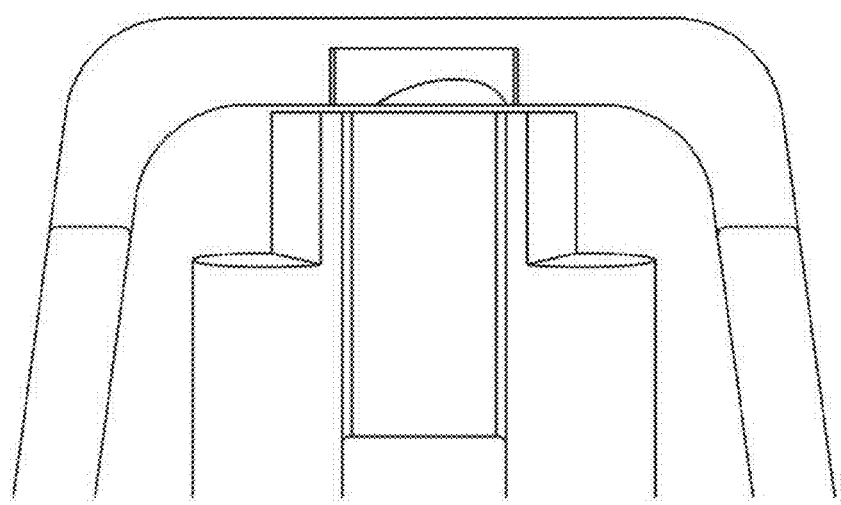
FIG. 73 shows typical wear of the outer arm after use.

The latching mechanism and bearing are monitored for wear throughout the test. The typical wear of the outer arm (FIG. 73) is compared to a new part (FIG. 72). Upon completion of the required critical shifts, the rocker arm is checked for proper operation and the test concluded. The edge wear shown did not have a significant effect on the latching function and the total mechanical lash as the majority of the latch shelf displayed negligible wear.

Subsystems

Figure 74:
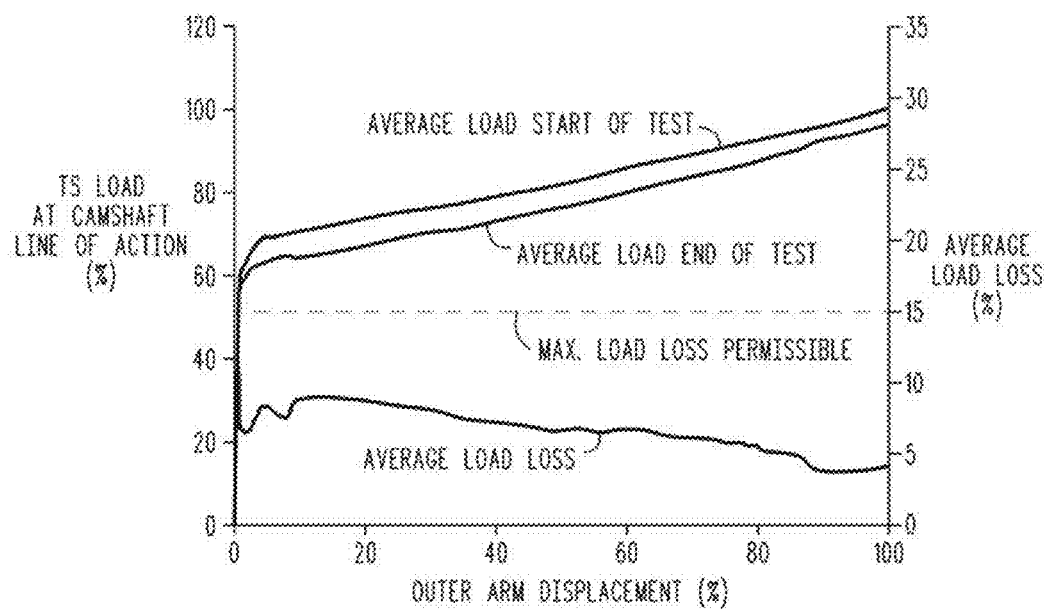
FIG. 74 illustrates average Torsion Spring Load Loss at end-of-life testing.

The subsystem tests evaluate particular functions and wear interfaces of the SRFF rocker arm. Switching Durability evaluates the latching mechanism for function and wear over the expected life of the SRFF. Similarly, Idle Speed Durability subjects the bearing and slider pad to a worst case condition including both low lubrication and an oil temperature of 130° C. The Torsion Spring Durability Test was accomplished by subjecting the torsion springs to approximately 25 million cycles. Torsion spring loads are measured throughout the test to measure degradation. Further confidence was gained by extending the test to 100 million cycles while not exceeding the maximum design load loss of 15%. FIG. 74 displays the torsion spring loads on the outer arm at start and end of test. Following 100 million cycles, there was a small load loss on the order of 5% to 10% which is below the 15% acceptable target and shows sufficient loading of the outer arm to four engine lives.

Accelerated System Aging

The Accelerated System Aging test is the comprehensive durability test used as the benchmark of sustained performance. The test represents the cumulative damage of the severe end-user. The test cycle averages approximately 5000 rpm with constant speed and acceleration profiles. The time per cycle is broken up as follows: 28% steady state, 15% low lift and cycling between high and low lift with the remainder under acceleration conditions. The results of testing show that the lash change in one-life of testing accounts for 21% of the available wear specification of the rocker arm. Accelerated System Aging test, consisting of 8 SRFF's, was extended out past the standard life to determine wear out modes of the SRFF. Total mechanical lash measurements were recorded every 100 test cycles once past the standard duration.

Figure 75:
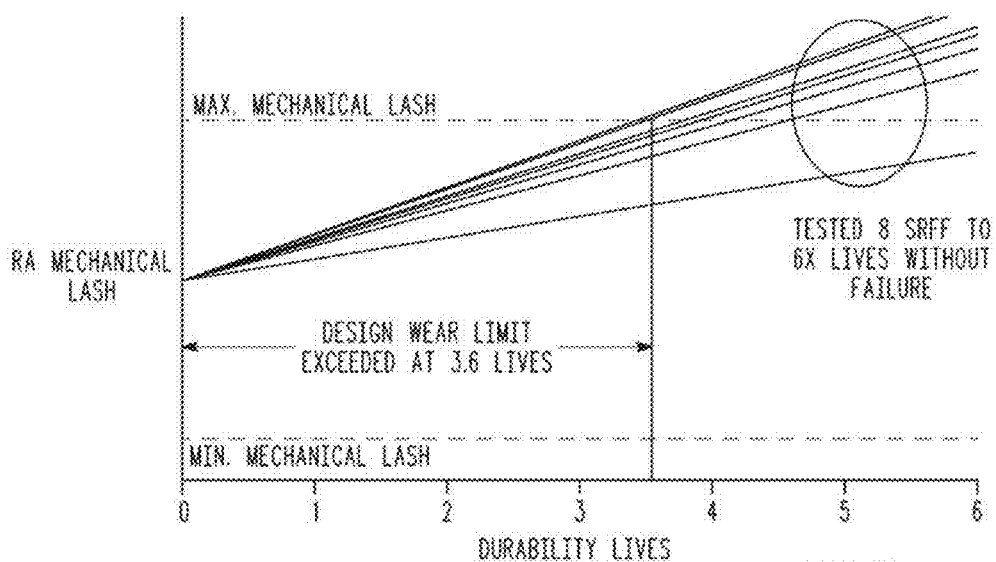
FIG. 75 illustrates the total mechanical lash change of Accelerated System Aging Tests.

The results of the accelerated system aging measurements are presented in FIG. 75 showing that the wear specification was exceeded at 3.6 lives. The test was continued and achieved six lives without failure. Extending the test to multiple lives displayed a linear change in mechanical lash once past an initial break in period. The dynamic behavior of the system degraded due to the increased total mechanical lash; nonetheless, functional performance remained intact at six engine lives.

5.2.5 Durability Test Results

Each of the tests discussed in the test plan were performed and a summary of the results are presented. The results of Valve train Dynamics, Critical Shift Durability, Torsion Spring Durability and finally the Accelerated System Aging test are shown.

The SRFF was subjected to accelerated aging tests combined with function-specific tests to demonstrate robustness and is summarized in Table 3.

TABLE 3

Durability Summary

| Durability Test | Lifetimes | Cycles | Valve Events total | # tests |
|---|---|---|---|---|
| Accelerated System Aging | 6 | | | |
| Switching | 1 (used oil) | | | |
| Torsion Spring | 3 | | | |
| Critical Shift | 4 | | | |
| Cold Start | >1 | | | |
| Overspeed (5000 rpm in low lift) | >1 | | | |
| Overspeed (7500 rpm in high lift) | >1 | | | |
| Bearing | | | 100M | 1 |
| Idle low lift | | | 27M | 2 |
| Idle high lift | >1 | | 27M | 2 |
| | >1 (dirty oil) | | 27M | 1 |

Legend:
1 engine lifetime = 200,000 miles (safe margin over the 150,000 mile requirement)

Figure 76:
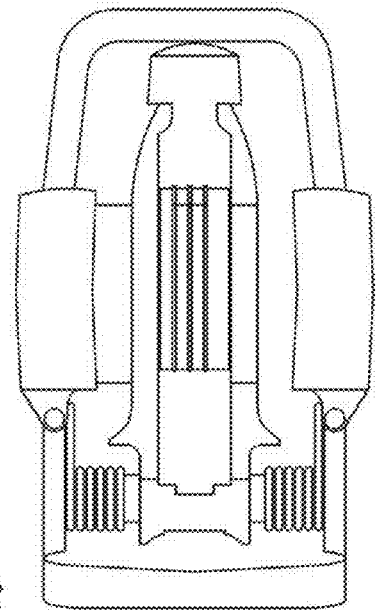
FIG. 76 illustrates end-of-life slider pads with the DLC coating, exhibiting minimal wear.

Durability was assessed in terms of engine lives totaling an equivalent 200,000 miles which provides substantial margin over the mandated 150,000 mile requirement. The goal of the project was to demonstrate that all tests show at least one engine life. The main durability test was the accelerated system aging test that exhibited durability to at least six engine lives or 1.2 million miles. This test was also conducted with used oil showing robustness to one engine life. A key operating mode is switching operation between high and low lift. The switching durability test exhibited at least three engine lives or 600,000 miles. Likewise, the torsion spring was robust to at least four engine lives or 800,000 miles. The remaining tests were shown to at least one engine life for critical shifts, over speed, cold start, bearing robustness and idle conditions. The DLC coating was robust to all conditions showing polishing with minimal wear, as shown in FIG. 76. As a result, the SRFF was tested extensively showing robustness well beyond a 200,000 mile useful life.

5.2.6 Durability Test Conclusions

The DVVL system including the SRFF, DFHLA and OCV was shown to be robust to at least 200,000 miles which is a safe margin beyond the 150,000 mile mandated requirement. The durability testing showed accelerated system aging to at least six engine lives or 1.2 million miles. This SRFF was also shown to be robust to used oil as well as aerated oil. The switching function of the SRFF was shown robust to at least three engine lives or 600,000 miles. All sub-system tests show that the SRFF was robust beyond one engine life of 200,000 miles.

Critical shift tests demonstrated robustness to 5000 events or at least one engine life. This condition occurs at oil pressure conditions outside of the normal operating range and causes a harsh event as the outer arm slips off the latch such that the SRFF transitions to the inner arm. Even though the condition is harsh, the SRFF was shown robust to this type of condition. It is unlikely that this event will occur in serial production. Testing results show that the SRFF is robust to this condition in the case that a critical shift occurs.

The SRFF was proven robust for passenger car application having engine speeds up to 7300 rpm and having burst speed conditions to 7500 rpm. The firing engine tests had consistent wear patterns to the non-firing engine tests described in this paper. The DLC coating on the outer arm slider pads was shown to be robust across all operating conditions. As a result, the SRFF design is appropriate for four cylinder passenger car applications for the purpose of improving fuel economy via reduced engine pumping losses at part load engine operation. This technology could be extended to other applications including six cylinder engines. The SRFF was shown to be robust in many cases that far exceeded automotive requirements. Diesel applications could be considered with additional development to address increased engine loads, oil contamination and lifetime requirements.

5.3 Slider PAD/DLC Coating Wear 5.3.1 Wear Test Plan

This section describes the test plan utilized to investigate the wear characteristics and durability of the DLC coating on the outer arm slider pad. The goal was to establish relationships between design specifications and process parameters and how each affected the durability of the sliding pad interface. Three key elements in this sliding interface are: the camshaft lobe, the slider pad, and the valve train loads. Each element has factors which needed to be included in the test plan to determine the effect on the durability of the DLC coating. Detailed descriptions for each component follow:

Camshaft—The width of the high lift camshaft lobes were specified to ensure the slider pad stayed within the camshaft lobe during engine operation. This includes axial positional changes resulting from thermal growth or dimensional variation due to manufacturing. As a result, the full width of the slider pad could be in contact with the camshaft lobe without risk of the camshaft lobe becoming offset to the slider pad. The shape of the lobe (profile) pertaining to the valve lift characteristics had also been established in the development of the camshaft and SRFF. This left two factors which needed to be understood relative to the durability of the DLC coating; the first was lobe material and the second was the surface finish of the camshaft lobe. The test plan included cast iron and steel camshaft lobes tested with different surface conditions on the lobe. The first included the camshafts lobes as prepared by a grinding operation (as-ground). The second was after a polishing operation improved the surface finish condition of the lobes (polished).

Figure 77:
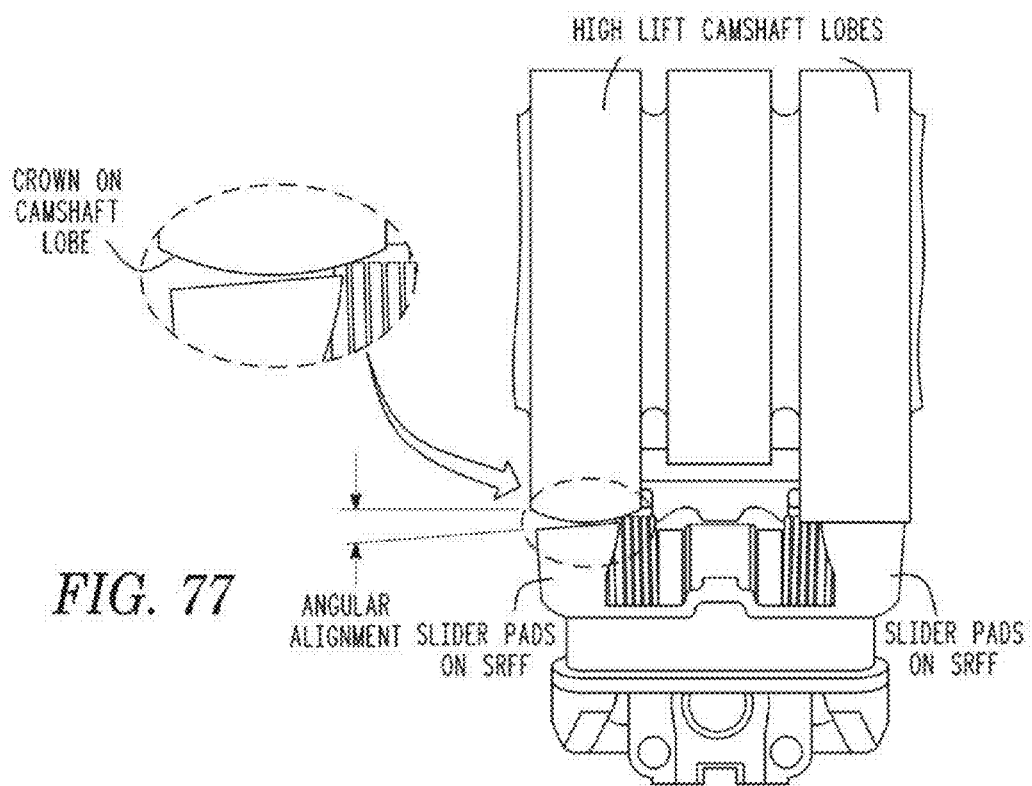
FIG. 77 is a camshaft surface embodiment employing a crown shape.

Slider Pad—The slider pad profile was designed to specific requirements for valve lift and valve train dynamics. FIG. 77 is a graphic representation of the contact relationship between the slider pads on the SRFF and the contacting high lift lobe pair. Due to expected manufacturing variations, there is an angular alignment relationship in this contacting surface which is shown in the FIG. 77 in exaggerated scale. The crowned surface reduces the risk of edge loading the slider pads considering various alignment conditions. However, the crowned surface adds manufacturing complexity, so the effect of crown on the coated interface performance was added to the test plan to determine its necessity.

The FIG. 77 shows the crown option on the camshaft surface as that was the chosen method. Hertzian stress calculations based on expected loads and crown variations were used for guidance in the test plan. A tolerance for the alignment between the two pads (included angle) needed to be specified in conjunction with the expected crown variation. The desired output of the testing was a practical understanding of how varying degrees of slider pad alignment affected the DLC coating. Stress calculations were used to provide a target value of misalignment of 0.2 degrees. These calculations served only as a reference point. The test plan incorporated three values for included angles between the slider pads: <0.05 degrees, 0.2 degrees and 0.4 degrees. Parts with included angles below 0.05 degrees are considered flat and parts with 0.4 degrees represent a doubling of the calculated reference point.

The second factor on the slider pads which required evaluation was the surface finish of the slider pads before DLC coating. The processing steps of the slider pad included a grinding operation which formed the profile of the slider pad and a polishing step to prepare the surface for the DLC coating. Each step influenced the final surface finish of the slider pad before DLC coating was applied. The test plan incorporated the contribution of each step and provided results to establish an in-process specification for grinding and a final specification for surface finish after the polishing step. The test plan incorporated the surface finish as ground and after polish.

Valve train load—The last element was the loading of the slider pad by operation of the valve train. Calculations provided a means to transform the valve train loads into stress levels. The durability of both the camshaft lobe and the DLC coating was based on the levels of stress each could withstand before failure. The camshaft lobe material should be specified in the range of 800-1000 MPa (kinematic contact stress). This range was considered the nominal design stress. In order to accelerate testing, the levels of stress in the test plan were set at 900-1000 MPa and 1125-1250 MPa. These values represent the top half of the nominal design stress and 125% of the design stress respectively.

The test plan incorporated six factors to investigate the durability of the DLC coating on the slider pads: (1) the camshaft lobe material, (2) the form of the camshaft lobe, (3) the surface conditions of the camshaft lobe, (4) the angular alignment of the slider pad to the camshaft lobe, {S} the surface finish of the slider pad and (6) the stress applied to the coated slider pad by opening the valve. A summary of the elements and factors outlined in this section is shown in Table 1.

TABLE 1

Test Plan Elements and Factors

| Element | Factor |
| --- | --- |
| Camshaft | Material: Cast Iron, steel |
|  | Surface Finish: as ground, polished |
|  | Lobe Form: Flat, Crowned |
| Slider Pad | Angular Alignment: <0.05, 0.2, 0.4 degrees |
|  | Surface Finish: as ground, polished |
| Valvetrain Load | Stress Level: Max Design, 125% Max Design |

5.3.2 Component Wear Test Results

Figure 78:
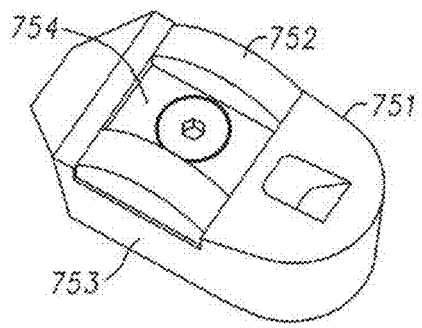
FIG. 78 illustrates a pair of slider pads attached to a support rocker on a test coupon.

The goal of testing was to determine relative contribution each of the factors had on the durability of the slider pad DLC coating. The majority of the test configurations included a minimum of two factors from the test plan. The slider pads 752 were attached to a support rocker 753 on a test coupon 751 shown in FIG. 78. All the configurations were tested at the two stress levels to allow for a relative comparison of each of the factors. Inspection intervals ranged from 20-50 hours at the start of testing and increased to 300-500 hour intervals as results took longer to observe. Testing was suspended when the coupons exhibited loss of the DLC coating or there was a significant change in the surface of the camshaft lobe. The testing was conducted at stress levels higher than the application required hastening the effects of the factors. As a result, the engine life assessment described is a conservative estimate and was used to demonstrate the relative effect of the tested factors. Samples completing one life on the test stand were described as adequate. Samples exceeding three lives without DLC loss were considered excellent. The test results were separated into two sections to facilitate discussion. The first section discusses results from the cast iron camshafts and the second examines results from the steel camshafts.

Test Results for Cast Iron Camshafts

The first tests utilized cast iron camshaft lobes and compared slider pad surface finish and two angular alignment configurations. The results are shown in Table 2 below. This table summarizes the combinations of slider pad included angle and surface conditions tested with the cast iron camshafts. Each combination was tested at the max: design and 125% max design load condition. The values listed represent the number of engine lives each combination achieved during testing.

TABLE 2

Cast Iron Test Matrix and Results
Cast Iron Camshaft

| Lobe Surface Finish | | | Ground | | |
|---|---|---|---|---|---|
| Lobe Profile | | | Flat | | |
| Slider Pad Configuration | 0.2 deg. | Ground | 0.1 | 0.1 | |
| | | Polished | 0.5 | 0.3 | Engine Lives |
| | Flat | Ground | 0.3 | 0.2 | |
| | | Polished | 0.75 | 0.4 | |
| Included Angle | | Surface Preparation | Max Design | 125% Max Design Valvetrain Load | |

The camshafts from the tests all developed spalling which resulted in the termination of the tests. The majority developed spalling before half an engine life. The spalling was more severe on the higher load parts but also present on the max design load parts. Analysis revealed both loads exceeded the capacity of the camshaft. Cast iron camshaft lobes are commonly utilized in applications with rolling elements containing similar load levels; however, in this sliding interface, the material was not a suitable choice.

Figure 79A:
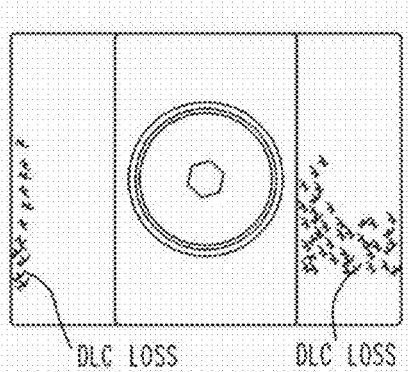
FIG. 79A illustrates DLC coating loss early in the testing of a coupon.

The inspection intervals were frequent enough to study the effect the surface finish had on the durability of the coating. The coupons with the as-ground surface finish suffered DLC coating loss very early in the testing. The coupon shown in FIG. 79A illustrates a typical sample of the DLC coating loss early in the test.

Scanning electron microscope (SEM) analysis revealed the fractured nature of the DLC coating. The metal surface below the DLC coating did not offer sufficient support to the coating. The coating is significantly harder than the metal to which it is bonded; thus, if the base metal significantly deforms the DLC may fracture as a result. The coupons that were polished before coating performed well until the camshaft lobes started to spall. The best result for the cast iron camshafts was 0.75 lives with the combination of the flat, polished coupons at the max design load.

Test Results for Steel Camshafts

The next set of tests incorporated the steel lobe camshafts. A summary of the test combinations and results is listed in Table 3. The camshaft lobes were tested with four different configurations: (1) surface finish as ground with flat lobes, (2) surface finish as ground with crowned lobes, (3) polished with minimum crowned lobes and (4) polished with nominal crown on the lobes. The slider pads on the coupons were polished before DLC coating and tested at three angles: (1) flat (less than 0.05 degrees of included angle), (2) 0.2 degrees of included angle and (3) 0.4 degrees of included angle. The loads for all the camshafts were set at max design or 125% of the max design level.

TABLE 3

Steel Camshaft Test Matrix and Results

| | | | Lobe Surface Finish | | Ground | | Polished | | | |
|---|---|---|---|---|---|---|---|---|---|---|
| | | | Steel Camshaft | | | | | | | |
| | | | Lobe Profile | | Flat | | Crown | | | |
| | | | | | | | Minimum | | Nominal | |
| Slider Pad Configuration | 0.4 deg. | Polished | | | 0.1 | 0.75 | 1.5 | 2.3 | 2.9 | 2.6 | Engine Lives |
| | 0.2 deg. | Polished | | | 1.6 | — | 3.3 | 2.8 | 3.1 | 3 | |
| | Flat | Polished | | | — | 1.8 | 2.6 | 2.2 | 3.3 | 3 | |
| | Included Angle | Surface Preparation | | | Max Design | 125% Max Design | Max Design | 125% Max Design | Max Design | 125% Max Design | |
| | | | | | | | | Valve train Load | | | |

The test samples which incorporated as-ground flat steel camshaft lobes and 0.4 degree included angle coupons at the 125% design load levels did not exceed one life. The samples tested at the maximum design stress lasted one life but exhibited the same effects on the coating. The 0.2 degree and flat samples performed better but did not exceed two lives.

This test was followed with ground, flat, steel camshaft lobes and coupons with 0.2 degree included angle and flat coupons. The time required before observing coating loss on the 0.2 degree samples was 1.6 lives. The flat coupons ran slightly longer achieving 1.8 lives. The pattern of DLC loss on the flat samples was non-uniform with the greatest losses on the outside of the contact patch. The loss of coating on the outside of the contact patches indicated the stress experienced by the slider pad was not uniform across its width. This phenomenon is known as "edge effect". The solution for reducing the stress at the edges of two aligned elements is to add a crown profile to one of the elements. The application utilizing the SRFF has the crowned profile added to the camshaft.

The next set of tests incorporated the minimum value of crown combined with 0.4, 0.2 degree and flat polished slider pads. This set of tests demonstrated the positive consequence of adding crown to the camshaft. The improvement in the 125% max load was from 0.75 to 1.3 lives for the 0.4 degree samples. The flat parts exhibited a smaller improvement from 1.8 to 2.2 lives for the same load.

Figure 79B:
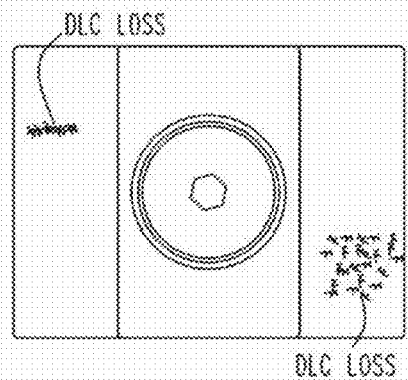
FIG. 79B shows a typical example of one of the coupons tested at the max design load with 0.2 degrees of included angle.

The last set of tests included all three angles of coupons with polished steel camshaft lobes machined with nominal crown values. The most notable difference in these results is the interaction between camshaft crown and the angular alignment of the slider pads to the camshaft lobe. The flat and 0.2 degree samples exceeded three lives at both load levels. The 0.4 degree samples did not exceed two lives. FIG. 79B shows a typical example of one of the coupons tested at the max design load with 0.2 degrees of included angle.

These results demonstrated the following: (1) the nominal value of camshaft crown was effective in mitigating slider pad angular alignment up to 0.2 degrees to flat; (2) the mitigation was effective at max design loads and 125% max design loads of the intended application and, (3) polishing the camshaft lobes contributes to the durability of the DLC coating when combined with slider pad polish and camshaft lobe crown.

Figure 80:
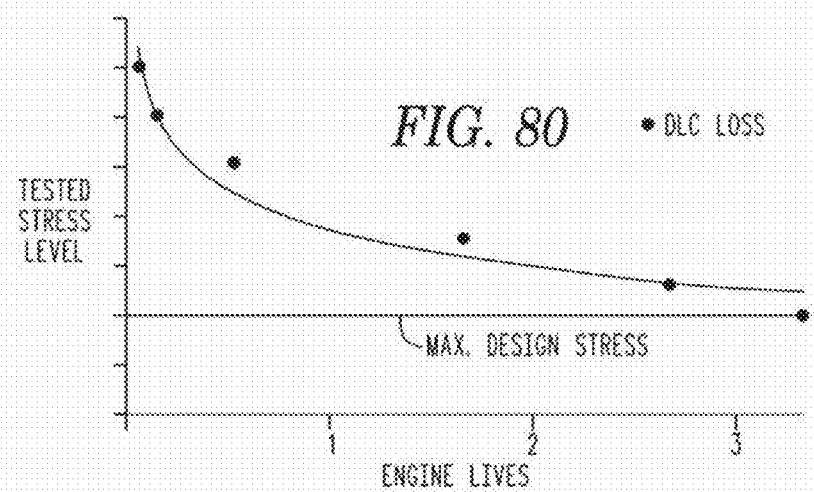
FIG. 80 is a graph of tested stress level vs. engine lives for a test coupon having DLC coating.

Each test result helped to develop a better understanding of the effect stress had on the durability of the DLC coating. The results are plotted in FIG. 80.

The early tests utilizing cast iron camshaft lobes did not exceed half an engine life in a sliding interface at the design loads. The next improvement came in the form of identifying 'edge effect'. The addition of crown to the polished camshaft lobes combined with a better understanding of allowable angular alignment, improved the coating durability to over three lives. The outcome is a demonstrated design margin between the observed test results and the maximum design stress for the application at each estimated engine life.

Figure 81:
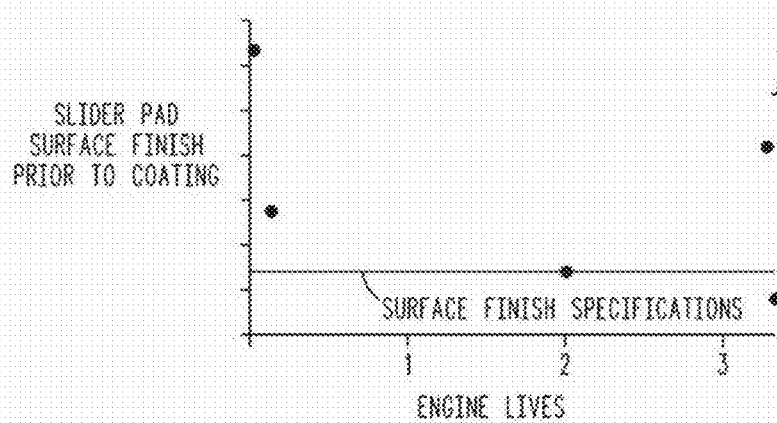
FIG. 81 is a graph showing the increase in engine lifetimes for slider pads having polished and non-polished surfaces prior to coating with a DLC coating.

The effect surface finish has on DLC durability is most pronounced in the transition from coated samples as-ground to coated coupons as-polished. Slider pads tested as-ground and coated did not exceed one third engine life as shown in FIG. 81. Improvements in the surface finish of the slider pad provided greater load carrying capability of the substrate below the coating and improved overall durability of the coated slider pad.

The results from the cast iron and steel camshaft testing provided the following: (1) a specification for angular alignment of the slider pads to the camshaft, (2) clear evidence that the angular alignment specification was compatible with the camshaft lobe crown specification, (3) the DLC coating will remain intact within the design specifications for camshaft lobe crown and slider pad alignment beyond the maximum design load, (4) a polishing operation is required after the grinding of the slider pad, (5) an in-process specification for the grinding operation, (6) a specification for surface finish of the slider pads prior to coating and (7) a polish operation on the steel camshaft lobes contributes to the durability of the DLC coating on the slider pad.

Figure 82:
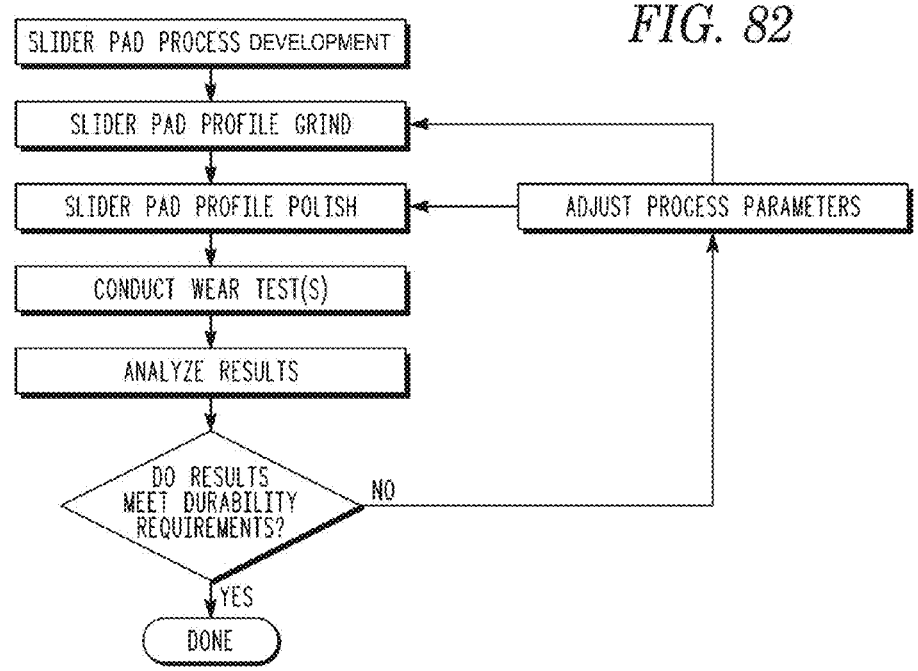
FIG. 82 is a flowchart illustrating the development of the production grinding and polishing processes that took place concurrently with the testing.

5.4 Slider Pad Manufacturing Development 5.4.1 Slider Pad Manufacturing Development Description The outer arm utilizes a machined casting. The prototype parts, machined from billet stock, had established targets for angular variation of the slider pads and the surface finish before coating. The development of the production grinding and polishing processes took place concurrently to the testing, and is illustrated in FIG. 82. The test results provided feedback and guidance in the development of the manufacturing process of the outer arm slider pad. Parameters in the process were adjusted based on the results of the testing and new samples machined were subsequently evaluated on the test fixture.

This section describes the evolution of the manufacturing process for the slider pad from the coupon to the outer arm of the SRFF.

The first step to develop the production grinding process was to evaluate different machines. A trial run was conducted on three different grinding machines. Each machine utilized the same vitrified cubic boron nitride (CBN) wheel and dresser. The CBN wheel was chosen as it offers (1) improved part to part consistency, (2) improved accuracy in applications requiring tight tolerances and (3) improved efficiency by producing more pieces between dress cycles compared to aluminum oxide. Each machine ground a population of coupons using the same feed rate and removing the same amount of material in each pass. A fixture was provided allowing the sequential grinding of coupons. The trial was conducted on coupons because the samples were readily polished and tested on the wear rig. This method provided an impartial means to evaluate the grinders by holding parameters like the fixture, grinding wheel and dresser as constants.

Figure 83:
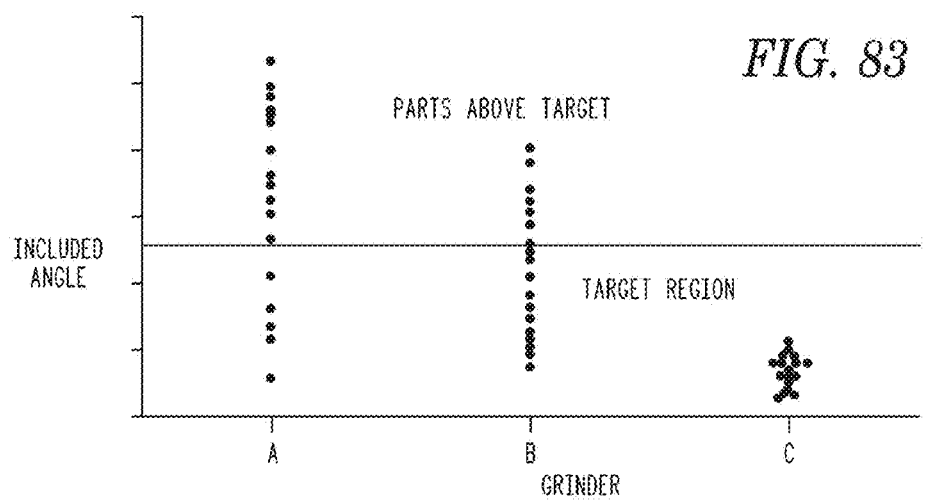
FIG. 83 shows the results of the slider pad angle control relative to three different grinders.

Measurements were taken after each set of samples were collected. Angular measurements of the slider pads were obtained using a Leitz PMM 654 coordinate measuring machine (CMM). Surface finish measurements were taken on a Mahr LD 120 profilometer. FIG. 83 shows the results of the slider pad angle control relative to the grinder equipment. The results above the line are where a noticeable degradation of coating performance occurred. The target region indicates that the parts tested to this included angle show no difference in life testing. Two of the grinders failed to meet the targets for included angle of the slider pad on the coupons. The third did very well by comparison. The test results from the wear rig confirmed the sliding interface was sensitive to included angles above this target. The combination of the grinder trials and the testing discussed in the previous section helped in the selection of manufacturing equipment.

Figure 84:
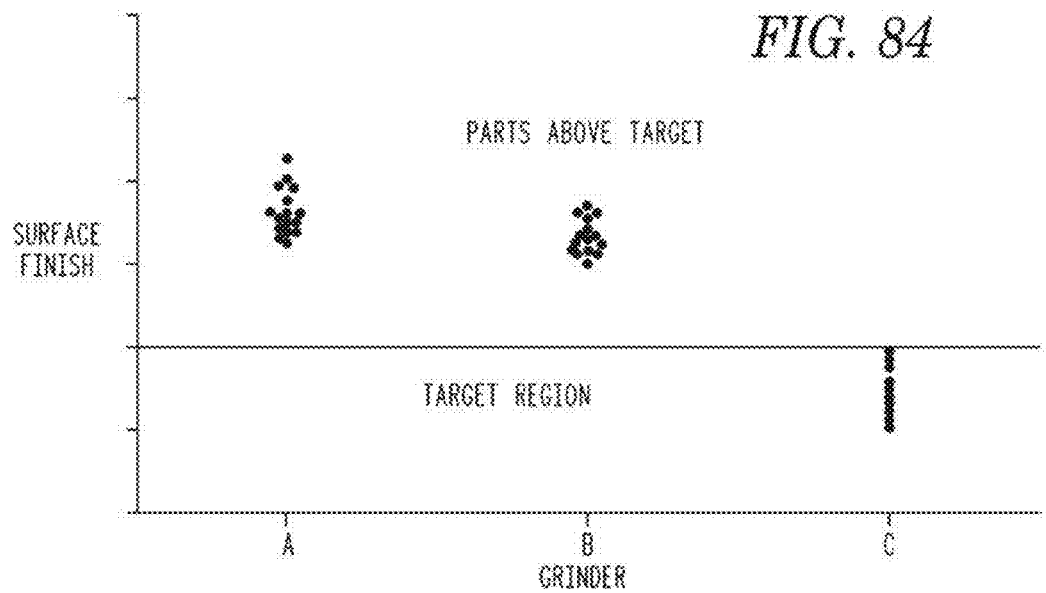
FIG. 84 illustrates surface finish measurements for three different grinders.

FIG. 84 summarizes the surface finish measurements of the same coupons as the included angle data shown in FIG. 83. The surface finish specification for the slider pads was established as a result of these test results. Surface finish values above the limit line shown have reduced durability.

The same two grinders (A and B) also failed to meet the target for surface finish. The target for surface finish was established based on the net change of surface finish in the polishing process for a given population of parts. Coupons that started out as outliers from the grinding process remained outliers after the polishing process; therefore, controlling surface finish at the grinding operation was important to be able to produce a slider pad after polish that meets the final surface finish prior to coating.

The measurements were reviewed for each machine. Grinders A and B both had variation in the form of each pad in the angular measurements. The results implied the grinding wheel moved vertically as it ground the slider pads. Vertical wheel movement in this kind of grinder is related to the overall stiffness of the machine. Machine stiffness also can affect surface finish of the part being ground. Grinding the slider pads of the outer arm to the specifications validated by the test fixture required the stiffness identified in Grinder C.

The lessons learned grinding coupons were applied to development of a fixture for grinding the outer arm for the SRFF. However the outer arm offered a significantly different set of challenges. The outer arm is designed to be stiff in the direction it is actuated by the camshaft lobes. The outer arm is not as stiff in the direction of the slider pad width.

The grinding fixture needed to (1) damp each slider pad without bias, (2) support each slider pad rigidly to resist the forces applied by grinding and (3) repeat this procedure reliably in high volume production.

Figure 85:
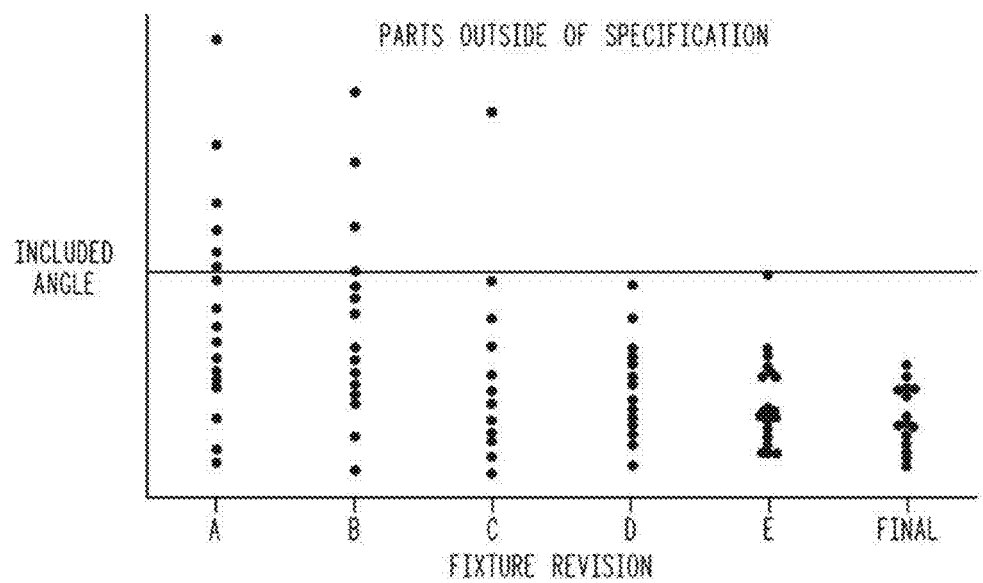
FIG. 85 illustrates the results of six different fixtures to hold the outer arm during the slider pad grinding operations.

The development of the outer arm fixture started with a manual clamping style block. Each revision of the fixture attempted to remove bias from the damping mechanism and reduce the variation of the ground surface. FIG. 85 illustrates the results through design evolution of the fixture that holds the outer arm during the slider pad grinding operation.

The development completed by the test plan set boundaries for key SRFF outer arm slider pad specifications for surface finish parameters and form tolerance in terms of included angle. The influence of grind operation surface finish to resulting final surface finish after polishing was studied and used to establish specifications for the intermediate process standards. These parameters were used to establish equipment and part fixture development that assure the coating performance will be maintained in high volume production.

5.4.2 Slider Pad Manufacturing Development Conclusions

The DLC coating on the SRFF slider pads that was configured in a DVVL system including DFHLA and OCV components was shown to be robust and durable well beyond the passenger car lifetime requirement. Although DLC coating has been used in multiple industries, it had limited production for the automotive valve train market. The work identified and quantified the effect of the surface finish prior to the DLC application, DLC stress level and the process to manufacture the slider pads. This technology was shown to be appropriate and ready for the serial production of a SRFF slider pad.

The surface finish was critical to maintaining DLC coating on the slider pads throughout lifetime tests. Testing results showed that early failures occurred when the surface finish was too rough. The paper highlighted a regime of surface finish levels that far exceeded lifetime testing requirements for the Ole This recipe maintained the DLC intact on top of the chrome nitride base layer such that the base metal of the SRFF was not exposed to contacting the camshaft lobe material.

The stress level on the DLC slider pad was also identified and proven. The testing highlighted the need for angle control for the edges of the slider pad. It was shown that a crown added to the camshaft lobe adds substantial robustness to edge loading effects due to manufacturing tolerances. Specifications set for the angle control exhibited testing results that exceeded lifetime durability requirements.

The camshaft lobe material was also found to be an important factor in the sliding interface. The package requirements for the SRFF based DVVL system necessitated a robust solution capable of sliding contact stresses up to 1000 MPa. The solution at these stress levels, a high quality steel material, was needed to avoid camshaft lobe spalling that would compromise the life of the sliding interface. The final system with the steel camshaft material, crowned and polished was found to exceed lifetime durability requirements.

The process to produce the slider pad and DLC in a high volume manufacturing process was discussed. Key manufacturing development focused on grinding equipment selection in combination with the grinder abrasive wheel and the fixture that holds the SRFF outer arm for the production slider pad grinding process. The manufacturing processes selected show robustness to meeting the specifications for assuring a durable sliding interface for the lifetime of the engine.

The DLC coating on the slider pads was shown to exceed lifetime requirements which are consistent with the system DVVL results. The DLC coating on the outer arm slider pads was shown to be robust across all operating conditions. As a result, the SRFF design is appropriate for four cylinder passenger car applications for the purpose of improving fuel economy via reduced engine pumping losses at part load engine operation. The DLC coated sliding interface for a DVVL was shown to be durable and enables VVA technologies to be utilized in a variety of engine valve train applications.

II. Single-Lobe Cylinder Deactivation System (CDA-1L) System Embodiment Description 1. CDA-1L System Overview CDA-1L (FIG. 88) is a compact cam-driven single-lobe cylinder deactivation (CDA-1L) switching rocker arm 1100 installed on a piston-driven internal combustion engine, and actuated with the combination of dual-feed hydraulic lash adjusters (DFHLA) 110 and oil control valves (OCV) 822.

Now, in reference to FIGS. 11, 88, 99, and 100, the CDA-1L layout includes four main components: Oil control valve (OCV) 822, dual feed hydraulic lash adjuster (DFHLA), CDA-1L switching rocker arm assembly (also referred to SRFF-1L) 1100; single-lobe cam 1320. The default configuration is in the normal-lift (latched) position where the inner arm 1108 and outer arm 1102 of the CDA-1L rocker arm 1100 are locked together, causing the engine valve to open and allowing the cylinder to operate as it would in a standard valvetrain. The DFHLA 110 has two oil ports. The lower oil port 512 provides lash compensation and is fed engine oil similar to a standard HLA. The upper oil port 506, referred as the switching pressure port, provides the conduit between controlled oil pressure from the OCV 822 and the latch 1202 in the SRFF-1L. As noted, when the latch is engaged, the inner arm 1108 and outer arm 1102 in the SRFF-1L 1110 operate together like a standard rocker arm to open the engine valve. In the no-lift (unlatched)

position, the inner arm 1108 and outer arm 1102 can move independently to enable cylinder deactivation.

Figure 88:
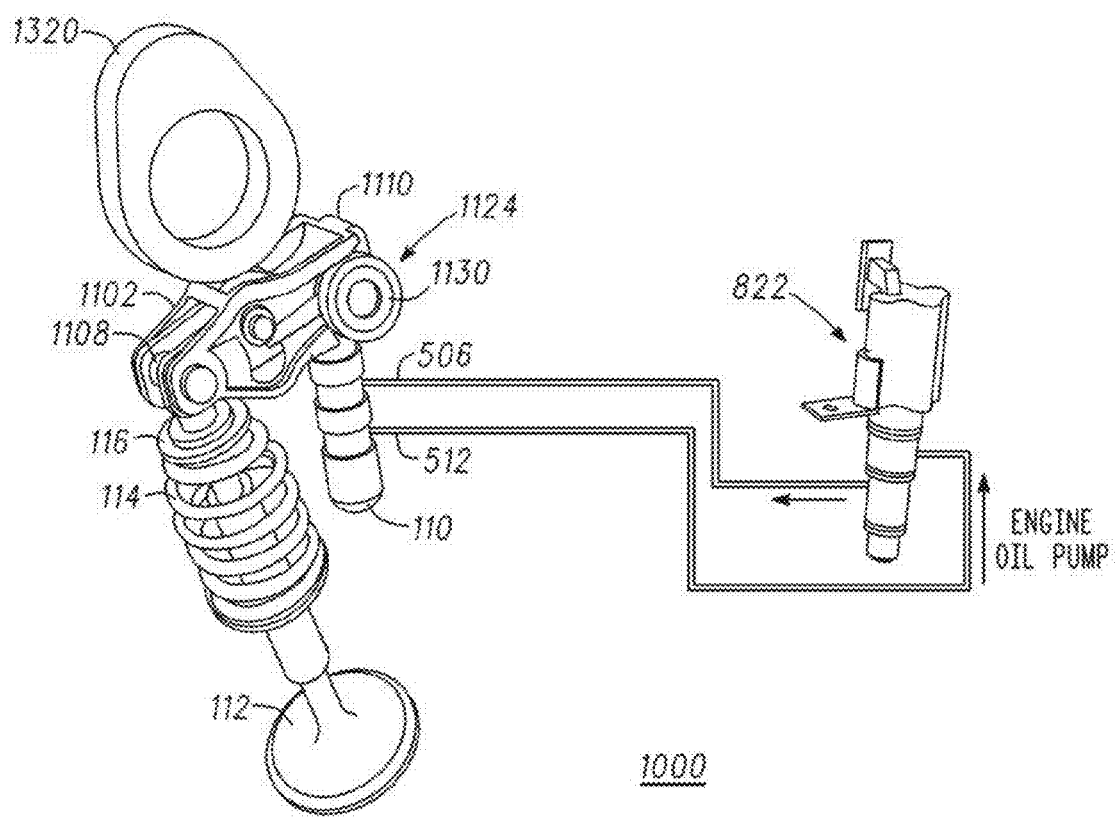
FIG. 88 shows a perspective view of an exemplary CDA-1L layout.
Figure 99:
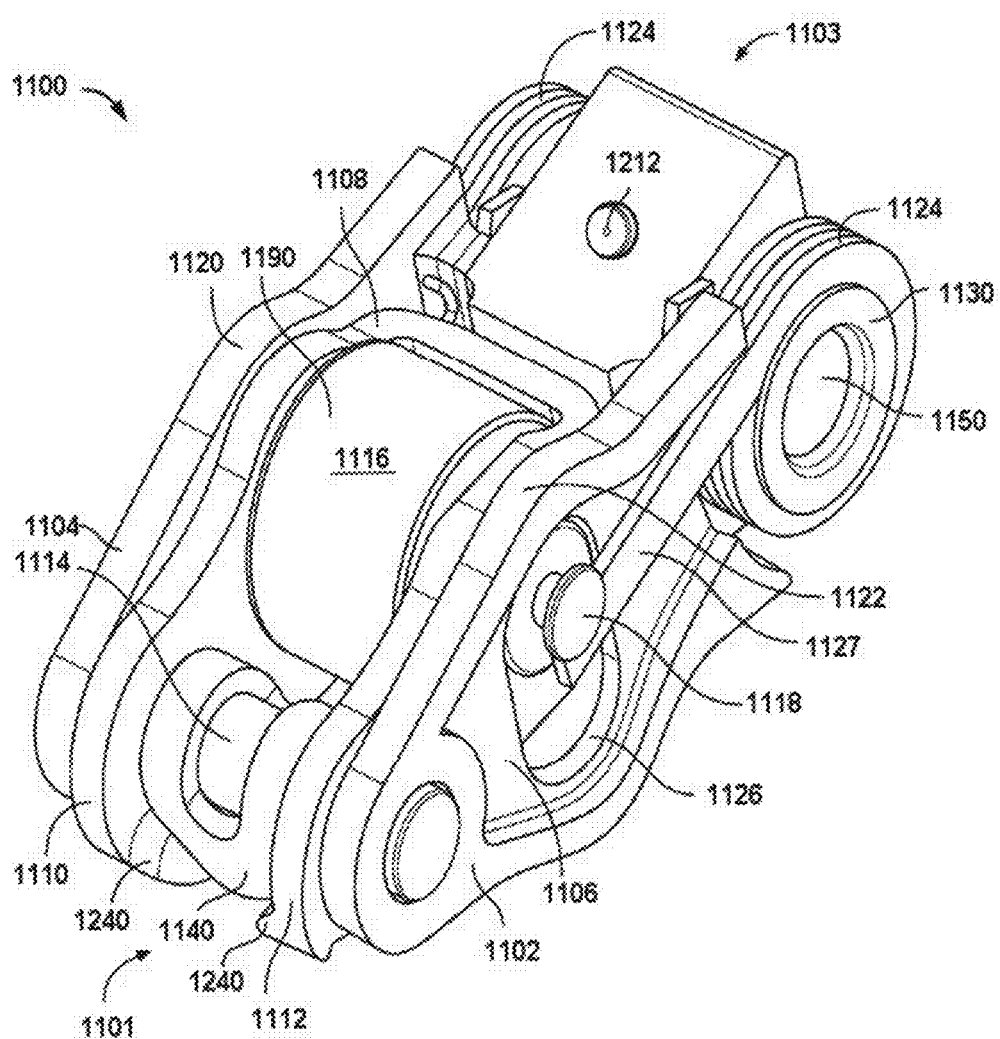
FIG. 99 illustrates an SRFF-1L rocker arm assembly.

As shown in FIGS. 88 and 99, a pair of lost motion torsion springs 1124 are incorporated to bias the position of the inner arm 1108 so that it always maintains continuous contact with the camshaft lobe 1320. The lost motion torsion springs 1124 require a higher preload than designs that use multiple lobes to facilitate continuous contact between the camshaft lobe 1320 and the inner arm roller bearing 1116.

Figure 89A:
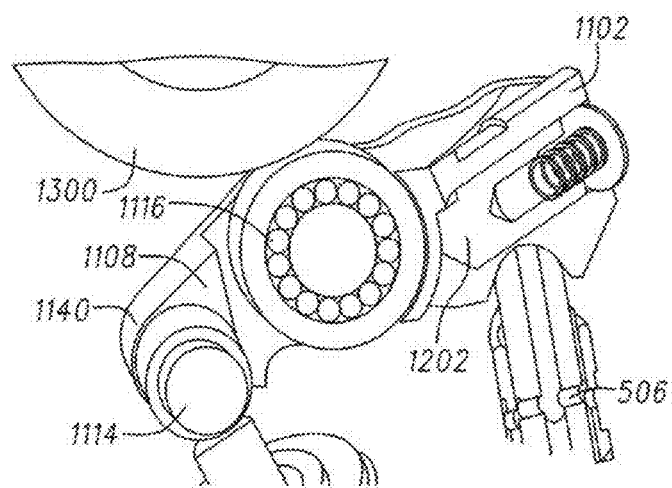
FIG. 89A shows a partial cut-away side elevational view of an exemplary SRFF-1L system with a latch mechanism and roller bearing.
Figure 89B:
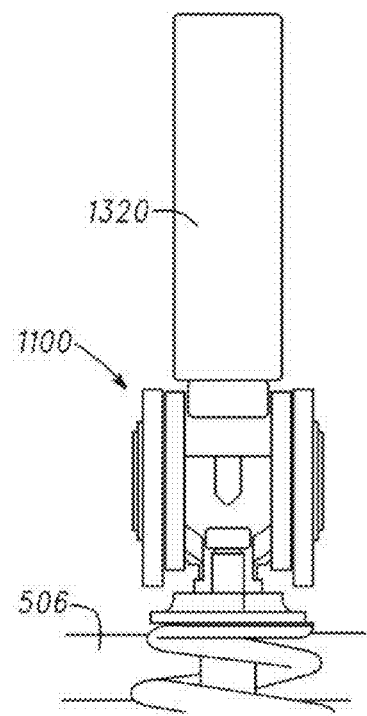
FIG. 89B shows a front elevation view of the exemplary SRFF-1L system of FIG. 89A.

FIG. 89 shows a detailed view of the inner arm 1108 and outer arm 1102 in the SRFF-1L 1100 along with the latch 1202 mechanism and roller bearing 1116. The functionality of the SRFF-1L 1100 design maintains similar packaging and reduces the complexity of the camshaft 1300 compared to configurations with more than one lobe, for example, separate no-lift lobes for each SRFF position can be eliminated.

Figure 91:
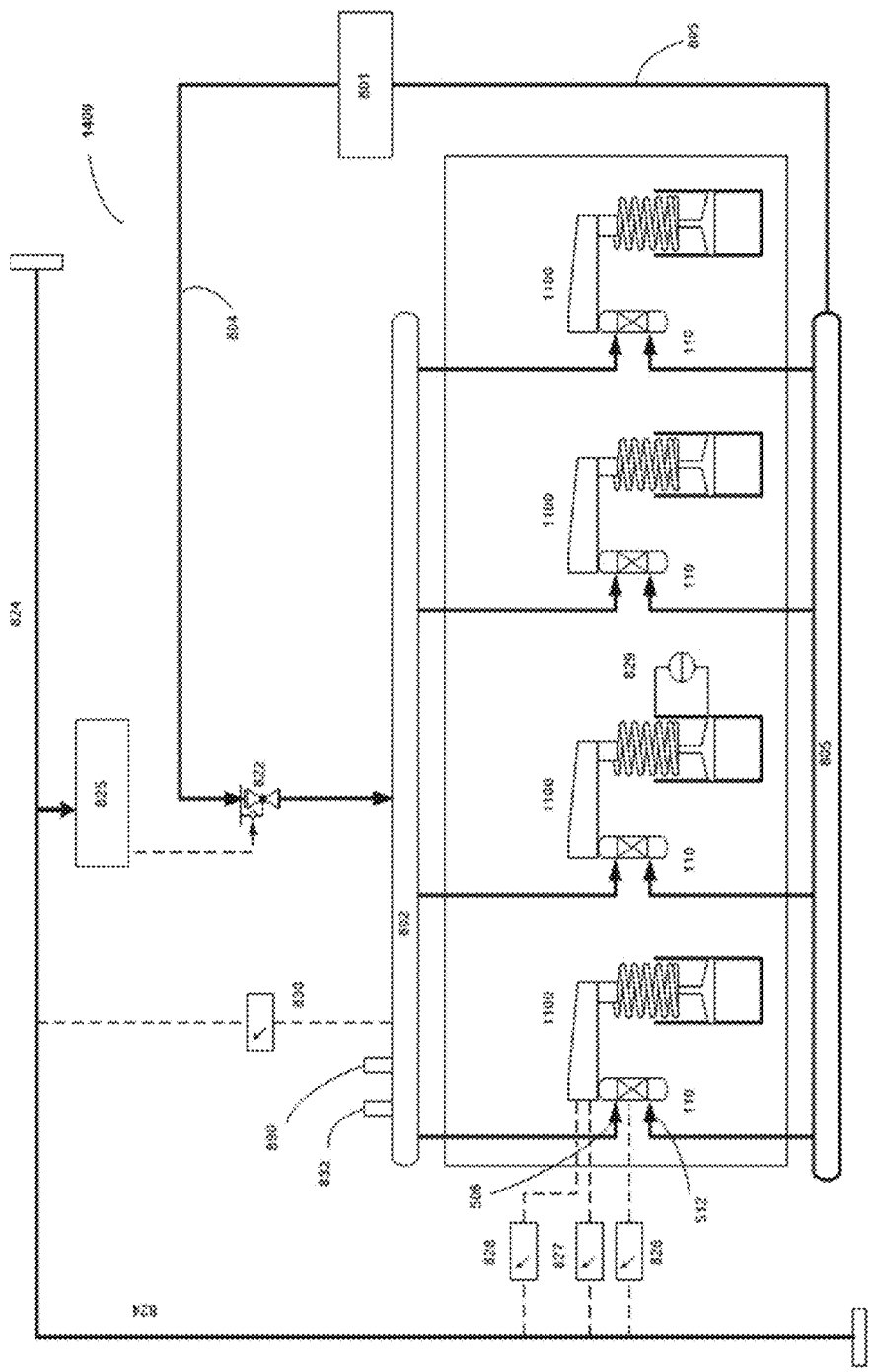
FIG. 91 shows a hydraulic fluid control system.

As illustrated in FIG. 91, a complete CDA system 1400 for one engine cylinder includes one OCV 822, two SRFF-1L rocker arms 1100 for the exhaust, two SRFF-1L rocker arms 1100 for the intake, one DFHLA 110 for each SRFF-1L 1100 and a single-lobe camshaft 1300 that drives each SRFF-1L 1100. Additionally, the CDA 1400 system is designed such that the SRFF-1L 1100 and DFHLA 110 are identical for both the intake and exhaust. This layout allows for a single OCV 822 to simultaneously switch each of the four SRFF-1L rocker arm 1100 assemblies necessary for cylinder deactivation. Finally, the system is controlled electronically from the ECU 825 to the OCV 822 to switch between normal-lift mode and no-lift mode.

Figure 90:
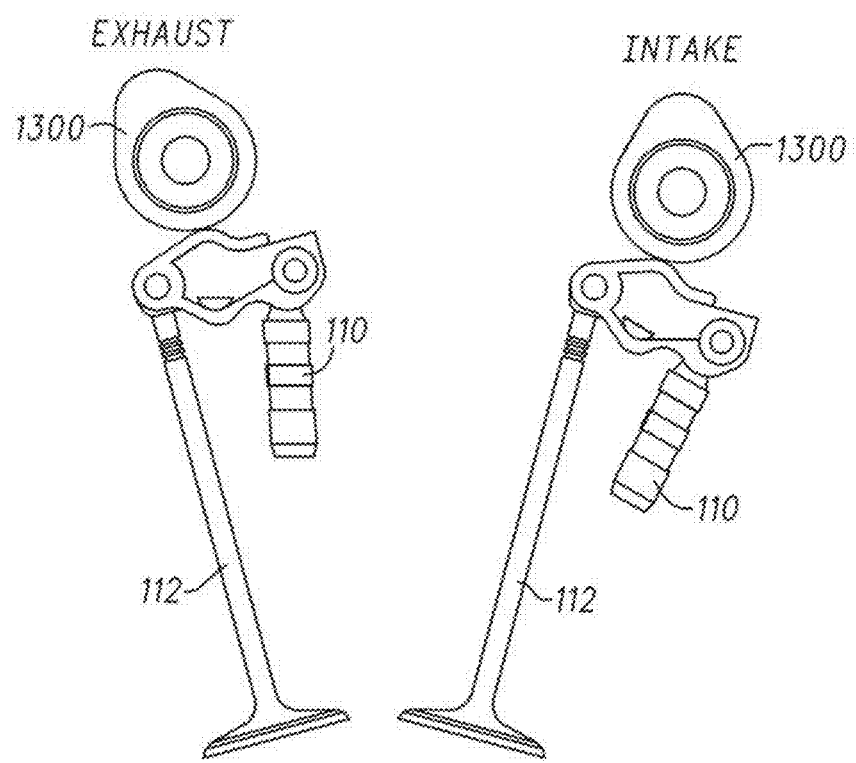
FIG. 90 is an engine layout showing an exemplary SRFF-1L rocker assembly on the exhaust and intake valves.

The engine layout for one exhaust and one intake valve using the SRFF-1L 1100 is shown in FIG. 90. The packaging of the SRFF-1L 1100 is similar to that of the standard valvetrain. The cylinder head requires modification to provide an oil feed from the lower gallery 805 to the OCV 822 (FIGS. 88, 91). Additionally, a second (upper) oil gallery 802 is required to connect the OCV 822 and the switching ports 506 of the DFHLA 110. The basic engine cylinder head architecture remains the same such that the valve centerline, camshaft centerline, and DFHLA 110 centerline remain constant. Because these three centerlines are maintained relative to a standard valvetrain, and because the SRFF-1L 1100 remains compact, the cylinder head height, length, and width remain nearly unchanged compared to a standard valvetrain system.

2. CDA-1L System Enabling Technologies

Several technologies used in this system have multiple uses in varied applications, they are described herein as components of the DVVL system disclosed herein. These include:

2.1. Oil Control Valve (OCV)

As described in earlier sections, and shown in FIGS. 88, 91, 92, and 93, an oil control valve (OCV) 822 is a control device that directs or does not direct pressurized hydraulic fluid to cause the rocker arm 1100 to switch between normal-lift mode and no-lift mode. The OCV is intelligently controlled, for example using a control signal sent by the ECU 825.

2.2. Dual Feed Hydraulic Lash Adjustor (DFHLA)

Many hydraulic lash adjusting devices exist for maintaining lash in engines. For DVVL switching of rocker arm 100 (FIG. 4), traditional lash management is required, but traditional HLA devices are insufficient to provide the necessary oil flow requirements for switching, withstand the associated side-loading applied by the assembly 100 during operation, and fit into restricted package spaces. A compact dual feed hydraulic lash adjuster 110 (DFHLA), used together with a switching rocker arm 100 is described, with a set of parameters and geometry designed to provide optimized oil flow pressure with low consumption, and a set of parameters and geometry designed to manage side loading.

As illustrated in FIG. 10, the ball plunger end 601 fits into the ball socket 502 that allows rotational freedom of movement in all directions. This permits side and possibly asymmetrical loading of the ball plunger end 601 in certain operating modes, for example when switching from high-lift to low-lift and vice versa. In contrast to typical ball end plungers for HLA devices, the DFHLA 110 ball end plunger 601 is constructed with thicker material to resist side loading, shown in FIG. 11 as plunger thickness 510.

Selected materials for the ball plunger end 601 may also have higher allowable kinetic stress loads, for example, chrome vanadium alloy.

Hydraulic flow pathways in the DFHLA 110 are designed for high flow and low pressure drop to ensure consistent hydraulic switching and reduced pumping losses. The DFHLA is installed in the engine in a cylindrical receiving socket sized to seal against exterior surface 511, illustrated in FIG. 11. The cylindrical receiving socket combines with the first oil flow channel 504 to form a closed fluid pathway with a specified cross-sectional area.

As shown in FIG. 11, the preferred embodiment includes four oil flow ports 506 (only two shown) as they are arranged in an equally spaced fashion around the base of the first oil flow channel 504. Additionally, two second oil flow channels 508 are arranged in an equally spaced fashion around ball end plunger 601, and are in fluid communication with the first oil flow channel 504 through oil ports 506. Oil flow ports 506 and the first oil flow channel 504 are sized with a specific area and spaced around the DFHLA 110 body to ensure even flow of oil and minimized pressure drop from the first flow channel 504 to the third oil flow channel 509. The third oil flow channel 509 is sized for the combined oil flow from the multiple second oil flow channels 508.

2.3. Sensing and Measurement

Information gathered using sensors may be used to verify switching modes, identify error conditions, or provide information analyzed and used for switching logic and timing. As can be seen, the sensing and measurement embodiments described in earlier sections pertaining to the DVVL system may also be applied to the CDA-1L system. Therefore, the valve position and/or motion sensing and logic used in DVVL, may also be used in the CDA system. Similarly, the sensing and logic used in determining the position/motion of the rocker arms, or the relative position/motion of the rocker arms relative to each other used for the DVVL system may also be used in the CDA system.

2.4. Torsion Spring Design and Implementation

A robust torsion spring 1124 design that provides more torque than conventional existing rocker arm designs, while maintaining high reliability, enables the CDA-1L system to maintain proper operation through all dynamic operating modes. The design and manufacture of the torsion springs 1124 are described in later sections.

3. Switching Control and Logic 3.1. Engine Implementation

CDA-1L embodiments may include any number of cylinders, for example 4 and 6 cylinder in-line and 6 and 8 cylinder V-configurations.

3.2. Hydraulic Fluid Delivery System to the Rocker Arm Assembly

As shown in FIG. 91, the hydraulic fluid system delivers engine oil at a controlled pressure to the CDA-1L switching rocker arm 1100. In this arrangement, engine oil from the cylinder head 801 that is not pressure regulated feeds into the DFHLA 110 via the lower oil gallery 805. This oil is always in fluid communication with the lower port 512 of the DFHLA 110, where it is used to perform normal hydraulic lash adjustment. Engine oil from the cylinder head 801 that is not pressure regulated is also supplied to the oil control valve 822. Hydraulic fluid from OCV 822, supplied at a controlled pressure, is supplied to the upper oil gallery 802. Switching of OCV 822 determines the lift mode for each of the CDA-1L rocker arm 1100 assemblies that comprise a CDA deactivation system 1400 for a given engine cylinder. As described in following sections, actuation of the OCV valve 822 is directed by the engine control unit 825 using logic based on both sensed and stored information for particular physical configuration, switching window, and set of operating conditions, for example, a certain number of cylinders and a certain oil temperature. Pressure regulated hydraulic fluid from the upper gallery 802 is directed to the DFHLA 110 upper port 506, where it is transmitted to the switching rocker arm assembly 1100. Hydraulic fluid is communicated through the rocker arm assembly 1100 to the latch pin 1202 assembly, where it is used to initiate switching between normal-lift and no-lift states.

Purging accumulated air in the upper gallery 802 is important to maintain hydraulic stiffness and minimize variation in the pressure rise time. Pressure rise time directly affects the latch movement time during switching operations. The passive air bleed port 832, shown in FIG. 91 was added to the high points in the upper gallery 802 to vent accumulated air into the cylinder head air space under the valve cover.

3.2.1. Hydraulic Fluid Delivery for Normal-Lift Mode

Figure 92:
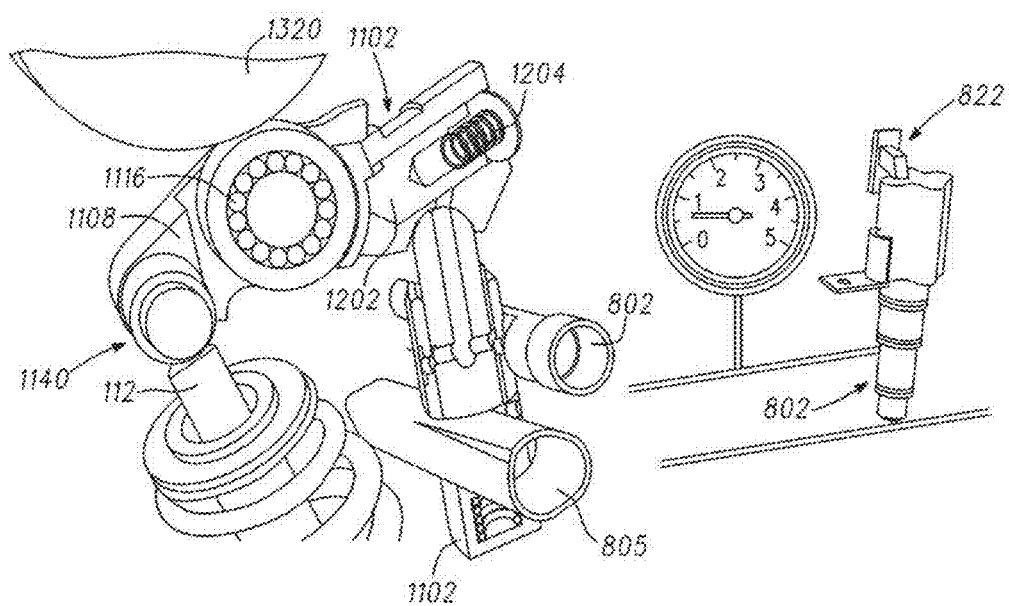
FIG. 92 shows an exemplary SRFF-1L system in operation exhibiting normal-lift engine valve operation.

FIG. 92 shows the SRFF-1L 1100 in the default position where the electronic signal to the OCV 822 is absent, and also shows a cross section of the system and components that enable operation in normal-lift mode: OCV 822, DFHLA 110, latch spring 1204, latch 1202, outer arm 1102, cam 1320, roller bearing 1116, inner arm 1108, valve pad 1140 and engine valve 112. Unregulated engine oil pressure in the lower gallery 805 is in communication with the lash compensation (lower) port 512 of the DFHLA 110 to enable standard lash compensation. The OCV 822 regulates oil pressure to the upper oil gallery 802, which then supplies oil to the upper port 506 at 0.2 to 0.4 bar when the ECU 825 electrical signal is absent. This pressure value is below the pressure required to compress the latch spring 1204 move the latch pin 1202. This pressure value serves to keep the oil circuit full of oil and free of air to achieve the required system response. The cam 1320 lobe contacts the roller bearing, rotating outer arm 1102 about the DFHLA 110 ball socket to open and close the valve. When the latch 1202 is engaged, the SRFF-1L functions similarly to a standard RFF rocker arm assembly.

3.2.2. Hydraulic Fluid Delivery for No-Lift Mode

Figure 93A:
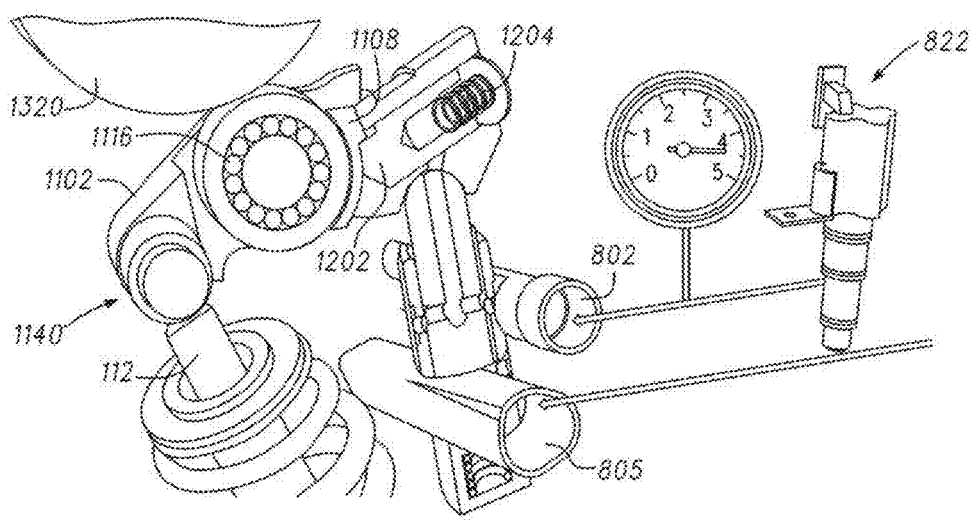
FIGS. 93A, 93B and 93C show an exemplary SRFF-1L system in operation exhibiting no-lift engine valve operation.
Figure 93B:
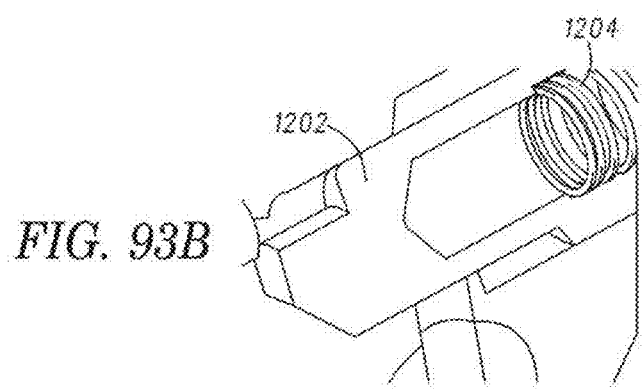
Figure 93C:
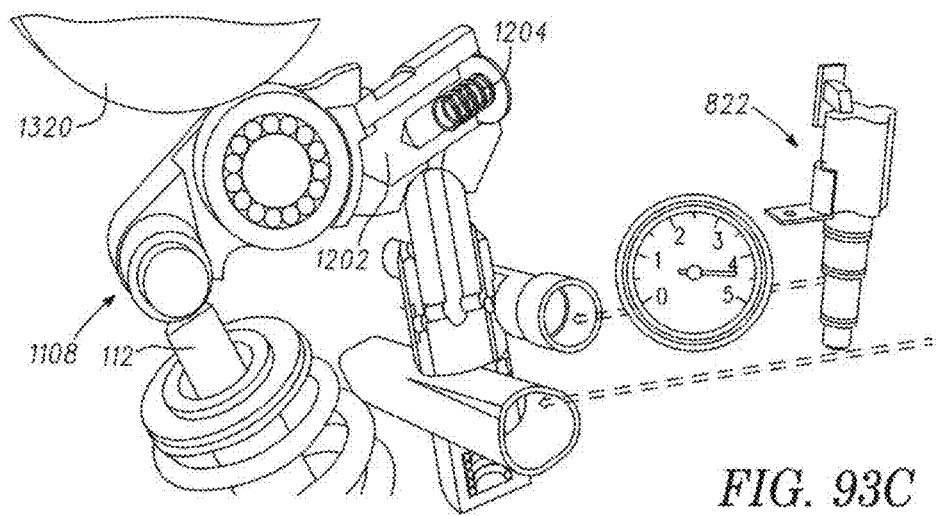

FIGS. 93 A, B, and C show detailed views of the SRFF-1L 1100 during cylinder deactivation (no-lift mode). The Engine Control Unit (ECU) 825 (FIG. 91) provides a signal to the OCV 822 such that oil pressure is supplied to the latch 1202 causing it to retract as shown in FIG. 93b. The pressure required to fully retract the latch is 2 bar or greater. The higher torsion spring 1124 (FIGS. 88, 99) preload in this single-lobe CDA embodiment enables the camshaft lobe 1320 to stay in contact with the inner arm 1108 roller bearing 1116 as this occurs in lost motion, and the engine valve remains closed as shown in FIG. 93c.

3.3. Operating Parameters

An important factor in operating a CDA system 1400 (FIG. 91) is the reliable control of switching between normal-lift mode to no-lift mode. CDA valve actuation systems 1400 can only be switched between modes during a predetermined window of time. As described above, switching from high-lift mode to low-lift mode and vice versa is initiated by a signal from the engine control unit (ECU) 825 (FIG. 91) using logic that analyzes stored information, for example a switching window for particular physical configuration, stored operating conditions, and processed data that is gathered by sensors. Switching window durations are determined by the CDA system physical configuration, including the number of cylinders, the number of cylinders controlled by a single OCV, the valve lift duration, engine speed, and the latch response times inherent in the hydraulic control and mechanical system.

3.3.1. Gathered Data

Real-time sensor information includes input from any number of sensors, as illustrated in the exemplary CDA-1L system 1400 illustrated in FIG. 91. As described previously, sensors may include 1) valve stem movement 829, as measured in one embodiment using a linear variable differential transformer (LVDT), 2) motion/position 828 and latch position 827 using a Hall-effect sensor or motion detector, 3) DFHLA movement 826 using a proximity switch, Hall effect sensor, or other means, 4) oil pressure 830, and 5) oil temperature 890. Cam shaft rotary position and speed may be gathered directly or inferred from the engine speed sensor.

In a hydraulically actuated VVA system, the oil temperature affects the stiffness of the hydraulic system used for switching in systems such as CDA and VVL. If the oil is too cold, its viscosity slows switching time, causing a malfunction. This temperature relationship is illustrated for an exemplary CDA-1L switching rocker arm 1100 system 1400 in FIG. 96. An accurate oil temperature, in one embodiment taken with a sensor 890 shown in FIG. 91, located near the point of use rather than in the engine oil crankcase, provides accurate information. In one example, the oil temperature in a CDA system 1400, monitored close to the oil control valves (OCV) 822, must be greater than or equal to 20 degrees C. to initiate no-lift (unlatched) operation with the required hydraulic stiffness. Measurements can be taken with any number of commercially available components, for example a thermocouple. The oil control valves are described further in published US Patent Applications US2010/0089347 published Apr. 15, 2010 and US2010/0018482 published Jan. 28, 2010 both hereby incorporated by reference in their entirety.

Sensor information is sent to the Engine Control Unit (ECU) 825 as a real-time operating parameter.

3.4. Stored Information 3.4.1. Switching Window Algorithms

The SRFF requires mode switching from the normal-lift to no-lift (deactivated), state and vice-versa. Switching is required to occur in less than one camshaft revolution to ensure proper engine operation. Mode switching can occur only when the SRFF is on the base circle 1322 (FIG. 101) of the cam 1320. Switching between valve lift states cannot occur when the latch 1202 (FIG. 93) is loaded and movement is restricted. The latch 1202 transition period between full and partial engagement must be controlled to keep the latch 1202 from slipping. Switching windows combined with electro-mechanical latch response times inherent in the CDA system 1400 (FIG. 91) identify the opportunities for mode switching.

The intended functional parameters of the SRFF based CDA system 1400 is analogous to the Type-V switching roller lifter designs that are in production today. The mode switch between normal-lift and no-lift is set to occur during the base circle 1322 event and be synchronized to the camshaft 1300 rotational position. The SRFF default position is set to normal-lift. The oil flow demand on the SRFF is also similar to the Type-V CDA production systems.

A critical shift is defined as an unintended event that may occur when latch is partially engaged, causing the valve to lift partially and suddenly drop back to the valve seat. This condition is unlikely, when the switching commands are executed during prescribed parameters of oil temperature, engine speeds with the camshaft position synchronized switching. The critical shift event creates an impact load to the DFHLA 110, which may require high strength DFHLA's, described in earlier sections, as enabling system components.

Figure 94:
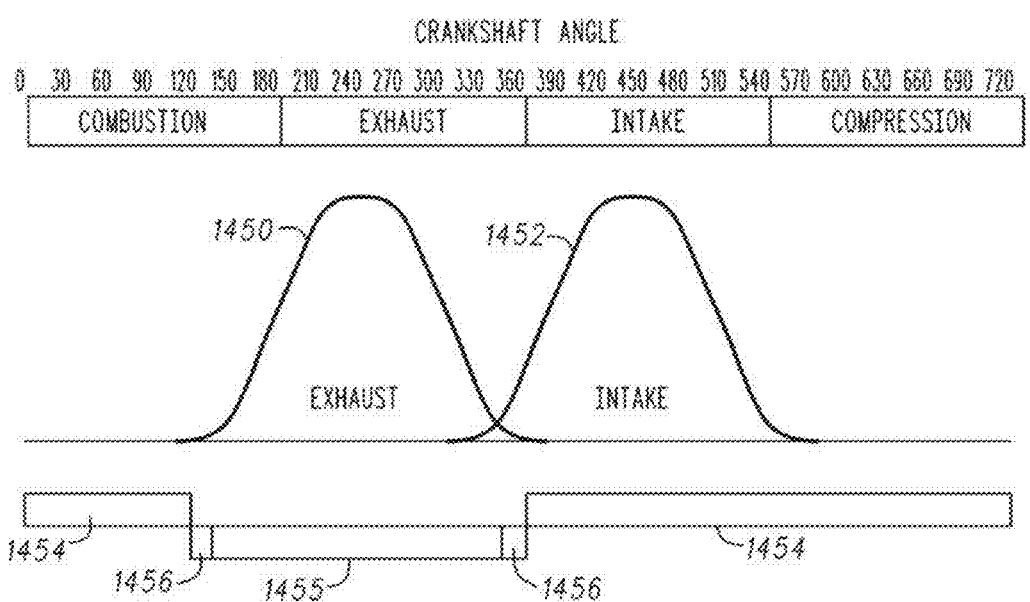
FIG. 94 shows an example switching window.

The fundamentals the synchronized switching for the CDA system 1400 are illustrated in FIG. 94. The exhaust valve profile 1450 and intake valve profile 1452 are plotted as a function of crankshaft angle. The required switching window is defined as the sum of the time it takes for the following operations: 1) the OCV 822 valve to supply pressurized oil, 2) the hydraulic system pressure to overcome the biasing spring 1204 and cause latch 1202 mechanical movement, and 3) the complete movement of latch 1202 necessary for mode change from no-lift to normal-lift and visa-versa. Switching window duration 1454, in this exhaust example, exists once the exhaust closes until the exhaust starts to open again. The latch 1202 remains restricted during the exhaust lift event. The timing windows that may cause critical shift 1456, described in more detail in later sections, are identified in FIG. 94. The switching window for the intake can be described in similar terms relative to the intake lift profile.

Latch Pre-Load

The CDA-1L rocker arm 1100 switching mechanism is designed such that hydraulic pressure can be applied to the latch 1202 after the latch lash is absorbed, resulting in no change in function. This design parameter allows hydraulic pressure to be initiated by the OCV 822 in the upper oil gallery 802 during the intake valve lift event. Once the intake valve lift profile 1452 returns to the base circle 1322 no-load condition, the latch completes its movement to the specified latched or unlatched mode. This design parameter helps to maximize the available switching window.

Hydraulic Response Time Versus Temperature

Figure 96:
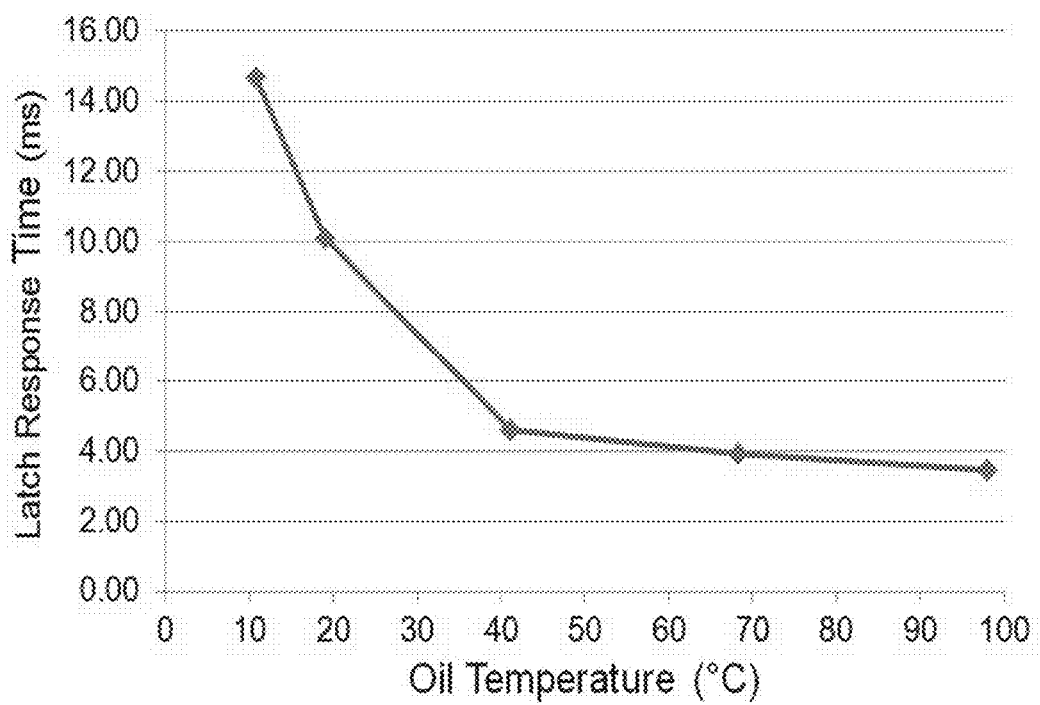
FIG. 96 shows latch response times for an embodiment of the SRFF-1 system.

FIG. 96 shows the dependence of latch 1202 response time on oil temperature using SAE 5 W-30 oil. The latch 1202 response time, reflects the duration for the latch 1202 to move from normal-lift (latched) to no-lift (unlatched) position, and vice-versa. The latch 1202 response time requires ten milliseconds with an oil temperature of 20° C. and 3 bar oil pressure in the switching pressure port 506. Latch response time is reduced to five milliseconds under the same pressure conditions at higher operating temperatures, for example 40° C. Hydraulic response times are used to determine switching windows.

Variable Valve Timing

Figure 95:
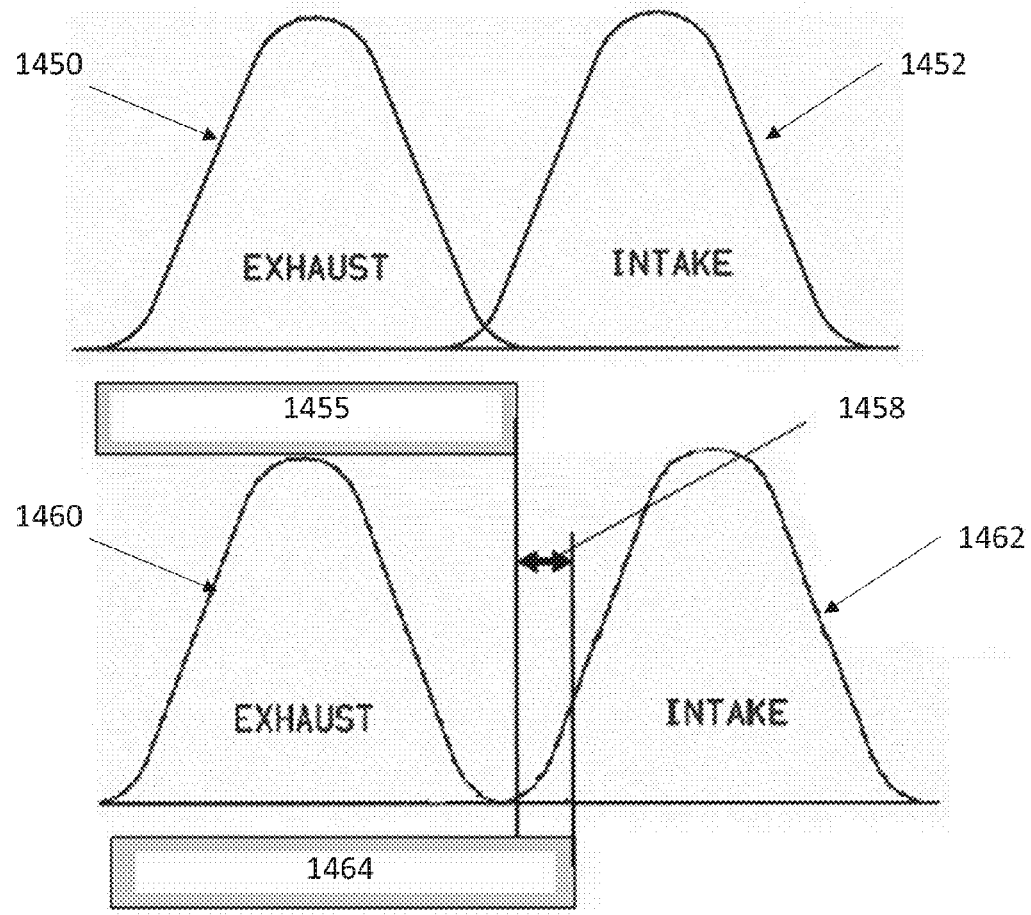
FIG. 95 shows the effect of camshaft phasing on the switching window.

Now, with reference to FIGS. 94 and 95, some camshaft drive systems are designed to have greater phasing authority/range of motion, relative to the crankshaft angle than standard drive systems. This technology may be referred to as variable valve timing, and must be considered along with engine speed when determining the allowable switching window duration 1454.

The plots of valve lift profile as a function of crankshaft angle are shown in FIG. 95, illustrating the effect that variable valve timing has on the switching window duration 1454. Exhaust valve lift profile 1450 and intake valve lift profile 1452 show a typical cycle with no variable valve timing capability that results in no switching window 1455 (also seen in FIG. 94), Exhaust valve lift profile 1460 and intake valve lift profile 1462 show a typical cycle that has variable valve timing capability that results in no switching window 1464. This example of variable valve timing results in an increase in the duration of the no switching window 1458. Assuming a variable valve timing capability of 120 degrees crankshaft angle duration between the exhaust and intake camshafts, the time duration shift 1458 is 6 milliseconds at 3500 engine rpm.

Figure 97:
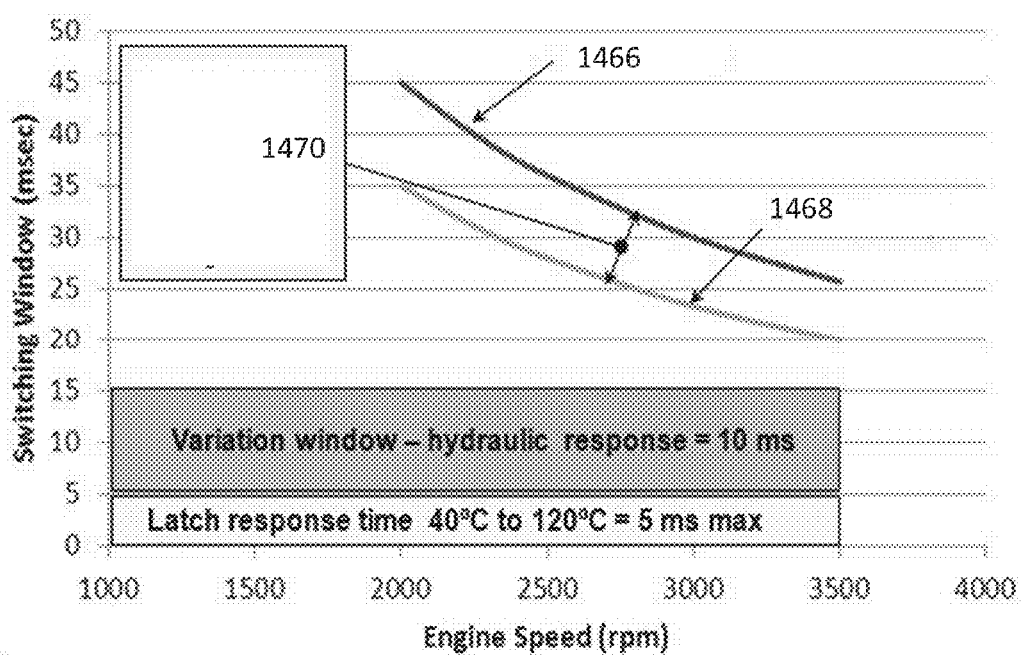
FIG. 97 is a graph showing a switching window times above 40 degrees C. for an exemplary SRFF-1 system.

FIG. 97 is a plot showing calculated and measured variations in switching time due to the effects of temperature and cam phasing. The plot is based on a switching window that ranges from 420 crankshaft degrees with camshaft phasing at minimum overlap 1468 to 540 crankshaft degrees with camshaft phasing at maximum overlap 1466. The latch response time of 5 milliseconds shown on this plot is for normal engine operating temperatures of 40-120° C. The hydraulic response variation 1470 is measured from ECU 825 switching signal initiation until the hydraulic pressure is sufficient to cause the latch 1202 to move. Based on CDA system 1400 studies that use OCVs to control hydraulic oil pressure, the maximum variation is approximately 10 milliseconds. This hydraulic response variation 1470 takes into consideration voltage to the OCV 822, temperature, and oil pressure in the engine. The phasing position with minimum overlap 1468 provides an available switching time of 20 milliseconds at 3500 engine rpm, and the total latch response time is 15 milliseconds, representing a 5 millisecond margin between the time available for switching and the latch 1202 response time.

Figure 98:
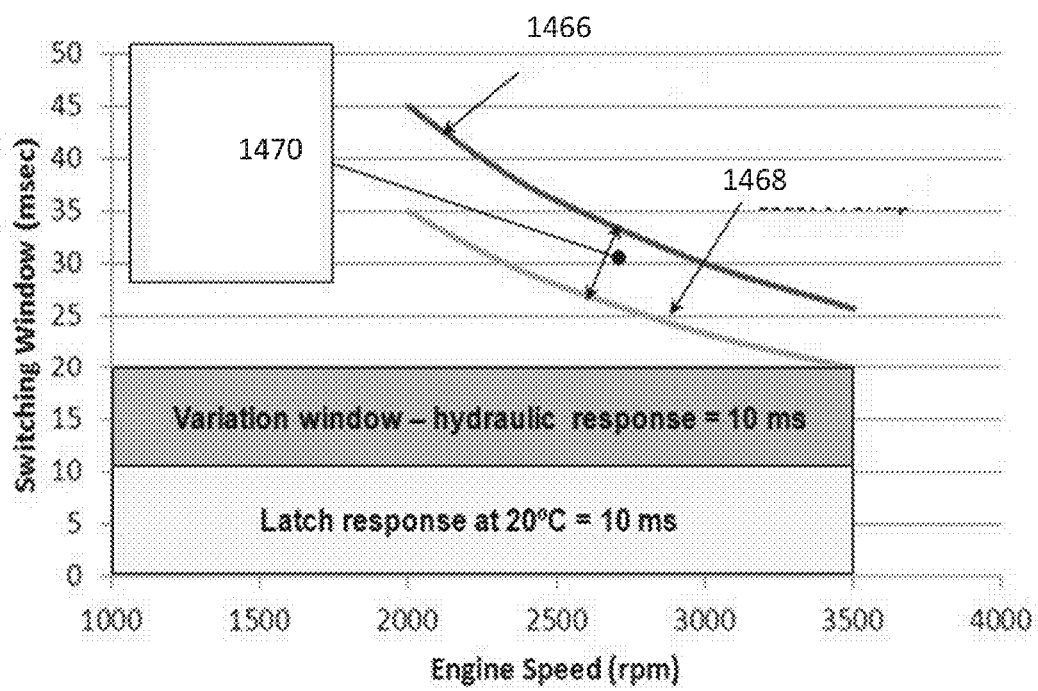
FIG. 98 is a graph showing a switching window times taking into account camshaft phasing and oil temperature for an exemplary SRFF-1 system.

FIG. 98 is also a plot showing calculated and measured variations in switching time due to the effects of temperature and cam phasing. The plot is based on a switching window that ranges from 420 crankshaft degrees with camshaft phasing at minimum overlap 1468 to 540 crankshaft degrees with camshaft phasing at maximum overlap 1466. The latch response time of 10 milliseconds shown on this plot is for a cold engine operating temperatures of 20° C. The hydraulic response variation 1470 is measured from ECU 825 switching signal initiation until the hydraulic pressure is sufficient to cause the latch 1202 to move. Based on CDA system 1400 studies that use OCVs to control hydraulic oil pressure, the maximum variation is approximately 10 milliseconds. This hydraulic response variation 1470 takes into consideration voltage to the OCV 822, temperature, and oil pressure in the engine. The phasing position with minimum overlap 1468 provides an available switching time of 20 milliseconds at 3500 engine rpm, and the total latch response time is 20 milliseconds, representing reduced design margin between the time available for switching and the latch 1202 response time.

3.4.2. Stored Operating Parameters

These variables include engine configuration parameters such as variable valve timing and predicted latch response times as a function of operating temperature.

3.5. Control Logic

As noted above, CDA switching can only occur during a small predetermined window of time under certain operating conditions, and switching the CDA system outside of the timing window may result in a critical shift event, that could result in damage to the valve train and/or other engine parts.

Because engine conditions such as oil pressure, temperature, emissions, and load may vary rapidly, a high-speed processor can be used to analyze real-time conditions, compare them to known operating parameters that characterize a working system, reconcile the results to determine when to switch, and send a switching signal. These operations can be performed hundreds or thousands of times per second. In embodiments, this computing function may be performed by a dedicated processor, or by an existing multi-purpose automotive control system referred to as the engine control unit (ECU). A typical ECU has an input section for analog and digital data, a processing section that includes a microprocessor, programmable memory, and random access memory, and an output section that might include relays, switches, and warning light actuation.

In one embodiment, the engine control unit (ECU) 825 shown in FIG. 91, accepts input from multiple sensors such as valve stem movement 829, motion/position 828, latch position 827, DFHLA movement 826, oil pressure 830, and oil temperature 890. Data such as allowable operating temperature and pressure for given engine speeds and switching windows are stored in memory. Real-time gathered information is then compared with stored information and analyzed to provide the logic for ECU 825 switching timing and control.

After input is analyzed, a control signal is transmitted by the ECU 825 to the OCV 822 to initiate switching operation, which may be timed to avoid critical shift events while meeting engine performance goals such as improved fuel economy and lowered emissions. If necessary, the ECU 825 may also alert operators to error conditions.

4. CDA-1L Rocker Arm Assembly

FIG. 99 illustrates a perspective view of an exemplary CDA-1L rocker arm 1100. The CDA-1L rocker arm 1100 is shown by way of example only and it will be appreciated that the configuration of the CDA-1L rocker arm 1100 that is the subject of this application is not limited to the configuration of the CDA-1L rocker arm 1100 illustrated in the figures contained herein.

Figure 100:
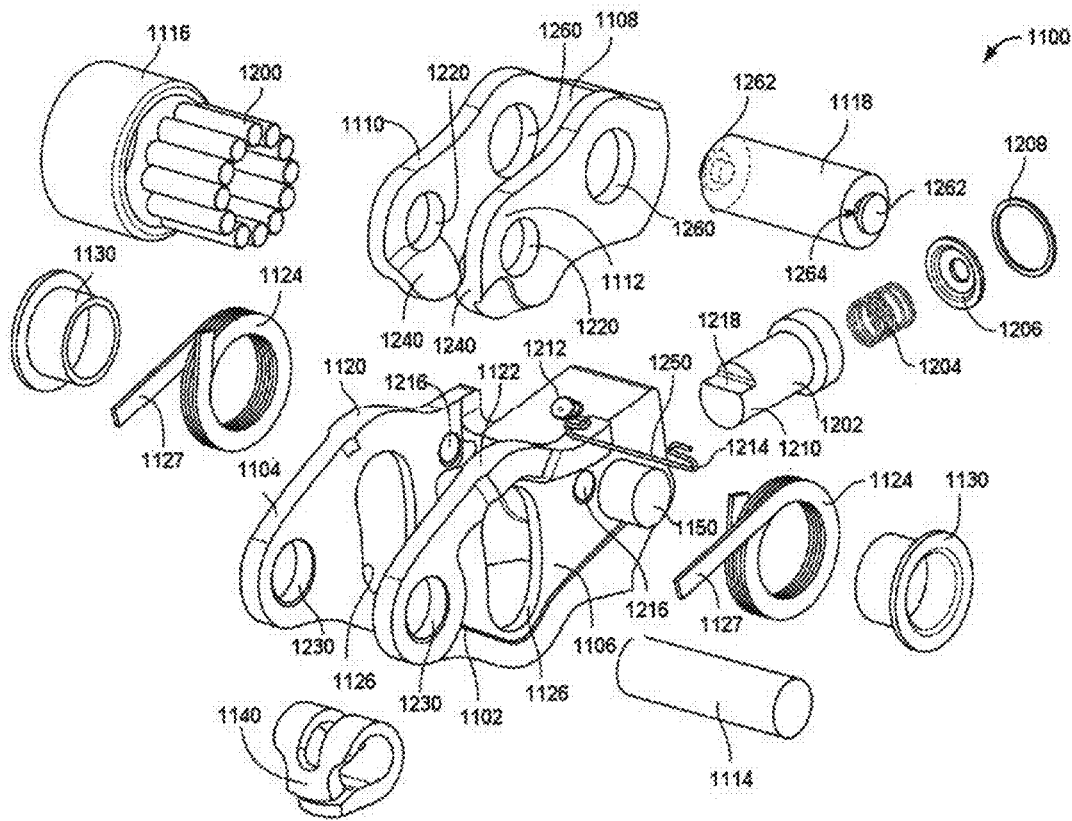
FIG. 100 illustrates an exploded view of the exemplary SRFF-1L rocker arm assembly of FIG. 99.

As shown in FIGS. 99 and 100, the CDA-1L rocker arm 1100 includes an outer arm 1102 having a first outer side arm 1104 and a second outer side arm 1106. An inner arm 1108 is disposed between the first outer side arm 1104 and second outer side arm 1106. The inner arm 1108 has a first inner side arm 1110 and a second inner side arm 1112. The inner arm 1108 and outer arm 1102 are both mounted to a pivot axle 1114, located adjacent the first end 1101 of the rocker arm 1100, which secures the inner arm 1108 to the outer arm 1102 while also allowing a rotational degree of freedom pivoting about the pivot axle 1114 when the rocker arm 1100 is in a no-lift state. In addition to the illustrated embodiment having a separate pivot axle 1114 mounted to the outer arm 1102 and inner arm 1108, the pivot axle 1114 may be integral to the outer arm 1102 or the inner arm 1108.

The CDA-1L rocker arm 1100 has a bearing 1190 comprising a roller 1116 that is mounted between the first inner side arm 1110 and second inner side arm 1112 on a bearing axle 1118 that, during normal operation of the rocker arm, serves to transfer energy from a rotating cam (not shown) to the rocker arm 1100. Mounting the roller 1116 on the bearing axle 1118 allows the bearing 1190 to rotate about the axle 1118, which serves to reduce the friction generated by the contact of the rotating cam with the roller 1116. As discussed herein, the roller 1116 is rotatably secured to the inner arm 1108, which in turn may rotate relative to the outer arm 1102 about the pivot axle 1114 under certain conditions. In the illustrated embodiment, the bearing axle 1118 is mounted to the inner arm 1108 in the bearing axle apertures 1260 of the inner arm 1108 and extends through the bearing axle slots 1126 of the outer arm 1102. Other configurations are possible when utilizing a bearing axle 1118, such as having the bearing axle 1118 not extend through bearing axle slots 1126 but still mounted in bearing axle apertures 1260 of the inner arm 1108, for example.

When the rocker arm 1100 is in a no-lift state, the inner arm 1108 pivots downwardly relative to the outer arm 1102 when the lifting portion of the cam (1324 in FIG. 101) comes into contact with the roller 1116 of bearing 1190, thereby pressing it downward. The axle slots 1126 allow for the downward movement of the bearing axle 1118, and therefore of the inner arm 1108 and bearing 1190. As the cam continues to rotate, the lifting portion of the cam rotates away from the roller 1116 of bearing 1190, allowing the bearing 1190 to move upwardly as the bearing axle 1118 is biased upwardly by the bearing axle torsion springs 1124. The illustrated bearing axle springs 1124 are torsion springs secured to mounts 1150 located on the outer arm 1102 by spring retainers 1130. The torsion springs 1124 are secured adjacent the second end 1103 of the rocker arm 1100 and have spring arms 1127 that come into contact with the bearing axle 1118. As the bearing axle 1118 and spring arm 1127 move downward, the bearing axle 1118 slides along the spring arm 1127. The configuration of rocker arm 1100 having the torsion springs 1124 secured adjacent the second end 1103 of the rocker arm 1100, and the pivot axle 1114 located adjacent the first end 1101 of the rocker arm, with the bearing axle 1118 between the pivot axle 1114 and the axle spring 1124, lessens the mass near the first end 1101 of the rocker arm.

Figure 101:
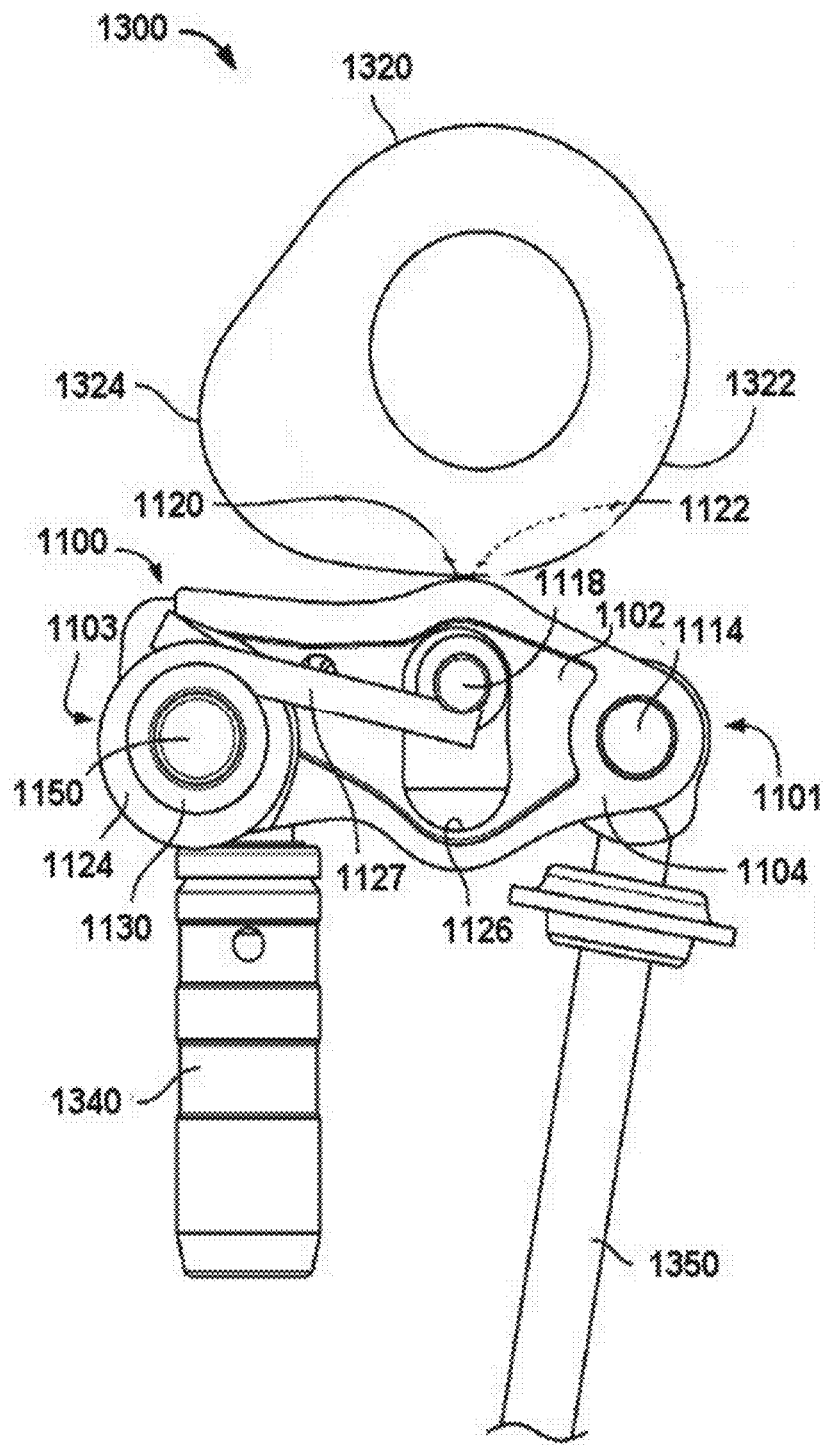
FIG. 101 illustrates a side view of an exemplary SRFF-1L rocker arm assembly, including DFHLA, valve stem, and cam lobe.
Figure 102:
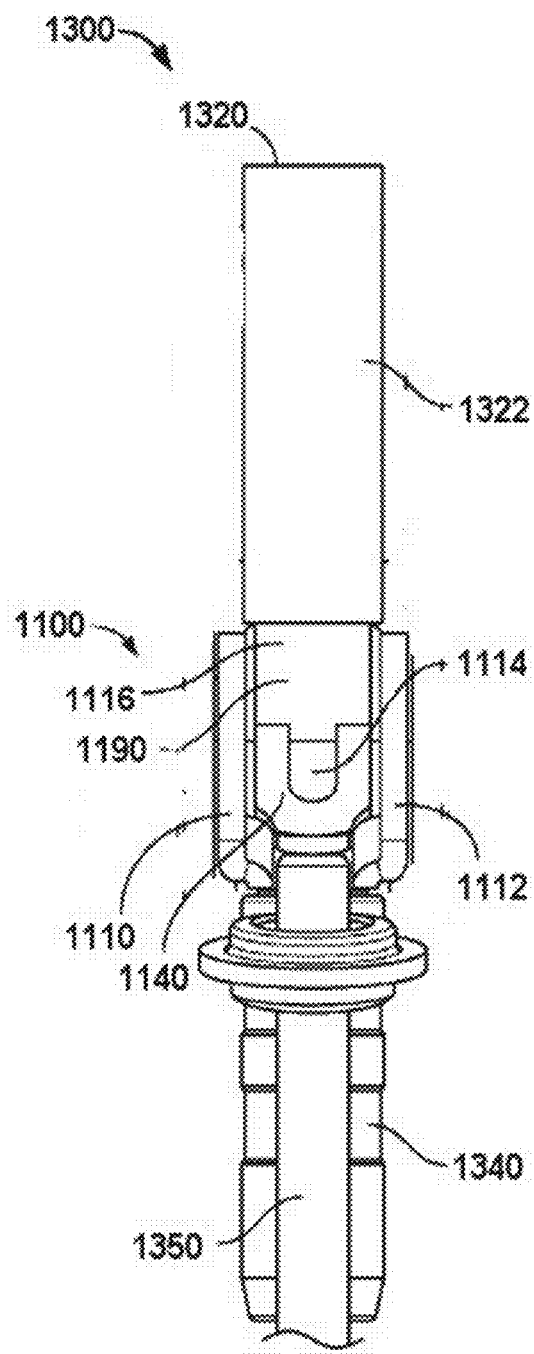
FIG. 102 illustrates an end view of an exemplary SRFF-1L rocker arm assembly, including DFHLA, valve stem, and cam lobe.

As shown in FIGS. 101 and 102, the valve stem 1350 is also in contact with the rocker arm 1100 near its first end 1101, and thus the reduced mass at the first end 1101 of the rocker arm 1100 reduces the mass of the overall valve train (not shown), thereby reducing the force necessary to change the velocity of the valve train. It should be noted that other spring configurations may be used to bias the bearing axle 1118, such as a single continuous spring.

FIG. 100 illustrates an exploded view of the CDA-1L rocker arm 1100 of FIG. 99. The exploded view in FIG. 100 and the assembly view in FIG. 99, show bearing 1190, a needle roller-type bearing that comprises a substantially cylindrical roller 1116 in combination with needles 1200, which can be mounted on a bearing axle 1118. The bearing 1190 serves to transfer the rotational motion of the cam to the rocker arm 100 that in turn transfers motion to the valve stem 350, for example in the configuration shown in FIGS. 101 and 102. As shown in FIGS. 99 and 100, the bearing axle 1118 may be mounted in the bearing axle apertures 1260 of the inner arm 1108. In such a configuration, the axle slots 1126 of the outer arm 1102 accept the bearing axle 1118 and allow for lost motion movement of the bearing axle 1118 and by extension the inner arm 1108 when the rocker arm 1100 is in a non-lift state. "Lost motion" movement can be considered movement of the rocker arm 1100 that does not transmit the rotating motion of the cam to the valve. In the illustrated embodiments, lost motion is exhibited by the pivotal motion of the inner arm 1108 relative to the outer arm 1102 about the pivot axle 1114.

Other configurations other than bearing 1190 also permit the transfer of motion from the cam to the rocker arm 1100. For example, a smooth non-rotating surface (not shown) for interfacing with the cam lift lobe (1320 in FIG. 101) may be mounted on or formed integral to the inner arm 1108 at approximately the location where the bearing 1190 is shown in FIG. 99 relative to the inner arm 1108 and rocker arm 1100. Such a non-rotating surface may comprise a friction pad formed on the non-rotating surface. In another example, alternative bearings, such as bearings with multiple concentric rollers, may be used effectively as a substitute for bearing 1190.

With reference to FIGS. 99 and 100, the elephant foot 1140 is mounted on the pivot axle 1114 between the first 1110 and second 1112 inner side arms. The pivot axle 1114 is mounted in the inner pivot axle apertures 1220 and outer pivot axle apertures 1230 adjacent the first end 1101 of the rocker arm 1100. Lips 1240 formed on inner arm 1108 prevent the elephant foot 1140 from rotating about the pivot axle 1114. The elephant foot 1140 engages the end of the valve stem 1350 as shown in FIG. 102. In an alternative embodiment, the elephant foot 1140 may be removed, and instead an interfacing surface complementary to the tip of the valve stem 1350 may be placed on the pivot axle 1114.

FIGS. 101 and 102 illustrate a side view and front view, respectively, of rocker arm 1100 in relation to a cam 1300 having a lift lobe 1320 with a base circle 1322 and lifting portion 1324. A roller 1116 is illustrated in contact with the lift lobe 1320. A dual feed hydraulic lash adjuster (DFHLA) 110 engages the rocker arm 1100 adjacent its second end 1103, and applies upward pressure to the rocker arm 1100, and in particular the outer rocker arm 1102, while mitigating against valve lash. The valve stem 1350 engages the elephant foot 1140 adjacent the first end 1101 of the rocker arm 1100. In the normal-lift state, the rocker arm 1100 periodically pushes the valve stem 1350 downward, which serves to open the corresponding valve (not shown).

4.1. Torsion Spring

As described in following sections, a rocker arm 1100 in the no-lift state may be subjected to excessive pump-up of the lash adjuster 110, whether due to excessive oil pressure, the onset of non-steady-state conditions, or other causes. This may result in an increase in the effective length of the lash adjuster 110 as pressurized oil fills its interior. Such a scenario may occur for example during a cold start of the engine, and could take significant time to resolve on its own if left unchecked and could even result in permanent engine damage. Under such circumstances, the latch 1202 may not be able to activate the rocker arm 1100 until the lash adjuster 110 has returned to a normal operating length. In this scenario, the lash adjuster 110 applies upward pressure to the outer arm 1102, bringing the outer arm 1102 closer to the cam 1300.

The lost motion torsion spring 1124 on the SRFF-1L was designed to provide sufficient force to keep the roller bearing 1116 in contact with the camshaft lift lobe 1320 during no-lift operation to ensure controlled acceleration and deceleration of the inner arm subassembly and controlled return of the inner arm 1108 to the latching position while preserving the latch lash. A pump-up scenario requires a stronger torsion spring 1124 to compensate for the additional force from pump-up.

Rectangular wire cross sections for the torsion springs 1124 were used to reduce the package space, keeping the assembly moment of inertia low and providing sufficient cross section height to sustain the operating loads. Stress calculations and FEA, and test validation, described in following sections, were used in developing the torsion spring 1124 components.

A torsion spring 1124 (FIG. 99) design and manufacturing process is described that results in a compact design with a generally rectangular shaped wire made with selected materials of construction.

Now, with reference to FIGS. 30A, 30B, and 99, the torsion spring 1124 is constructed from a wire 397 that is generally trapezoidal in shape. The trapezoidal shape is designed to allow wire 397 to deform into a generally rectangular shape as force is applied during the winding process. After torsion spring 1124 is wound, the shape of the resulting wires can be described as similar to a first wire 396 with a generally rectangular shape cross section. FIG. 99 shows two torsion spring embodiments, illustrated as multiple coils 398, 399 in cross section. In a preferred embodiment, wire 396 has a rectangular cross sectional shape, with two elongated sides, shown here as the vertical sides 402, 404 and a top 401 and bottom 403. The ratio of the average length of side 402 and side 404 to the average length of top 401 and bottom 403 of the coil can be any value less than 1. This ratio produces more stiffness along the coil axis of bending 400 than a spring coiled with round wire with a diameter equal to the average length of top 401 and bottom 403 of the coil 398. In an alternate embodiment, the cross section wire shape has a generally trapezoidal shape with a larger top 401 and a smaller bottom 403.

In this configuration, as the coils are wound, elongated side 402 of each coil rests against the elongated side 402 of the previous coil, thereby stabilizing the torsion springs 1124. The shape and arrangement holds all of the coils in an upright position, preventing them from passing over each other or angling when under pressure.

When the rocker arm assembly 1100 is operating, the generally rectangular or trapezoidal shape of the torsion springs 1124, as they bend about axis 400 shown in FIGS. 30A and 30B, produce high part stress, particularly tensile stress on top surface 401. To meet durability requirements, a combination of techniques and materials are used together. For example, the torsion spring may be made of a material that includes Chrome Vanadium alloy steel along with this design to improve strength and durability. The torsion spring may be heated and quickly cooled to temper the springs. This reduces residual part stress. Impacting the surface of the wire 396, 397 used for creating the torsion springs with projectiles, or 'shot peening' is used to put residual compressive stress in the surface of the wire 396, 397. The wire 396, 397 is then wound into the torsion spring. Due to their shot peening, the resulting torsion springs can now accept more tensile stress than identical springs made without shot peening.

4.2. Torsion Spring Pocket

As illustrated in FIG. 100, knob 1262 extends from the end of the bearing axle 1118 and creates a slot 1264 in which the spring arm 1127 sits. In one alternative, a hollow bearing axle 1118 may be used along with a separate spring mounting pin (not shown) comprising a feature such as the knob 1262 and slot 1264 for mounting the spring arm 1127.

4.3. Outer Arm Assembly 4.3.1. Latch Mechanism Description

The mechanism for selectively deactivating the rocker arm 1100, which in the illustrated embodiment is found near the second end 1103 of the rocker arm 1100, is shown in FIG. 100 as comprising latch 1202, latch spring 1204, spring retainer 1206 and clip 1208. The latch 1202 is configured to be mounted inside the outer arm 1102. The latch spring 1204 is placed inside the latch 1202 and secured in place by the latch spring retainer 1206 and clip 1208. Once installed, the latch spring 1204 biases the latch 1202 toward the first end 1101 of the rocker arm 1100, allowing the latch 1202, and in particular the engaging portion 1210 to engage the inner arm 1108, thereby preventing the inner arm 1108 from moving with respect to the outer arm 1102. When the latch 1202 is engaged with the inner arm in this way, the rocker arm 1100 is in the normal-lift state, and will transfer motion from the cam to the valve stem.

In the assembled rocker arm 1100, the latch 1202 alternates between normal-lift and no-lift states. The rocker arm 1100 may enter the no-lift state when oil pressure sufficient to counteract the biasing force of latch spring 1204 is applied, for example, through the port 1212 which is configured to permit oil pressure to be applied to the surface of the latch 1202. When the oil pressure is applied, the latch 1202 is pushed toward the second end 1103 of the rocker arm 1100, thereby withdrawing the latch 1202 from engagement with the inner arm 1108 and allowing the inner arm 1108 to rotate about the pivot axle 1114. In both the normal-lift and no-lift states, the linear portion 1250 of orientation clip 1214 engages the latch 1202 at the flat surface 1218. The orientation clip 1250 is mounted in the clip apertures 1216, and thereby maintains a horizontal orientation of the linear portion 1250 relative to the rocker arm 1100. This restricts the orientation of the flat surface 1218 to also be horizontal, thereby orienting the latch 1202 in the appropriate direction for consistent engagement with the inner arm 1108.

4.3.2. Latch Pin Design

Figure 103:
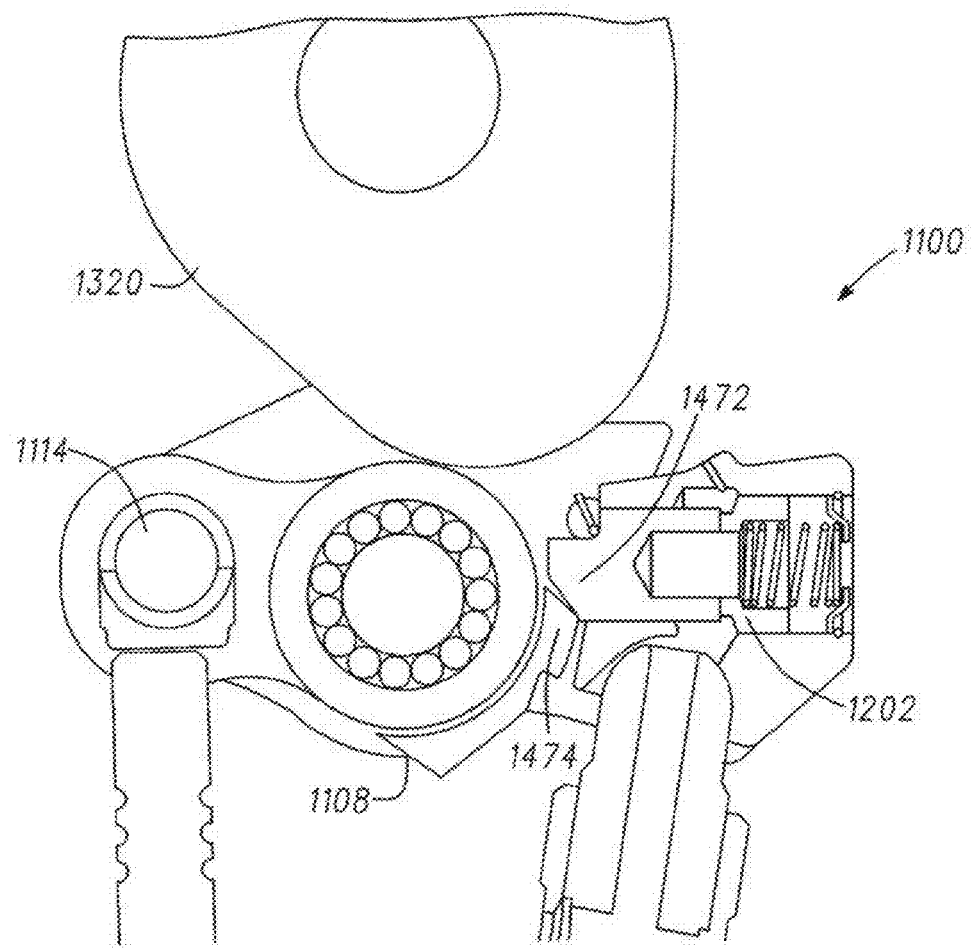
FIG. 103 shows latch re-engagement features in case of pressure loss.

As shown in FIGS. 93 A, B, C, the SRFF-1L rocker arm 1100 latch 1202 operating in no-lift mode is retracted inside the outer arm 1202, while the inner arm 1108 follows the camshaft lift lobe 1320. Under certain conditions, transitioning from no-lift mode to normal-lift mode can result in a condition shown in FIG. 103, where the latch 1202 extends before the inner arm 1108 returns to the position where the latch 1202 normally engages.

A re-engagement feature was added to the SRFF to prevent the condition where the inner arm 1108 is blocked and trapped in a position below the latch 1202. An inner arm sloped surface 1474 and a latch sloped surface 1472 were optimized to provide smooth latch 1202 movement to the retracted position when the inner arm 1108 contacts the latch sloped surface 1472. The design avoids damage to latch mechanism that may be caused by pressure changes at the switching pressure port 506 (FIG. 88).

As described in previous sections pertaining to DVVL rocker arm assembly and operation, several latch embodiments may be employed to allow reliable operation of the latching mechanism during operating conditions, including latches with round or other non-flat shapes.

4.4. System Packaging

The SRFF-1F design is focused on minimizing valvetrain packaging changes compared to a standard production layout. Important design parameters include relative placement of the camshaft lobes in relation to the SRFF roller bearing, and axial alignment between the steel camshaft and aluminum cylinder head. The steel and aluminum components have different thermal growth coefficients that can shift the camshaft lobes relative to the SRFF-1F.

Figure 104:
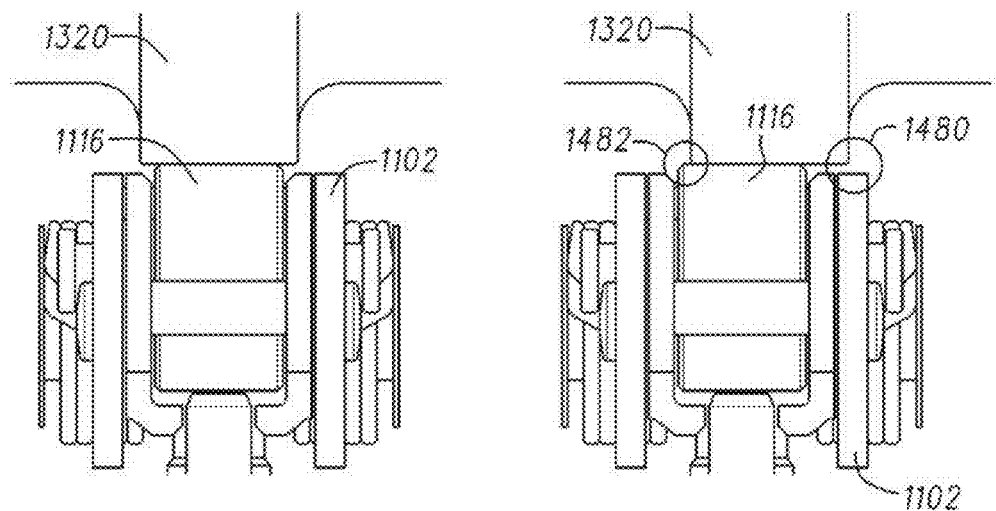
FIG. 104 shows camshaft alignment of an exemplary SRFF-1L system.

FIG. 104 shows both proper and poor alignment of the single camshaft lobe relative to the SRFF-1L 1100 outer arm 1102 and bearing 1116. The proper alignment shows the camshaft lift lobe 1320 centered over the roller bearing 1116. The single camshaft lobe 1320 and SRFF-1L 1110 is designed to avoid edge loading 1482 on the roller bearing 1116 and avoid cam lobe 1320 contact 1480 with the outer arm 1102. The elimination of camshaft no-lift lobes found in multi-lobe CDA configurations relaxes the requirements for tight manufacturing tolerances and assembly control of the camshaft lobe width and position, making the camshaft manufacturing process similar to that of standard camshafts used on Type II engines.

4.5. CDA-1L Latch Mechanism Hydraulic Operation

As previously mentioned, pump-up is a term used to describe a condition in which the HLA is extended past its intended working dimension; thereby preventing the valve from returning to its seat during the base circle event.

Figure 105:
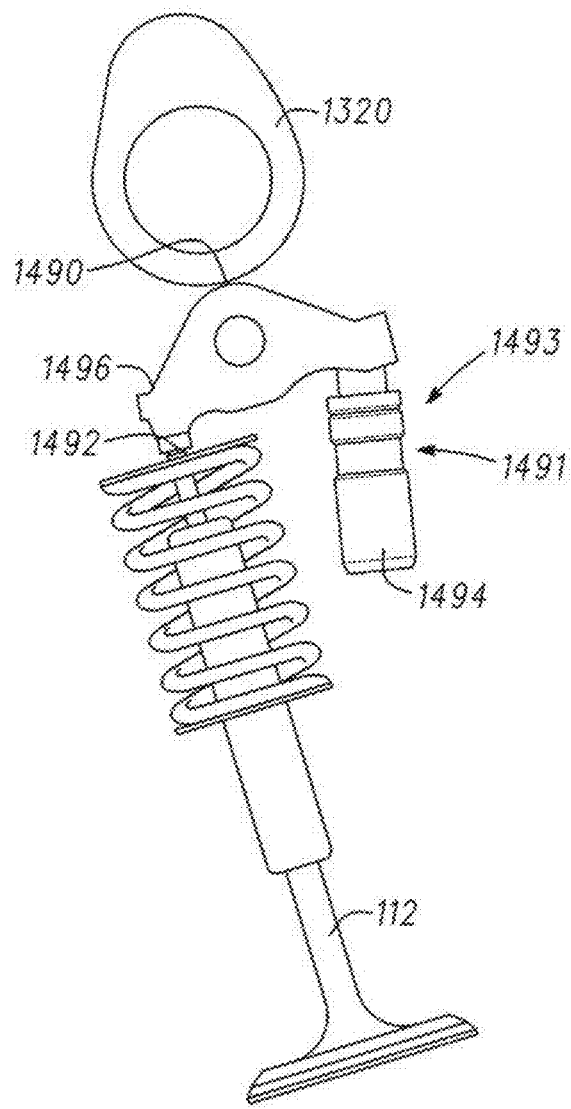
FIG. 105 shows forces acting on an RFF employing hydraulic lash adjusters.

FIG. 105 below shows a standard valvetrain system and the forces acting on the roller finger follower assembly (RFF) 1496 during a camshaft base circle event. The hydraulic lash adjuster force 1494 is a combination of the hydraulic lash adjuster (HLA) 1493 force generated by the oil pressure in the lash compensation port 1491 and the HLA internal spring force. The cam reaction force 1490 is between the camshaft 1320 and the RFF bearing. The reaction force 1492 is between the RFF 1496 and the valve 112 tip. The force balance must be such that the valve spring force 1492 will prevent unintentional opening of the valve 112. If the valve reaction force 1492 generated by the HLA force 1494 and cam reaction force 1490 exceeds the seating force required to seat the valve 112, then the valve 112 will be lifted and held open during base circle operation, which is undesirable. This description of the standard fixed arm system does not include the dynamic operating loads.

The SRFF-1L 1100 was designed with additional consideration for pump-up when the system is in no-lift mode. Pump-up of the DFHLA 110 when the SRFF-1L 1100 is in no-lift mode can create a condition in which the inner arm 1108 does not return to the position where the latch 1202 can re-engage the inner arm 1108.

The SRFF-1L 1100 reacts similarly to a standard RFF 1496 (FIG. 105) when the SRFF-1L 1100 is in normal-lift mode. Maintaining the required latch lash to switch the SRFF-1L 1100 while preventing pump-up is resolved by applying additional force from the torsion springs 1124 to overcome the HLA force 1494 in addition to the torsional already force required to return the inner arm 1108 to its the latch engagement position.

Figure 106:
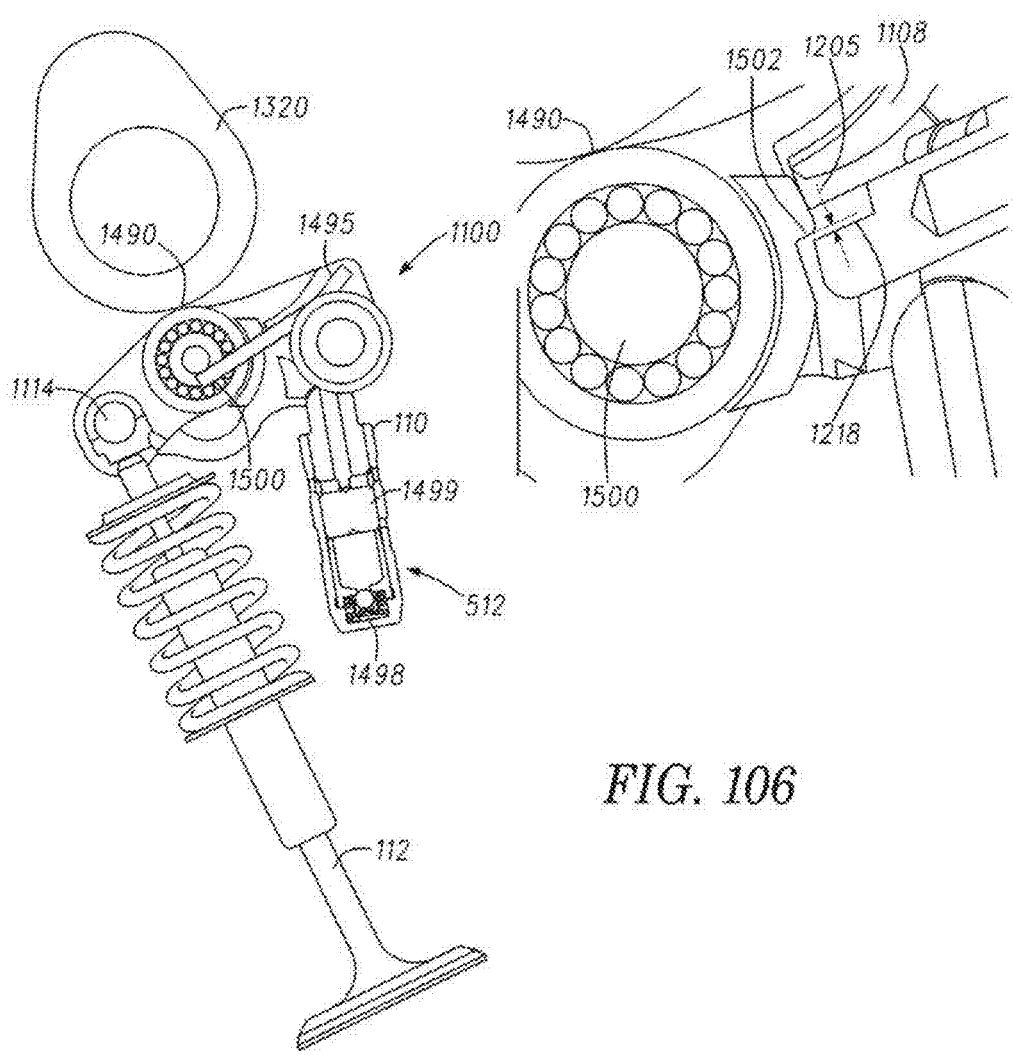
FIG. 106 shows a force balance for an exemplary SRFF-1L system in a 'no-lift' mode.

FIG. 106 shows the balance of forces acting on the SRFF-1L 1100 when the system is in no-lift mode: the DFHLA force 1499, caused by the oil pressure at the lash compensator port 512 (FIG. 88) plus the plunger spring force 1498, the cam reaction force 1490, and the torsion spring force 1495. The torsion force 1495 produced by springs 1124 is converted, via the bearing axle 1118 and the spring arms 1127, to spring reaction force 1500 acting on the inner arm 1108.

The torsion springs 1124 in the SRFF-1L rocker arm assembly 1100 were designed to provide sufficient force to keep the roller bearing 1116 in contact with the camshaft lift lobe 1320 during no-lift mode to ensure controlled acceleration and deceleration of the inner arm 1108 subassembly and return the inner arm 1108 to the latching position while preserving the latch lash 1205. The torsion spring 1124 design for SRFF-1L 1100 design also accounts for a variation in oil pressure at the lash compensation port 512 when the system is in no-lift mode. Oil pressure regulation can reduce the load requirements for the torsion springs 1124 with direct effect on the spring sizing.

FIG. 107 shows the requirements for oil pressure in the lash compensation pressure port 512. Limited oil pressure for the SRFF-1L is only required when the system is in no-lift mode. Consideration for synchronized switching, described in earlier sections, limits the no-lift mode for temperatures lower than 20° C.

4.6. CDA-1L Assembly Lash Management

Figure 108:
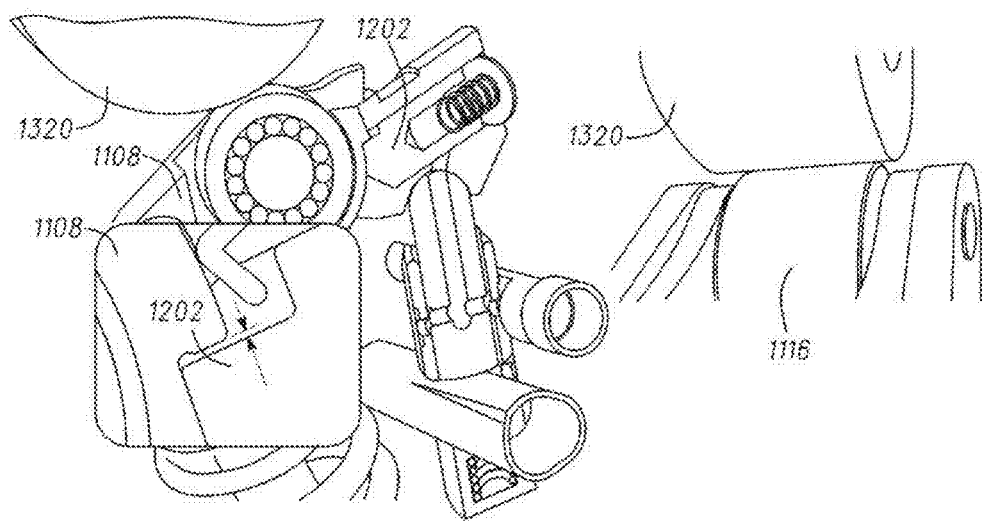
FIG. 108 shows mechanical lash for an exemplary SRFF-1 system.

FIG. 108 shows the latch lash 1205 for the SRFF-1L 1100. For a single-lobe CDA system, the total mechanical lash 1505 is reduced to a single latch lash 1205 value, as opposed to the sum of camshaft lash 1504 and latch lash 1205 for CDA designs with more than one lobe. The latch lash 1205 for the SRFF-1L 1100 is the distance between the latch 1202 and the inner arm 1108.

Figure 109:
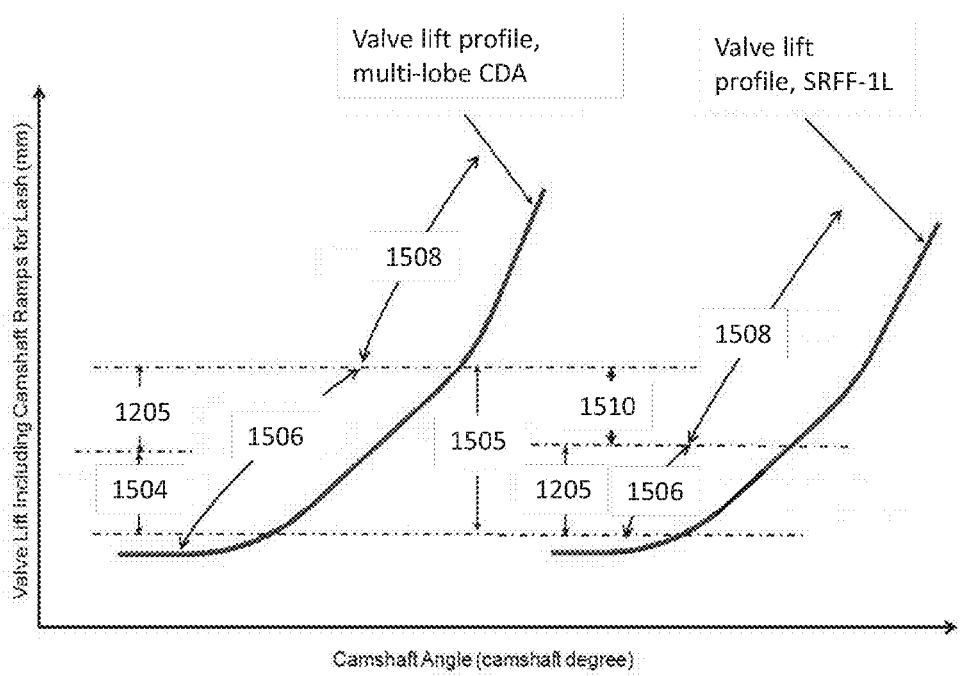
FIG. 109 shows camshaft lift profiles for a three-lobe CDA system versus an exemplary SRFF-1L system.

FIG. 109 compares the opening ramp on a camshaft designed for a three-lobe SRFF and the single-lobe SRFF-1L.

Camshaft lash was eliminated by design for the single-lobe SRFF-1L. The elimination of the camshaft lash 1504 allows further optimization of the camshaft lift profile, by creating a lifting ramp reduction 1510, thus allowing for longer lift events. The camshaft opening ramps 1506 for the SRFF-1L are reduced up to 36% from the camshaft opening ramps 1506 required for similar designs using multiple lobes.

In addition, mechanical lash variation on the SRFF-1L is improved 39% over an analogous three-lobe design due to the elimination of the camshaft lash and the features associated with it, for example, manufacturing tolerances for the camshaft no-lift lobes base circle radius, lobe run-out, required slider pad to slider pad and slider pad to roller bearing parallelism.

4.7. CDA-1L Assembly Dynamics

4.7.1. Detailed Description

Figure 110:
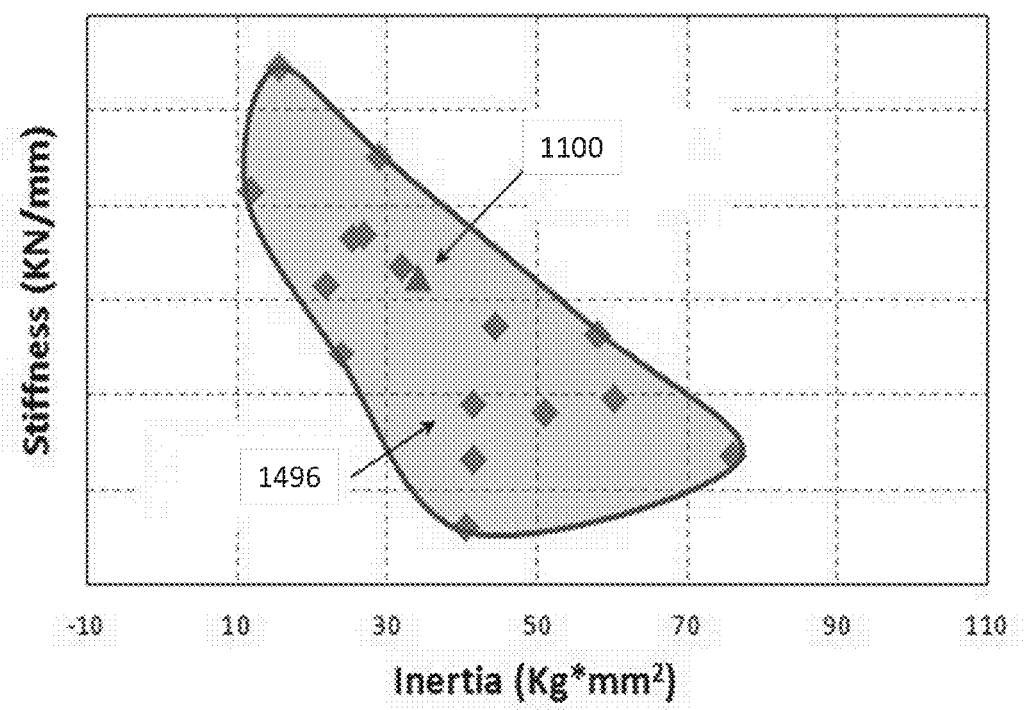
FIG. 110 is a graphic representation of stiffness vs. moment of inertia for multiple rocker arm designs.

The SRFF-1L rocker arm 1100 and system 1400 (FIG. 91) is designed to meet the dynamic stability requirements for the entire engine operating range. SRFF stiffness and moment of inertia (MOI) were analyzed for the SRFF design. The MOI of the SRFF-1L assembly 1100 is measured about the pivot axle 1114 (FIG. 99) which is the rotational axis that passes through the SRFF socket that is in contact with the DFHLA 110. Stiffness is measured at the interface between cam 1320 and bearing 1116. FIG. 110 shows measured stiffness plotted against calculated assembly MOI. The SRFF-1L relationship between stiffness and MOI compares well with standard RFF's used on Type II engines currently in production.

4.7.2. Analysis

Several design and Finite Element Analysis (FEA) iterations were performed to maximize the stiffness and reduce MOI over the DFHLA end of the SRFF. The mass intensive components were placed over the DFHLA end of the SRFF to minimize the MOI. The torsion springs 1124, one of the heaviest components in the SRFF assembly were positioned in close proximity to the SRFF rotational axis. The latching mechanism was also located near the DFHLA. The vertical section height of the SRFF was increased to maximize stiffness while minimizing MOI.

The SRFF designs were optimized using load information from kinematic modeling. Key input parameters for the analysis include valvetrain layout, SRFF elements of mass, moment of inertia, stiffness (predicted by the FEA), mechanical lash, valve spring loads and rates, DFHLA geometry and plunger spring, and valve lift profiles. Next, the system was altered to meet the predicted dynamic targets, by optimizing the stiffness versus the effective mass over the valve of the CDA SRFF. The effective mass over the valve represents the ratio between the MOI in respect to the pivot point of the SRFF and the square distance between the valve and the SRFF pivot. The tested dynamic performance is described in later sections.

5. Design Verification and Testing

5.1. Valve Train Dynamic Results

Dynamic behavior of a valvetrain is important in controlling the Noise Vibration and Harshness (NVH) while meeting the durability and performance targets of an engine. Valvetrain dynamics are partially influenced by the stiffness and MOI of the SRFF component. The MOI of the SRFF can be readily calculated and the stiffness is estimated through Computer Aided Engineering (CAE) techniques. Dynamic valve motion is also influenced by a variety of factors, so tests were conducted gain assurance in high speed valve control.

A motorized engine test rig was utilized for valvetrain dynamics. A cylinder head was instrumented prior to the test. Oil was heated to represent actual engine conditions. A speed sweep was performed from idle speed to 7500 rpm, recording data as defined by engine speed. Dynamic performance was determined by evaluating valve closing velocity and valve bounce. The SRFF-1L was strain gaged for the purpose of monitoring load. Valve spring loads were held constant to the fixed system for consistency.

Figure 111:
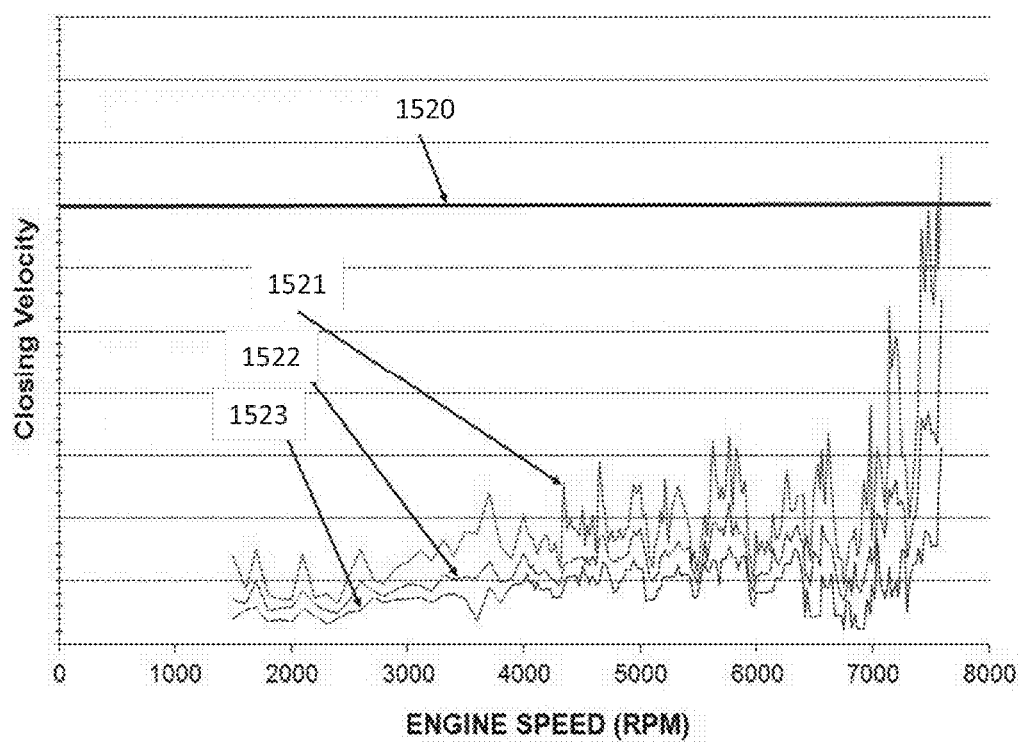
FIG. 111 illustrates the resultant seating closing velocity of an intake valve of an exemplary SRFF-1L system.

FIG. 111 illustrates the resultant seating closing velocity of an intake valve. Data was acquired for eight consecutive events showing the minimum, average, and maximum velocities relative to engine speed. The target velocity is shown as the maximum speed for seating velocity that is typical in the industry. The target seating velocity was maintained up to approximately 7500 engine rpm which illustrates acceptable dynamic control for passenger car engine applications.

5.2. Torsion Spring Validation

Torsion springs are key components for the SRFF-1L design, especially during high speed operation. Concept validation was conducted on the springs to validate the robustness. Three elements of the spring design were tested for proof of concept. First, load loss was documented under the conditions of high cycling at operating temperature. Spring load loss, or relaxation, represents the reduction of the spring load at end of test from beginning of test. The load loss was also documented by applying highest stress levels and subjecting parts to high temperatures. Second, the durability and the springs were tested at worst case load and cycled to validate fatigue life, as well as the load loss as mentioned. Finally, the function of the lost motion springs were validated by using lowest load springs and verifying that the DFHLA does not pump up during all operating conditions in CDA mode.

The torsion springs were cycled at engine operating temperatures in the engine oil environment on a targeted fixture test. Torsion springs were cycled with the full stroke of the application with the highest preload conditions to represent worst case stress. The cycling target value was set at 25 million and 50 million cycles. Torsion springs were also subjected to a heat-set test in which they were loaded to highest application stress and held at 140° C. for 50 hours and measured for load loss.

FIG. 112 summarizes the load loss for both the cycling test and the heat set test. All parts passed with a maximum load loss of 8% while the design target was set to 10% maximum load loss.

The results indicated a maximum load loss of 8% and met the design target. Many of the tests showed minimal load loss near 1%. All tests were safely within the design guidelines for load loss.

5.3. Pump-Up Robustness During Cylinder Deactivation

Torsion springs 1124 (FIG. 99) are designed to prevent the HLA pump-up to preserve the latch lash 1205 (FIG. 108) when the system operates in no-lift mode. The test apparatus was designed to sustain engine oil pressure at the lash compensation pressure port over the range of oil temperatures and engine speed conditions where mode switching is required.

Validation experiments were performed to prove torsion spring 1124 ability to preserve latch lash 1205 at required conditions. The tests were conducted on motorized engines, with instrumentation for measuring the valve and the CDA SRFF motion, oil pressure and temperature at the lash compensation pressure port 512 (FIG. 88) and switching pressure port 506 (FIG. 88).

Low limit lost motion springs were used to simulate worst condition. This test was conducted at 3500 rpm which represents the maximum switching speed. Two operating temperatures were considered of 58° C. and 130° C. Test results show pump-up at pressures 25% higher than the application requirement.

Figure 113:
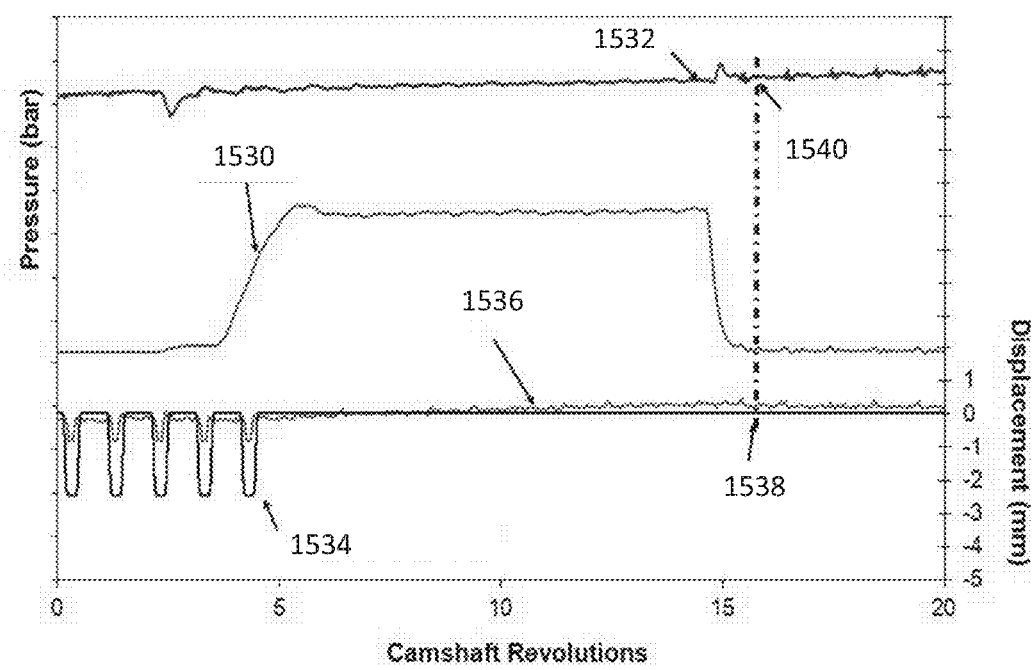

FIG. 113 shows the lowest pump-up pressure measured 1540, which is on the exhaust side at 58° C. Pump-up pressure for the intake at 58° C. and 130° C. and exhaust at 130° C. were higher than the pump-up pressure of the exhaust side at 58° C. The SRFF was in switching mode, having events on normal-lift and events in no-lift mode. Proximity probes were used to detect valve motion in order to validate the SRFF mode state at corresponding pressure at the switching pressure port 506. The pressure in the lash compensator port 512 was gradually increased and switching from no-lift mode to normal-lift mode was monitored. The pressure at which the system ceased to switch was recorded as pump-up pressure 1540. The system safely avoids pump-up pressures when the oil pressure is maintained at or below 5 bar for the SRFF-1L design. Concept testing was conducted with specially procured high limit torque torsion spring to simulate the worst case fatigue design margin condition. The concept testing conducted on the high load torsion spring met the required design goal.

5.4. Validation of Mechanical Lash During Switching Durability

Mechanical lash control is important to valvetrain dynamic stability and must be maintained through the life of the engine. A test with loading of the latch and switching between normal-lift mode and no-lift mode was considered appropriate to validate the wear and the performance of the latch mechanism. Switching durability was tested by switching the latch from the engaged to disengaged position, cycling the SRFF in no-lift mode, engaging the latch with the inner arm and cycling the SRFF in normal-lift mode. One cycle is defined to disengage and then re-engage the latch and exercise the SRFF in the two modes. The durability target for switching is 3,000,000 cycles. 3,000,000 cycles represents the equivalent of one engine life. One engine life is defined as an equivalent of 200,000 miles which is safely above the 150,000 mile standard. Parts were tested at highest switching speed target of 3500 engine rpm to simulate worst case dynamic load during switching.

Figure 114:
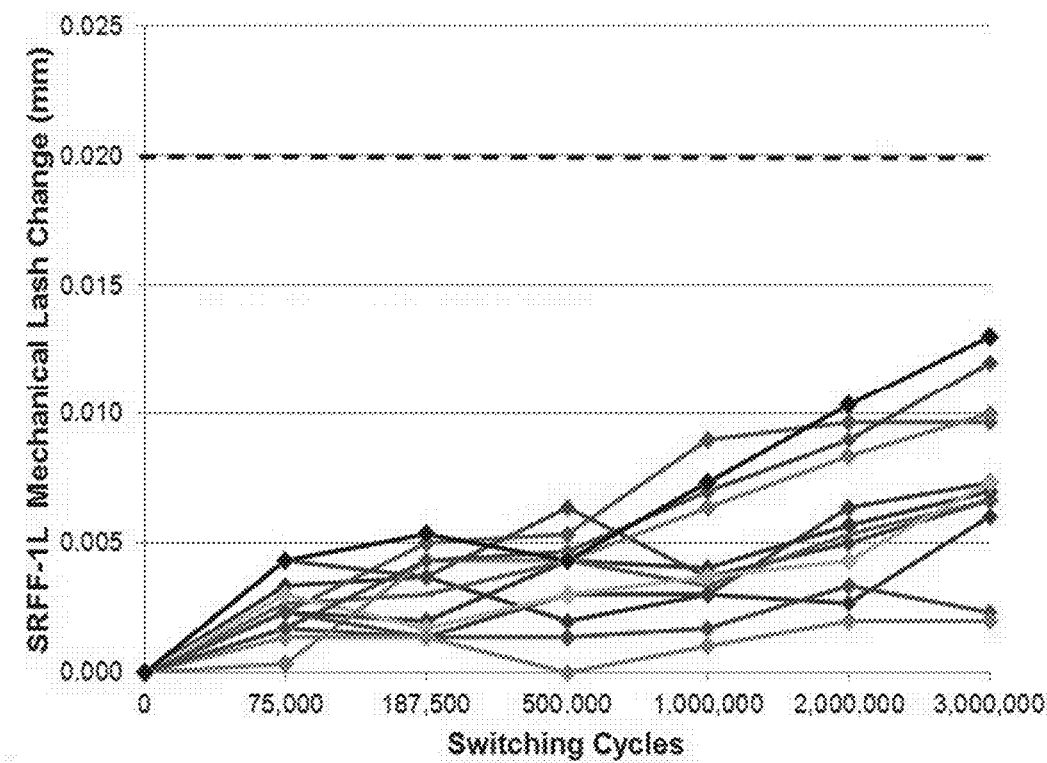

FIG. 114 illustrates the change in mechanical lash at periodic inspection points during the test. This test was conducted on one bank of a six cylinder engine fixture. Since there are three cylinders per bank and four SRFF-1L's per cylinder, twelve profiles are shown. The mechanical lash limit change of 0.020 mm was established as the design wear target. All SRFF-1L's show a safe margin of lash wear below the wear target at the equivalent of the vehicle life. The test was extended to 25% over the life target at which time parts were approaching the maximum lash change target value.

The valvetrain dynamics, Torsion spring load loss, pump-up validation and mechanical lash over an equivalent engine life all met intended targets for the SRFF-1L. The valvetrain dynamics, in terms of closing velocity, is safely within the limit at maximum engine speed of 7200 rpm and at the limit for a higher speed of 7500 rpm. The LMS load loss showed a maximum loss of 8% which is safely within the design target of 10%. A pump-up test was performed showing that the SRFF-1L design operates properly given a target oil pressure of 5 bar. Finally, the mechanical lash variation over an equivalent engine lift is safely within the design target. The SRFF-1L meets all design requirements for cylinder deactivation on a gasoline passenger car application.

6. Conclusions

Cylinder deactivation is a proven method to improve fuel economy for passenger car gasoline vehicles. The design, development, and validation of a single-lobe SRFF based cylinder deactivation system was completed, providing the ability to improve fuel economy by reducing the pumping losses and operating a portion of the engine cylinders at higher combustion efficiencies. The system preserves the base architecture of a standard Type II valvetrain by maintaining the same centerlines for the engine valves, camshaft and lash adjusters. The engine cylinder head requires the addition of the OCV and oil control ports in the cylinder head to allow for hydraulic switching of the SRFF from normal lift mode to deactivation mode. The system requires one OCV per engine cylinder, and is typically configured with four identical SRFF's for the intake and exhaust, along with one DFHLA per SRFF.

The SRFF-1L design provides a solution that reduces system complexity and cost. The most important enabling technology for the SRFF-1L design is the modification to the lost motion torsion spring. The LMS was designed to maintain continuous contact between a single lobe camshaft and the SRFF during both normal-lift and no-lift modes. Although this torsion spring requires slightly more packaging space, the overall system becomes less complex with the elimination of a three lobe camshaft. The axial stack up of the SRFF-1L is reduced from a three-lobe CDA design since there are no outer camshaft lobes that increase the chance of edge loading on the outer arm sliding pads and interference with the inner arm. Rocker arm stiffness levels for the SRFF-1L are comparable with standard production rocker arms.

The moment of inertia was minimized by placing the heavier components over the end pivot that sits directly on the DFHLA, namely the latching mechanism and the torsion springs. This feature enables better valvetrain dynamics by minimizing the effective mass over the valve. The system was designed and validated to engine speeds of 7200 rpm during standard lift mode and 3500 rpm for cylinder deactivation mode. The components also were validated to at least one engine life that is equivalent to 200,000 engine miles.

While the present disclosure illustrates various aspects of the present teachings, and while these aspects have been described in some detail, it is not the intention of the applicant to restrict or in any way limit the scope of the claimed teachings of the present application to such detail. Additional advantages and modifications will readily appear to those skilled in the art. Therefore, the teachings of the present application, in its broader aspects, are not limited to the specific details and illustrative examples shown and described. Accordingly, departures may be made from such details without departing from the spirit or scope of the applicant's claimed teachings of the present application. Moreover, the foregoing aspects are illustrative, and no single feature or element is essential to all possible combinations that may be claimed in this or a later application.

Figure 115:
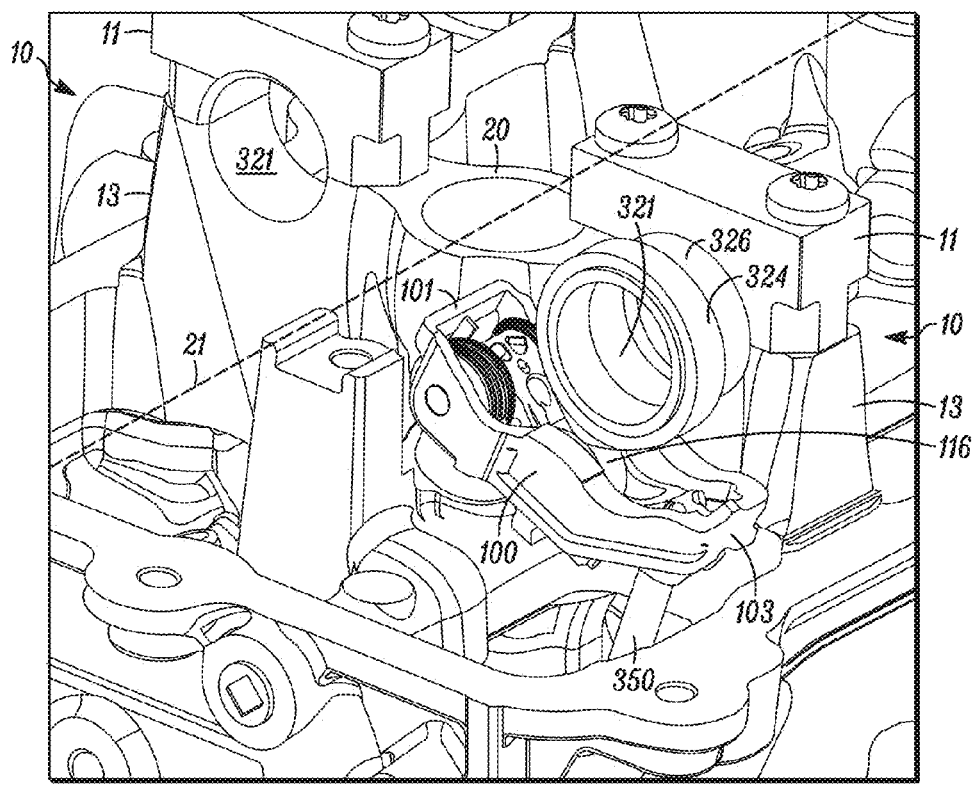
Figure 116:
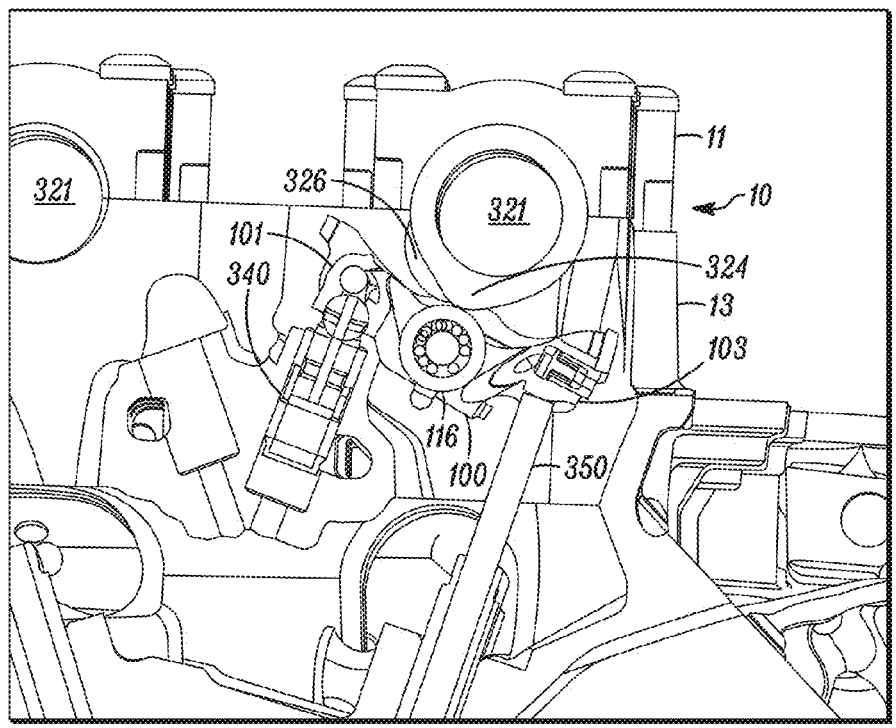

III. VVA Engine and Cylinder Head Arrangements
1. Switching Rocker Arm Assemblies
1.1. Description—General Engine Structure FIGS. 115 and 116 illustrate a partial engine head assembly that is a conventional Type II, dual overhead cam internal combustion engine with the exhaust cam. Exhaust cam rockers, valves and a portion of the intake valve camshaft are removed for clarity. It should be noted here that the present teachings are equally applicable to other engine designs having similar arrangements and obstructions.

A plurality of cam towers 10 extend upward having a cam tower bottom 13 section that extends upward from the cylinder head. The upper side of the cam tower bottom 13 has a semi-circular recess.

A cam tower cap 11 is bolted to the cam tower bottom 13. The cam tower cap 11 has a similar semi-circular recess facing downward such that when the cam tower cap 11 is bolted to the cam tower bottom 13, the recesses create a circular cam recess 321 that receives the camshafts. Cam recesses 321 are sized and constructed to secure but allow the intake and exhaust camshafts to freely rotate.

Spark plug tubes 20 in this aspect of the present teachings are located between the cam towers 10 and parallel to a centerline 21 passing through the center of the cylinder head. The spark plug tubes 20 extend downward through the cylinder head into the top of each engine cylinder and is designed to receive a spark plug.

1.2. VVA Switching Rocker Arm Arrangements
1.2.1. Symmetrical Arrangements This engine head assembly shown in FIGS. 115 and 116 has enough space to accept a symmetrical variable valve lift (VVL) rocker arm assembly 100 as previously described.

The VVL rocker arm assembly 100 will be used for the remainder of the description provided here; however, it is understood that these aspects of the present teachings may be applied to various other rocker arm assemblies installed on heads having small clearances on one side of the rocker assemblies.

This VVL rocker arm assembly 100 is driven by a camshaft having three lobes per cylinder. It is shown here in FIGS. 115 and 116 with the camshafts removed except a middle cam lobe 324 and an outer cam lobe 326 remain and are shown. In this aspect of the present teachings, a rocker arm assembly 100 is shown that has an inboard end 101 (or a first end 101) and an outboard end 103 (or a second end 103). The term 'inboard' refers to a direction inward toward centerline 21 and 'outboard' refers to a direction outward away from the centerline 21.

As seen in FIG. 116, it is seen that the VVL rocker arm assembly 100 inboard end 101 is supported by a hydraulic lash adjuster 340. The outboard end 103 rests upon valve stem 350.

As middle cam lobe 324 turns and presses downward onto the VVL rocker arm assembly 100, it causes outboard end 103 of VVL rocker arm assembly 100 to push valve stem 350 downward opening the poppet valve connected to valve stem 350. When an internal latch is operated by providing high-pressure oil to it, the VVL rocker arm assembly 100 causes the valves to lift according to the shape of the outer cam lobes 326. This is further described below in connection with FIG. 117.

1.2.2. Non-Symmetrical Arrangements

Figure 117:
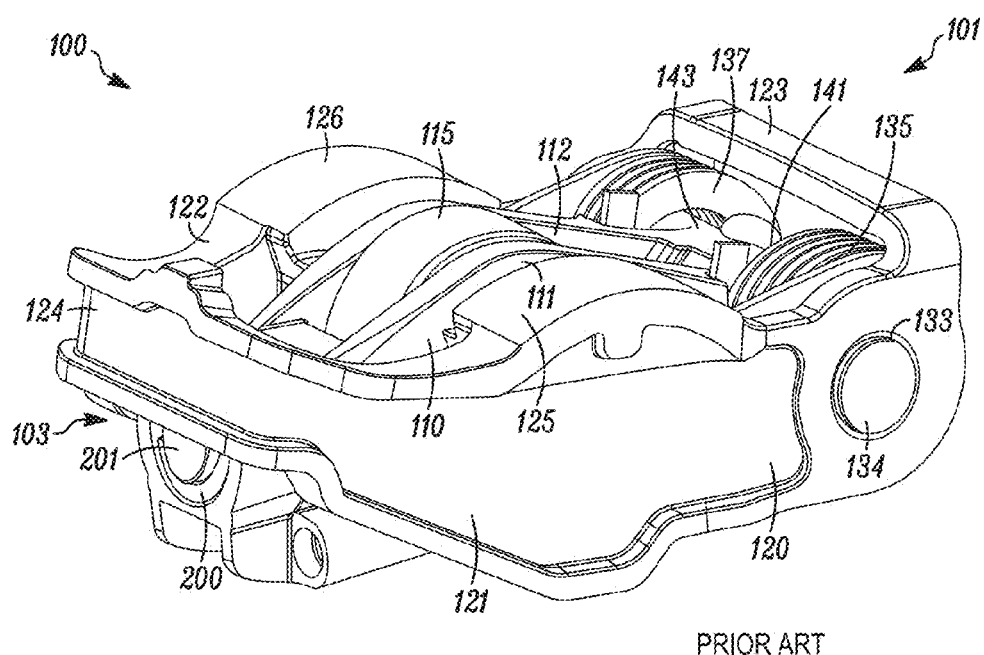

In FIG. 117, the torsion springs 135, 137 and spring posts 141, 143 make the VVL rocker arm assembly 100 wider at its first end as compared with a standard rocker arm. The design of the VVL rocker arm assembly 100 (and that of the CDA rocker arm) is wider than standard rocker arms and can fit in only certain cylinder heads. There is enough clearance in the cylinder heads shown in FIGS. 115 and 116, however, in certain engine heads, there is not enough clearance from other structures, such as a cam tower or spark plug tube, and this VVL rocker arm assembly 100 could not be used.

As indicated above, it is very costly to redesign/modify cylinder heads, cam drives and gear trains. Also, many different manufacturers may make equipment based upon the standard design of the cylinder head, making it very difficult to change or modify the cylinder head.

Therefore, the present teachings can be embodied in VVA rocker arm assemblies that are specially designed to fit cylinder heads having little clearance.

In many cylinder head designs, it was determined that there was only a lack of space in one side of the rocker. Typically, the lack of space can occur in the inboard end 101 on the side of the rocker near the spark plug tubes 20. Therefore, it would be viable to package the VVL rocker arm assembly 100 in a redesigned form so that the width on the obstructed side would not be wider than that of a standard rocker arm.

The result was to create modified rocker assemblies for use on cylinder heads that have obstructions on the right-hand side of the rocker assemblies, or left-hand rocker assemblies. In the left-hand rocker assembly most of the functional elements are moved from the right-hand side to the left-hand side. Also, the right-hand side is formed to have reduced width.

Similarly, right-hand rocker assemblies are designed for use when there is an obstruction on the left-hand side. Similarly, structures are moved from the left-hand side to the right-hand side and the left-hand side is formed to create increased clearance on the left side to compensate for the obstruction. Collectively, they will be referred to as modified rocker assemblies.

A novel modified rocker assembly 400 according to one aspect of the present teachings is described in connection with FIGS. 118-122.

Figure 118:
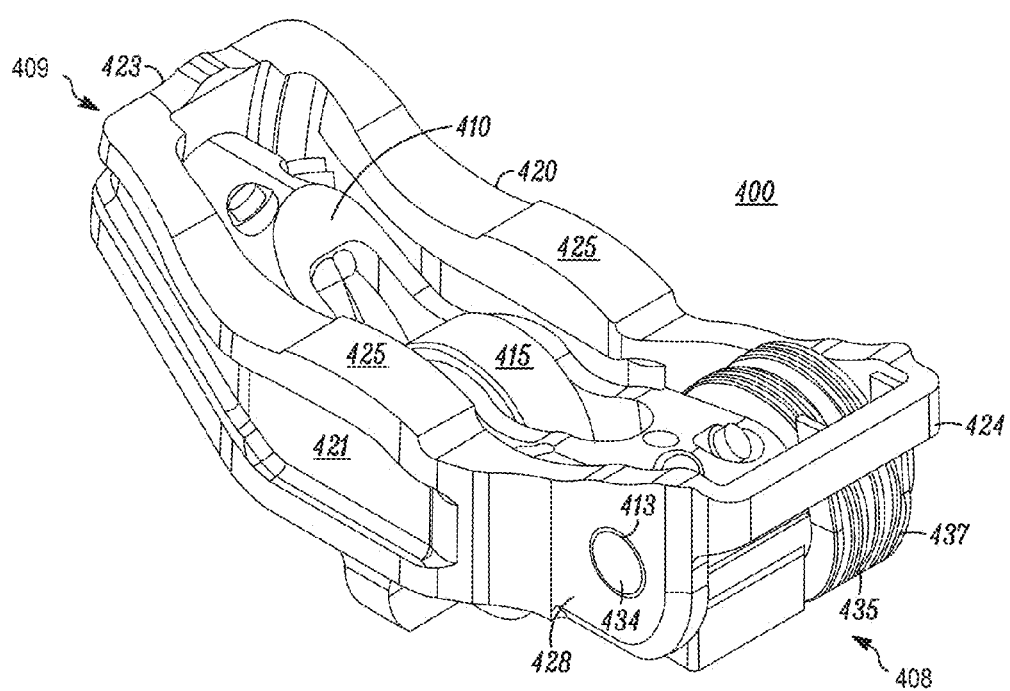

FIG. 118 is a perspective view of a left-handed modified rocker assembly 400 exhibiting variable valve lift, according to one aspect of the present teachings.

Figure 119:
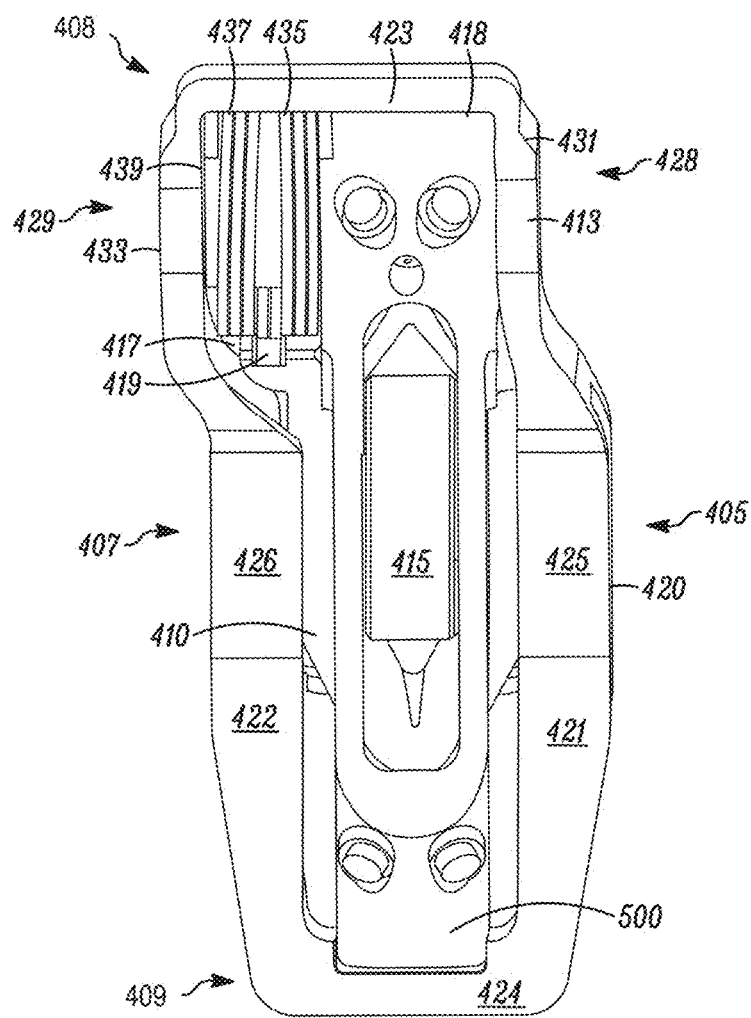

FIG. 119 is top plan view of the modified rocker assembly 400 of FIG. 118.

Figure 120:
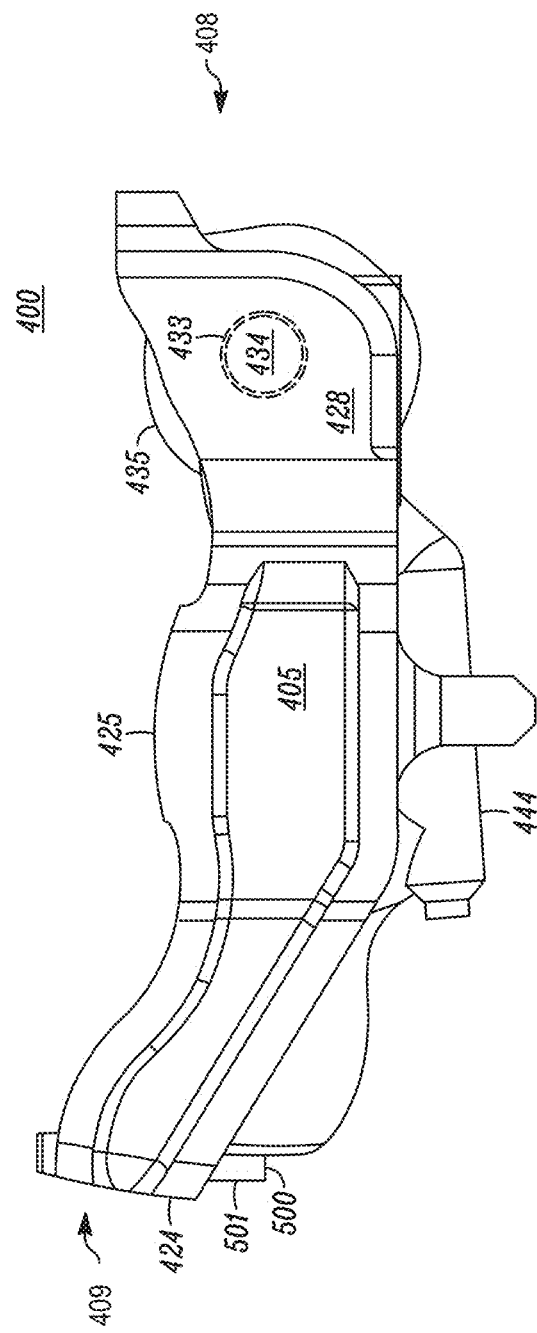

FIG. 120 is a side elevational view of the modified rocker assembly 400 of FIGS. 118-119.

Figure 121:
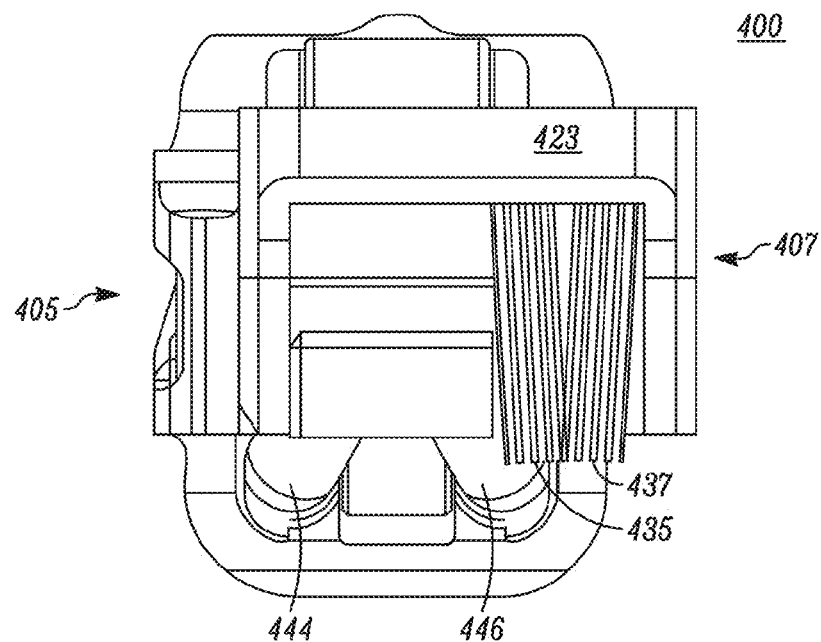

FIG. 121 is an end-on elevational view of the modified rocker assembly 400 of FIGS. 118-120 as viewed from its hinge (first) end.

Figure 122:
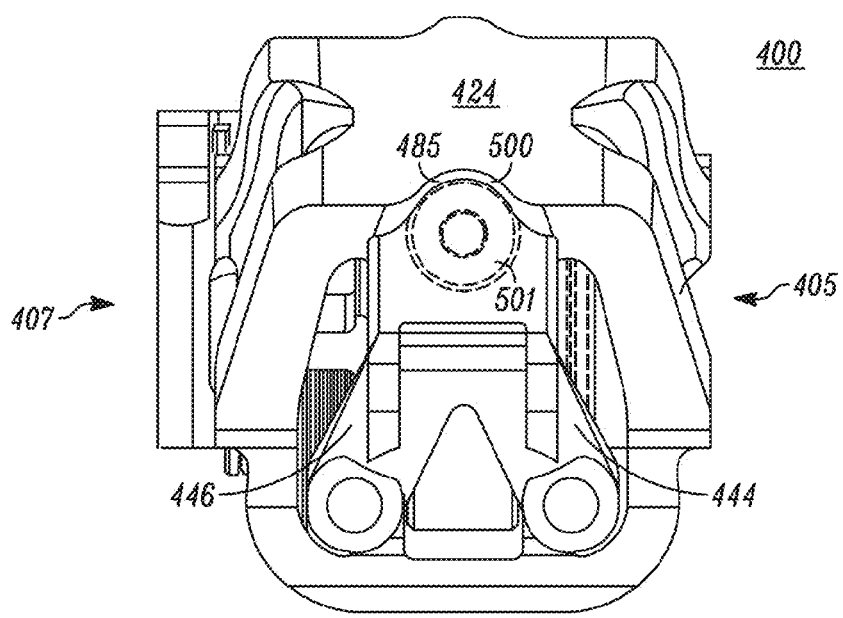

FIG. 122 is an end-on elevational view of the modified rocker assembly 400 of FIGS. 118-121 as viewed from its latch (second) end.

The modified rocker assembly 400 shown here for illustrative purposes is a variable valve lift (VVL) rocker assembly; however, a cylinder deactivation (CDA) rocker assembly or other rocker assembly employing torsion springs on its first end 408, or otherwise having a widened first (or hinged) end 408 fall within the scope of the present teachings.

This rocker assembly functions in a very similar manner as that shown in FIG. 117 and described above, and the VVL Rocker Application, herein incorporated by reference. The modified rocker assembly 400 employs an inner structure 410 that fits inside of an outer structure 420. However, this modified rocker assembly 400 is used on cylinder heads having less clearance near the rocker assembly. The modified rocker assembly 400 includes many ornamental aspects apart from the functional aspects disclosed herein.

Inner structure 410 can have an axle recess 413 passing through its first end 408. The outer structure 420 also can have an axle recess 433 through its first end 408. When the roller axle recesses 413, 433 are aligned with the inner structure 410 inside of the outer structure 420, the axle 434 can be secured through the axle recesses 413, 433 allowing inner structure 410 to pivot relative to outer structure 420 about axle 434.

The outer structure 420 on the obstructed side 405, as it extends from the second end 409 toward the first end 408, can be offset toward the non-obstructed side 407 creating a first offset portion 428. This offset can be a curved or angled sidearm that can create a smaller width at the first end 408. This first offset portion 428 can provide additional clearance on the obstructed side 405 as compared with standard VVL or CDA rocker arm assemblies. This can now allow the modified rocker assembly 400 to fit into and function with cylinder heads that have narrow obstruction region such as obstruction region 600 of FIGS. 132, 133.

The outer structure 420 on the non-obstructed side 407, as it extends from the second end 409 toward the first end 408, can be offset outward away from the modified rocker assembly 400 creating a second offset portion 429. This second offset portion 429 can provide additional clearance on the non-obstructed side 407 as compared with standard VVL or CDA rocker arm assemblies, to allow the incorporation of a second torsion spring 437. This now can allow the modified rocker assembly 400 to exert the proper amount of force to bias the inner structure 410 with respect to the outer structure 420. In an alternative aspect of the present teachings, a single larger torsion spring can be used in place of the two or more torsion springs shown here.

The modified rocker assembly 400 employs a latch assembly 500 with a latch pin 501 that can hold the inner structure 410 and outer structure 420 together so they move as a single rocker. The latch assembly 500 can be activated by an oil control valve (not shown) that can provide increased oil pressure through a cup 448 pivoting upon the hydraulic latch adjuster 340. This is further described in connection with FIGS. 126, 127.

Since there are now two (or more) torsion springs 435, 437 on the non-obstructed side 407 (or here is a single larger torsion spring) with no torsion springs on the obstructed side 405, there will be a twisting force placed upon the inner structure 410 and outer structure 420 of the rocker assemblies. Therefore the amount of play about the axle 434 can be adjusted to make sure that the modified rocker arm 400 functions correctly.

When using two torsion springs 435, 437, torsion spring 435 is considered a right-hand side spring and is wound in the opposite direction of torsion spring 437. These different springs null out some of the torsional forces.

If only a single torsion spring is to be used, the additional torsional forces should be considered when designing the inner and outer structures 410, 420.

For the double torsion spring and single torsion spring designs, the relative strength of the inner and outer structures 410, 420 can be adjusted to reduce flexing, to ensure proper performance. Also the weight distribution of each of the structures along their length can be configured to provide the proper strength and structure while minimizing the inertial force required to pivot the modified rocker assembly 400 at the speed required to operate an engine. The inner and outer structures 410, 420 include many ornamental aspects apart from the functional aspects disclosed herein.

FIG. 122 shows the latch pin seat 485 that receives and holds latch pin 501 when it is in the extended position. Latch pin 501 and latch pin seat 485 can hold inner structure 410 from fitting into outer structure 420. Even though the latch pin is shown as a round shape, it may have a flat end that corresponds to a flat seat. The latch pin 501 and latch pin seat 485 can have any complementary shape that allows them to fit properly together.

Figure 123:
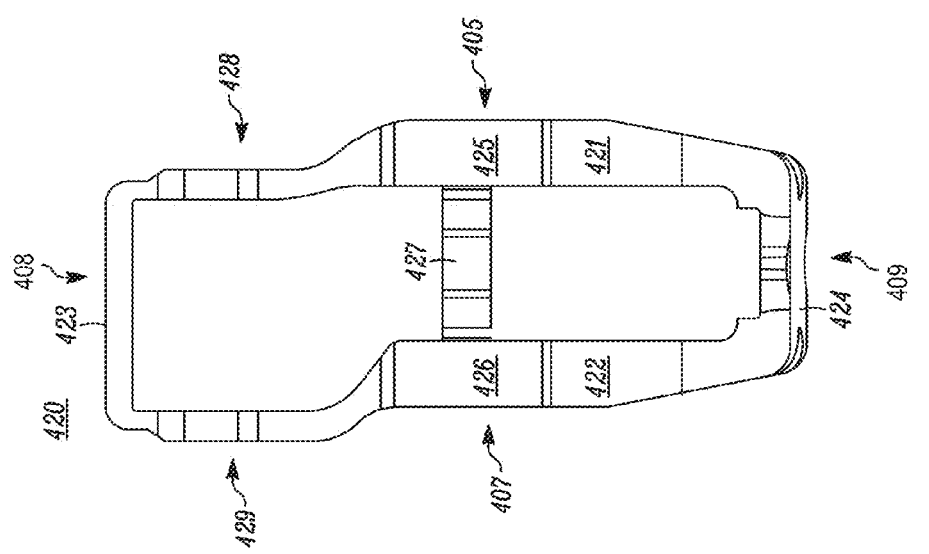

FIG. 123 is a plan view from above the outer structure 420 showing the first and second offset areas 428, 429. Here the differences from the outer structure of the rocker assembly of FIG. 117 can be seen. The first outer side arm 421 near the first end 408 can be skewed to the left to accommodate an obstruction on the right side of the first end of rocker assembly 400. Similarly, the second outer side arm 422 can also be skewed to the left to also accommodate an obstruction on the right side of the first end of rocker assembly 400, keeping the first and second outer side arms roughly the same distance from each other as they extend from the second end 409 toward the first end 408. This can create the offset areas 428 and 429.

FIG. 124 is a plan view from below the outer structure 420 of FIG. 123 also showing the first and second offset areas 428, 429. This also shows a lower cross arm 439. The lower cross arm 439 can be shown to add strength to counteract forces and help prevent flexing that may otherwise occur, due to the non-symmetric design of the modified rocker assembly 400.

Latch pin seat 485, discussed in connection with FIG. 122 above, is also visible from this view.

FIG. 125 is a side elevational view of an outer structure 420 according to one aspect of the present teachings. The first outer side arm 421 and first offset portion 428 are visible in this view.

FIG. 126 is a perspective view of top side of an inner structure 410 according to one aspect of the present teachings.

FIG. 127 is a perspective view of bottom side of the inner structure 410 of FIG. 126. Axle recess 413 is shown that can receive axle 434 and can pivotally connect the inner structure 410 to the outer structure 420. In both FIGS. 126 and 127, roller axle apertures 483 and 484 can receive the roller axle (not shown) to hold roller 415. In FIG. 127, cup 448 can receive the hydraulic lash adjuster 340 of FIG. 116. The hydraulic lash adjuster (340 of FIG. 116) is provided with oil flow from an oil control valve (not shown). The hydraulic lash adjuster 340 has an oil outlet that can provide the oil flow into cup 448. Cup 448 can be connected to internal passageways that provide the oil to galleries 444 and 446. The oil galleries can be connected by internal passageways to latch assembly 500. An oil pressure provided by the oil control valve greater than a threshold pressure can cause the latch assembly 500 to be switched. The latch pin (501 of FIGS. 120-122) can be set to its normal position (with low oil pressure) in a retracted position. When the oil pressure greater than a threshold amount is provided to the latch, it can switch to extend latch pin (501 of FIGS. 120-122). This is a 'normally unlatched' configuration.

Alternatively, at low oil pressure, the latch pin can normally be in an extended position. When the oil pressure increases above a threshold amount, the latch pin can be retracted. This is a 'normally latched' design.

FIG. 128 is a plan view from the top side of the inner structure of FIGS. 126-127.

FIG. 129 is a plan view from the bottom side of the inner structure of FIGS. 126-128.

In FIG. 129, the valve stem seat 417 is shown. Valve stem seat 417 presses against the engine valve stem, actuating the valve when the modified rocker assembly 400 pivots.

FIG. 130 is an end-on elevational view of the inner structure 410 of FIGS. 126-129 as viewed from its hinge (first) end.

FIG. 131 is an end-on elevational view of the inner structure 410 of FIGS. 126-130 as viewed from its latch (second) end.

In FIGS. 128-131 spring post 447 is shown. One or more of the first torsion springs 435, 437 fit over and can be held in place by the spring post 447. A single larger torsion spring may also be used in place of first and second torsion springs 435, 437.

FIG. 132 is a perspective view of the modified rocker assembly 400 of FIGS. 118-122 as it would appear installed in a cylinder head.

As with FIGS. 115 and 116, parts have been removed for clarity. Most notably, the shaft portion of a camshaft having three lobes per engine valve has been removed. The middle cam lobe 324 and one outer cam lobe 326 are shown. Since one of the side lobes is not shown, the second slider pad 426 is visible. This and the second slider pad can ride on the outer cam lobes 326 as described in the VVL Rocker Application above.

The camshaft would be secured by and pass through the cam tower 10. Here it can be easily seen that spark plug tube 20 would interfere with a standard CDA or VVL rocker assembly at the obstruction region 600. The first offset portion 428 of the modified rocker assembly 400 is adjacent to the spark plug tube 20 at obstruction region 600. Due to its reduced width, it is now able to fit on this head and function without colliding into the spark plug tube 20.

FIG. 133 is a perspective view from another viewpoint of the modified rocker assembly 400 of FIGS. 118-122, as it would appear installed in a cylinder head.

This shows the same structures as FIG. 120, but from a viewpoint above, and closer to the centerline of the cylinder head, viewing the non-obstructed side 407 of the modified rocker assembly 400. Middle cam lobe 324 is pressing down roller 415.

First offset portion 428 is shown near the obstruction region 600 adjacent to the spark plug tube 20 providing the required clearance.

Second offset portion 429 is also shown providing the additional space for both torsion springs 435, 437.

While the present disclosure illustrates various aspects of the present teachings, and while these aspects have been described in some detail, it is not the intention of the applicant to restrict or in any way limit the scope of the claimed teachings of the present application to such detail. Additional advantages and modifications will readily appear to those skilled in the art. Therefore, the teachings of the present application, in its broader aspects, are not limited to the specific details and illustrative examples shown and described. Accordingly, departures may be made from such details without departing from the spirit or scope of the applicant's claimed teachings of the present application. Moreover, the foregoing aspects are illustrative, and no single feature or element is essential to all possible combinations that may be claimed in this or a later application.

What is claimed is:

1. A manufacturing apparatus, comprising:
   a base;
   a ball plunger post extending upward from the base, the ball plunger post having a size and a shape of a hydraulic lift adjuster (HLA) of a predefined engine;
   a valve stem post extending upward from the base, the valve stem post having a size and a shape of a valve stem of the predefined engine, the valve stem post having a position, a height and an orientation relative to the ball plunger post with relation to the HLA of the predefined engine; and
   a support shelf,
   wherein the manufacturing apparatus comprises a fixture sized and shaped to receive a switching rocker arm assembly for use in the predefined engine, the switching rocker arm assembly comprising a first end for pivoting and a second end for latching.

2. The manufacturing apparatus of claim 1 wherein the ball plunger post and the valve stem post are adapted to receive the switching rocker arm assembly.

3. The manufacturing apparatus of claim 1 wherein the switching rocker arm assembly comprises a latch with a latch pin fitting into a latch bore and a latch seat; and the manufacturing apparatus further comprises:
   a latch rod for positioning within the latch bore to rest upon the latch seat when the switching rocker arm assembly is mounted upon the ball plunger post and the valve tip post, the latch rod having a hardness significantly higher than that of the latch seat and a same diameter as the latch pin, wherein the latch rod is adapted for coining the latch seat of the switching rocker assembly, the latch rod also adapted for removal after coining for replacement by the latch pin.

4. The manufacturing apparatus of claim 3, further comprising:
   a press for pressing upon the second end for latching of the switching rocker arm assembly when the second end for latching of the switching rocker arm assembly is mounted on the ball plunger post and the valve tip post, the press adapted for pressing the second end for latching latch rod into the latch rod, coining a latch seat in a surface of the switching rocker arm adjacent to the latch rod.

5. The manufacturing apparatus of claim 3, wherein the latch rod is harder than switching rocker arm assembly.

6. The manufacturing apparatus of claim 3, wherein a diameter of the latch rod matches a diameter of the latch bore within a slip fit.

7. A manufacturing apparatus, comprising:
   a base;
   a ball plunger post extending away from the base, the ball plunger post having a size and a shape of a hydraulic lift adjuster (HLA) of an internal combustion engine;
   a valve stem post extending away from the base and parallel with the ball plunger post, the valve stem post having a size and a shape of a valve stem of the internal combustion engine, the valve stem post having a position, a height and an orientation relative to the ball plunger post with relation to the HLA of the internal combustion engine; and
   a support shelf,
   wherein the manufacturing apparatus comprises a fixture sized and shaped to receive a switching rocker arm assembly for use in the internal combustion engine, the switching rocker arm assembly comprising a first end for pivoting nearer the ball plunger post and a second end for latching closer to the valve stem post and the support shelf.

8. The manufacturing apparatus of claim 7, wherein the manufacturing apparatus is adapted for assembly into a press for applying a deforming load to the switching rocker arm assembly.

9. The manufacturing apparatus of claim 7, wherein the switching rocker arm assembly comprises an outer arm and an inner arm mounted between first and second side arms of the outer arm.

10. The manufacturing apparatus of claim 9, wherein the outer arm comprises first and second cross members between the first and second side arms, a first cross member located nearer a pivoting portion of the switching rocker arm assembly and a second cross member located nearer a latching end of the switching rocker arm assembly.

11. The manufacturing apparatus of claim 10, wherein the second cross member is adapted for use with the manufacturing apparatus and wherein force applied to a first side of the second cross member is effective to coining a latch seat on a second side of the second cross member.

12. The manufacturing apparatus of claim 10, wherein the second cross member is adapted for use with the manufacturing apparatus, the second cross member having a milled-flat surface adapted for receiving an indenting load from a latch rod mounted in the inner arm, the indenting load applied to an opposite side of the milled-flat surface.

\* \* \* \* \*

UNITED STATES PATENT AND TRADEMARK OFFICE
CERTIFICATE OF CORRECTION

PATENT NO. : 9,822,673 B2  Page 1 of 1
APPLICATION NO. : 14/981092
DATED : November 21, 2017
INVENTOR(S) : Anthony L. Spoor et al.

It is certified that error appears in the above-identified patent and that said Letters Patent is hereby corrected as shown below:

On the Page 2, in item (63), in Column 1, in "Related U.S. Patent Documents", Line 2, delete "and" and insert -- which is --, therefor.

Signed and Sealed this
Twenty-sixth Day of June, 2018

Andrei Iancu
*Director of the United States Patent and Trademark Office*

UNITED STATES PATENT AND TRADEMARK OFFICE
CERTIFICATE OF CORRECTION

PATENT NO. : 9,822,673 B2
APPLICATION NO. : 14/981092
DATED : November 21, 2017
INVENTOR(S) : Anthony L. Spoor et al.

It is certified that error appears in the above-identified patent and that said Letters Patent is hereby corrected as shown below:

On the Title Page

On Page 2, Item (60), Line 11, delete ", provisional application No. 61/315,646, filed on Mar. 19, 2010", therefor.

Signed and Sealed this
Twenty-sixth Day of May, 2020

Andrei Iancu
*Director of the United States Patent and Trademark Office*